(12) United States Patent
Myojin et al.

(10) Patent No.: US 11,245,315 B2
(45) Date of Patent: Feb. 8, 2022

(54) METHOD OF MANUFACTURING STACKED STATOR CORE

(71) Applicant: Mitsui High-tec, Inc., Kitakyushu (JP)

(72) Inventors: Iwao Myojin, Kitakyushu (JP); Yusuke Hasuo, Kitakyushu (JP); Yusuke Eto, Kitakyushu (JP); Hayato Nakayama, Kitakyushu (JP)

( * ) Notice: Subject to any disclaimer, the term of this patent is extended or adjusted under 35 U.S.C. 154(b) by 203 days.

(21) Appl. No.: 16/535,088

(22) Filed: Aug. 8, 2019

(65) Prior Publication Data
US 2019/0363621 A1    Nov. 28, 2019

Related U.S. Application Data

(63) Continuation of application No. PCT/JP2018/001965, filed on Jan. 23, 2018.

(30) Foreign Application Priority Data

Feb. 13, 2017  (JP) .............................. JP2017-024383
Jul. 14, 2017  (JP) .............................. JP2017-138428

(51) Int. Cl.
*H02K 15/10*    (2006.01)
*H02K 1/04*     (2006.01)
(Continued)

(52) U.S. Cl.
CPC .............. *H02K 15/10* (2013.01); *H02K 1/04* (2013.01); *H02K 3/521* (2013.01); *H02K 15/0043* (2013.01); *H02K 15/024* (2013.01)

(58) Field of Classification Search
CPC .......... H02K 15/10; H02K 1/04; H02K 15/00; H02K 15/02; H02K 3/52; H02K 15/0043;
(Continued)

(56) References Cited

U.S. PATENT DOCUMENTS

2004/0046477 A1   3/2004  Kuroyanagi et al.
2011/0268923 A1*  11/2011 Suzuki ............... B29C 45/0013
                                                    428/156
(Continued)

FOREIGN PATENT DOCUMENTS

CN   102934336   2/2013
CN   104247212   12/2014
(Continued)

OTHER PUBLICATIONS

International Search Report dated Apr. 10, 2018 for PCT/JP2018/001965.
(Continued)

*Primary Examiner* — Naishadh N Desai
(74) *Attorney, Agent, or Firm* — Soei Patent & Law Firm

(57) ABSTRACT

A method of manufacturing a stacked stator core comprises forming a stack that comprises an annular yoke portion, a plurality of tooth portions, and a plurality of slots. The method further comprises inserting a mold core member of the plurality of mold core members into a slot of the plurality of slots, the mold core member comprising a body portion and a closing portion connected to the body portion, the body portion extending along a longitudinal direction of the slot and spaced apart from an inner wall surface of the slot, the closing portion being positioned on a slot opening side of the slot and closing an open end portion of the slot on the slot opening side. Additionally, the method comprises forming a resin portion by charging a melted resin into a filling space between the slot and the mold core member.

13 Claims, 94 Drawing Sheets

(51) Int. Cl.
*H02K 3/52* (2006.01)
*H02K 15/00* (2006.01)
*H02K 15/02* (2006.01)

(58) Field of Classification Search
CPC ...... H02K 15/024; H02K 15/12; H02K 3/521; H02K 3/48; H02K 3/345; H02K 1/16
See application file for complete search history.

(56) References Cited

U.S. PATENT DOCUMENTS

| | | | |
|---|---|---|---|
| 2013/0062973 | A1 | 3/2013 | Yoshimura et al. |
| 2015/0069878 | A1 | 3/2015 | Hattori et al. |
| 2015/0108857 | A1 | 4/2015 | Takahashi |
| 2016/0056694 | A1 | 2/2016 | Mabu |
| 2016/0118870 | A1* | 4/2016 | Lin ................. H02K 15/02 29/736 |
| 2019/0276709 | A1* | 9/2019 | Tsu ................. B32B 27/281 |

FOREIGN PATENT DOCUMENTS

| | | | | |
|---|---|---|---|---|
| CN | 105365153 | | 3/2016 | |
| EP | 2544339 | | 1/2013 | |
| JP | 61150638 A | * | 7/1986 | ............ H02K 15/12 |
| JP | S61-150638 | | 7/1986 | |
| JP | H7-016557 | | 3/1995 | |
| JP | H7-222413 | | 8/1995 | |
| JP | 2000125524 A | * | 4/2000 | |
| JP | 2002-247813 | | 8/2002 | |
| JP | 2002247813 A | * | 8/2002 | |
| JP | 3400031 | | 4/2003 | |
| JP | 2003-235193 | | 8/2003 | |
| JP | 2003-324913 | | 11/2003 | |
| JP | 2003324913 A | * | 11/2003 | |
| JP | 2007-244065 | | 9/2007 | |
| JP | 2013-027180 | | 2/2013 | |
| JP | 2015-073406 | | 4/2015 | |
| JP | 2015-076982 | | 4/2015 | |
| JP | 2015-080368 | | 4/2015 | |
| JP | 2016-037581 | | 3/2016 | |
| JP | 2016-086508 | | 5/2016 | |
| JP | 2016-116417 | | 6/2016 | |
| JP | 2016116417 A | * | 6/2016 | |
| JP | 2017-163797 | | 9/2017 | |
| WO | 03/028188 | | 4/2003 | |

OTHER PUBLICATIONS

International Preliminary Report on Patentability with Written Opinion dated Aug. 22, 2019 for PCT/JP2018/001965.

Extended Search Report in corresponding European Application No. 18751507.7, dated Feb. 5, 2021.

* cited by examiner

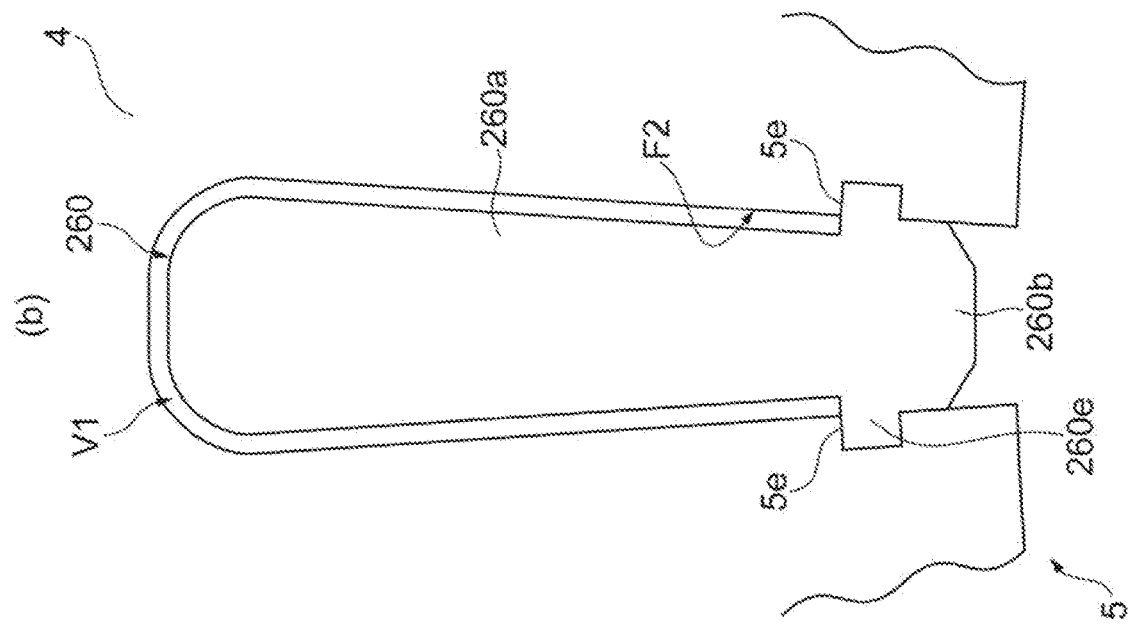
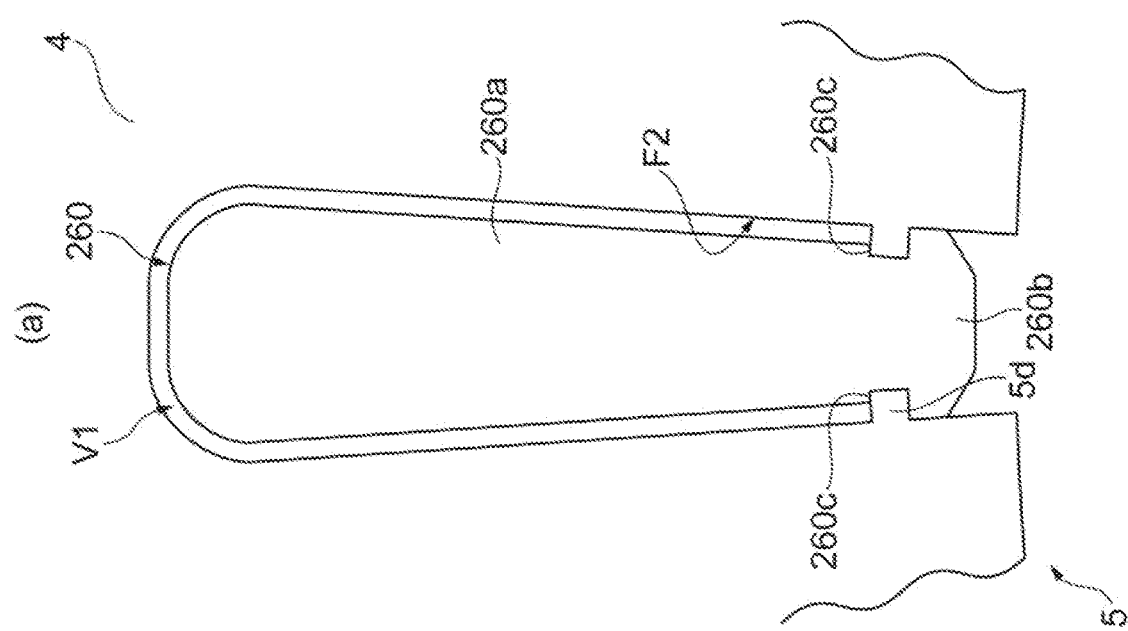
Fig.21

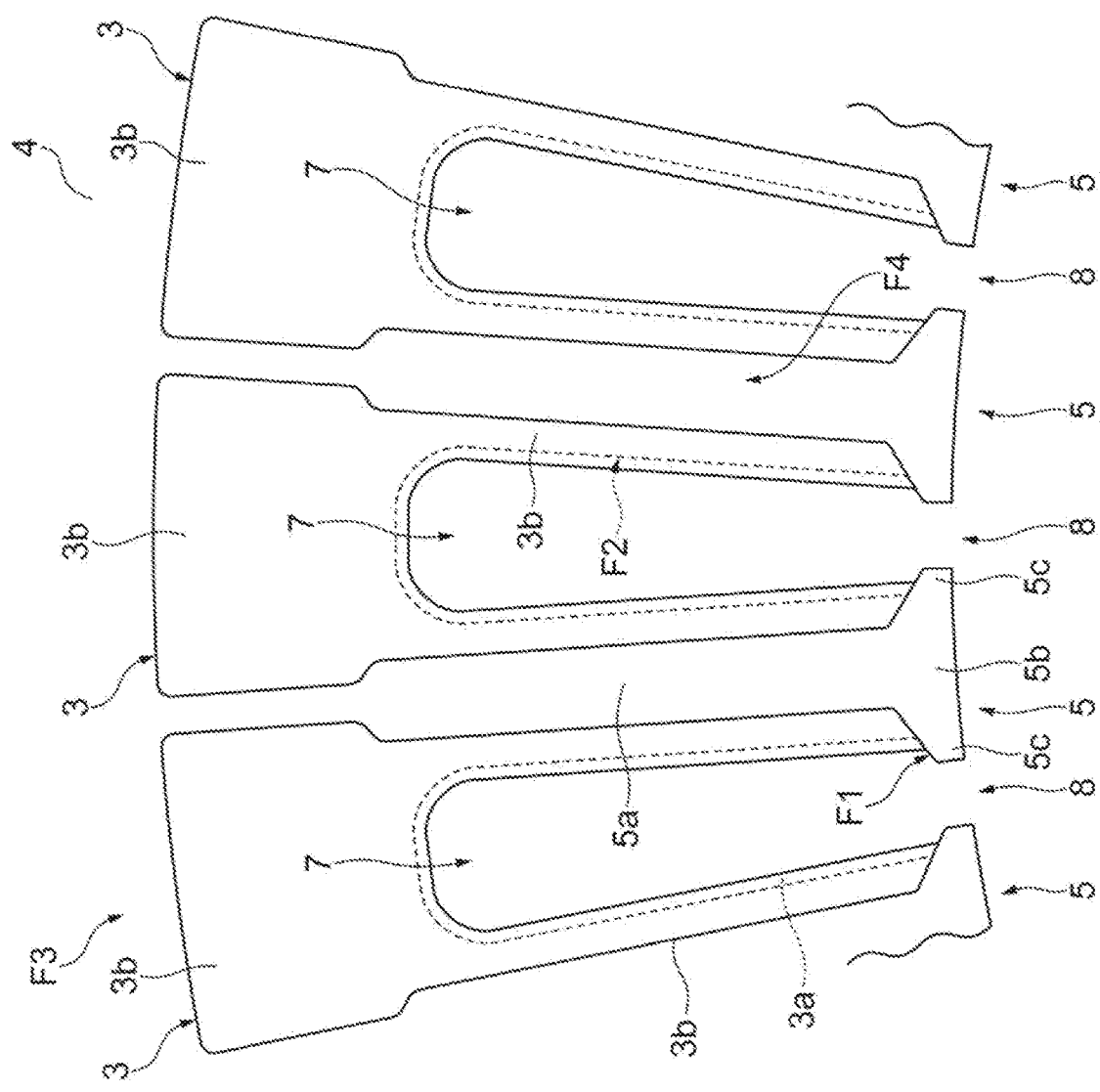
Fig. 24

Fig.28
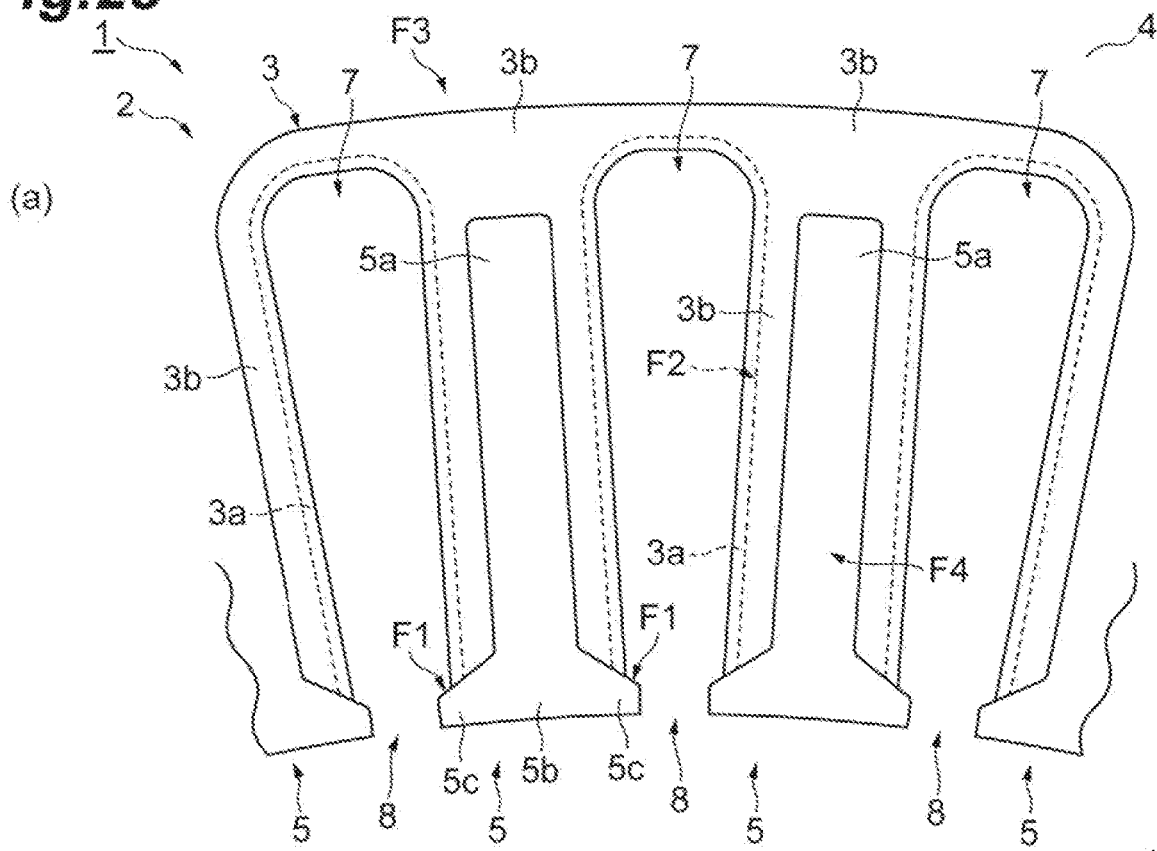
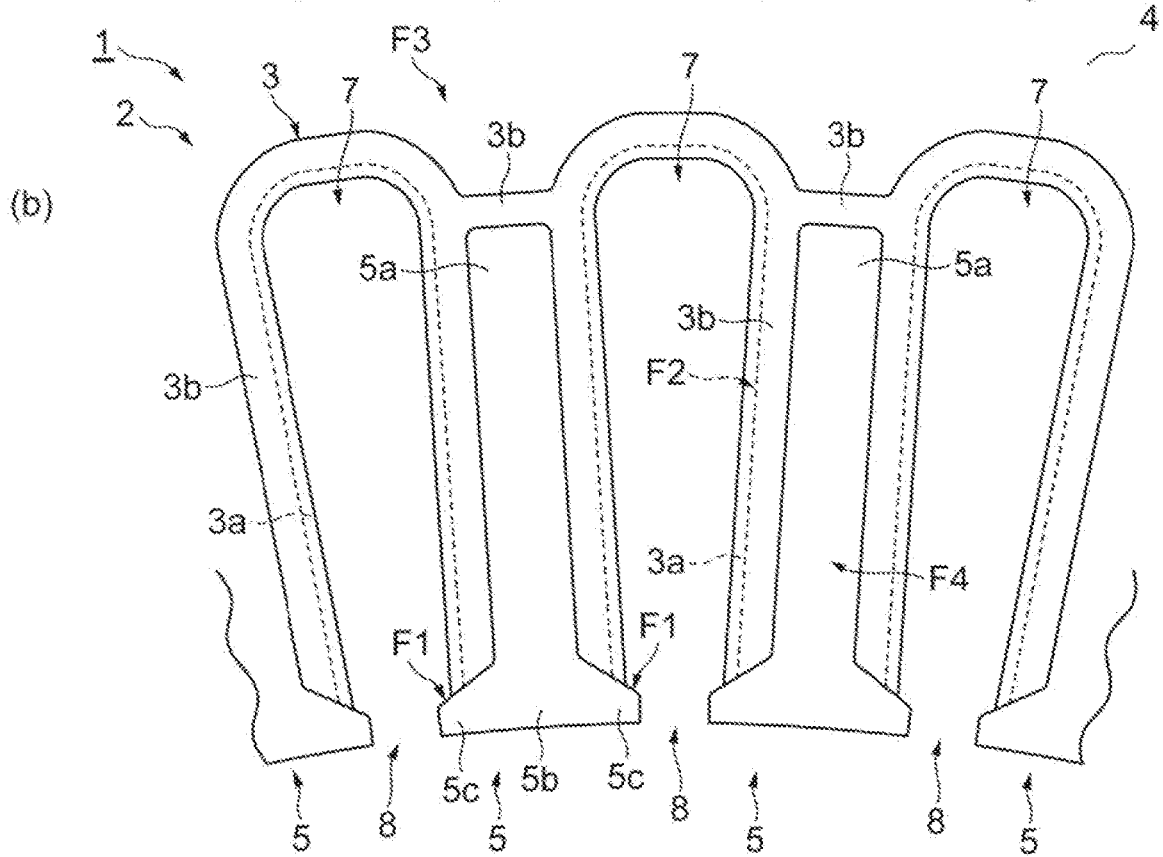

Fig.35
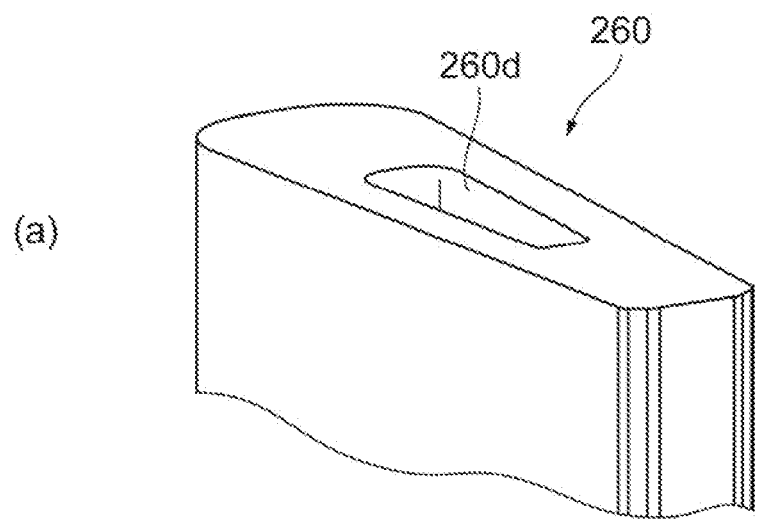
(a)
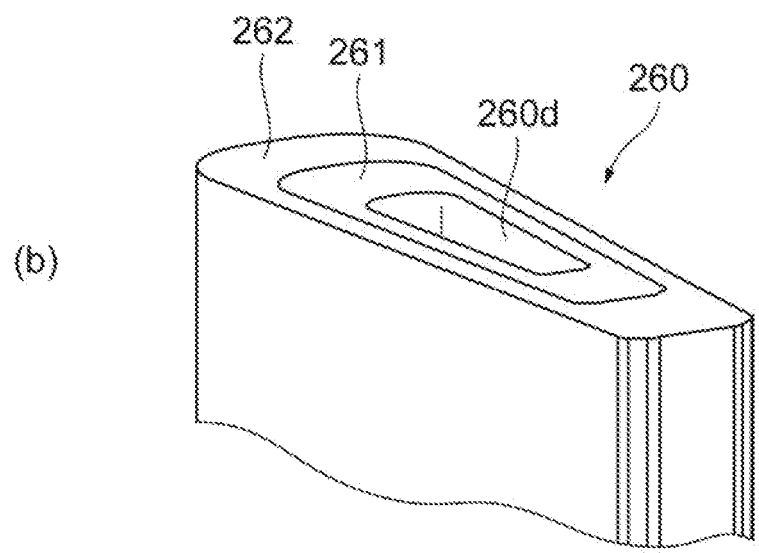
(b)

Fig. 58
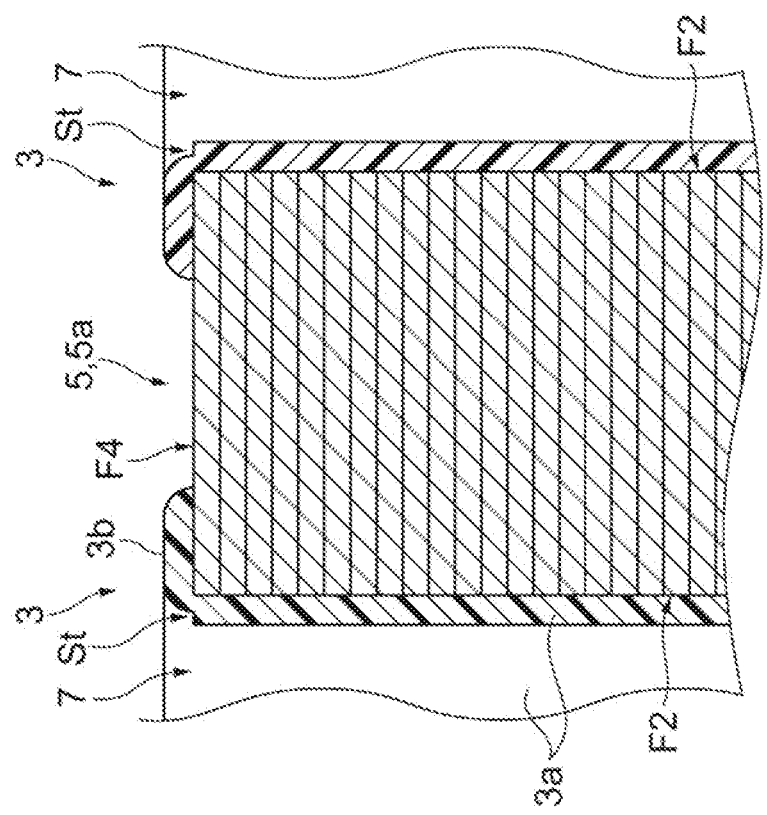
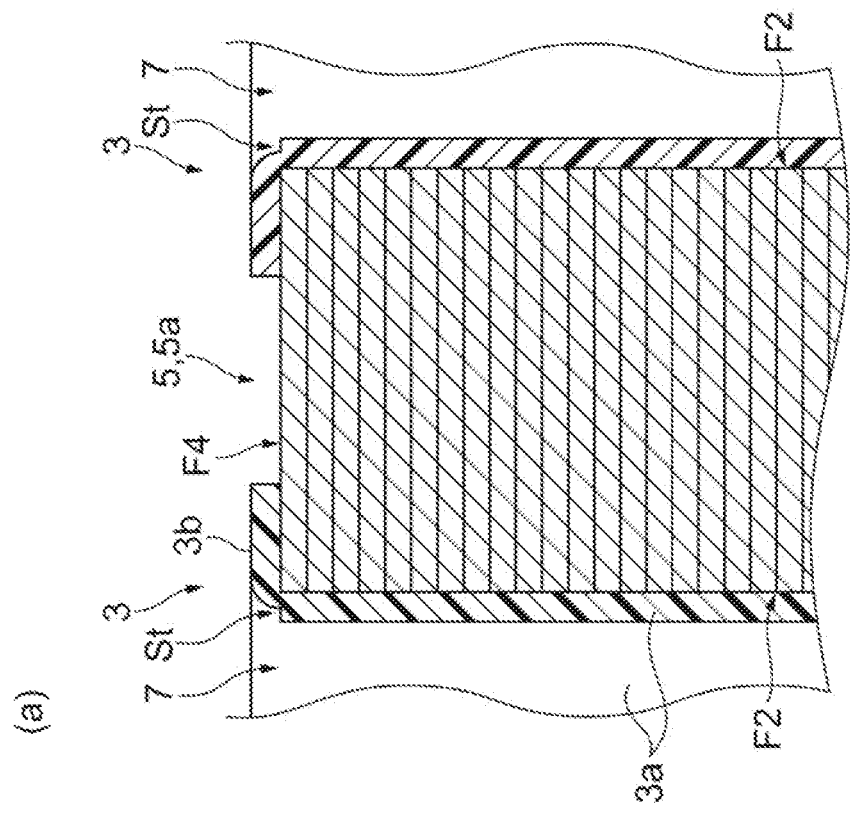

Fig.70
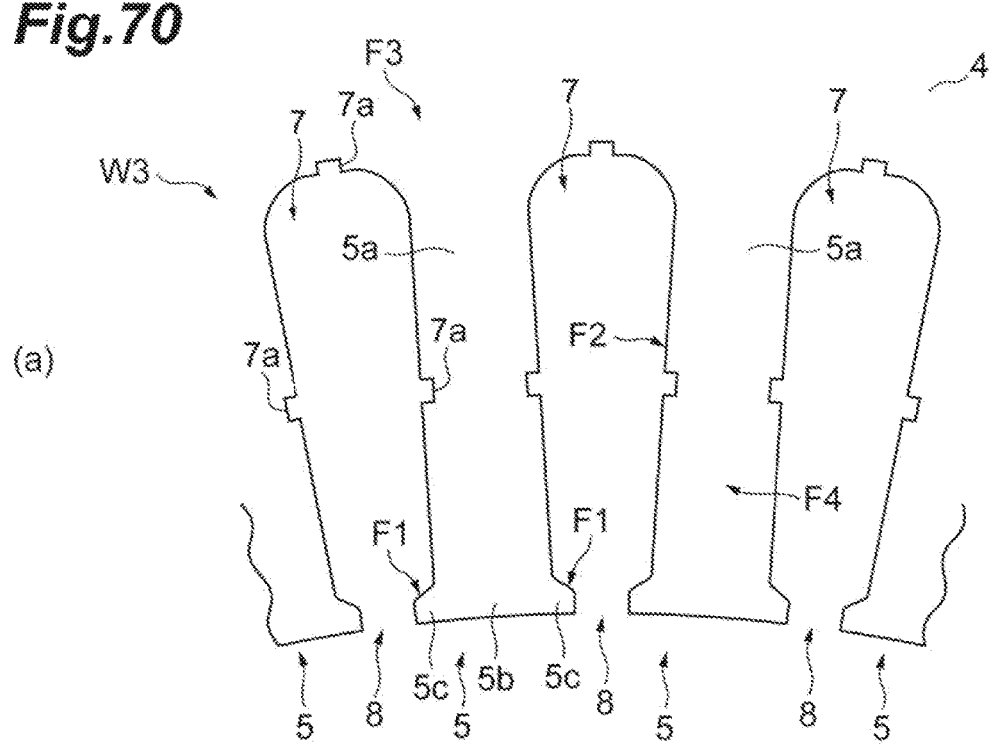
(a)
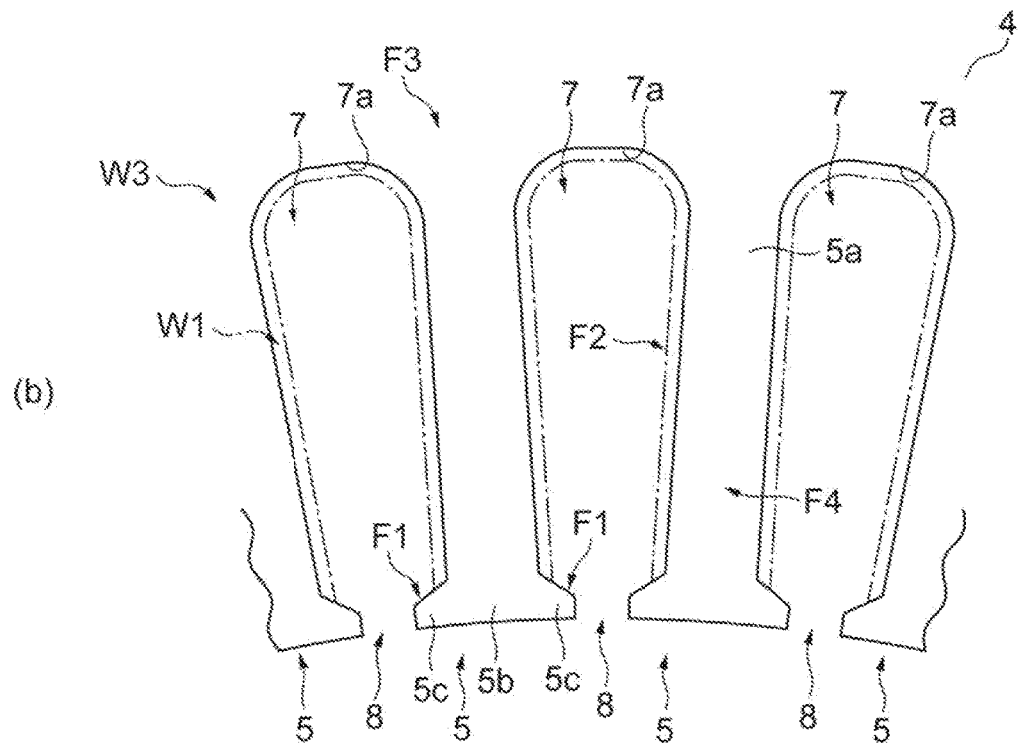
(b)

Fig.72
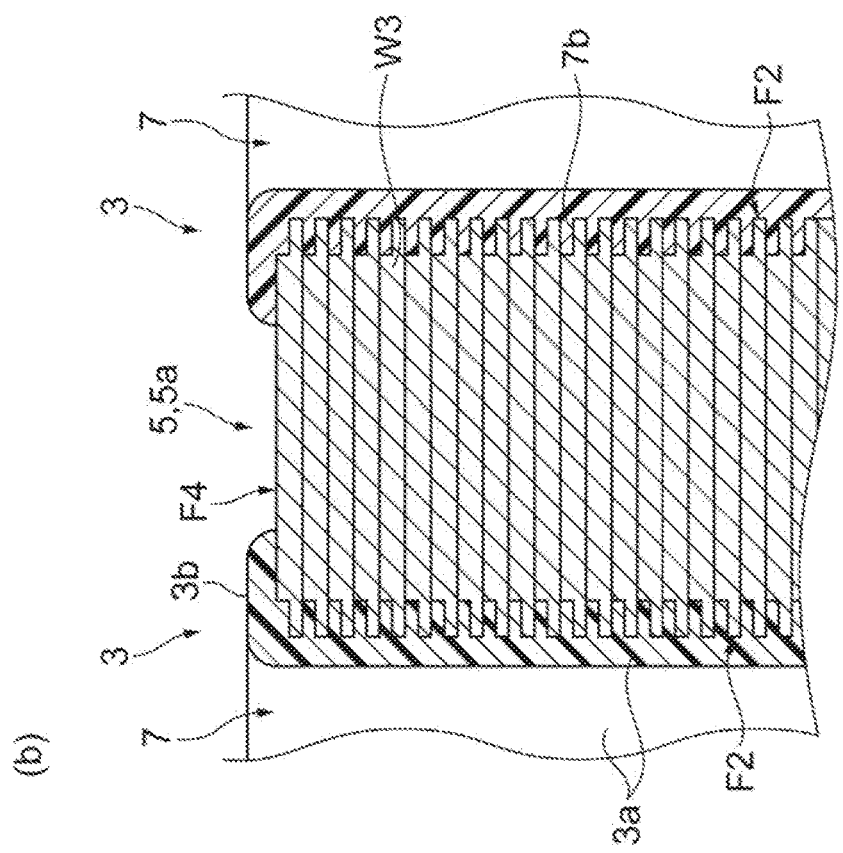
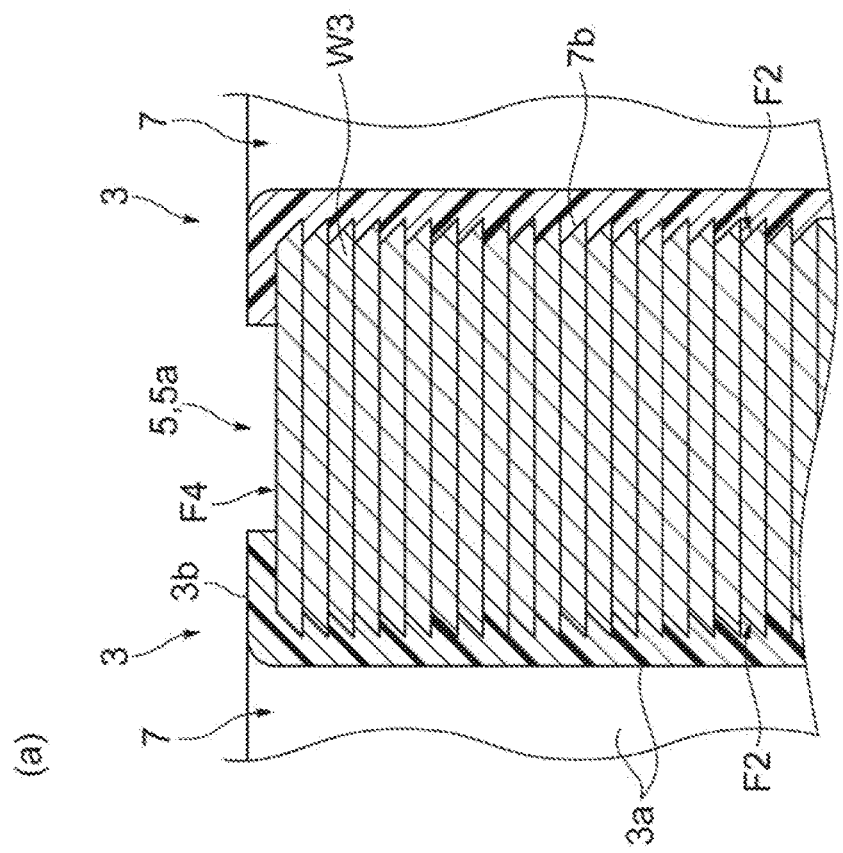

METHOD OF MANUFACTURING STACKED STATOR CORE

CROSS-REFERENCE TO RELATED APPLICATIONS

This application is a continuation application of PCT Application No. PCT/JP2018/001965 filed on Jan. 23, 2018, which claims the benefit of priority from Japanese Patent Application No. 2017-024383, filed on Feb. 13, 2017, and Japanese Patent Application No. 2017-138428, filed on Jul. 14, 2017, the entire contents of which are incorporated herein by reference.

FIELD

The present disclosure relates to a method of manufacturing a stacked stator core and a stacked stator core.

BACKGROUND

In general, a stator is formed by attaching a winding coil to a tooth portion of a stacked stator core. It is required to ensure insulation between the winding coil and the stacked stator core. For example, Japanese Unexamined Patent Publication No. 2015-076982 discloses a method of manufacturing a stator, including a step of inserting a bundle of coil wire material wrapped with an insulating sheet into a slot between tooth portions, and a step of filling the slot with resin in a state in which the bundle of coil wire material is pressed against the slot opening. In this case, the insulating sheet is disposed between the slot and the coil wire material to ensure the insulation between them.

SUMMARY

An example method of manufacturing a stacked stator core may comprise forming a stack configured such that a plurality of core members are stacked, the stack comprising an annular yoke portion, a plurality of tooth portions extending from the yoke portion in a direction crossing the yoke portion, and a plurality of slots, each of the plurality of slots being a space formed between adjacent two of the plurality of tooth portions in a circumferential direction of the yoke portion. The method may further comprise inserting a mold core member of the plurality of mold core members into a slot of the plurality of slots, the mold core member comprising a body portion and a closing portion connected to the body portion, the body portion extending along a longitudinal direction of the slot and spaced apart from an inner wall surface of the slot, the closing portion being positioned on a slot opening side of the slot and closing an open end portion of the slot on the slot opening side. Additionally, the method may comprise forming a resin portion by charging a melted resin into a filling space between the slot and the mold core member.

Another example method of manufacturing a stacked stator core may comprise forming a stack configured such that a plurality of core members are stacked, the stack comprising an annular yoke portion, a plurality of tooth portions extending from the yoke portion in a crossing direction crossing the yoke portion, and a plurality of slots, each of the plurality of slots being a space formed between adjacent two of the plurality of tooth portions in a circumferential direction of the yoke portion. The method may further comprise inserting a mold core member of the plurality of mold core members into a slot of the plurality of slots, the mold core member extending along a longitudinal direction of the slot and spaced apart from an inner wall surface of the slot. The method may still further comprise sandwiching the stack between a pair of holding plates in a height direction of the stack, after forming the stack. Additionally, the method may comprise disposing a closing member in a through hole provided at the center of the stack so as to close a slot opening of the slot, after forming the stack. Still further, the method may comprise forming a resin portion by charging a melted resin into a filling space between the slot, the mold core member, and the closing member, after inserting the mold core member, sandwiching the stack and disposing the closing member. The pair of holding plates may comprise an auxiliary space continuous from a region facing the filling space to a region facing at least a part of an end surface of the tooth portion adjacent to the filling space. The filling space may be positioned to be shifted from the auxiliary space such that the filling space protrudes toward the slot relative to the auxiliary space. In the method, the resin portion may be formed by charging the melted resin into the filling space and the auxiliary space.

An example stacked stator core may comprise a stack configured such that a plurality of core members are stacked, the stack comprising an annular yoke portion, a plurality of tooth portions extending from the yoke portion in a direction crossing the yoke portion, and a plurality of slots, each of the plurality of slots being a space formed between adjacent two of the plurality of tooth portions in a circumferential direction of the yoke portion. The stacked stator core may further comprise a resin portion covering an inner wall surface of a slot of the plurality of slots. The resin portion may not close an open end portion of the slot on a slot opening side.

Another example stacked stator core may comprise a stack configured such that a plurality of core members are stacked, the stack comprising an annular yoke portion, a plurality of tooth portions extending from the yoke portion in a crossing direction crossing the yoke portion, and a plurality of slots, each of the plurality of slots being a space formed between adjacent two of the plurality of tooth portions in a circumferential direction of the yoke portion. The stacked stator core may further comprise a resin portion covering an inner wall surface of a slot of the plurality of slots and closing a slot opening of the slot. A resin main portion may be disposed to be shifted from a resin end portion such that the resin main portion protrudes toward the slot side relative to the resin end portion. Additionally, the resin main portion may be a part of the resin portion and disposed on an inner wall surface of the slot. Still further, the resin end portion may be a-part of the resin portion and disposed on an end surface of the tooth portion and an end surface of the yoke portion.

BRIEF DESCRIPTION OF THE DRAWINGS

FIG. 21 is a top view of the vicinity of one slot in which a mold core member is inserted, in another example method of manufacturing a stacked stator core.

FIG. 24 is a partially enlarged top view of the vicinity of tooth portions, in another example stacked stator core.

FIG. 28 is a partially enlarged top view of the vicinity of tooth portions, in another example stacked stator core.

FIG. 35 is a perspective view illustrating the vicinity of an upper end of the mold core member used in another example method of manufacturing a stacked stator core.

FIG. 58 is a cross-sectional view of the vicinity of the upper end surface of the tooth portion cut in the same manner as in FIG. 4, in another example stacked stator core.

FIG. 70 is a partially enlarged top view of the vicinity of the tooth portion in a blanked member forming another example stacked stator core.

FIG. 72 is a cross-sectional view of the vicinity of the upper end surface of the tooth portion cut in the same manner as in FIG. 4, in another example stacked stator core.

DETAILED DESCRIPTION

Figure 1:
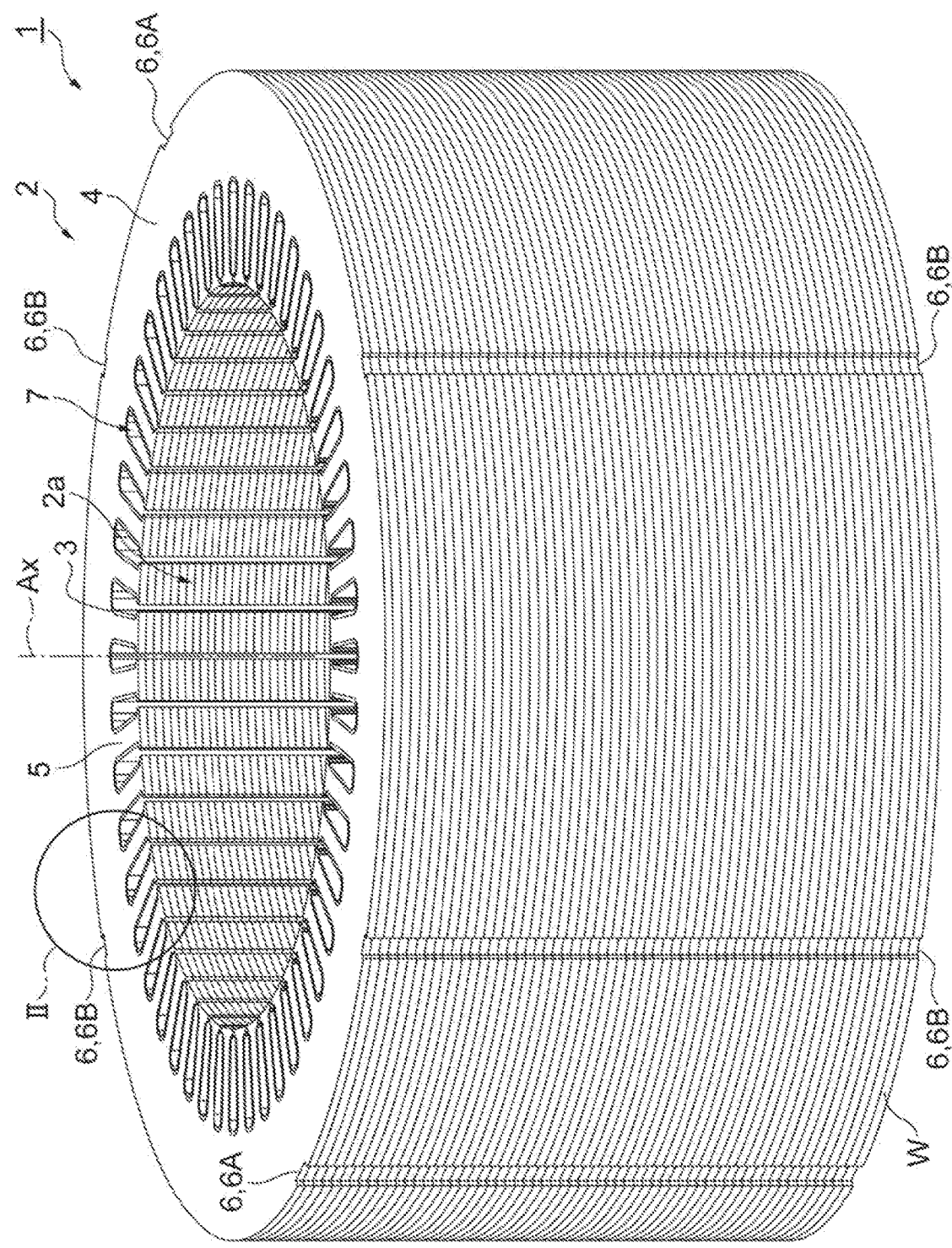
FIG. 1 is a perspective view illustrating an example stacked stator core.

In the following description, with reference to the drawings, the same reference numbers are assigned to the same components or to similar components having the same function, and overlapping description is omitted.

Structure of Stacked Stator Core

Referring first to FIG. 1 to FIG. 4, a configuration of a stacked stator core 1 is described. The stacked stator core 1 is a part of a stator. The stator has a winding coil attached to the stacked stator core 1. The stator is combined with a rotor to form a motor.

The stacked stator core 1 includes a stack 2 and a plurality of resin portions 3. The stack 2 has a cylindrical shape. More specifically, a through hole 2a extending along the center axis Ax is provided at the center of the stack 2. A rotor can be disposed in the through hole 2a.

The stack 2 includes a yoke portion 4 and a plurality of tooth portions 5. The yoke portion 4 has an annular shape and extends so as to surround the center axis Ax. The width in the radial direction of the yoke portion 4 (hereinafter simply referred to as "radial direction"), the inner diameter, the outer diameter, and the thickness can be set to a variety of values according to the purpose and performance of the motor.

A plurality of depressed grooves 6 (six odd-shape portions in FIG. 1) are provided on the outer peripheral surface of the stack 2 (yoke portion 4). A pair of depressed grooves 6A and four depressed grooves 6B are provided in the stack 2. The depressed groove 6 is depressed toward the center axis Ax. The depressed groove 6 extends linearly from one end surface to the other end surface of the stack 2 in the stacking direction of the stack 2 (hereinafter simply referred to as "stacking direction"). A pair of depressed grooves 6A face each other with respect to the center axis Ax. The four depressed grooves 6B are arranged at substantially regular intervals in the circumferential direction of the yoke portion 4 (hereinafter simply referred to as "circumferential direction").

A plurality of lug parts (not illustrated) protruding radially outward may be provided integrally on the outer peripheral surface of the yoke portion 4. The lug part may have a through hole passing through the lug part in the stacking direction of the stack 2. The through hole functions as, for example, an insertion hole for a bolt for fixing the stacked stator core 1 to the housing (not illustrated) of a motor. The number of lug parts (the number of through holes) can be set as appropriate according to the kind of the stacked stator core 1.

Each tooth portion 5 extends along the radial direction (the direction crossing the yoke portion 4) so as to extend from the inner edge of the yoke portion 4 toward the center axis Ax. That is, each tooth portion 5 protrudes from the inner edge of the yoke portion 4 toward the center axis Ax. In the stack 2, 48 tooth portions 5 are formed integrally with the yoke portion 4. The tooth portions 5 are arranged at substantially regular intervals in the circumferential direction. A slot 7 which is a space for disposing a winding coil (not illustrated) is defined between the adjacent tooth portions 5.

Figure 2:
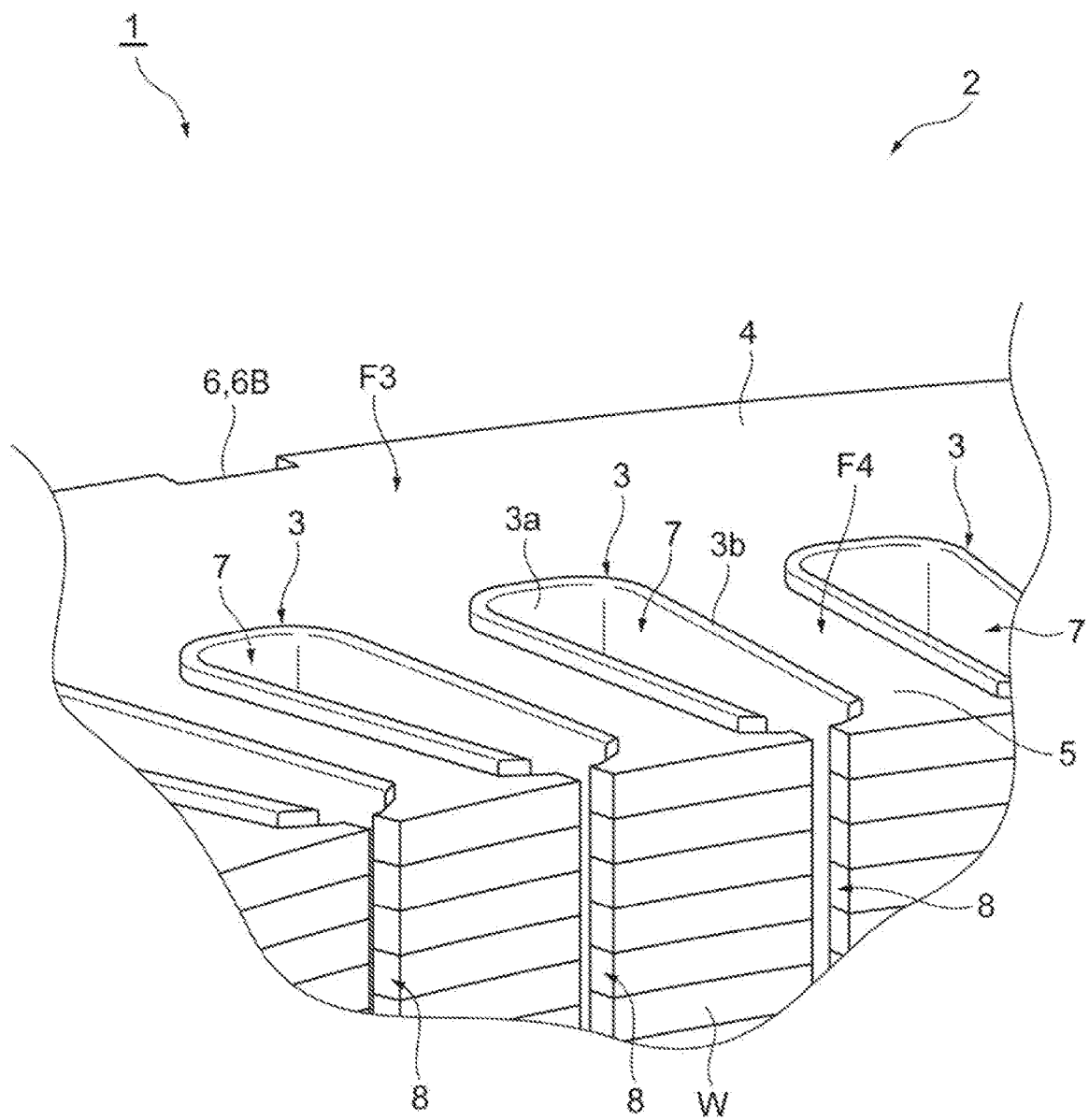
FIG. 2 is an enlarged perspective view of the portion II in FIG. 1.
Figure 3:
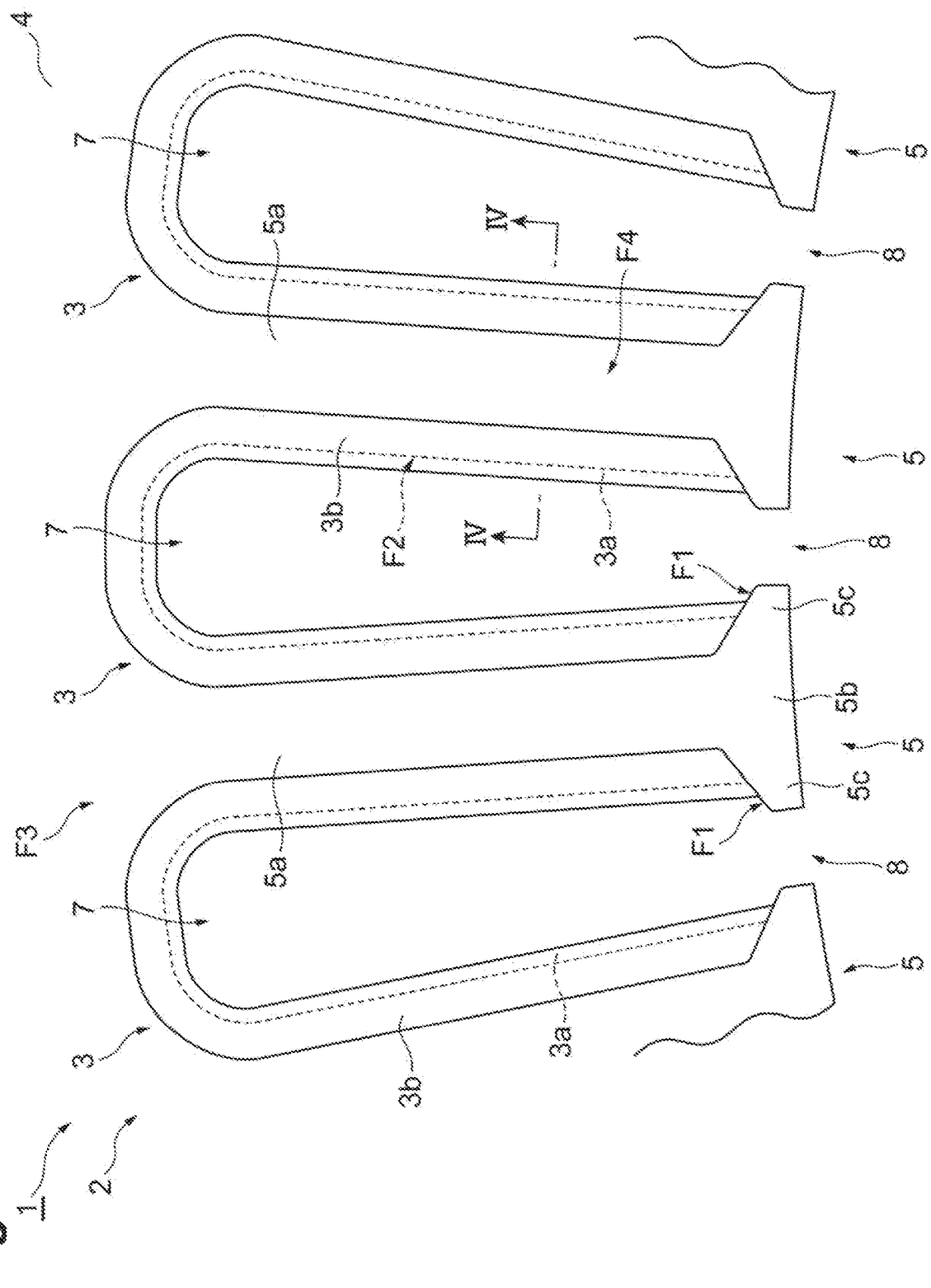
FIG. 3 is an enlarged top view of the vicinity of tooth portions.

As illustrated in detail in FIG. 2 and FIG. 3, each tooth portion 5 includes a base end portion 5a and an open end portion 5b. The base end portion 5a extends from the yoke portion 4 and has a rectangular shape as viewed from above. The open end portion 5b is provided at an end portion on the center axis Ax side relative to the base end portion 5a. The open end portion 5b is also a tip end portion of the tooth portion 5 on the center axis Ax side. The open end portion 5b is spaced apart from another open end portion 5b adjacent in the circumferential direction. In this configuration, a slit-like opening (slot opening) 8 extending in the stacking direction is defined between the open end portions 5b adjacent in the circumferential direction. The slot 7 is communicatively connected with the opening 8.

The open end portion 5b protrudes relative to the base end portion 5a in the circumferential direction. More specifically, the open end portion 5b is wider than the base end portion 5a and has a pair of protrusions 5c positioned to the outside of the base end portion 5a in the circumferential direction. The protrusion 5c has a trapezoidal shape. An inner wall surface F1 of the protrusion 5c comes closer to another tooth portion 5 adjacent in the circumferential direction, toward the opening 8 along the radial direction. That is, the inner wall surface F1 of the protrusion 5c is inclined relative to the extending direction (radial direction) of the tooth portion 5. In other words, the open end portion 5b has the inner wall surface F1 (first inclined surface) that is an inclined surface inclined relative to the extending direction of the tooth portion 5.

The stack 2 is configured such that a plurality of blanked members W (core members) are stacked. The blanked member W is a plate-shaped part formed by blanking an electrical steel sheet ES (metal plate; workpiece plate) described later into a predetermined shape and has a shape corresponding to the stack 2. The stack 2 may be configured by rotational stacking. "Rotational stacking" refers to stacking the plurality of blanked members W while shifting the angles of the blanked members W relative to each other. The rotational stacking is performed mainly for cancelling out the plate thickness deviations of the stack 2. The angle of the rotational stacking may be set to a desired value.

Figure 4:
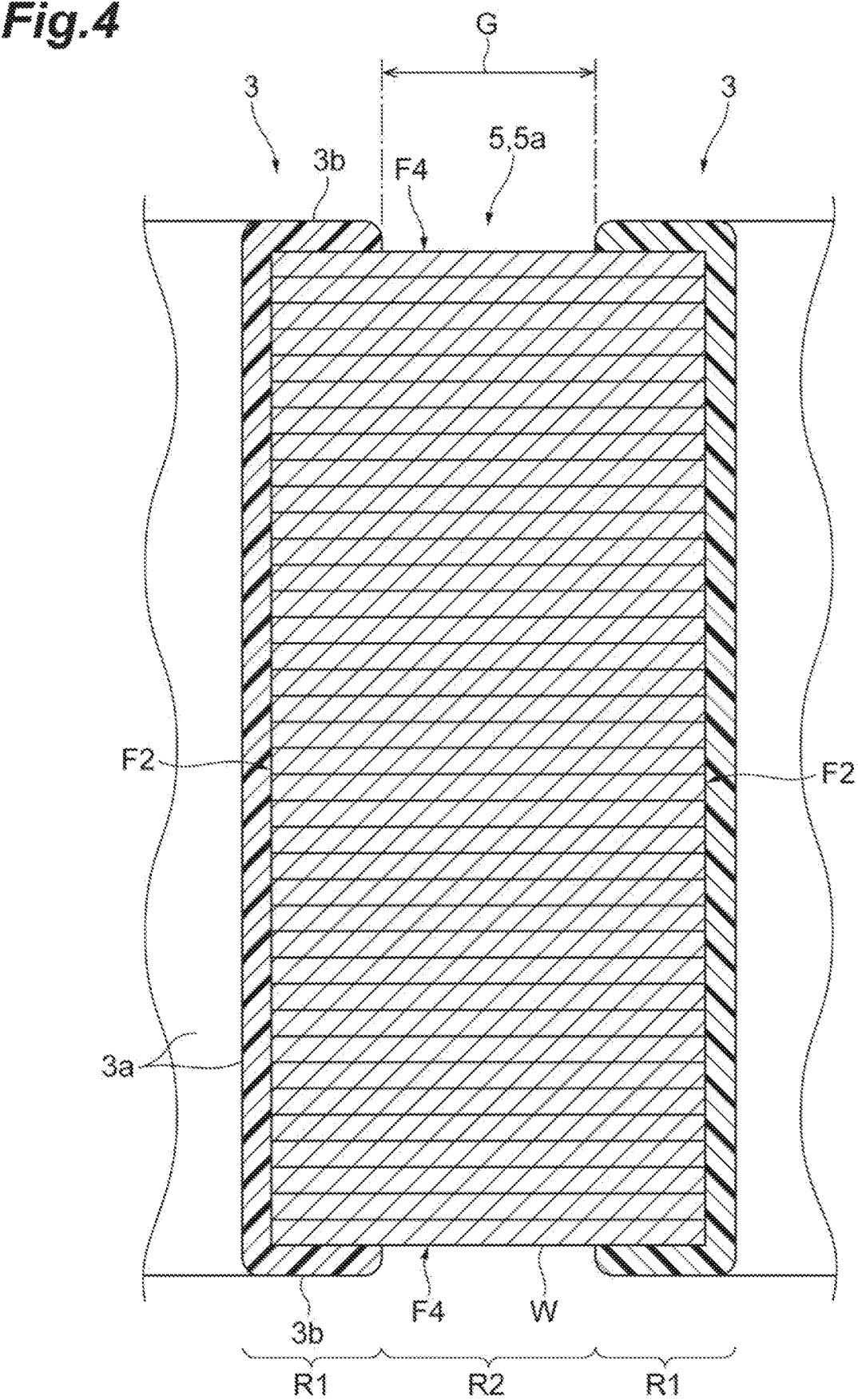
FIG. 4 is a cross-sectional view along line IV-IV in FIG. 3.

The resin portions 3 are each provided in the corresponding slots 7. Specifically, as illustrated in FIG. 2 to FIG. 4, the resin portion 3 has a main portion 3a and an end portion 3b. The main portion 3a is disposed so as to cover an inner wall surface F2 of the slot 7 inside the open end portion 5b (the yoke portion 4 side). That is, the main portion 3a (resin portion 3) does not cover the inner wall surface of the open end portion 5b and does not close the open end portion 5b or the opening 8. The main portion 3a (resin portion) does not cover the inner peripheral surface of the stack 2 (tooth portion 5), either. The thickness of the main portion 3a may be set as appropriate based on the permittivity of the resin portion 3 and the use voltage of the motor including the stacked stator core 1. The thickness of the main portion 3a may be, for example, smaller than the amount of protrusion of the protrusion 5c and may be approximately 0.2 mm. In this case, the main portion 3a does not protrude relative to the open end portion 5b (protrusion 5c) in the circumferential direction.

The end portion 3b is provided integrally with each of the upper end and the lower end of the main portion 3a in the stacking direction and extends from the inner wall surface F2 around the end surface of the stack 2 (the end surface F3 of the yoke portion 4 and the end surface F4 of the tooth portion 5). The end portion 3b protrudes outward relative to the end surfaces F3 and F4 in the stacking direction and partially covers the end surfaces F3 and F4. In this case, each of the end surfaces F3 and F4 has a covered region R1 covered with the resin portion 3 and a non-covered region R2 not covered with the resin portion 3 (see FIG. 4). In some examples, the non-covered region R2 in the end surface F4 (tooth portion 5) extends linearly along the extending direction of the tooth portion 5 (the radial direction of the stack 2). In this configuration, the end portions 3b of the resin portions 3 adjacent in the circumferential direction are not connected to each other in the tooth portion 5.

In some examples, the corner of the resin portion 3 is beveled. In this configuration; the corner of the resin portion 3 that extends from the inner wall surface F2 around the end surfaces F3 and F4 is also beveled. The shape of the bevel may be rounded or chamfered or may be any other shapes such as a trapezoidal shape and a step shape as long as the corner is cut off. Alternatively, the main portion 3a or the end portion 3b of the resin portion 3 may be projecting or depressed such that protrusions and depressions are alternately arranged in the extending direction of the tooth portion so as to conform to the shape of the winding coil attached to the tooth portion 5.

Apparatus for Manufacturing Stacked Stator Core

Figure 5:
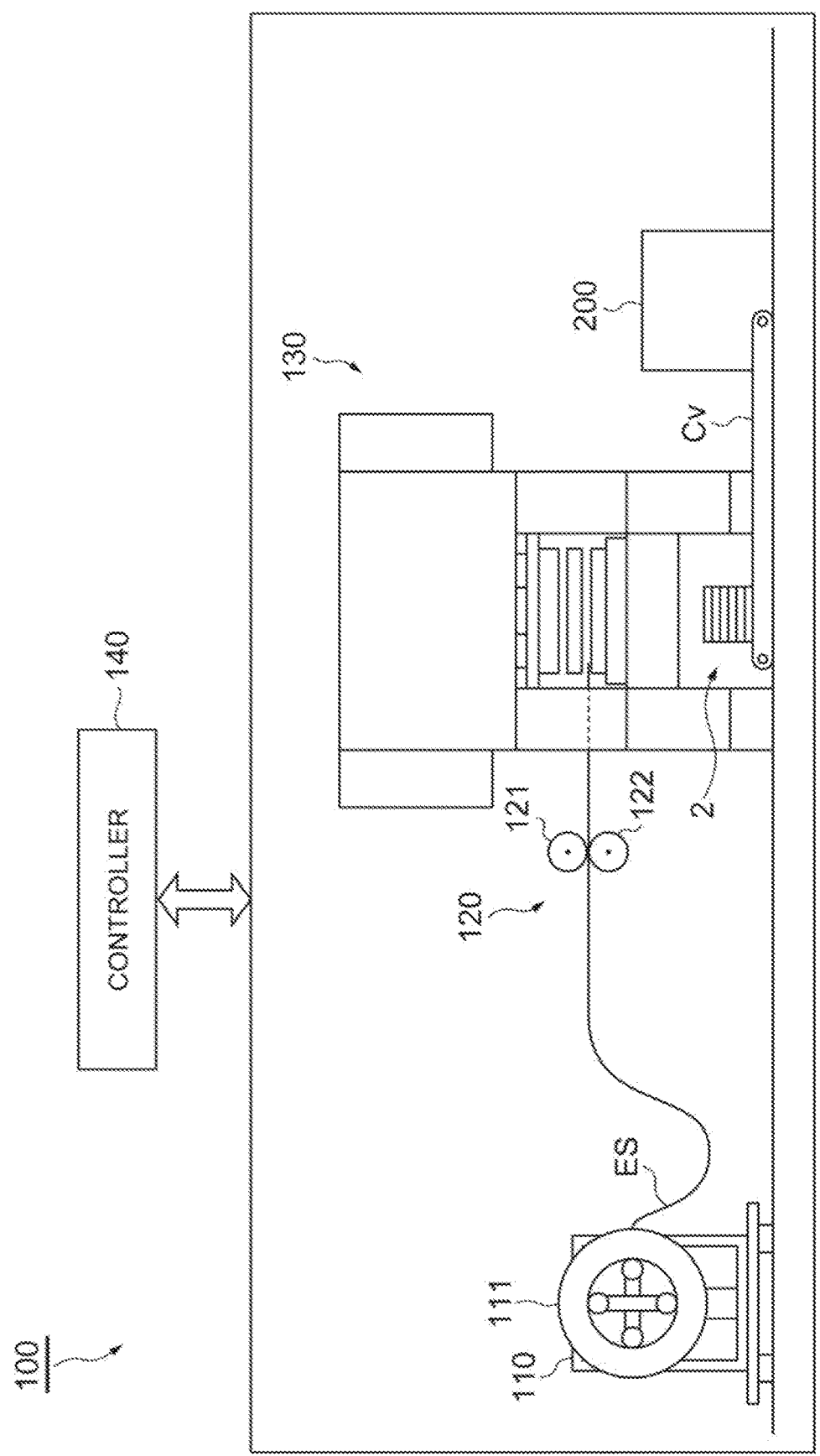
FIG. 5 is a schematic diagram illustrating an example manufacturing apparatus for a stacked stator core.

Referring now to FIG. 5, a manufacturing apparatus 100 for the stacked stator core 1 is described.

The manufacturing apparatus 100 is an apparatus for manufacturing the stacked stator core 1 from an electrical steel sheet ES which is a strip-like metal plate. The manufacturing apparatus 100 includes an uncoiler 110, a feeding device 120, a blanking device 130, a resin filling device 200, and a controller 140 (control unit).

The uncoiler 110 rotatably holds a coil material 111 with the coil material 111 attached thereto. The coil material 111 is a strip-like electrical steel sheet ES wound into a coil shape. The feeding device 120 has a pair of rollers 121 and 122 sandwiching the electrical steel sheet ES from above and below. A pair of rollers 121 and 122 rotate and stop based on an instruction signal from the controller 140 and sequentially feed the electrical steel sheet ES intermittently in one direction toward the blanking device 130.

The length of the electrical steel sheet ES that forms the coil material 111 may be, for example, approximately 500 m to 10000 m. The thickness of the electrical steel sheet ES may be, for example, approximately 0.1 mm to 0.5 mm. The thickness of the electrical steel sheet ES may be, for example, approximately 0.1 mm to 0.3 mm in terms of obtaining the stacked stator core 1 having more excellent magnetic characteristics. The width of the electrical steel sheet ES may be, for example, approximately 50 mm to 500 mm.

The blanking device 130 operates based on an instruction signal from the controller 140. The blanking device 130 has the function of sequentially blanking the electrical steel sheet ES intermittently fed by the feeding device 120 to form a blanked member W and the function of sequentially stacking the blanked members W obtained by blanking to produce a stack 2.

The stack 2 is ejected from the blanking device 130 and then placed onto a conveyor Cv extending between the blanking device 130 and the resin filling device 200. The conveyor Cv operates based on an instruction from the controller 140 and feeds the stack 2 to the resin filling device 200. The stack 2 may be conveyed by anything other than the conveyor Cv between the blanking device 130 and the resin filling device 200. For example, the stack 2 may be placed in a container and conveyed manually.

The resin filling device 200 has the function of charging melted resin into a filling space V1 (described later) to connect the blanked members W to each other to form a stack 2. The details of the resin filling device 200 will be described later.

The controller 140, for example, generates an instruction signal for operating each of the feeding device 120 and the blanking device 130, for example, based on a program stored in a recording medium (not illustrated) or an operation input from an operator, and transmits the instruction signal to the feeding device 120 and the blanking device 130.

Resin Filling Device

Referring now to FIG. 6 to FIG. 9, a configuration of the resin filling device 200 is described. The resin filling device 200 includes a lower die 210 (holding plate), a plurality of guide shafts 220, a plurality of positioning blocks 230A (positioning member), a plurality of positioning pins 230B (positioning member), a pair of overflow plates 240 (holding plate), a diameter increaser 250, a plurality of mold core members 260, a lower cull plate 270 (holding plate), an upper cull plate 280 (holding plate), and an upper die 290.

Figure 6:
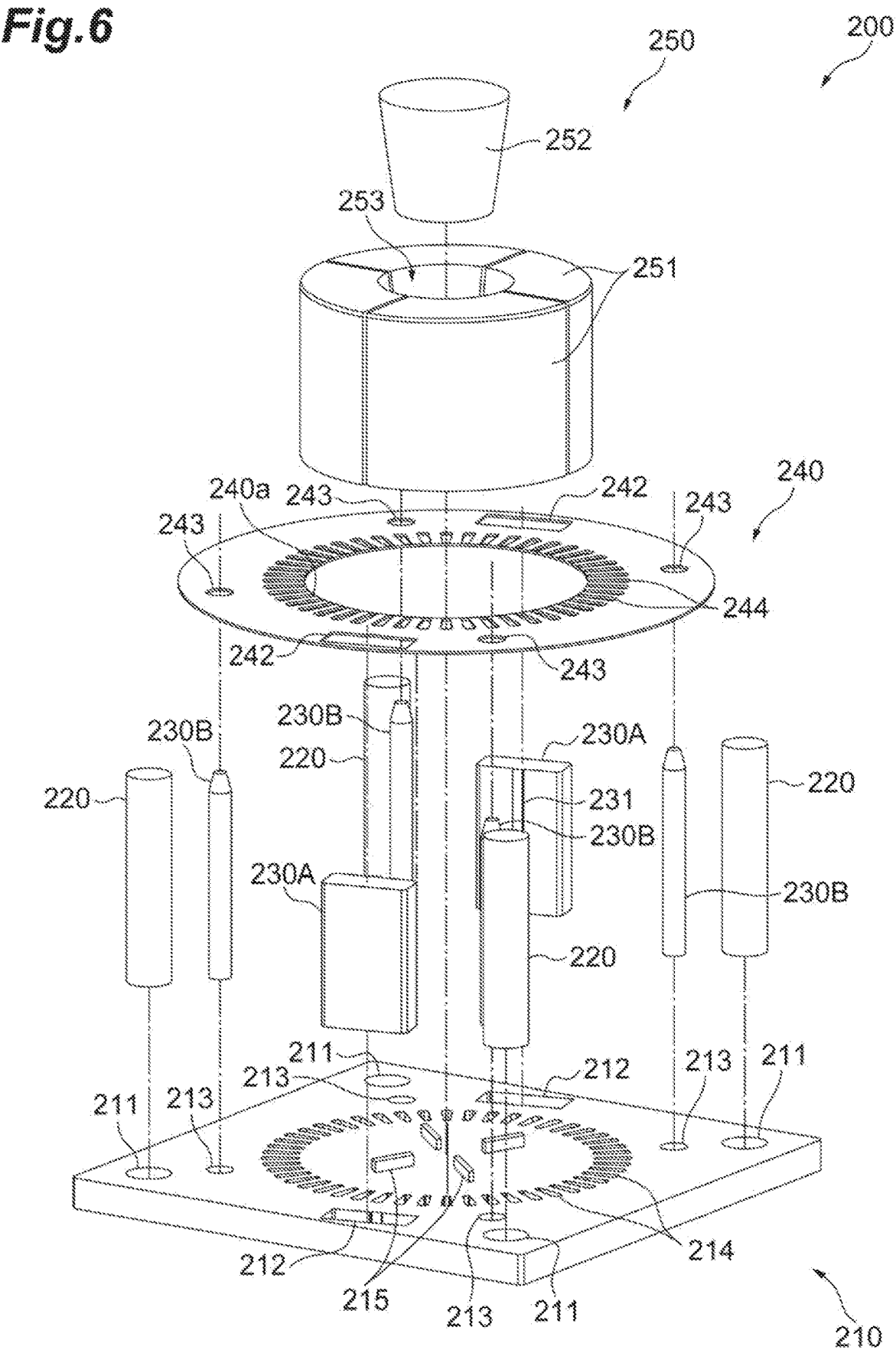
FIG. 6 is an exploded perspective view illustrating a part (lower portion) of a resin filling device.

As illustrated in FIG. 6, the lower die 210 is a plate-shaped member having a rectangular shape. The lower die 210 is configured to hold the stack 2 placed thereon. The lower die 210 has a plurality of insertion holes 211, a plurality of insertion holes 212, a plurality of insertion holes 213, a plurality of insertion holes 214, and a plurality of guide rails 215.

In some examples, four insertion holes 211 are provided in the lower die 210. One insertion hole 211 is positioned at each of four corners of the lower die 210. The insertion hole 211 has a shape corresponding to the outer shape of the guide shaft 220. In some examples, the insertion hole 211 has a circular shape.

In some examples, two insertion holes 212 are provided in the lower die 210. The insertion holes 212 are positioned in the vicinity of a pair of outer edges of the lower die 210 and face each other with respect to the center of the lower die 210. The insertion hole 212 has a shape corresponding to the positioning block 230A. In some examples, the insertion hole 212 has a substantially rectangular shape.

In some examples, four insertion holes 213 are provided in the lower die 210. One insertion hole 213 is positioned at each of four corners of the lower die 210 inside the insertion holes 211. The insertion holes 213 has a shape corresponding to the outer shape of the positioning pin 230B. In some examples, the insertion hole 213 has a circular shape.

In some examples, 48 insertion holes 214 are provided in the lower die 210. A plurality of insertion holes 214 are arranged substantially at regular intervals in a circular shape inside the insertion holes 211 to 213. The insertion holes 214 are disposed at positions corresponding one-to-one to the slots 7 of the stack 2 placed on the lower die 210. The insertion hole 214 has a shape corresponding to the shape of the mold core member 260 and has a size equivalent to the size of the mold core member 260. In some examples, the insertion hole 214 has a substantially trapezoidal shape. The insertion holes 214 extend radially outward from the center of the lower die 210. The short side of a pair of bases of the insertion hole 214 is positioned closer to the center of the lower die 210. The long side of a pair of bases of the insertion hole 214 is positioned closer to the outer edge of the lower die 210.

In some examples, four guide rails 215 are provided so as to protrude upward from a surface of the lower die 210. The plurality of guide rails 215 are arranged substantially at regular intervals in a circular shape inside the insertion holes 214. The guide rails 215 extend radially outward from the center of the lower die 210.

Each guide shaft 220 is secured in the corresponding insertion hole 211. That is, in some examples, the resin filling device 200 has four guide shafts 220 as many as the insertion holes 211. The guide shaft 220 has a cylindrical shape. A not-illustrated retainer (for example, ball retainer) is attached in the vicinity of the upper end of each guide shaft 220. The retainer is biased upward by a not-illustrated elastic member (for example, compression coil spring).

Each positioning block 230A is secured in the corresponding insertion hole 212. That is, in some examples, the resin filling device 200 has two positioning blocks 230A as many as the insertion holes 211. The positioning block 230A has a substantially rectangular parallelepiped shape. A ridge 231 extending linearly in the top-bottom direction is provided on one side surface of the positioning block 230A. The positioning block 230A is disposed in the insertion hole 212 such that the ridge 231 faces toward the center of the lower die 210.

Each positioning pin 230B is secured in the corresponding insertion hole 213. That is, in some examples, the resin filling device 200 has four positioning pins 230B as many as the insertion holes 213. The positioning pin 230B has a cylindrical shape.

The overflow plate 240 (hereinafter simply referred to as "plate 240") is a thin plate having an annular shape. The plate 240 has one through hole 240a, a plurality of through holes 242, a plurality of through holes 243, and a plurality of through holes 244. The through hole 240a has a circular shape and is positioned at the center of the plate 240. The through hole 240a may be equivalent to the inner diameter of the stack 2 or may be slightly larger than the inner diameter of the stack 2.

In some examples, two through holes 242 are provided in the plate 240. The through holes 242 are each positioned in the vicinity of the outer peripheral edge of the plate 240 and face each other with the through hole 240a interposed therebetween. The through hole 242 has a shape corresponding to the positioning block 230A. In some examples, the through hole 242 has a substantially rectangular shape.

In some examples, four through holes 243 are provided in the plate 240. The through holes 243 are arranged substantially at regular intervals in a circular shape along the outer peripheral edge of the plate 240. The through hole 243 has a shape corresponding to the outer shape of the positioning pin 230B. In some examples, the through hole 243 has a circular shape.

In some examples, 48 through holes 244 are provided in the plate 240. The plurality of through holes 244 are arranged substantially at regular intervals in a circular shape so as to surround the through hole 240a, inside the through holes 242 and 243. The through holes 244 are disposed at positions corresponding one-to-one to the slots 7 of the stack 2 placed on the lower die 210. The through hole 244 has a shape corresponding to the mold core member 260 and is slightly larger than the mold core member 260. In some examples, the through hole 244 has a substantially trapezoidal shape. The through holes 244 extend radially outward from the through hole 240a. The short side of a pair of bases of the through hole 244 is positioned closer to the through hole 240a. The long side of a pair of bases of the through hole 244 is positioned closer to the outer peripheral edge of the plate 240.

The diameter increaser 250 includes a plurality of diameter-increasing member 251 and a plunger member 252. The diameter-increasing member 251 has a sector shape as viewed from above. The diameter-increasing member 251 can be obtained, for example, by dividing an annular column-shaped body into multiple pieces. The upper surface and the lower surface of the diameter-increasing member 251 are each configured with an arc-shaped outer peripheral edge, an arc shaped inner peripheral edge having a length shorter than the outer peripheral edge, a linear side edge connecting one end of the outer peripheral edge with one end of the inner peripheral edge, and a liner side edge connecting the other end of the outer peripheral edge with the other end of the inner peripheral edge. An inner peripheral surface 253 of the diameter-increasing member 251 has an inclined surface coming closer to the inside toward the lower side.

Figure 10:
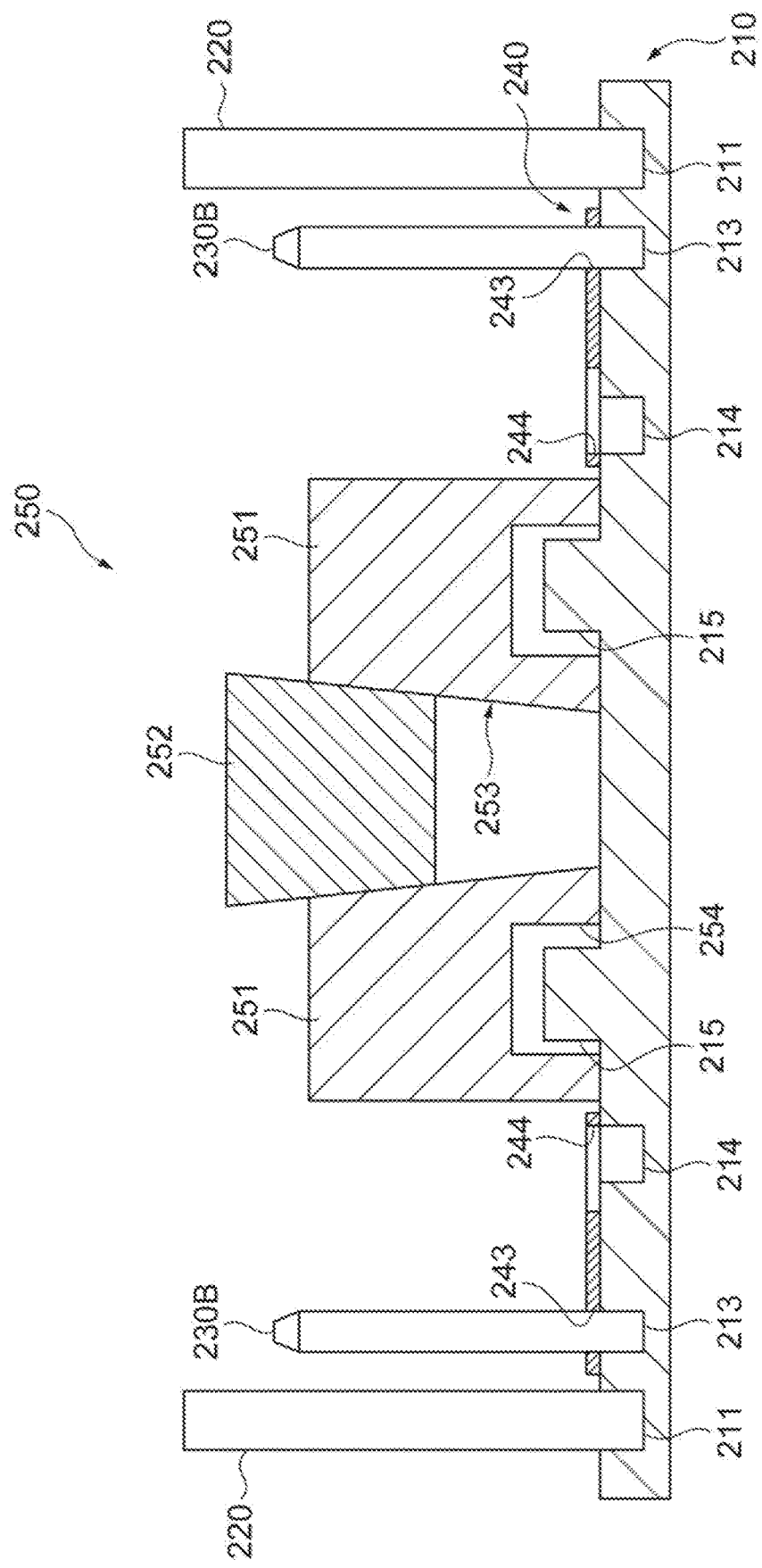
FIG. 10 is a diagram for explaining a process of manufacturing a stacked stator core, specifically, a cross-sectional view illustrating a part of the resin filling device.

A depressed groove 254 is provided on the lower surface of the diameter-increasing member 251 (for example, see FIG. 10). The depressed groove 254 has the shape of an elongated hole extending between the inner peripheral surface 253 and the outer peripheral surface of the diameter-increasing member 251. The corresponding guide rail 215 can be inserted into the depressed groove 254. The length of the depressed groove 254 is longer than the length of the guide rail 215. With this configuration, the diameter-increasing member 251 is movable in the extending direction of the guide rail 215.

The plunger member 252 is disposed within the inner peripheral surface 253 of the diameter-increasing member 251. The plunger member 252 has the shape of a truncated cone with the diameter decreasing toward the tip end (lower end). In this configuration, the outer peripheral surface of the plunger member 252 is shaped like a conical surface and has a shape corresponding to the inner peripheral surface 253 of the diameter-increasing member 251.

Figure 7:
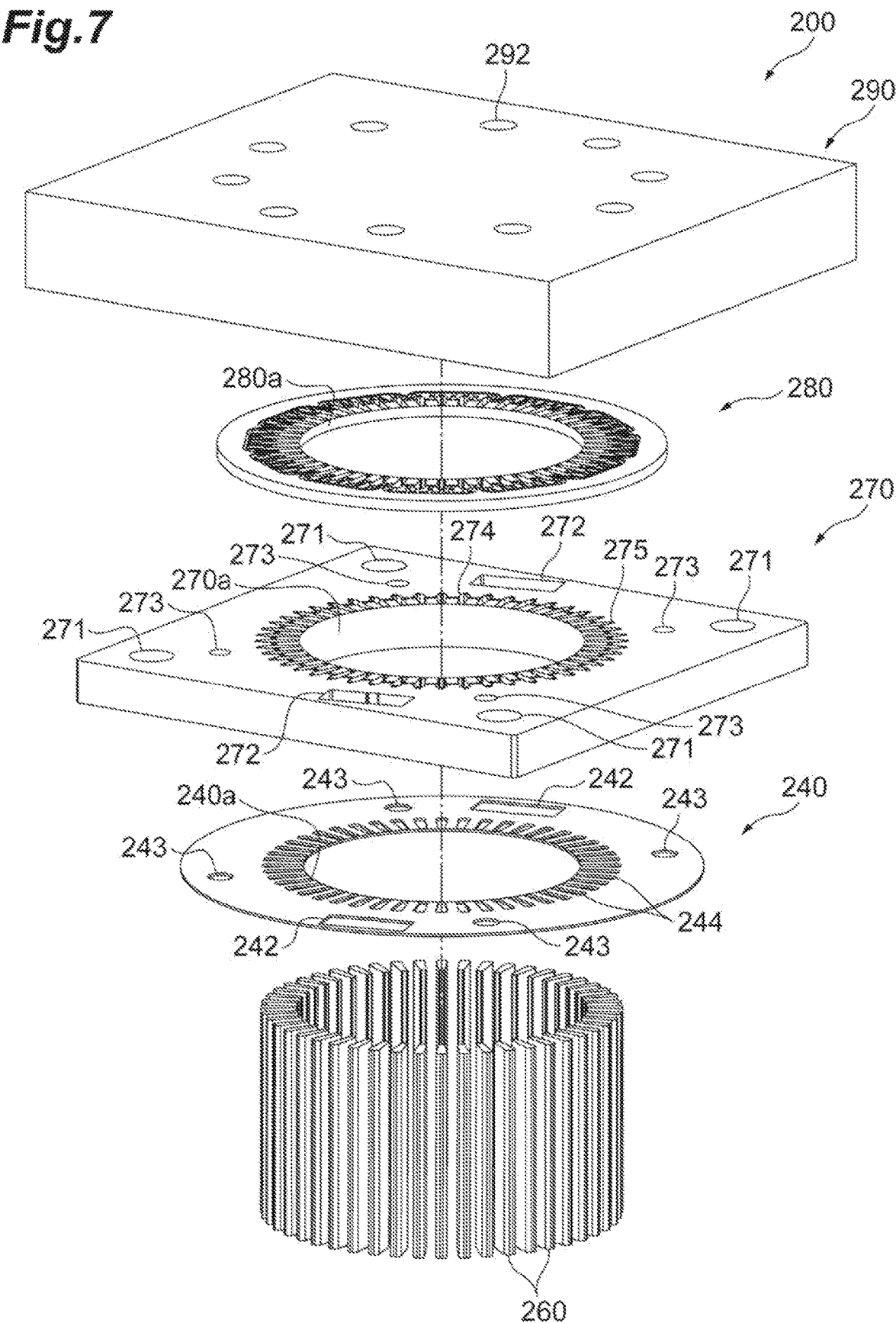
FIG. 7 is an exploded perspective view illustrating a part (upper portion) of the resin filling device.

As illustrated in FIG. 7, the mold core member 260 has a rectangular prism shape having a substantially trapezoidal bottom surface. In some examples, the resin filling device 200 includes 48 mold core members 260 as many as the insertion holes 214 and the through holes 244, 274, 284.

Figure 8:
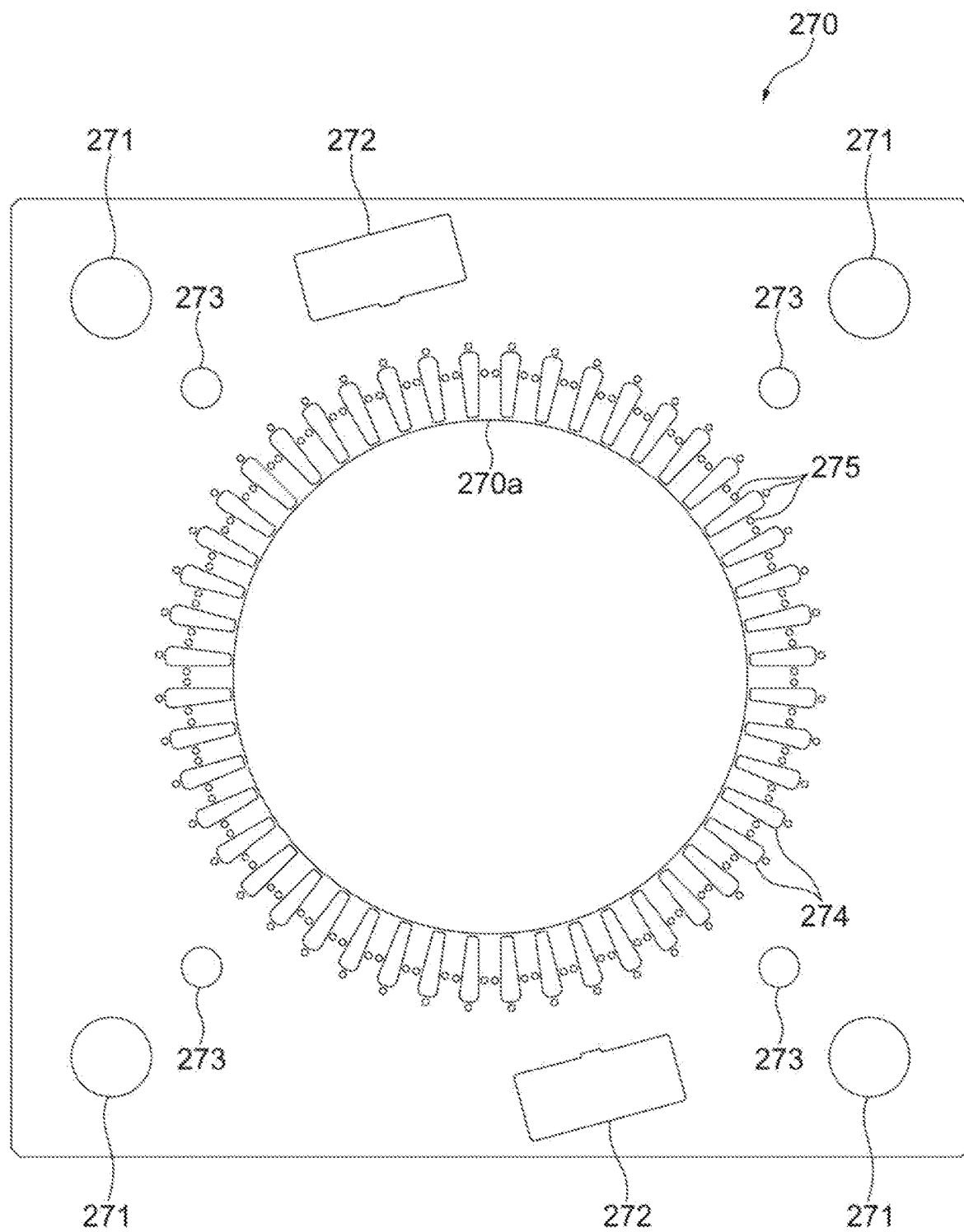
FIG. 8 is a plan view illustrating a lower cull plate.

As illustrated in FIG. 7 and FIG. 8, the lower cull plate 270 (hereinafter simply referred to as "plate 270") is a plate-shaped member having a rectangular shape. The plate 270 has one through hole 270a, a plurality of through holes 271, a plurality of through holes 272, a plurality of through holes 273, a plurality of through holes 274, and a plurality of through holes 275. The through hole 270a has a circular shape and is positioned at the center of the plate 270. The through hole 270a may be equivalent to the inner diameter of the stack 2 or may be slightly larger than the inner diameter of the stack 2.

In some examples, four through holes 271 are provided in the plate 270. One through hole 271 is positioned at each of four corners of the plate 270. A retainer positioned in the vicinity of the upper end of the guide shaft 220 is inserted into each through hole 271. With this configuration, the plate 270 can slide through the guide shafts 220 in the extending direction thereof (top-bottom direction). In some examples, the through hole 271 has a circular shape.

In some examples, two through holes 272 are provided in the plate 270. The through holes 272 are provided in the vicinity of a pair of outer edges of the plate 270 and face each other with the through hole 270a interposed therebetween. The through hole 272 has a shape corresponding to the positioning block 230A. In some examples, the through hole 272 has a substantially rectangular shape.

In some examples, four through holes 273 are provided in the plate 270. One through hole 273 is positioned at each of four corners of the plate 270, inside the through holes 271. The through hole 273 has a shape corresponding to the outer shape of the positioning pin 230B. In some examples, the through hole 273 has a circular shape.

In some examples, 48 through holes 274 are provided in the plate 270. The plurality of through holes 274 are arranged substantially at regular intervals in a circular shape so as to surround the through hole 270a, inside the through holes 271 to 273. The through holes 274 are disposed at positions corresponding one-to-one to the slots 7 of the stack 2 placed on the lower die 210. The through hole 274 has a shape equivalent to the insertion hole 214.

In some examples, as illustrated in FIG. 8, three through holes 275 are disposed around one through hole 274. Specifically, one through hole 275 is disposed adjacent to the long side of a pair of bases of the through hole 274. One through hole 275 is disposed adjacent to each of a pair of lateral sides of the through hole 274.

Figure 9:
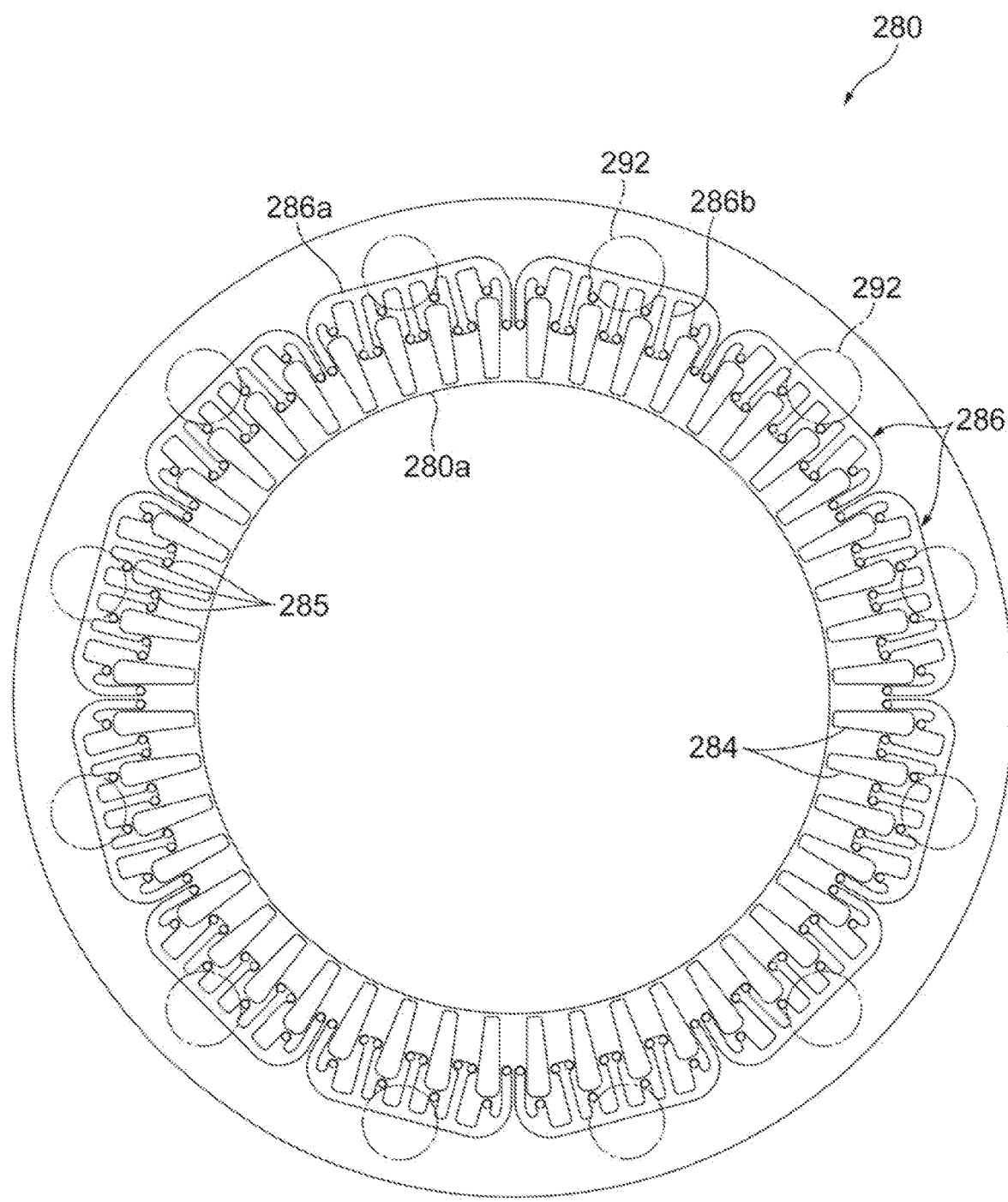
FIG. 9 is a plan view illustrating an upper cull plate.

As illustrated in FIG. 7 and FIG. 9, the upper cull plate 280 (hereinafter simply referred to as "plate 280") is a plate-shaped member having an annular shape. The plate 280 has one through hole 280a, a plurality of through holes 284, a plurality of through holes 285, and a plurality of depressed grooves 286. The through hole 280a has a circular shape and is positioned at the center of the plate 280. The through hole 280a may be equivalent to the inner diameter of the stack 2 or may be slightly larger than the inner diameter of the stack 2.

In some examples, 48 through holes 284 are provided in the plate 280. The plurality of through holes 284 are arranged substantially at regular intervals in a circular shape so as to surround the through hole 280a. The through holes 284 are disposed at positions corresponding one-to-one to the slots 7 of the stack 2 placed on the lower die 210. The through hole 284 has a shape equivalent to the insertion hole 214 and the through hole 274.

In some examples, as illustrated in FIG. 9, three through holes 285 are disposed around one through hole 284. Specifically, one through hole 285 is disposed adjacent to the long side of a pair of bases of the through hole 284. One through hole 285 is disposed adjacent to each of a pair of lateral sides of the through hole 284.

In some examples, 12 depressed grooves 286 are provided on a surface of the plate 280. The plurality of depressed grooves 286 are arranged in a circular shape so as to surround the through holes 284. One depressed groove 286 has a comb-like shape and surrounds four through holes 284 from the outer peripheral edge side of the plate 280. Specifically, the depressed groove 286 includes one main portion 286a and a plurality of branch portions 286b. The main portion 286a extends along the outer peripheral edge of the plate 280 between the outer peripheral edge of the plate 280 and the through holes 284. The plurality of branch portions 286b branch off from the main portion 286a and extend toward the through hole 280a. The tip end portions of the branch portions 286b are connected to the through holes 285 disposed around four through holes 284 surrounded by one depressed groove 286.

As illustrated in FIG. 7, the upper die 290 is a plate-shaped member having a rectangular shape. The plate 290 has a plurality of insertion holes 291 (see FIG. 14) and a plurality of through holes 292. In some examples, four insertion holes 291 are provided on the underside of the upper die 290. One insertion hole 291 is positioned at each of four corners of the upper die 290. The insertion hole 291 has a shape corresponding to the outer shape of the guide shaft 220. In some examples, the insertion hole 291 has a circular shape. In some examples, as illustrated in FIG. 9, the through holes 292 are disposed at positions corresponding one-to-one to the main portions 286a of the depressed grooves 286 of the plate 280.

Method of Manufacturing Stacked Stator Core

Referring now to FIG. 10 to FIG. 16, a method of manufacturing the stacked stator core 1 is described. First of all, a stack 2 is formed (first step). Specifically, the feeding device 120 feeds an electrical steel sheet ES to the blanking device 130 based on an instruction from the controller 140, and the blanking device 130 blanks a portion to be worked of the electrical steel sheet ES into a predetermined shape. A blanked member W is thus formed. This blanking process is repeated, whereby a predetermined number of blanked members W are stacked to form one stack 2.

When a blanked member W is formed, a region corresponding to the slots 7 of the stack 2 and a region corresponding to the positioning parts of the stack 2 (for example, the depressed grooves 6 and the bolt holes) may be simultaneously blanked from the electrical steel sheet ES. In this case, displacement of the relative position between the positioning parts and the slots 7 of the stack 2 can be reduced.

Subsequently, the conveyor Cv conveys the stack 2 ejected from the blanking device 130 to the resin filling device 200, based on an instruction from the controller 140. In the resin filling device 200, preparation for placing the stack 2 on the lower die 210 is performed before the stack 2 arrives. Specifically, as illustrated in FIG. 10, one guide shaft 220 is attached to each insertion hole 211, one positioning block 230A is attached to each insertion hole 212, and one positioning pin 230B is attached to each insertion hole 213. The diameter increaser 250 is placed on the lower die 210 such that the guide rails 215 are inserted into the depressed grooves 254 of the diameter-increasing members 251. At this moment, the plunger member 252 is positioned on the relatively upper side of the inner peripheral surfaces 253. The diameter-increasing members 251 therefore are closer to the center of the lower die 210 as a whole.

Figure 11:
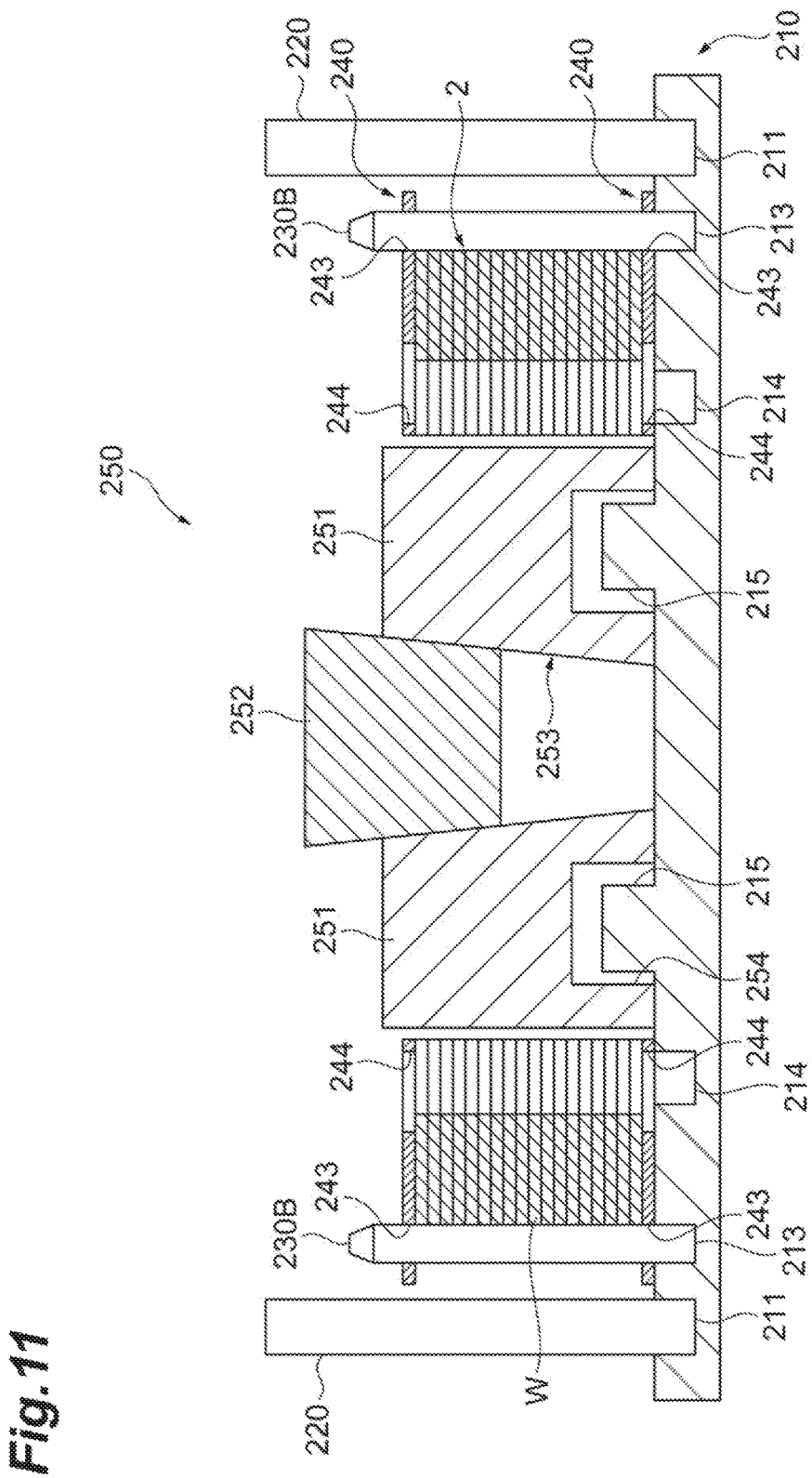
FIG. 11 is a diagram for explaining a process of manufacturing a stacked stator core, specifically, a cross-sectional view illustrating a part of the resin filling device and a stack.

Next, as illustrated in FIG. 11, the plate 240 is placed on the lower die 210. Specifically, the plate 240 is lowered toward the lower die 210 such that the diameter increaser 250 is inserted into the through hole 240a, one positioning block 230A is inserted into each through hole 242, and one positioning pin 230B is inserted into each through hole 243. At this moment, one through hole 244 of the plate 240 overlaps each insertion hole 214. As viewed from above, a portion on the short side of a pair of bases of the through hole 244 overlaps a portion on the short side of a pair of bases of the insertion hole 214. Since the through hole 244 is slightly larger than the insertion hole 214, as viewed from above, a portion outside the short side of the through hole 244 is positioned on the outside of a portion outside the short side of the insertion hole 214.

Next, as illustrated in FIG. 11, the stack 2 is placed on the prepared lower die 210. Specifically, the stack 2 is lowered toward the lower die 210 and the plate 240 such that the diameter increaser 250 is inserted into the through hole 2a of the stack 2, one ridge 231 of the positioning blocks 230A is engaged in each depressed groove 6A, and the outer peripheral surface of one positioning pin 230B is engaged in each depressed groove 6B. In some examples, each positioning pin 230B is positioned to face the diameter-increasing member 251 in the radial direction. At this moment, each slot 7 of the stack 2 overlaps one through hole 244. The diameter-increasing members 251 are positioned on the inside of the yoke portion 4 and the tooth portions 5 so as to be aligned in the circumferential direction within the through hole 2a (sixth step). Furthermore, the positioning of the stack 2 on the lower die 210 is performed by the ridges 231 of the positioning blocks 230A and the outer peripheral surfaces of the positioning pins 230B (eighth step).

Next, as illustrated in FIG. 11, the plate 240 is placed on the stack 2. The stack 2 is thus sandwiched between a pair of plates 240, and each end surface of the stack 2 is covered with a region excluding the through holes 244 of the plate 240 (fourth step).

Figure 12:
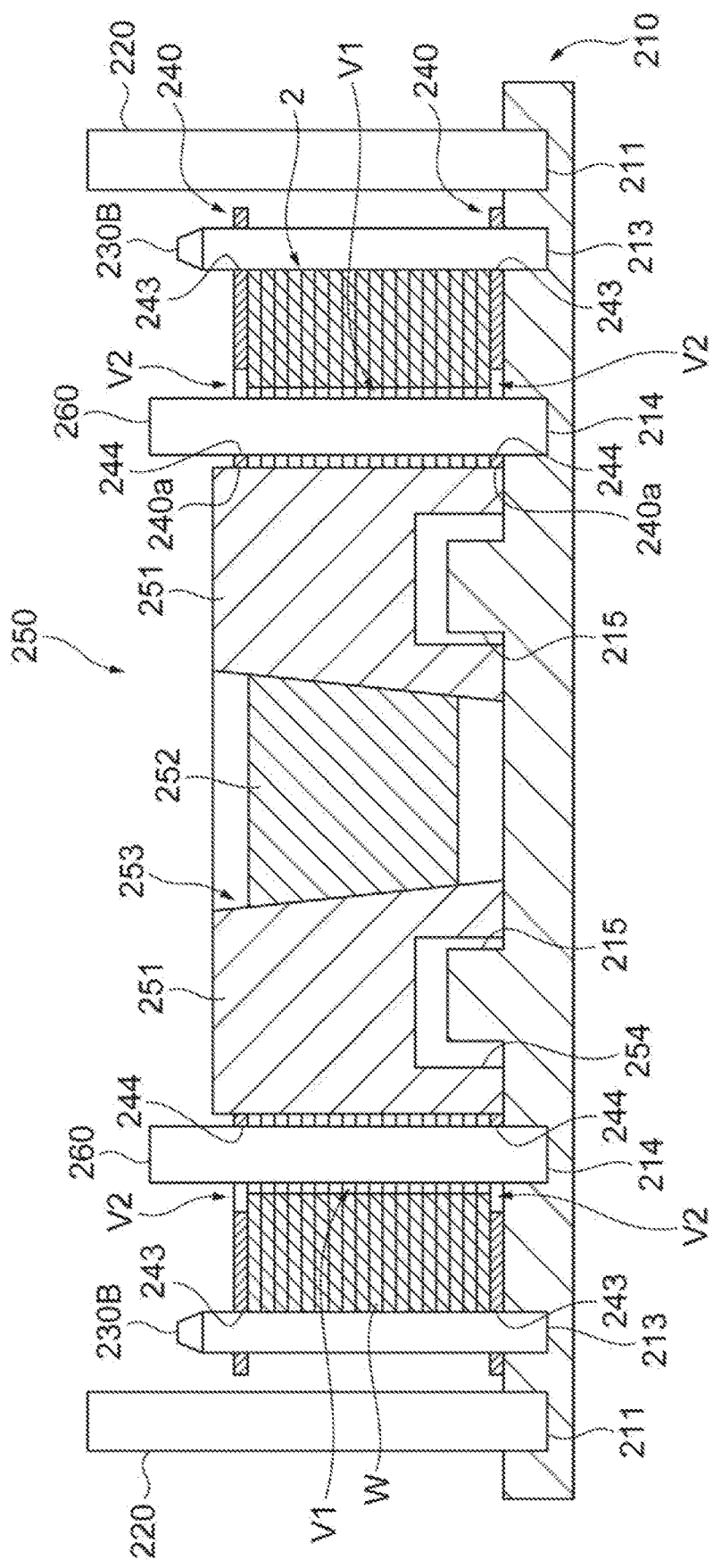
FIG. 12 is a diagram for explaining a process of manufacturing a stacked stator core, specifically, a cross-sectional view illustrating a part of the resin filling-device and a stack.
Figure 13:
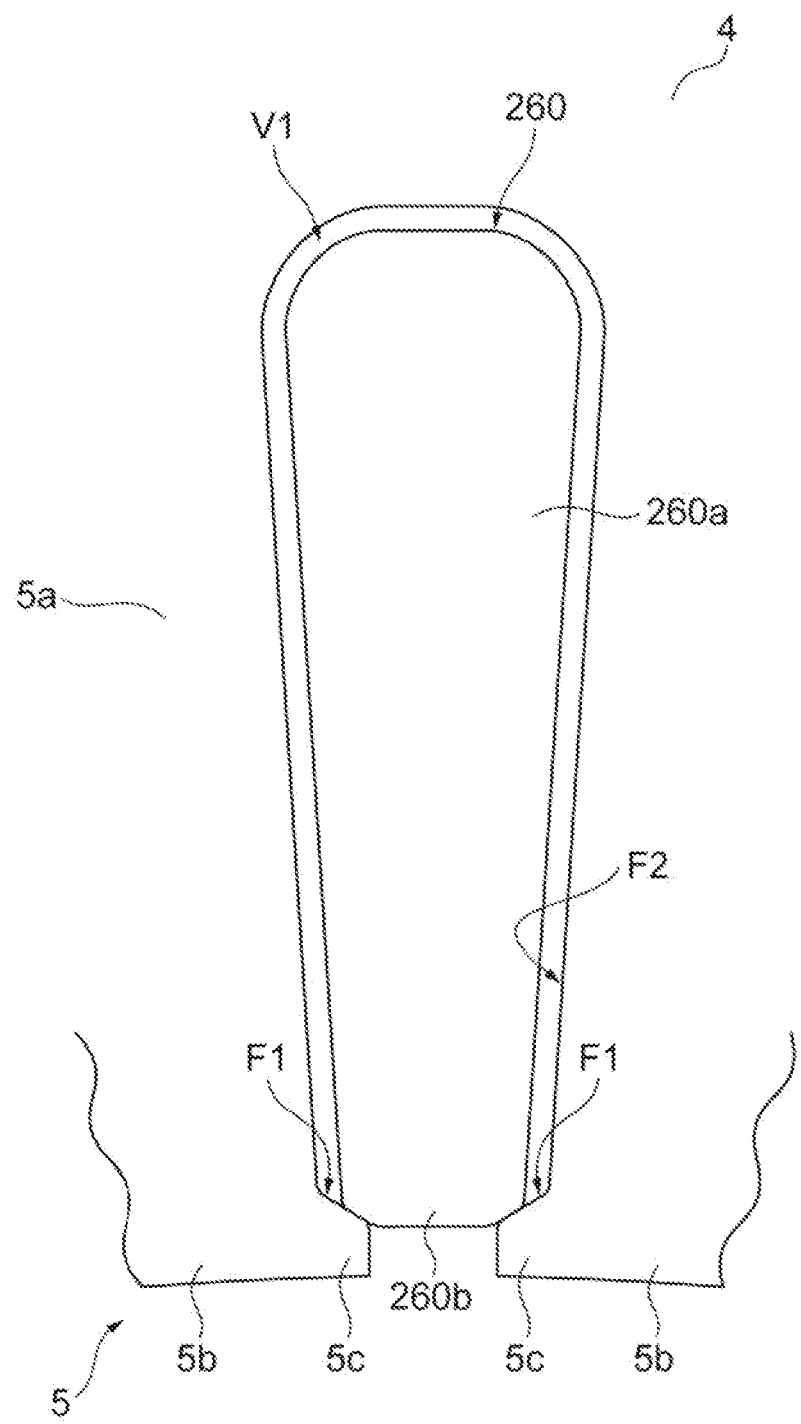
FIG. 13 is a top view of the vicinity of one slot in which a mold core member is inserted, with an upper overflow plate removed.

Next, as illustrated in FIG. 12, one mold core member 260 is inserted into each slot 7 (second step). At this moment, one mold core member 260 is disposed in the insertion hole 214, the through hole 244, and the slot 7 communicatively connected in the stacking direction. Specifically, as illustrated in FIG. 13, the body 260a of the mold core member 260 extends along the extending direction of the slot 7 (the radial direction of the stack 2) and is spaced apart from the inner wall surface F2 of the slot 7. The closing portion 260b of the mold core member 260 is connected integrally with the body 260a on the opening 8 side and closes the open end portion 5b. In this configuration, a filling space V1 is formed between the body 260a and the slot 7 to the body 260a side of the closing portion 260b.

In some examples, the closing portion 260b has a trapezoidal shape and becomes narrower toward the opening 8. That is, a pair of outside surfaces F5 of the closing portion 260b are inclined relative to the extending direction of the mold core member 260 (the radial direction of the stack 2). In other words, the closing portion 260b has the outside surface F5 (second inclined surface) which is an inclined surface inclined relative to the extending direction of the mold core member 260. The outside surface F5 of the closing portion 260b and the inner wall surface F2 of the open end portion 5b abut on each other. The mold core member 260 (closing portion 260b) does not exist between the protrusions 5c. In this configuration, the closing portion 260b abuts on the inner wall surface of the slot 7 in a region of the slot 7 inside the opening 8.

Returning to FIG. 12, the filling space V1 is communicatively connected with the through holes 244 of the plates 240 at the top and the bottom. That is, the space surrounded by the through hole 244 and the mold core member 260 functions as an auxiliary space V2 communicatively connected with the filling space V1. In some examples, the auxiliary space V2 faces the filling space V1 and continuously expands from the filling space V1 so as to partially face the end surface F3 of the yoke portion 4 and the end surface F4 of the tooth portion 5 (see FIG. 15). In other words, a region of the plate 240 other than the through hole 244 abuts on the end surfaces F3 and F4 of the stack 2.

Next, as illustrated in FIG. 12, the plunger member 252 of the diameter increaser 250 is pushed downward. The plunger member 252 is thus pressed against the diameter-increasing members 251 while the peripheral surface (conical surface) of the plunger member 252 is kept in abutment with the inner peripheral surfaces 253 of the diameter-increasing members 251. In this configuration, the peripheral surface (conical surface) of the plunger member 252 applies outward force to the inner peripheral surfaces 253 while sliding on the inner peripheral surfaces 253. Each diameter-increasing member 251 therefore moves outward in the radial direction of the stack 2 while being guided by the guide rail 215. The outer peripheral surfaces of the diameter-increasing members 251 abut on the inner peripheral surfaces of the through holes 2a and 240a and apply radially outward force to these surfaces (seventh step). Here, the stack 2 is positioned by the positioning blocks 230A and the positioning pins 230B on the outer peripheral surface side thereof. In this configuration, when the diameter-increasing members 251 apply the radially outward force, the stack 2 is sandwiched between the diameter-increasing members 251 and the positioning blocks 230A as well as the positioning pins 230B in the radial direction.

Figure 14:
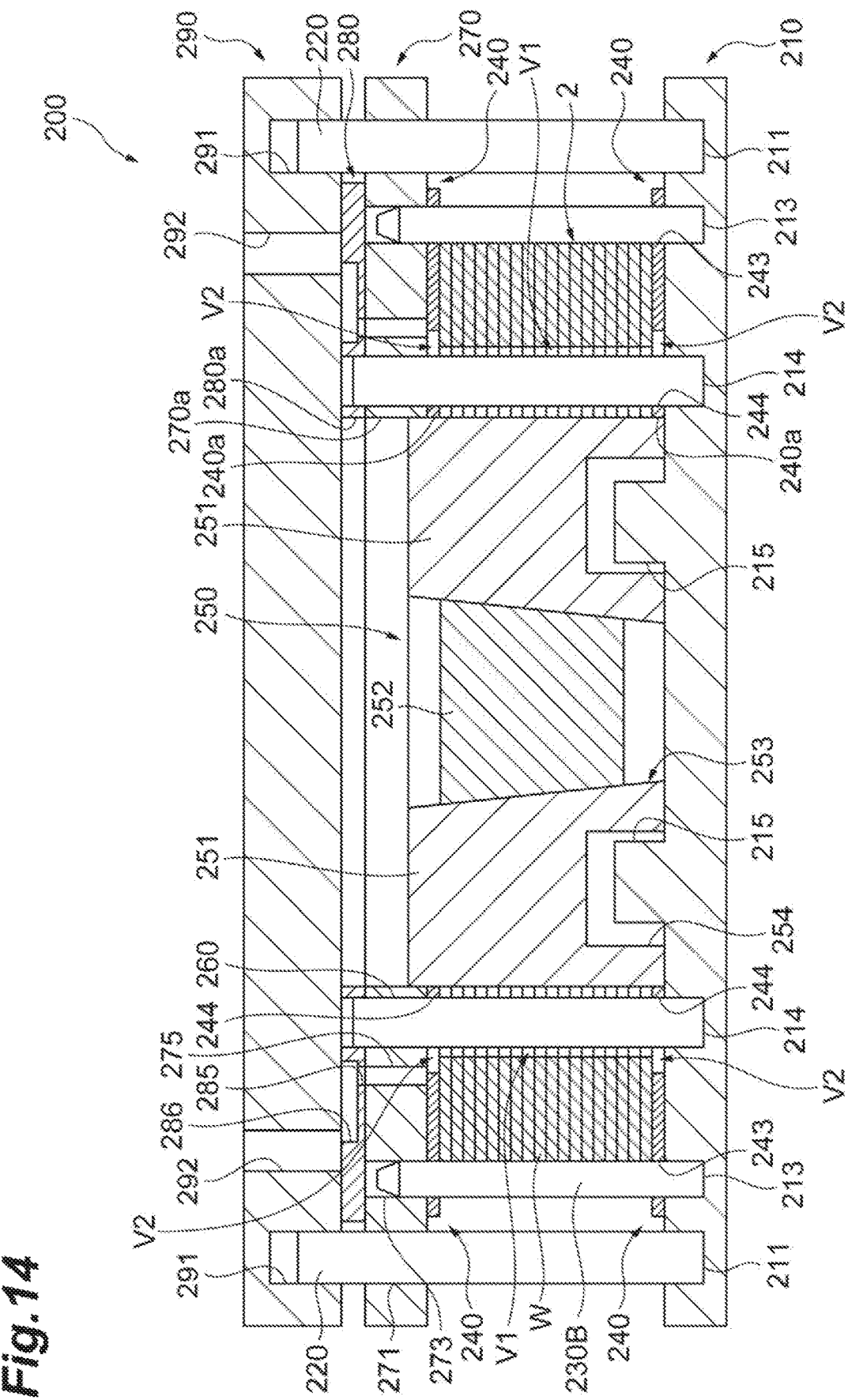
FIG. 14 is a diagram for explaining a process of manufacturing a stacked stator core, specifically, a cross-sectional view illustrating the resin filling device and a stack.
Figure 15:
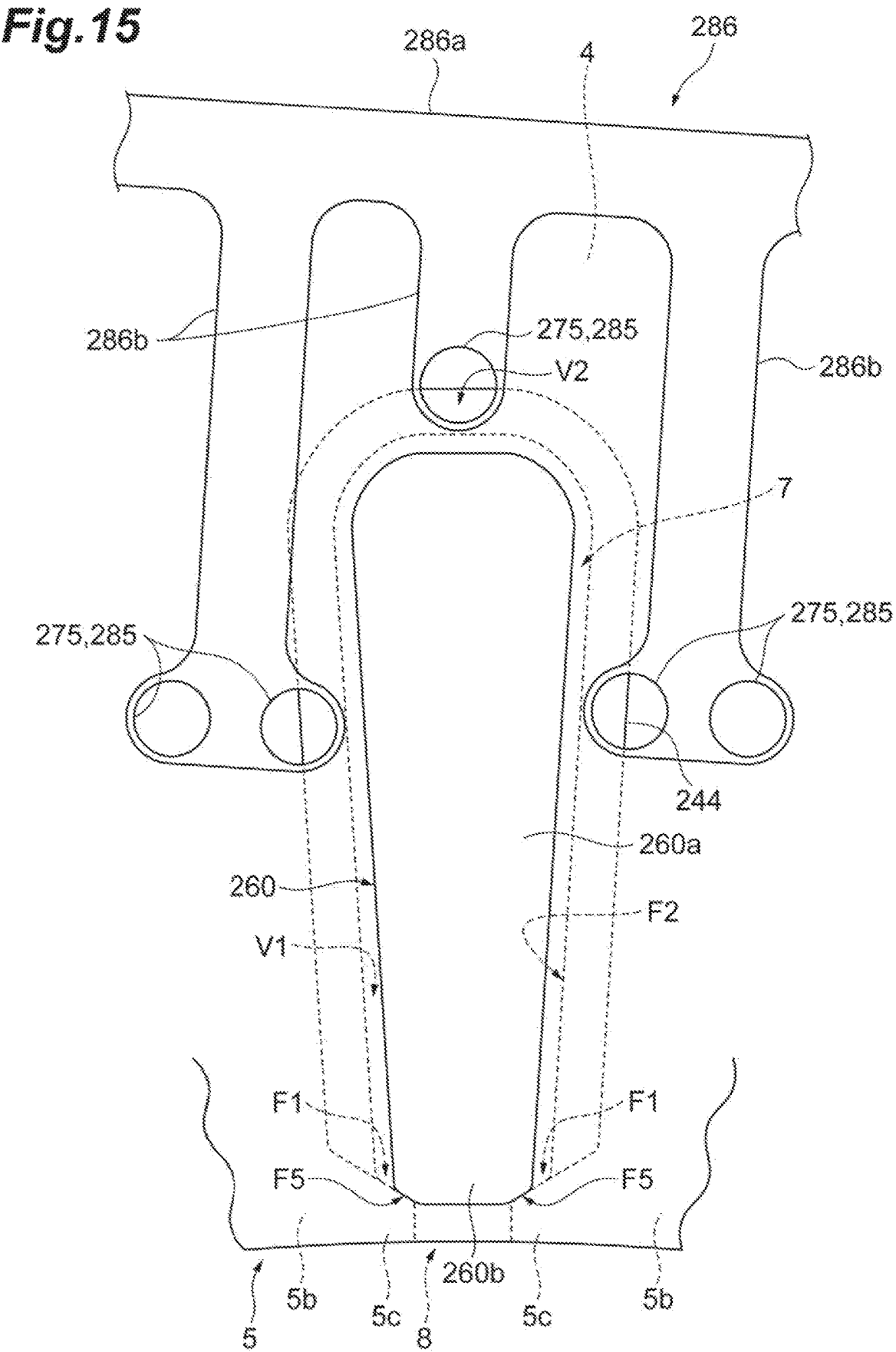
FIG. 15 is a top view of the vicinity of one slot in which a mold core member is inserted, with an upper die removed.

Next, as illustrated in FIG. 14, the plate 270 is placed on the stack 2 and the plate 240. Specifically, the plate 270 is lowered toward the stack 2 and the plate 240 such that the diameter increaser 250 is inserted into the through hole 270a of the plate 270, one guide shaft 220 is inserted into each through hole 271, one positioning block 230A is inserted into each through hole 272, one positioning pin 230B is inserted into each through hole 273, and one mold core member 260 is inserted into each through hole 274. At this moment, as illustrated in FIG. 15, three through holes 275 surround one through hole 244, and these through holes 275 partially overlap the through hole 244 as viewed from above. That is, the through holes 275 are communicatively connected with the corresponding through hole 244.

Thus, the auxiliary space V2 positioned on the lower side of the stack 2 is covered with the lower die 210, and the auxiliary space V2 positioned on the upper side of the stack 2 is covered with the plate 270. That is, a depressed groove produced by a combination of the lower die 210 and the through hole 244 forms the auxiliary space V2 on the lower side, and a depressed groove produced by a combination of the plate 270 and the through hole 244 forms the auxiliary space V2 on the upper side.

Next, as illustrated in FIG. 14, the plate 280 is placed on the plate 270. The stack 2 is thus sandwiched between the lower die 210 and the plates 270, 280. Specifically, the plate 280 is lowered toward the plate 270 such that one mold core member 260 is inserted into each through hole 284. At this moment, as illustrated in FIG. 15, three through holes 285 surround one through hole 244, and these through holes 285 overlap the through holes 275 as viewed from above. That is, the through hole 285 is communicatively connected with the corresponding through hole 275.

Next, as illustrated in FIG. 14, the upper die 290 is placed on the plate 280. Specifically, the upper die 290 is lowered toward the plate 280 such that one guide shaft 220 is inserted into each insertion hole 291. The stack 2 is thus sandwiched between the lower die 210 and the upper die 290. At this moment, as illustrated in FIG. 9, one through hole 292 overlaps one depressed groove 286 as viewed from above. That is, the through hole 292 is communicatively connected with the corresponding depressed groove 286. A load is applied to the stack 2 by a not-illustrated actuator through the lower die 210 and the upper die 290. The gap between the blanked members W that constitute the stack 2 is thus reduced.

Figure 16:
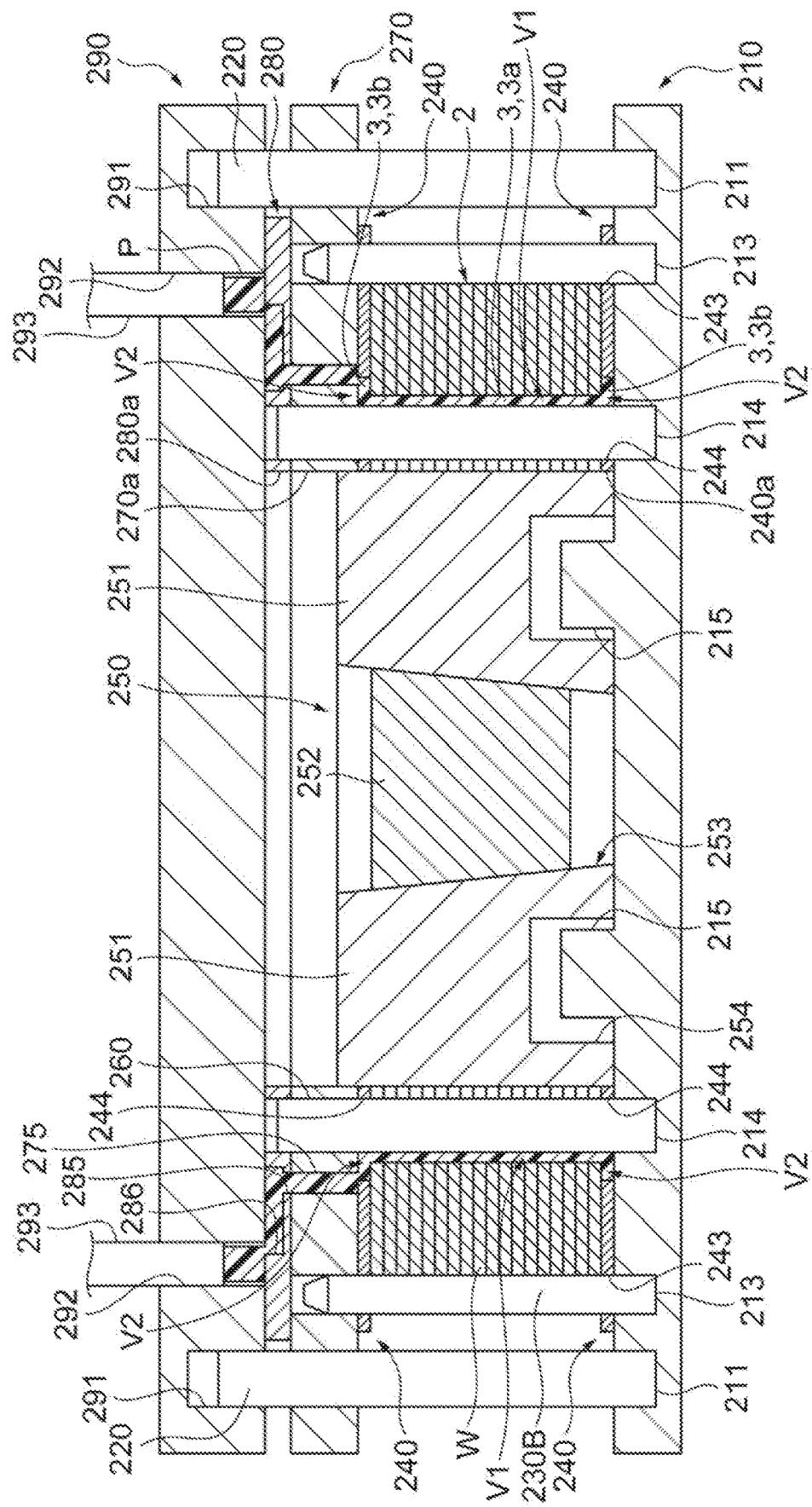
FIG. 16 is a diagram for explaining a process of manufacturing a stacked stator core, specifically, a cross-sectional view illustrating the resin filling device and a stack.

Next, as illustrated in FIG. 16, a resin pellet P is disposed in each through hole 292. The resin pellet P is a solid resin having a cylindrical shape. Subsequently, one plunger 293 is inserted into each through hole 292. In this state, the controller 140 brings a not-illustrated heater into operation and also the plunger 293 into operation. Then, the resin pellet P in a melted state is pushed out by the plunger 293, and melted resin is charged into the through hole 292, the depressed groove 286, the through hole 285, the through hole 275, the through hole 244 (auxiliary space V2), the filling space V1, and the through hole 244 (auxiliary space V2) in this order. Subsequently, melted resin is solidified by a chemical change due to heating during molding, whereby the resin portion 3 is formed in the filling space V1 and the auxiliary space V2 (third step). At this moment, the blanked members W that constitute the stack 2 are connected by the resin portion 3 and integrated. The stacked stator core 1 in which the resin portion 3 is provided on the inner wall surface F2 of the slot 7 of the stack 2 is thus completed.

In some examples, the body 260a of the mold core member 260 is spaced apart from the inner wall surface F2, and the closing portion 260b of the mold core member 260 closes the open end portion 5b, in a state in which the mold core member 260 is disposed in the slot 7. With this configuration, even when melted resin flows around the core member 260, the shape of the mold core member 260 is not deformed and therefore melted resin hardly leaks to the outside of the opening 8. Accordingly, when melted resin is charged into the filling space V1, the resin portion 3 is formed on the inner wall surface F2 of the slot 7 but the resin portion 3 is not formed to the outside of the opening 8 side. As a result, the air gap between the inner peripheral surface of the stack 2 (through hole 2a) and the outer peripheral surface of the rotor can be kept at a predetermined size. In the step of charging melted resin into the filling space V1, since the closing portion 260b of the mold core member 260 exists at the open end portion 5b, the open end portion 5b is not filled with melted resin. That is, the resin portion 3 formed on the inner wall surface F2 of the slot 7 does not close the open end portion 5b. In this configuration, since the opening 8 is kept open, a winding coil can be attached to the tooth portion 5, for example, using a general coil winder with no need for a special material and apparatus. The winding operation thus can be performed at low cost while the insulation between the winding coil and the stack 2 is kept by the resin portion 3. After a winding coil is attached to the tooth portion 5, a fixing material for fixing the winding coil to the tooth portion 5 may be applied to the winding coil. Specifically, the winding coil may be impregnated dropwise with varnish and dried, or a thermosetting resin (for example, epoxy resin) may be applied around the winding coil and then cured.

In some examples, the closing portion 260b abuts on the inner wall surface of the open end portion 5b. In this configuration, the resin portion 3 is not formed on the inner wall surface of the slot 7 on the open end portion 5b side. Accordingly, leakage of melted resin to the outside of the opening 8 (into the through hole 2a of the stack 2) can be further suppressed.

Even when the mold core member 260 abuts on the inner wall surface of the slot 7, a minute gap (for example, a gap with approximately a few tens of μm) exists when viewed microscopically. Melted resin may penetrate the gap by capillarity to cause burrs. In some examples, the closing portion 260b abuts on the inner wall surface of the slot 7 in a region of the slot 7 inside the opening 8. With this configuration, the end point of the minute gap in which capillarity may occur exists at the slot inside the slot opening. Accordingly, even if melted resin penetrates the gap, burrs are less likely to be formed on the outside of the opening 8.

In some examples, both of the outside surface F5 of the closing portion 260b and the inner wall surface F2 of the open end portion 5b are inclined surfaces and abut on each other. With this configuration, the contact area between the closing portion 260b and the open end portion 5b is increased. The open end portion 5b is thus closed more securely by the closing portion 260b of the mold core member 260. As a result, leakage of melted resin to the outside of the opening 8 can be further suppressed. Melted resin penetrates the minute gap by capillarity to reach the end point of the gap and thereafter develops so as to extend along the extending direction of the inner wall surface F2 and the outside surface F5. With this configuration, burrs are less likely to adhere to the inner wall surface of the slot 7 on the opening 8 side. Burrs, if any, thus can be removed easily.

In some examples, the open end portion 5b is wider than the base end portion 5a and has a pair of protrusions 5c positioned outside the base end portion 5a in the circumferential direction. In other words, the resin portion 3 (the main portion 3a) does not protrude relative to the protrusion 5c in the circumferential direction. In this configuration, when viewed from the opening 8 side, the resin portion 3 formed on the inner wall surface F2 of the slot 7 is protected by the open end portion 5b. Accordingly, for example, when a winding coil is attached to the tooth portion 5 by a coil winder, the resin portion 3 is less likely to be damaged by the winding coil or the winder. Consequently, foreign matters due to dropping of the resin portion 3 can be suppressed.

In some examples, the auxiliary space V2 communicatively connected with the filling space V1 is formed at the top and the bottom of the filling space V1. Thus, not only the filling space V1 but also the auxiliary space V2 is filled with melted resin. Accordingly, the resin portion 3 provided on the inner wall surface F2 of the slot 7 protrudes to the outside of the end surfaces F3 and F4 of the stack 2. As a result, when a winding coil is attached to the tooth portion 5, the winding coil is less likely to abut on the end surface F4 of the tooth portion 5. Since the linear distance between the winding coil and the tooth portion 5 is increased, surface discharge is less likely to occur between the winding coil and the tooth portion 5. Furthermore, since the resin portion 3 protrudes to the outside of the end surfaces F3 and F4 of the stack 2, the state of the blanked members W entirely fastened by the resin portion 3 is easily kept even when the resin portion 3 is shrunken by heat. This configuration can suppress separation of the blanked member W positioned on the end surfaces F3 and F4 side of the stack 2 and also can suppress, for example, chipping and cracking of the resin portion 3 due to the separation. If chipping occurs, resin pieces dropping from the resin portion 3 scatter in the surroundings as foreign matters, possibly influencing the performance of the motor when the motor is configured using the stacked stator core 1. If cracking occurs, surface discharge occurs between the winding coil and the stack 2 in the cracked region, and electrical continuity may be established between the winding coil and the stack 2.

In some examples, the auxiliary space V2 faces the filling space V1 and expands continuously from the filling space V1 so as to partially face the end surface F3 of the yoke portion 4 and the end surface F4 of the tooth portion 5. In this configuration, the resin portion 3 is formed on the inner wall surface F2 of the slot 7 and also formed on the end surface F3 of the yoke portion 4 and the end surface F4 of the tooth portion 5 around the inner wall surface F2. Accordingly, when a winding coil is attached to the tooth portion 5, the winding coil is less likely to abut on the end surfaces F3 and F4 of the stack 2.

In some examples, the region of the plate 240 other than the through holes 244 abuts on the end surfaces F3 and F4 of the stack 2. The resin portion 3 is not formed in the region of the end surfaces F3 and F4 of the stack 2 that abuts on the plate 240. In this configuration, the end surface F4 of the tooth portion 5 has a covered region R1 covered with the end portion 3b of the resin portion 3 and a non-covered region R2 not covered with the resin portion 3. Here, the resin portion 3 is obtained from melted resin at high temperature (for example, approximately 120° C. to 200° C.) which is cooled to room temperature and cured. Since melted resin is shrunken with temperature change from high temperature to room temperature, internal stress may remain in the resin portion 3. When the internal stress is large, chipping or cracking easily occurs in the resin portion 3. However, in some examples, since the non-covered region R2 exists on the end surface F4 of the tooth portion 5, expansion and shrinkage of the resin portion 3 is alleviated in the non-covered region R2, and the internal stress is less likely to remain in the resin portion 3. This configuration can suppress chipping in the resin portion 3.

In some examples, the corner of the depressed groove that forms the auxiliary space V2 may have a rounded cross-sectional shape or may be inclined relative to a bottom wall surface and a side wall surface of the depressed groove. Alternatively, in some examples, the corner of the depressed groove that forms the auxiliary space V2 may be shaped like a step. In these cases, the corner of the resin portion 3 that extends from the inner wall surface of the slot 7 around the end surface of the stack 2 is beveled (rounded or chamfered) or stepped. In this configuration, when a winding coil is attached to the tooth portion 5, the winding coil is easily wound along the outer shape of the resin portion 3. This configuration reduces stress acting on the resin portion 3 by the winding coil and thus can suppress, for example, chipping and cracking in the resin portion 3. Since the winding coil wound around the tooth portion 5 is compact, the motor formed such a stacked stator core 1 achieves a compact size, higher efficiency, and higher output.

In some examples, the diameter-increasing members 251 are moved outward in the radial direction of the stack 2 to apply the radially outward force to the inner peripheral surface of the stack 2 (through hole 2a). With this configuration, melted resin is charged into the filling space V1 in a state in which the shape of the stack 2 is kept by the diameter-increasing members 251. Accordingly, deformation of the stack 2 by heat of melted resin is suppressed. As a result, the stacked stator core 1 is produced in a desired shape as designed and, therefore, the motor formed with the stacked stator core 1 can achieve improved performance. In addition, in some examples, since the closing portion 260b abuts on the inner wall surface of the open end portion 5b in a state in which the mold core member 260 is inserted in the slot 7, the open end portion 5b is securely closed by the closing portion 260b when the diameter-increasing member 251 pushes the tooth portion 5 radially outward. With this configuration, leakage of melted resin to the outside of the opening 8 (into the through hole 2a of the stack 2) can be further suppressed.

In some examples, when the stack 2 is placed on the lower die 210, the ridge 231 of one positioning block 230A is engaged in each depressed groove 6A, and the outer peripheral surface of one positioning pin 230B is engaged in each depressed groove 6B, whereby the stack 2 is positioned. In this configuration, when the diameter-increasing members 251 apply the radially outward force, the stack 2 is sandwiched between the diameter-increasing members 251 and the positioning blocks 230A as well as the positioning pins 230B in the radial direction. This configuration can further suppress deformation of the stack 2 by heat of melted resin.

In some examples, each positioning pin 230B is positioned to face the corresponding diameter-increasing member 251 in the radial direction. In this configuration, since a large part of force acting on the stack 2 by the diameter-increasing member 251 is received by the positioning pin 230B at a position facing the diameter-increasing member 251 in the radial direction, the force contributing to deformation of the stack 2 is suppressed. This configuration can further suppress deformation of the stack by heat of melted resin.

It is to be understood that not all aspects, advantages and features described herein may necessarily be achieved by, or included in, any one particular example embodiment. Indeed, having described and illustrated various examples herein, it should be apparent that other examples may be modified in arrangement and detail may be omitted.

Figure 17:
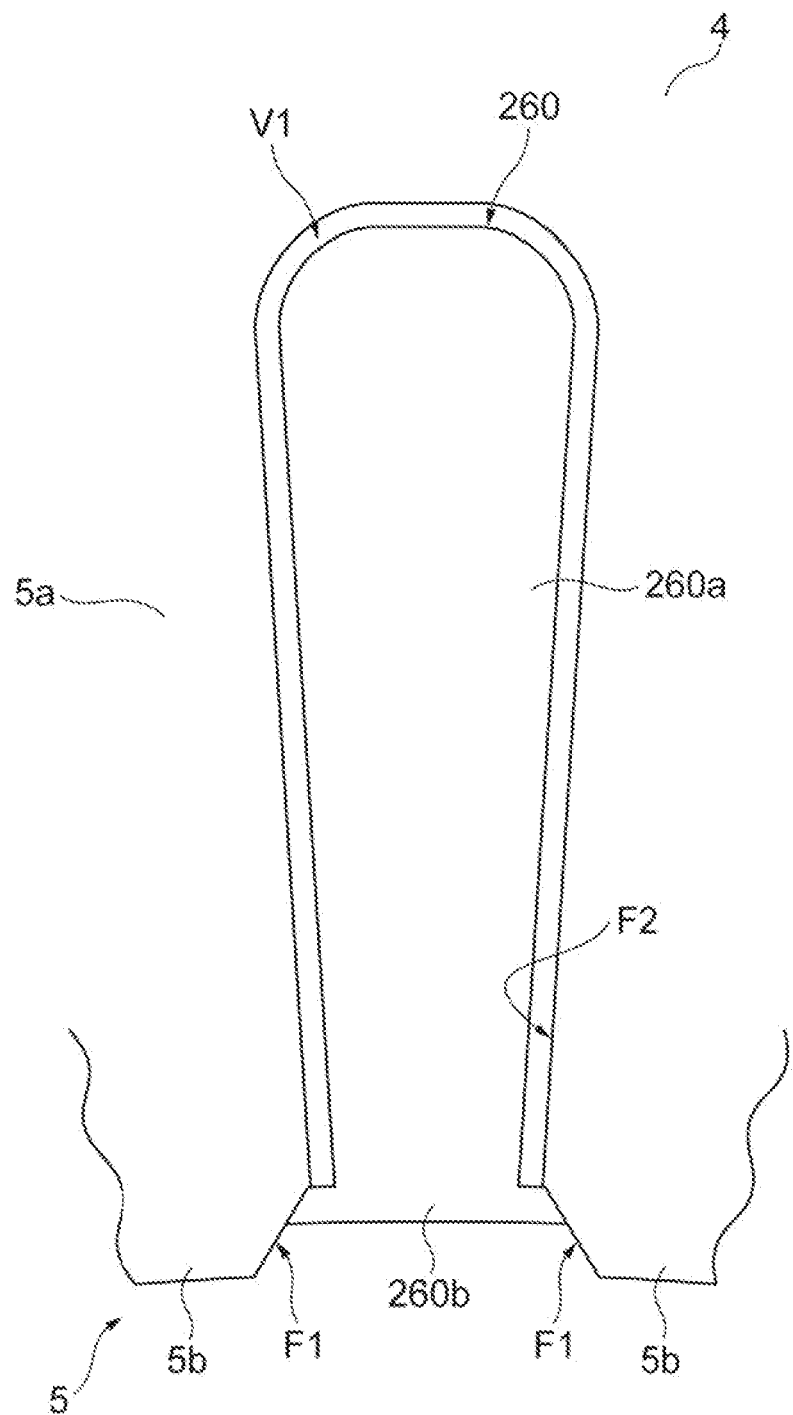
FIG. 17 is a top view of the vicinity of one slot in which a mold core member is inserted, in the method of manufacturing a stacked stator core according to another example.

For example, the open end portion 5b of the tooth portion 5 and the closing portion 260b of the mold core member 260 are not limited to the foregoing examples and may employ various shapes. For example, as illustrated in FIG. 17, the open end portion 5b may be narrower toward the through hole 2a. That is, the slot 7 may expand toward the opening 8 side. In this case, the closing portion 260b of the mold core member 260 has a trapezoidal shape and may have a trapezoidal shape so as to be wider toward the opening 8.

Figure 18:
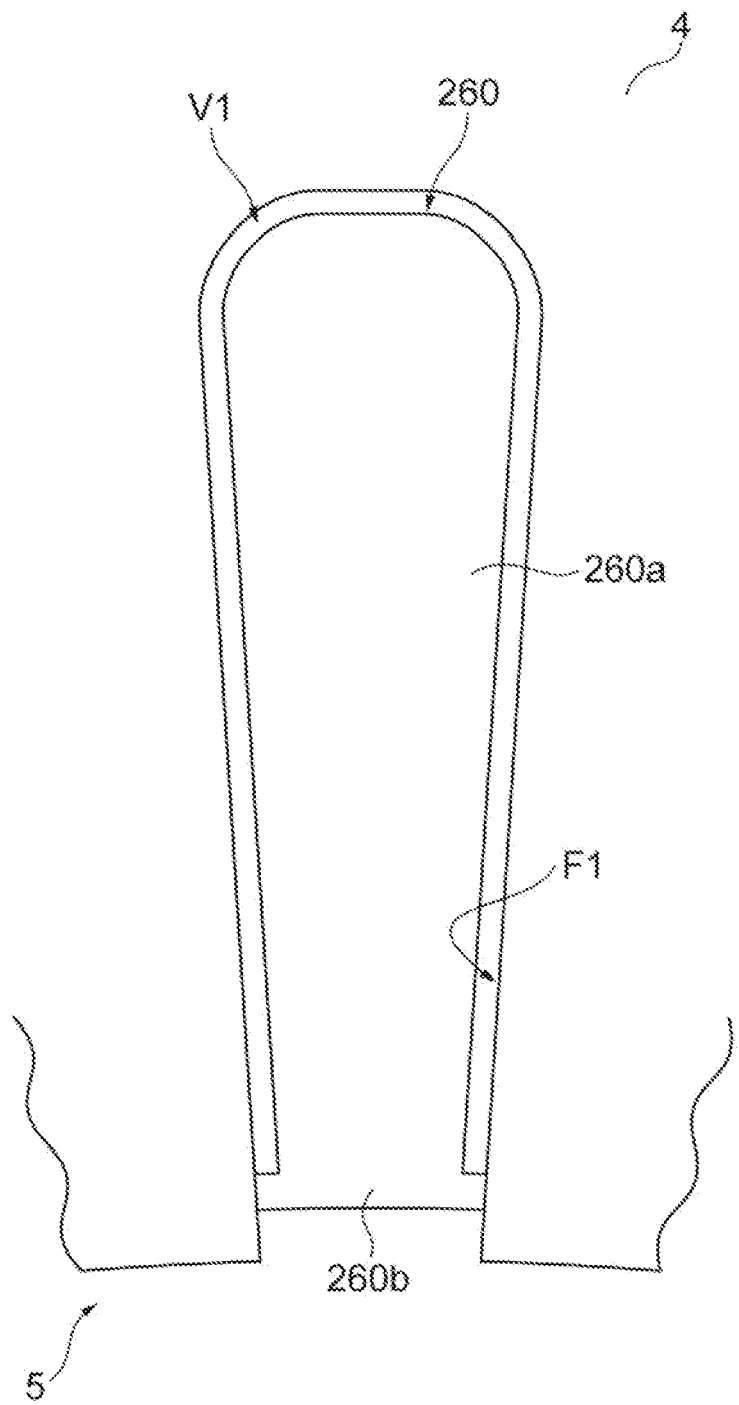
FIG. 18 is a top view of the vicinity of one slot in which a mold core member is inserted, in another example method of manufacturing a stacked stator core.

2) As illustrated in FIG. 18, the width of the tooth portion 5 may be substantially constant in the extending direction thereof. In this case, the closing portion 260b of the mold core member 260 may protrude outward relative to the body 260a in the circumferential direction.

Figure 19:
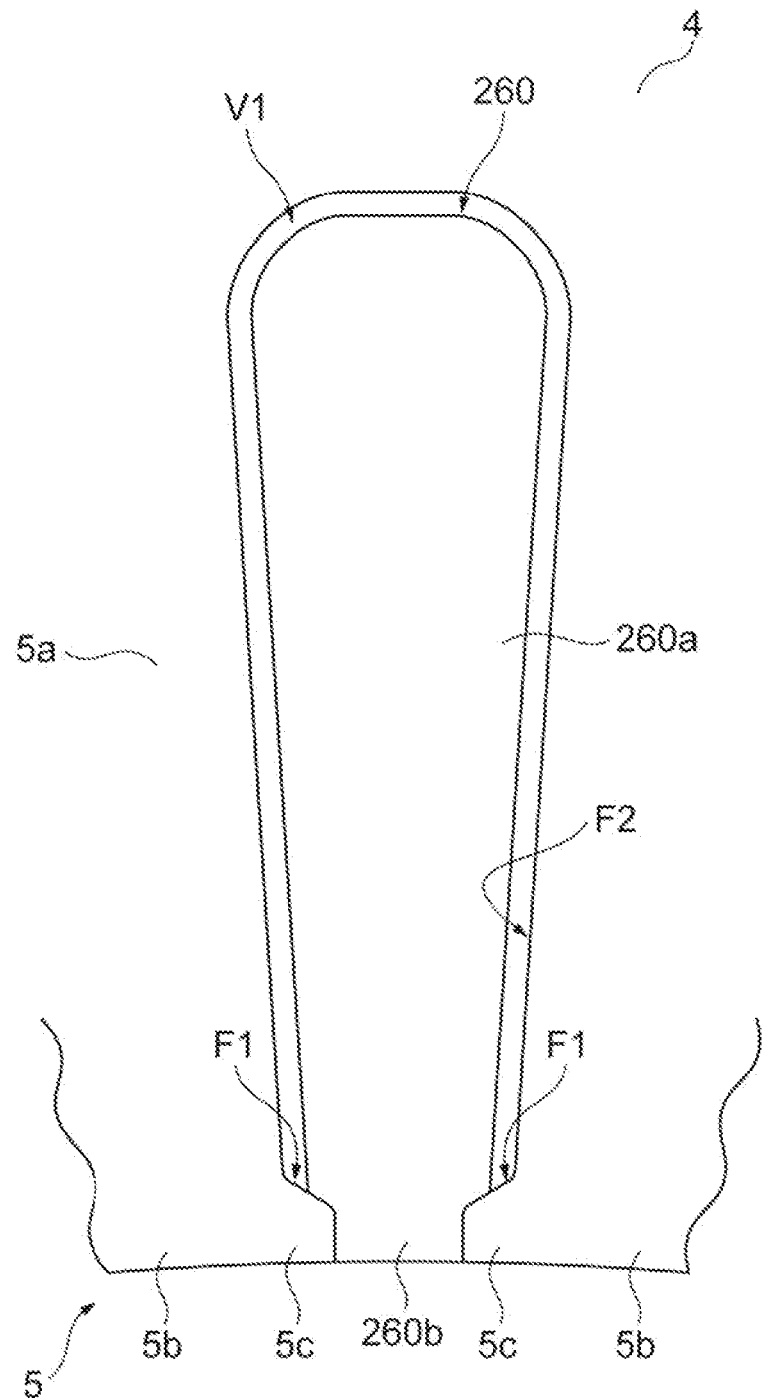
FIG. 19 is a top view of the vicinity of one slot in which a mold core member is inserted, in another example method of manufacturing a stacked stator core.

3) As illustrated in FIG. 19, the closing portion 260b of the mold core member 260 may close the closing portion 260b up to the opening 8.

Figure 20:
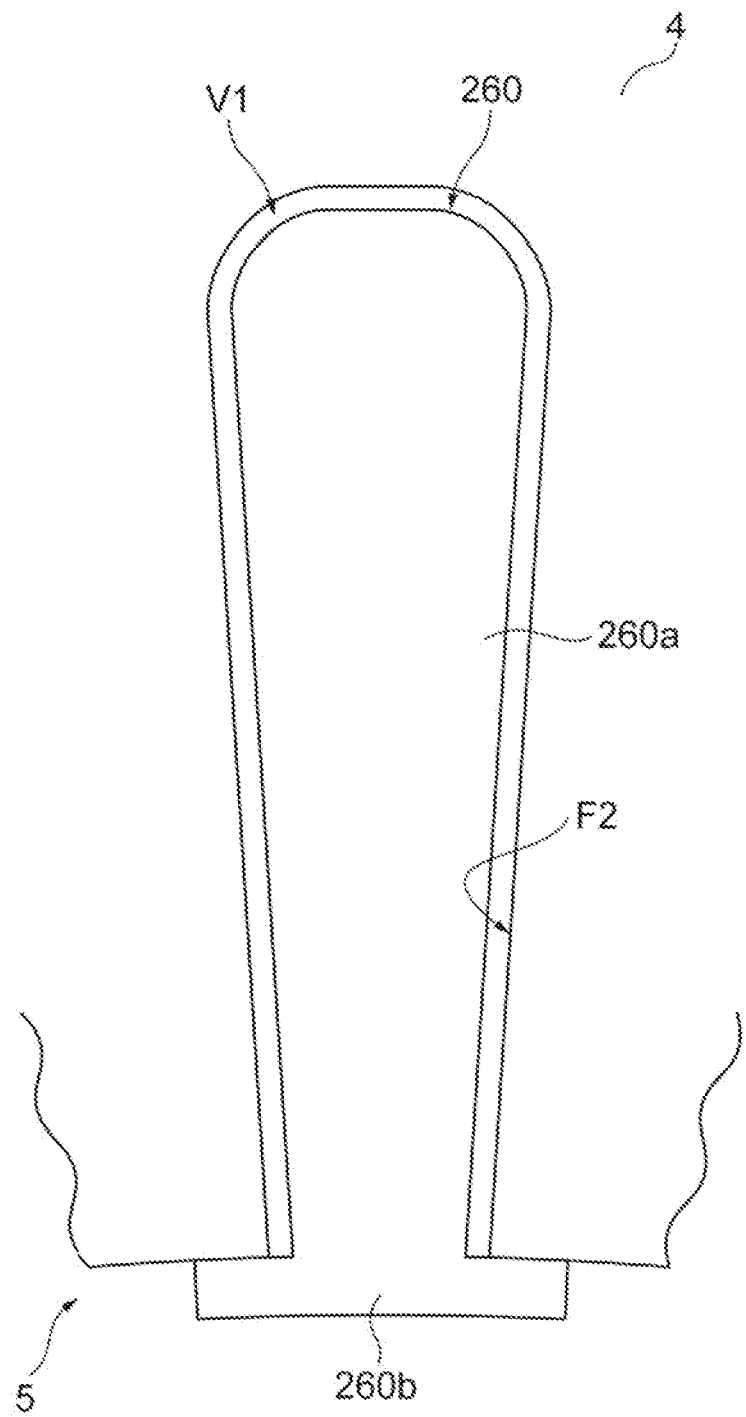
FIG. 20 is a top view of the vicinity of one slot in which a mold core member is inserted, in another example method of manufacturing a stacked stator core.

4) As illustrated in FIG. 20, the closing portion 260b of the mold core member 260 may be positioned outside the slot 7 and the opening 8 may be closed by the closing portion 260b. In this case, the main portion 3a of the resin portion 3 is formed on the entire surface of the inner peripheral wall of the slot 7. Here, the closing portion 260b is positioned outside the slot 7, and when the radially outward force is applied to the inner peripheral surface of the stack 2 (through hole 2a) using the diameter-increasing member 251, a depressed groove corresponding to the diameter-increasing member 251 is provided on the outer peripheral surface of the diameter-increasing member 251.

5) As illustrated in FIG. 21(a), a ridge 5d extending in the stacking direction and protruding toward the slot 7 may be provided at the tooth portion 5. In this case, a depressed groove 260c corresponding to the ridge 5d may be provided at the closing portion 260b of the mold core member 260. On the other hand, as illustrated in FIG. 21(b), a ridge 260e extending in the stacking direction and protruding toward the tooth portion 5 may be provided at the closing portion 260b of the mold core member 260. In this case, a depressed groove 5e corresponding to the ridge 260e may be provided in the tooth portion 5. Although the ridges 5d and 260e and the depressed grooves 260c and 5e have a quadrature shape in FIG. 21, these depressed grooves and ridges may have any shapes that can be engaged with each other.

Figure 22:
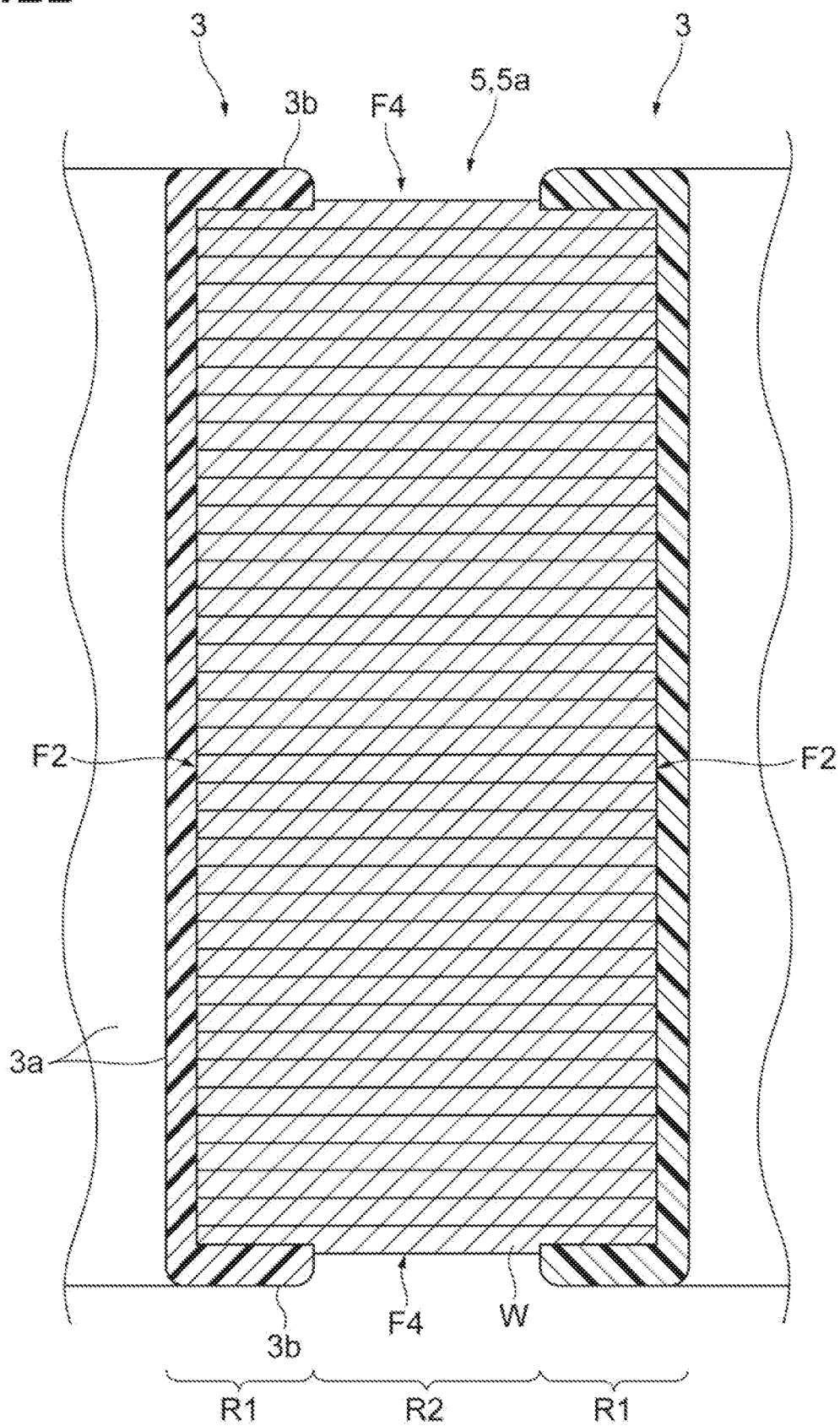
FIG. 22 is a cross-sectional view of the tooth portion cut in the same manner as in FIG. 4, in another example stacked stator core.

6) As illustrated in FIG. 22, a portion of the end surfaces F3 and F4 of the stack 2 that is covered with the end portion 3b of the resin portion 3 may be depressed from the other portion. Although not illustrated in the figure, the surface of a portion of the end surfaces F3 and F4 of the stack 2 that is covered with the end portion 3b of the resin portion 3 may be roughed. In this case, the adherence of the resin portion 3 to the end surfaces F3 and F4 of the stack 2 is increased. This can suppress separation of the resin portion 3 from the stack 2.

Figure 23:
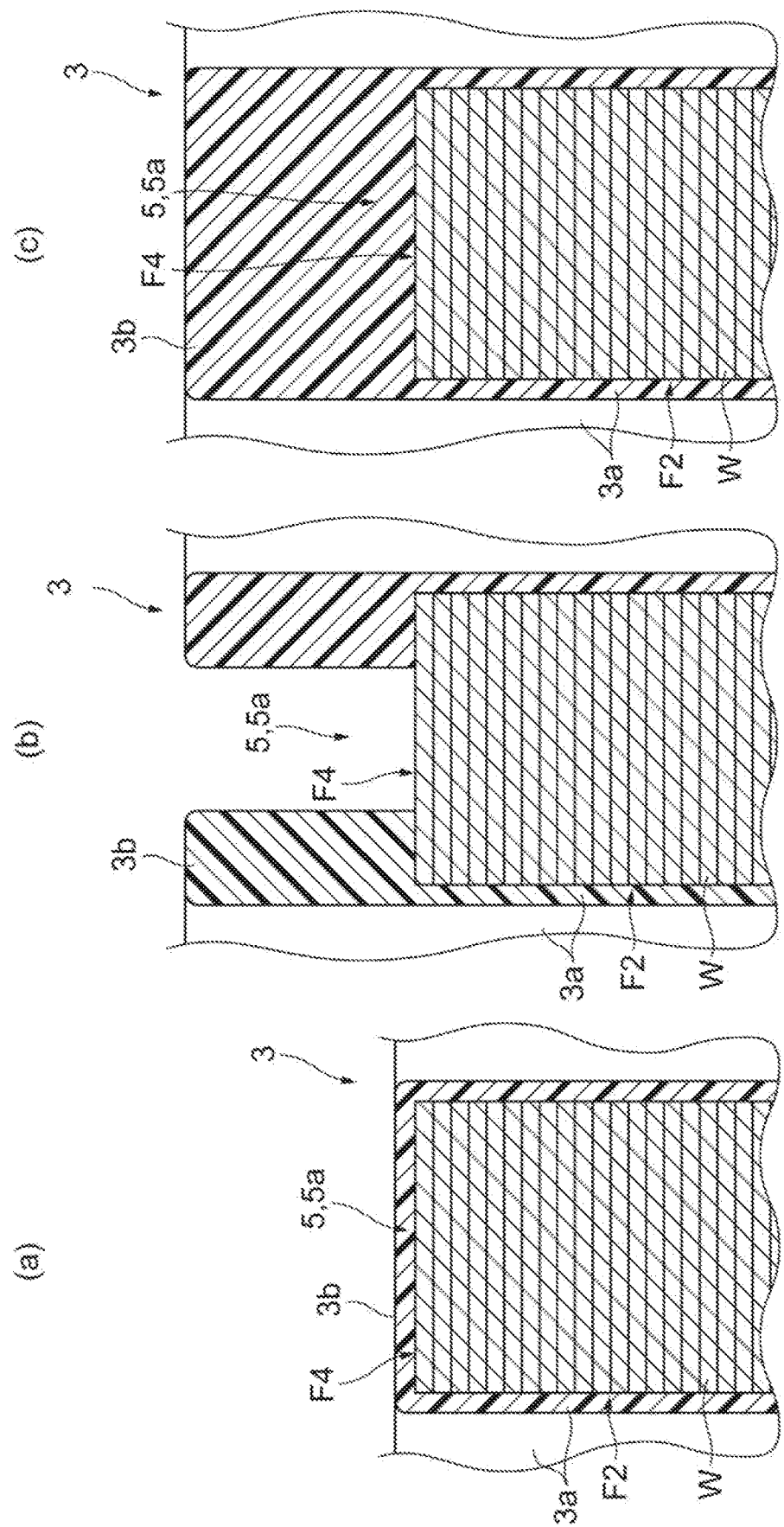
FIG. 23 is a cross-sectional view of the vicinity of an upper end surface of the tooth portion cut in the same manner as in FIG. 4, in another example stacked stator core.

7) As illustrated in FIG. 23(a), the end surface F4 of the tooth portion 5 (base end portion 5a) may be substantially entirely covered with the end portion 3b of the resin portion 3.

8) As illustrated in FIGS. 23(b) and 23(c), either when the end surface F4 of the tooth portion 5 has the non-covered region R2 not covered with the end portion 3b of the resin portion 3 or when the end surface F4 of the tooth portion 5 is substantially entirely covered with the end portion 3b of the resin portion 3, the end portion 3b may have a predetermined thickness. Since the copper loss of the winding coil wound around the tooth portion 5 tends to increase as the thickness of the end portion 3b increases, the upper limit of the thickness of the end portion 3b may be set as appropriate considering the performance of the motor. If the end portion 3b is too thin, the linear distance between the winding coil wound around the tooth portion 5 and the tooth portion 5 is reduced, so that surface discharge is more likely to occur. For this reason, the lower limit of the thickness of the end portion 3*b* may be set as appropriate considering surface discharge. For example, the thickness of the end portion 3*b* may be equivalent to the thickness of the main portion 3*a* or may be larger than the thickness of the main portion 3*a*.

Figure 25:
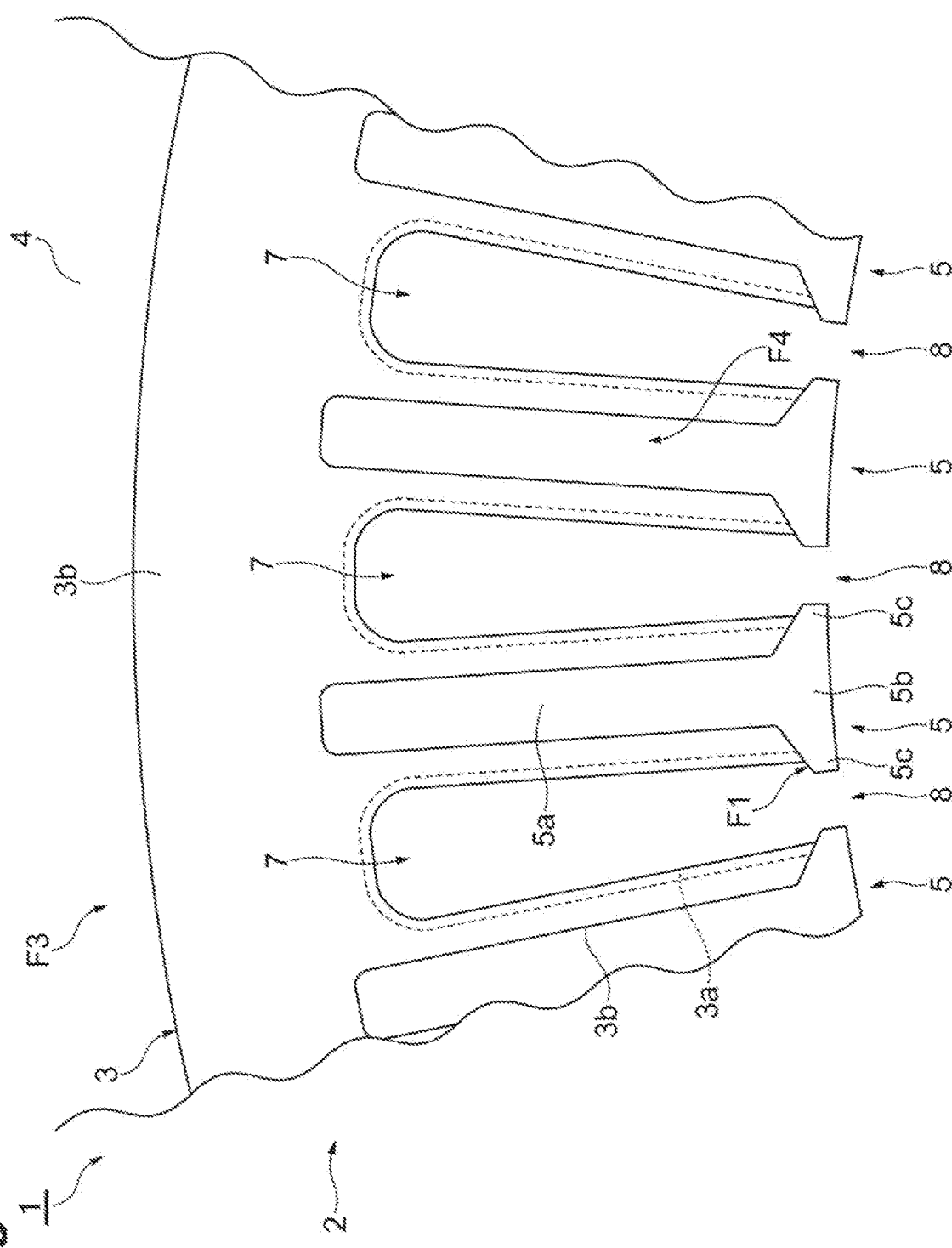
FIG. 25 is a partially enlarged top view of the vicinity of tooth portions, in another example stacked stator core.
Figure 26:
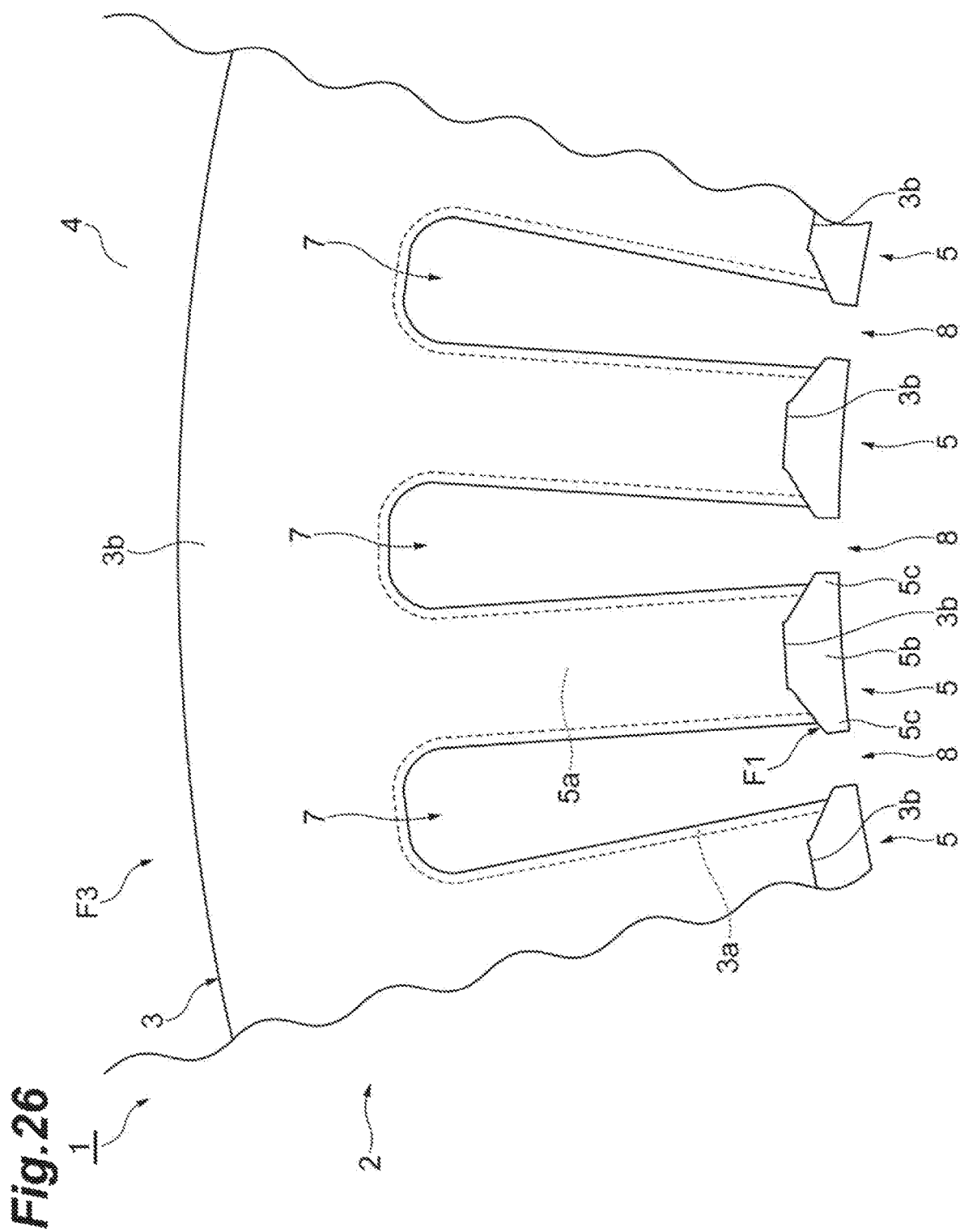
FIG. 26 is a partially enlarged top view of the vicinity of tooth portions, in another example stacked stator core.
Figure 27:
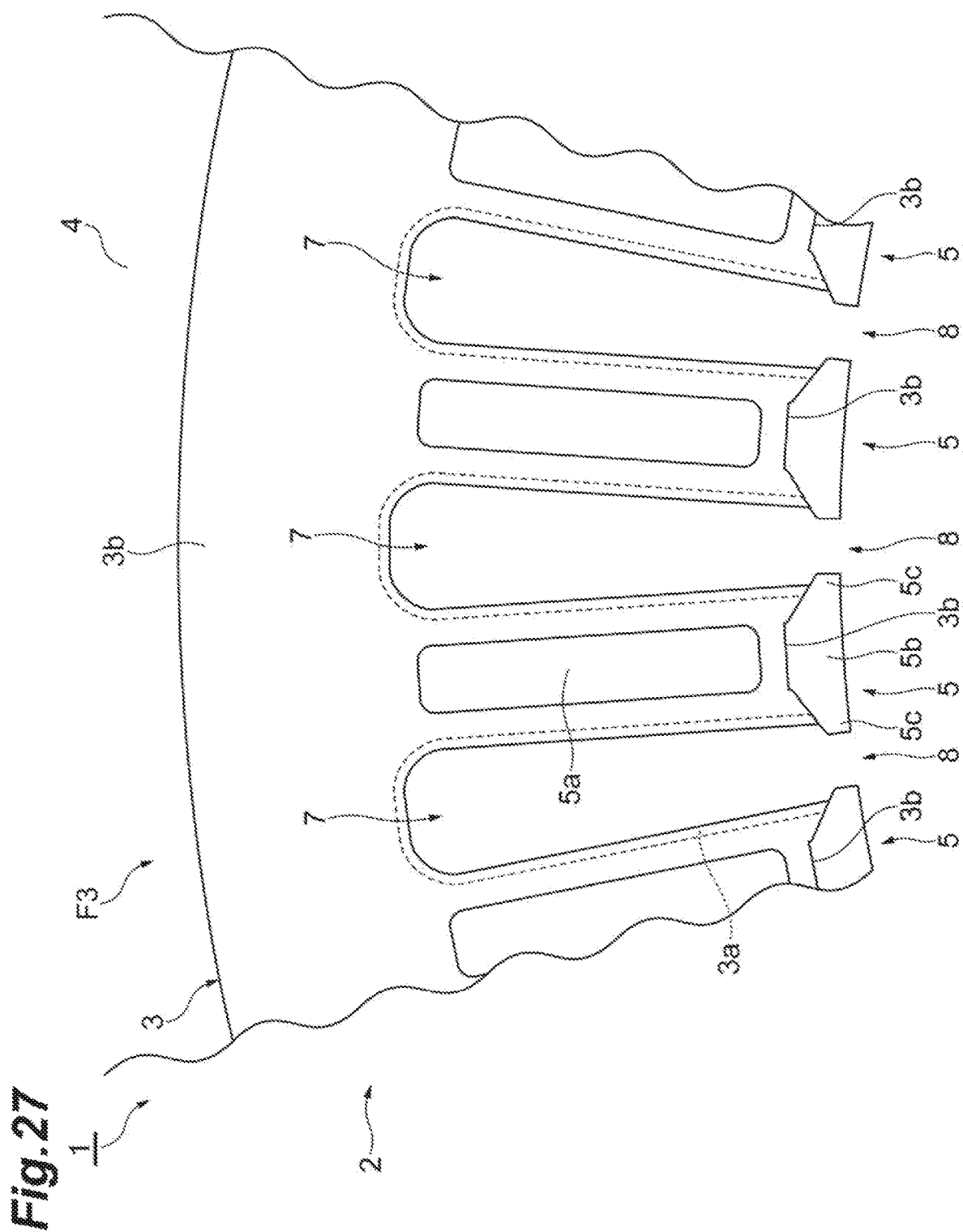
FIG. 27 is a partially enlarged top view of the vicinity of tooth portions, in another example stacked stator core.

9) As illustrated in FIG. 24, the end portion 3*b* of the resin portion 3 may extend toward the outer peripheral edge of the yoke portion 4, on the end surface F3 of the yoke portion 4. In this case, as illustrated in FIG. 25, the end portions 3*b* extending toward the outer peripheral edge of the yoke portion 4 may be integrated so that the end portion 3*b* has an annular shape as a whole. Also in this case, as illustrated in FIG. 26, the end surface F4 of the tooth portion 5 (base end portion 5*a*) may be substantially entirely covered with the end portion 3*b* of the resin portion 3, or as illustrated in FIG. 27, the end surface F4 of the tooth portion 5 (base end portion 5*a*) may be partially covered with the end portion 3*b* of the resin portion 3. In the example in FIG. 27, a rectangular opening is formed at the end portion 3*b* in the end surface F4 of the base end portion 5*a*, and the base end portion 5*a* is partially exposed from the opening. In these cases, since the end surface F3 of the yoke portion 4 is covered with the resin portion 3 in a wider range, the winding coil is less likely to abut on the end surface F3 of the yoke portion 4. Alternatively, the end portions 3*b* of the resin portions 3 adjacent in the circumferential direction may be integrated with each other so as to partially cover the end surface F4 of the tooth portion 5. For example, as illustrated in FIG. 28(*a*), the end portions 3*b* of the resin portions 3 may be integrated with each other from a region of the end surface F4 of the tooth portion 5 in the vicinity of the boundary of the yoke portion 4 (the end surface of the base end portion 5*a*) to the yoke portion 4. As illustrated in FIG. 28(*b*), the end portions 3*b* of the resin portions 3 may be integrated with each other only in a region of the end surface F4 of the tooth portion 5 in the vicinity of the boundary of the yoke portion 4 (the end surface of the base end portion 5*a*). A portion of the end portion 3*b* that is integrated with the resin portion 3 adjacent in the circumferential direction may extend over all of the resin portions 3 to form an annular shape as a whole or may have an arc shape rather than extending over all of the resin portions 3.

Figure 29:
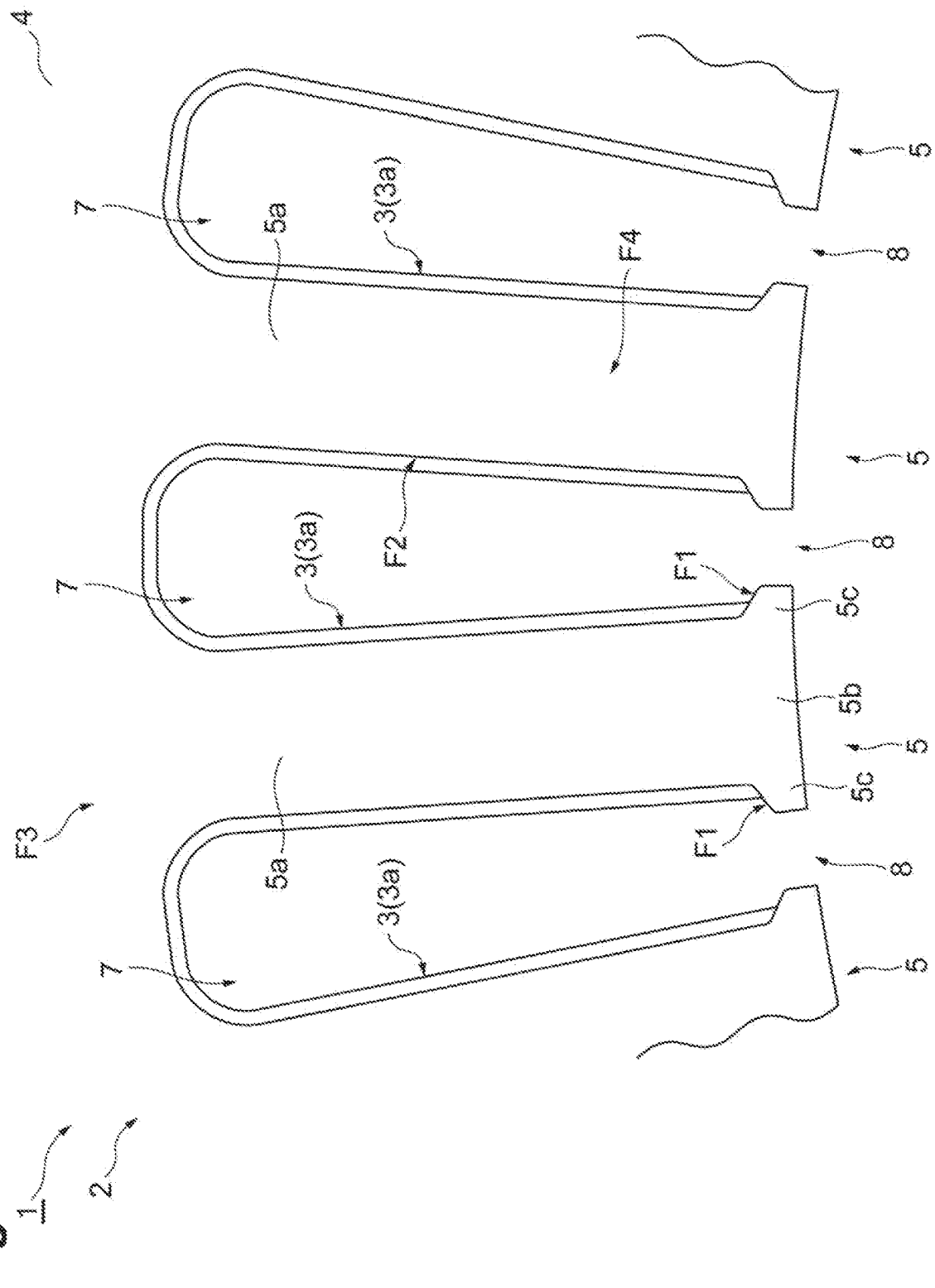
FIG. 29 is a partially enlarged top view of the vicinity of tooth portions, in another example stacked stator core.

10) As illustrated in FIG. 29, the resin portion 3 is not necessarily formed on the end surfaces F3 and F4 of the stack 2. In this case, the resin portion 3 may protrude outward relative to the end surfaces F3 and F4 of the stack 2 in the stacking direction of the stack or may not protrude.

Figure 30:
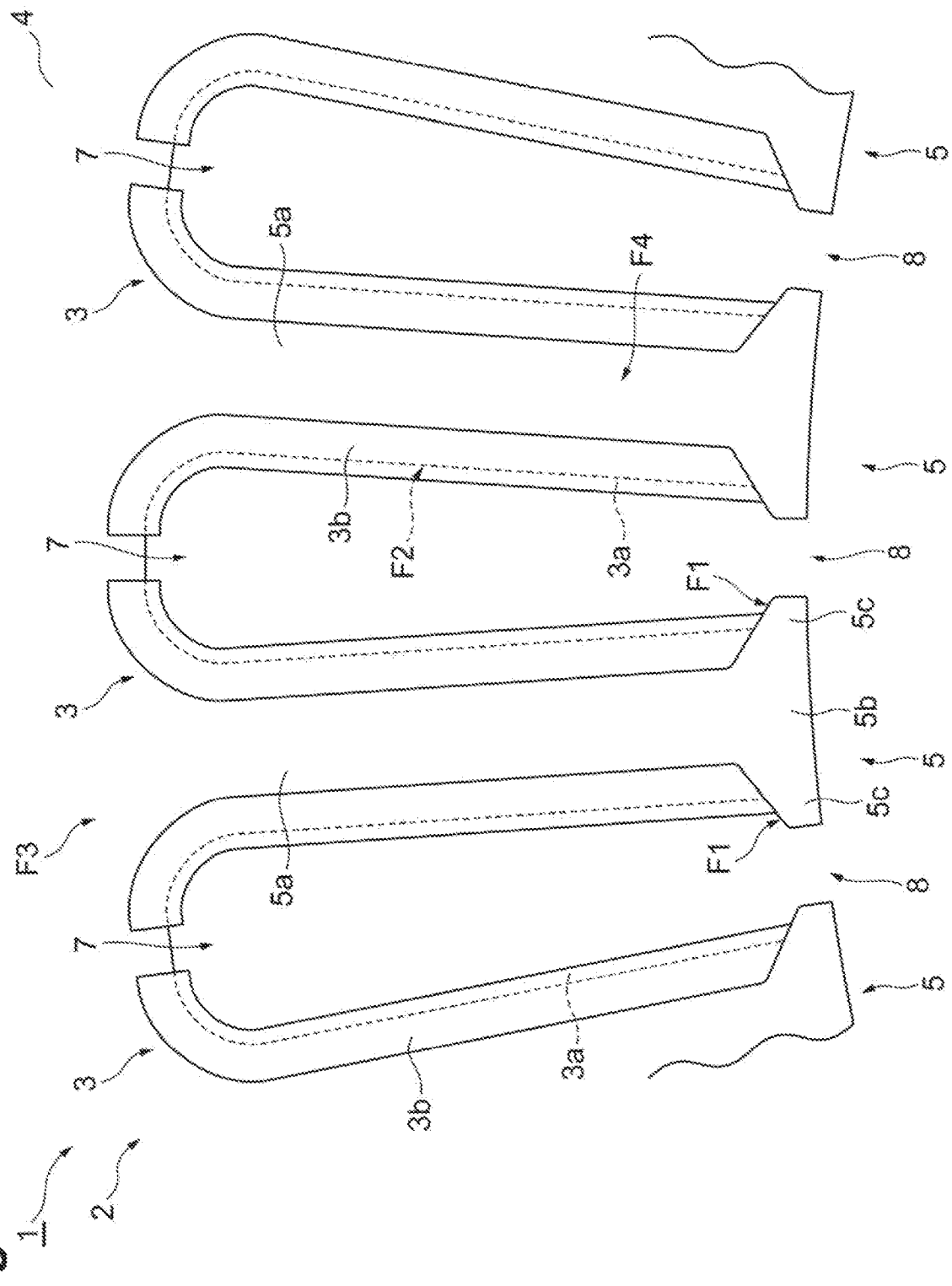
FIG. 30 is a partially enlarged top view of the vicinity of tooth portions, in another example stacked stator core.
Figure 31:
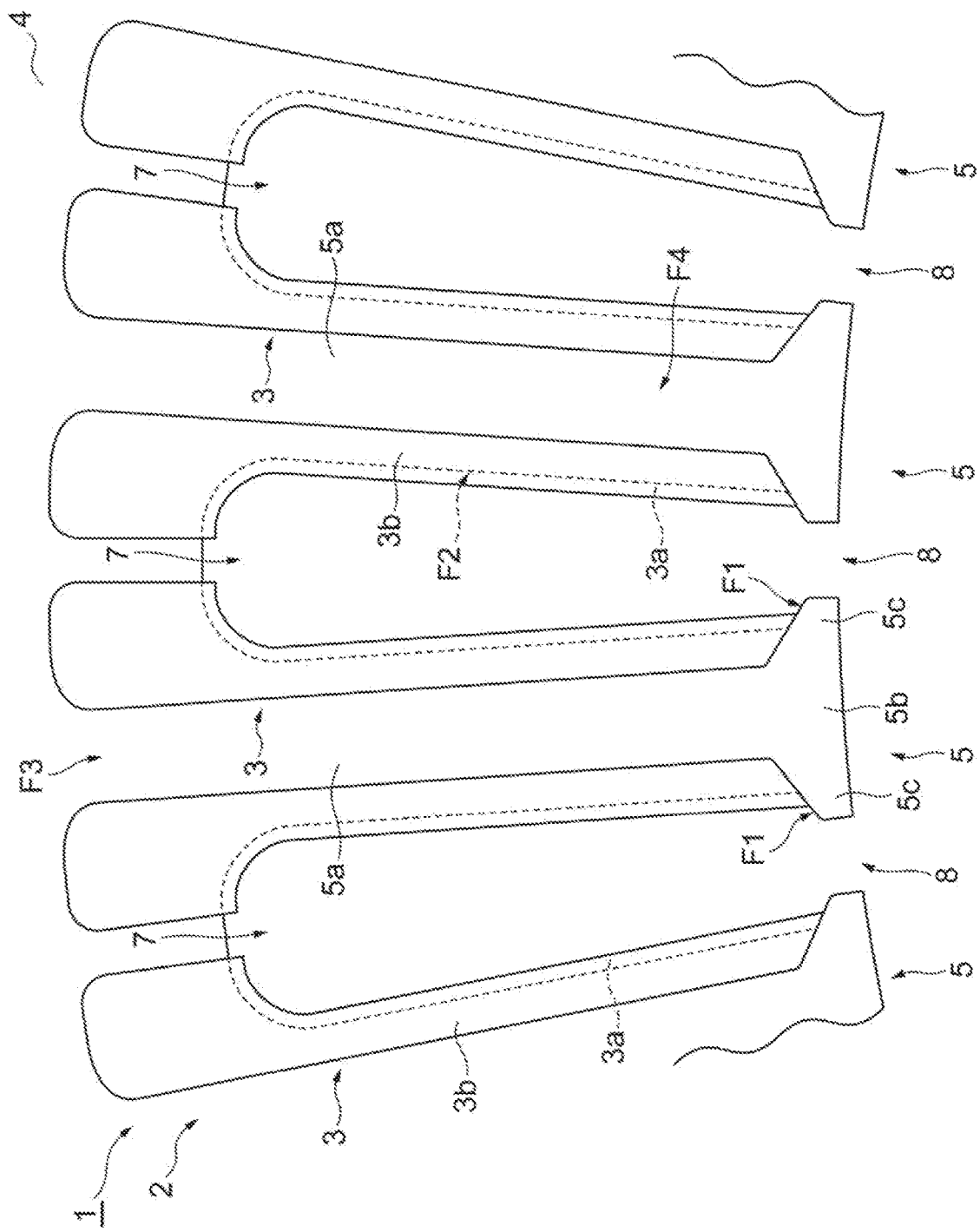
FIG. 31 is a partially enlarged top view of the vicinity of tooth portions, in another example stacked stator core.

11) As illustrated in FIG. 30 and FIG. 31, the main portion 3*a* may be partially not provided in a region of the inner wall surface F2 of the slot 7 that corresponds to the yoke portion 4. Similarly, the end portion 3*b* may partially not provided on the end surface F3 of the yoke portion 4. That is, the resin portion 3 may be divided in the circumferential direction in one slot 7. In this case, the amount of resin used can be reduced.

Figure 32:
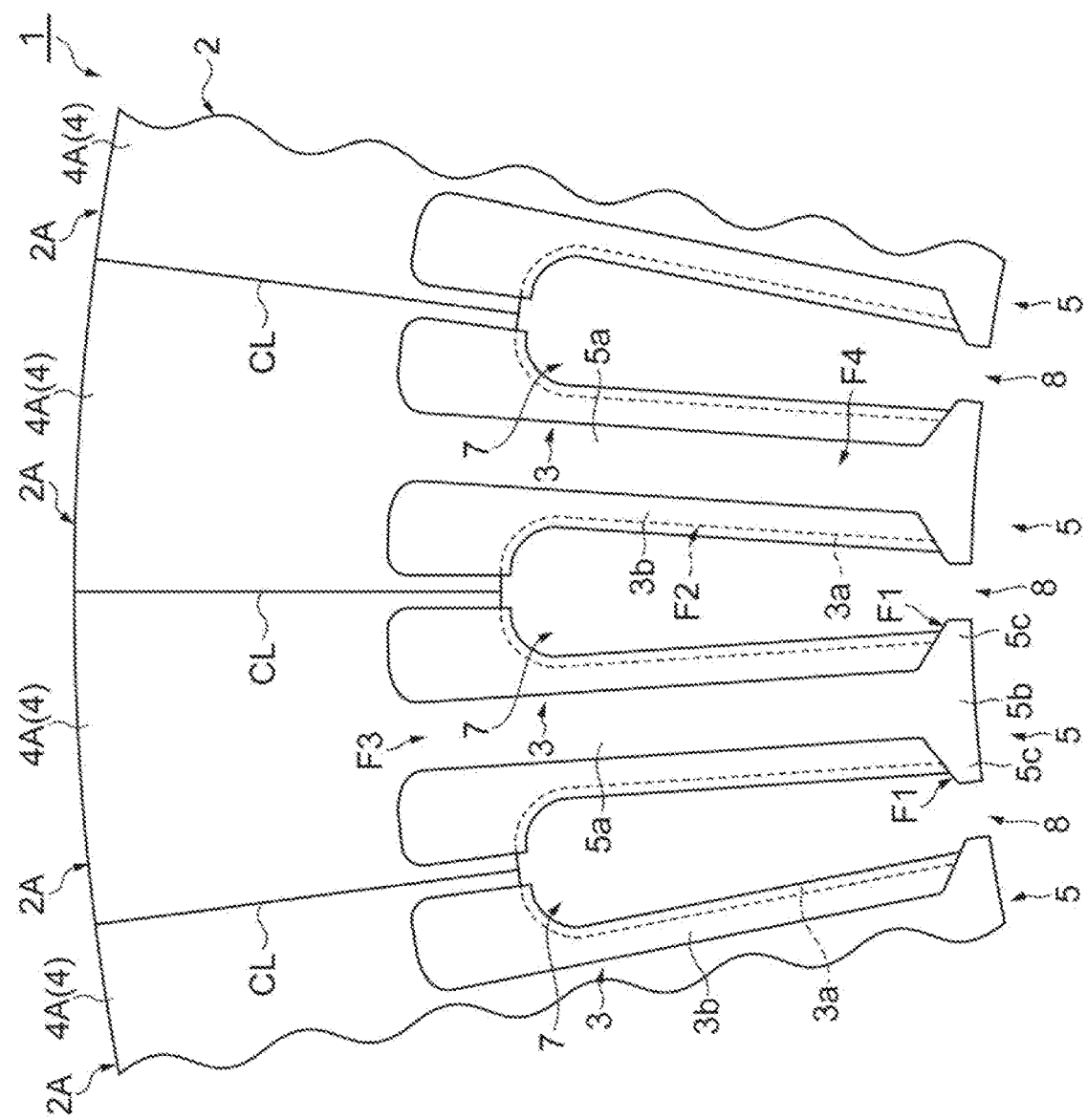
FIG. 32 is a partially enlarged top view of the vicinity of tooth portions, in another example stacked stator core.

12) As illustrated in FIG. 30 and FIG. 31, when the main portion 3*a* may be partially not provided in a region of the inner wall surface F2 of the slot 7 that corresponds to the yoke portion 4, the stack 2 may be an assembly in which a plurality of core pieces 2A are combined, as illustrated in FIG. 32. Specifically, each core piece 2A is configured with one yoke piece portion 4A and one tooth portion 5. The yoke piece portion 4A is a part of the yoke portion 4 when the yoke portion 4 is cut along the cut line CL. In FIG. 32, the cut line CL extends along the radial direction of the yoke portion 4 so as not to overlap the resin portion 3. That is, the stack 2 is formed such that the core pieces 2A adjacent in the circumferential direction of the center axis Ax are integrated at the ends (cut lines CL) of the yoke piece portions 4A. The core pieces 2A may be obtained by dividing the stack 2 along the cut line CL after the resin portions 3 are provided in the stack 2 so as not to overlap the cut lines CL. Alternatively, the resin portions 3 may be provided individually for the core pieces 2A in a divided state.

Figure 33:
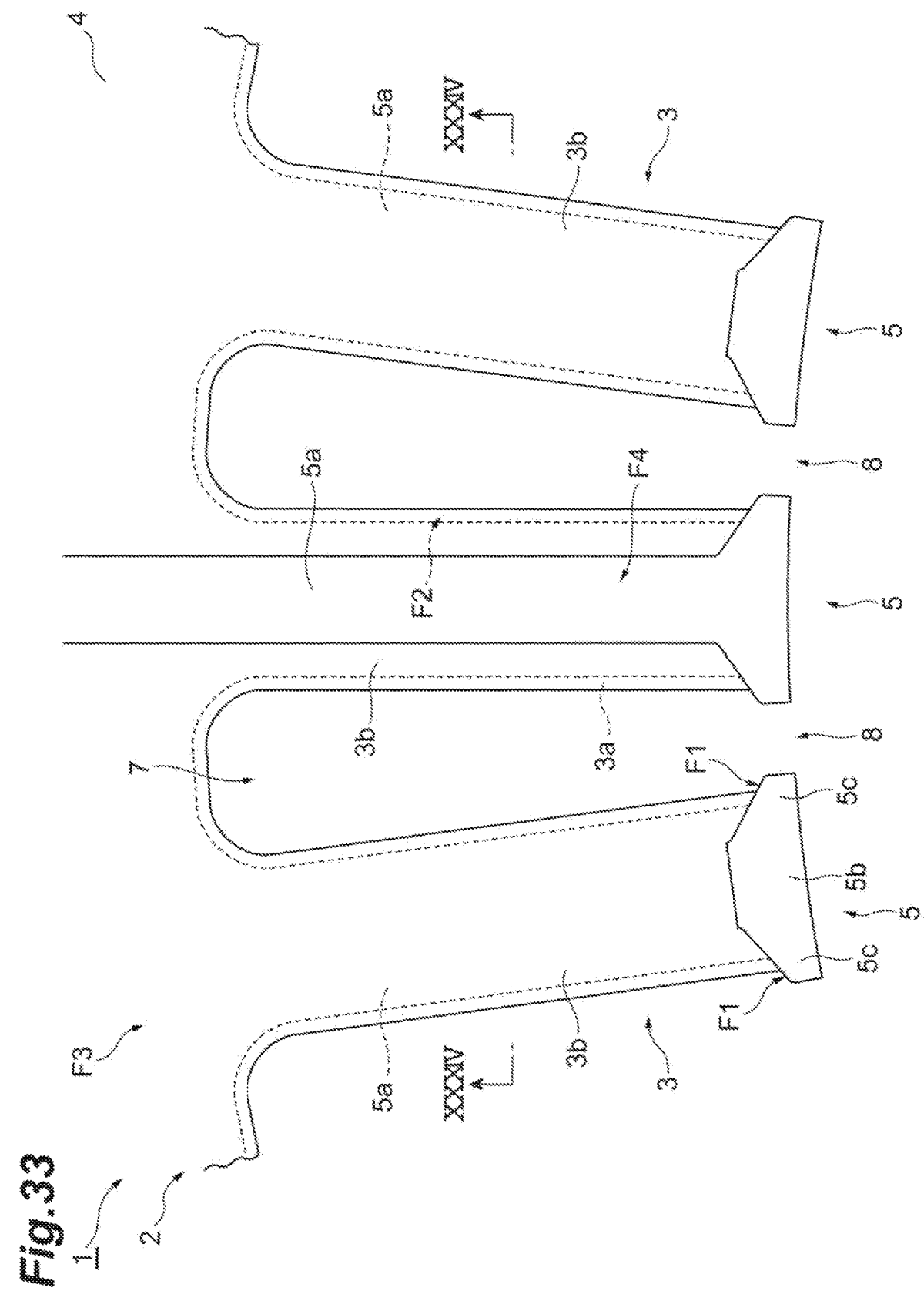
FIG. 33 is a partially enlarged top view of the vicinity of tooth portions, in another example stacked stator core.
Figure 34:
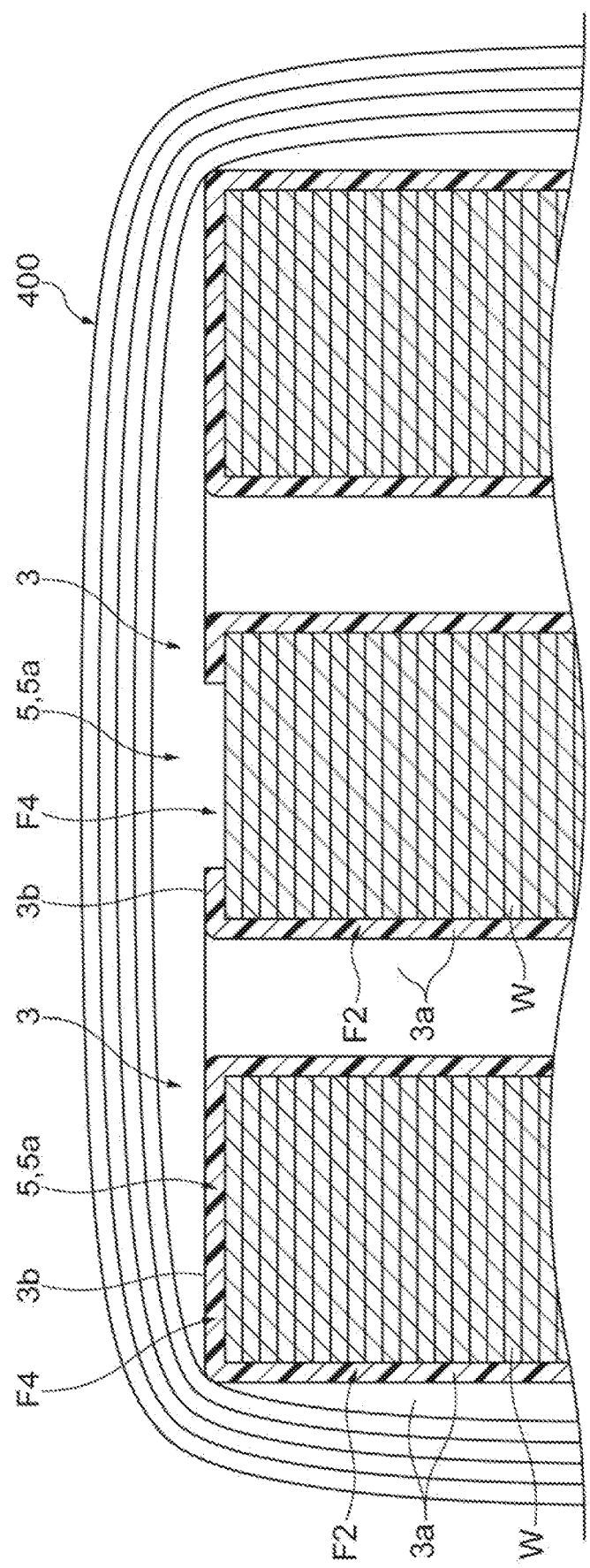
FIG. 34 is a cross-sectional view along line XXXIV-XXXIV in FIG. 33.

13) As illustrated in FIG. 33 and FIG. 34, the end surface F4 of one tooth portion 5 and the end surface F3 of the corresponding yoke portion 4 may be partially covered with the end portion 3*b*, and the end surface F4 of another tooth portion 5 adjacent to the one tooth portion 5 in the circumferential direction and the end surface F3 of the corresponding yoke portion 4 may be entirely covered with the end portion 3*b*. In other words, the range of the end portion 3*b* provided on the end surface F4 of the tooth portion 5 adjacent in the circumferential direction may vary. As illustrated in FIG. 34, when a winding coil 400 is wound around, for example, a set of three tooth portions 5 (in the case of distributed winding), the winding coil 400 has an oval shape as whole, and therefore the distance between the tooth portion 5 positioned at the middle and the winding coil 400 tends to increase. In this configuration, formation of the end portion 3*b* can be eliminated in a region where the winding coil 400 hardly abuts on the end surface F4 of the tooth portion 5 positioned at the middle. Accordingly, the amount of resin used can be reduced. Similarly, when the winding coil 400 is wound around a set of two tooth portions 5 or when the winding coil 400 is wound around a set of four or more tooth portions 5, formation of the end portion 3*b* may be eliminated in a region of the end surface F4 of the tooth portion 5 where the winding coil 400 hardly abuts.

14) When the end portion 3*b* of the resin portion 3 is formed on the end surface F3 of the yoke portion 4 or the end surface F4 of the tooth portion 5, a hole extending in the stacking direction may be formed in advance in the end surface F3 or F4, and this hole may also be filled with melted resin. In this case, the adherence of the resin portion 3 (end portion 3*b*) to the stack 2 can be increased by the anchor effect. The tip end of the hole may expand in a direction crossing the extending direction of the hole such that the hole is, for example, T-shaped in cross section.

15) Melted resin is charged into the filling space V1 while catching the air present in the filling space V1. As illustrated in FIG. 2 to FIG. 5, FIG. 22, FIG. 23(*b*), FIG. 24, FIG. 25, and FIG. 27 to FIG. 34, when a region (non-covered region R2) with no end portion 3*b* exists on the end surface F3 of the yoke portion 4 or the end surface F4 of the tooth portion 5, that is, when the plate 240 partially abuts on the end surfaces F3 and F4 of the stack 2, the air caught by melted resin can be easily evacuated from the gap between the end surfaces F3 and F4 and the plate 240. Since the gap is usually sufficiently smaller than the particle size of the resin filler included in melted resin, melted resin does not leak from the gap.

16) Since the blanked member W is formed by presswork, for example, burr or shear droop occurs at the tooth portion 5, and the tooth portion 5 is not always flat. Therefore, when melted resin is charged into the filling space V1, the tooth portions 5 may be pressed appropriately in order to suppress intrusion of melted resin between the tooth portions 5. Specifically, the plate 240 may partially abut on the end surface F4 of the tooth portion 5. For example, a region where the end surface F4 of the tooth portion 5 and the plate 240 abut on each other may be set such that the distance G (see FIG. 4) from the end portion 3b adjacent in the circumferential direction in one tooth portion 5 is at least approximately one-fourth of the thickness of the electrical steel sheet ES.

17) As illustrated in FIGS. 35(a) and 35(b), a through hole 260d (channel) may be provided in the mold core member 260 to pass through in the longitudinal direction thereof. In this case, a cooling medium is circulated in the through hole 260d after charging melted resin into the filling space V1, whereby the volume of the mold core member 260 is shrunken to facilitate removal of the mold core member 260 from the slot 7 of the stack 2. This configuration reduces the time required for removing the mold core member 260 from the slot 7 of the stack 2 and thus can improve productivity of stacked stator cores 1. A channel through which a cooling medium can circulate in the mold core member 260 may be formed instead of the through hole 260d. That is, the entrance and the exit of the channel may be disposed at any position in the mold core member 260. In order to increase the heat exchange efficiency, the through hole 260d may have a variety of shapes such as curved, spiral, and serpentine shapes, rather than a linear shape. The cooling medium may be liquid or gas. Examples of the liquid include water and oil. Examples of the gas include air and coolant gas (fluorocarbon-based, non-fluorocarbon-based).

18) As illustrated in FIG. 35(b), a portion 261 of the mold core member 260 that surrounds the through hole 260d (channel) may be formed of a material different from a portion 262 outside the portion 261. For example, the thermal conductivity of the portion 261 may be higher than the thermal conductivity of the stack 2 and the portion 262. Alternatively, the thermal conductivity of the entire mold core member 260 may be higher than the thermal conductivity of the stack 2. In these cases, the shrinkage of the mold core member 260 is accelerated, so that the mold core member 260 can be removed from the slot 7 of the stack 2 even more easily.

Figure 36:
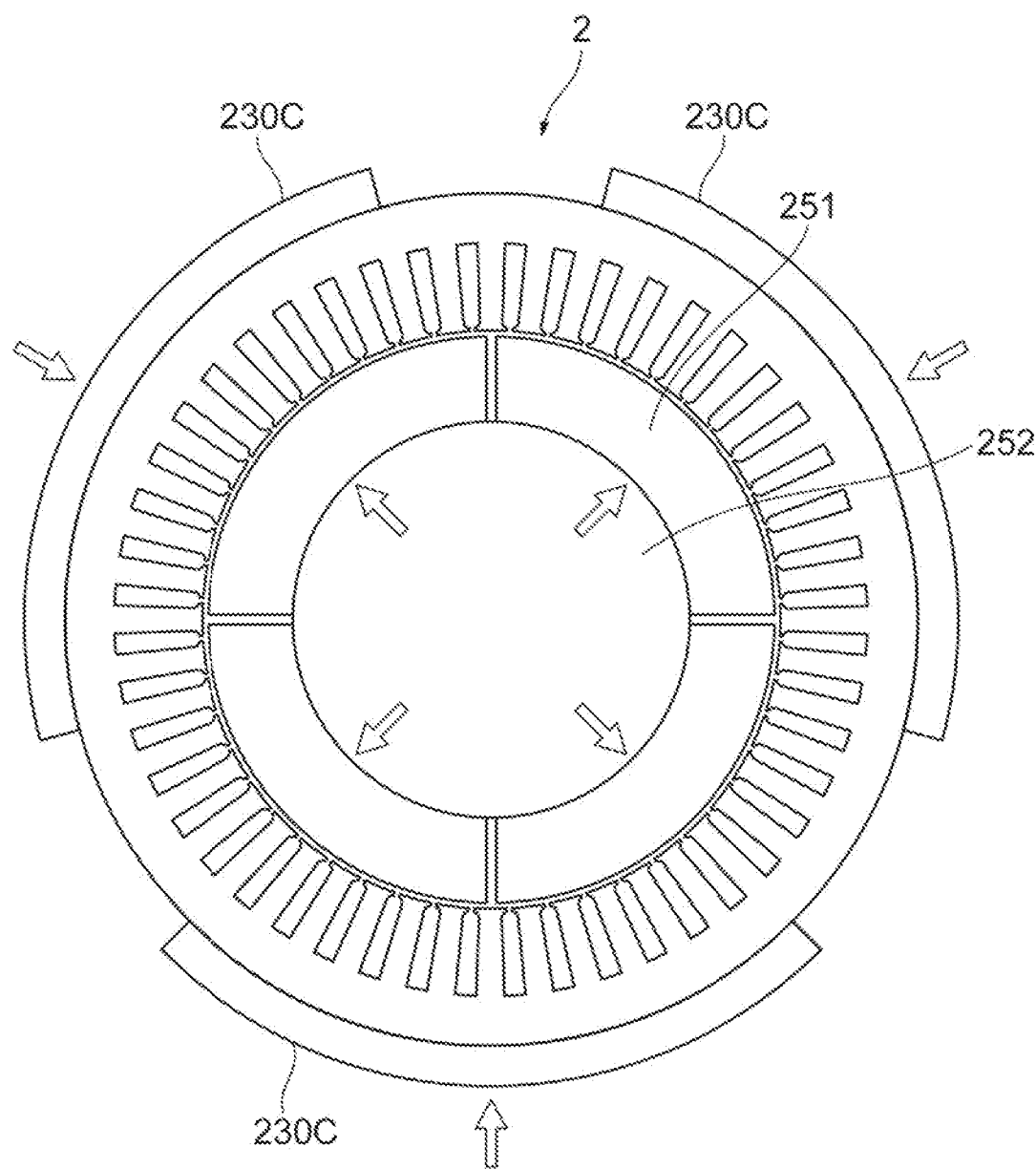
FIG. 36 is a top view for explaining a positioning plate used in another example method of manufacturing a stacked stator core.

19) As illustrated in FIG. 36, the stack 2 may be positioned using positioning members 230C having a shape conforming to the outer peripheral surface of the stack 2. As illustrated in the figure, the positioning members 230C may apply radially inward force to the outer peripheral surface of the stack 2. In this case, the stack 2 is pushed not only by the diameter-increasing members 251 but also by the positioning members 230C from the inside and the outside of the stack 2. In this configuration, since the shape of the stack 2 is kept by force acting from the inside and the outside of the stack 2, deformation of the stack 2 by heat of melted resin can be further suppressed.

Figure 37:
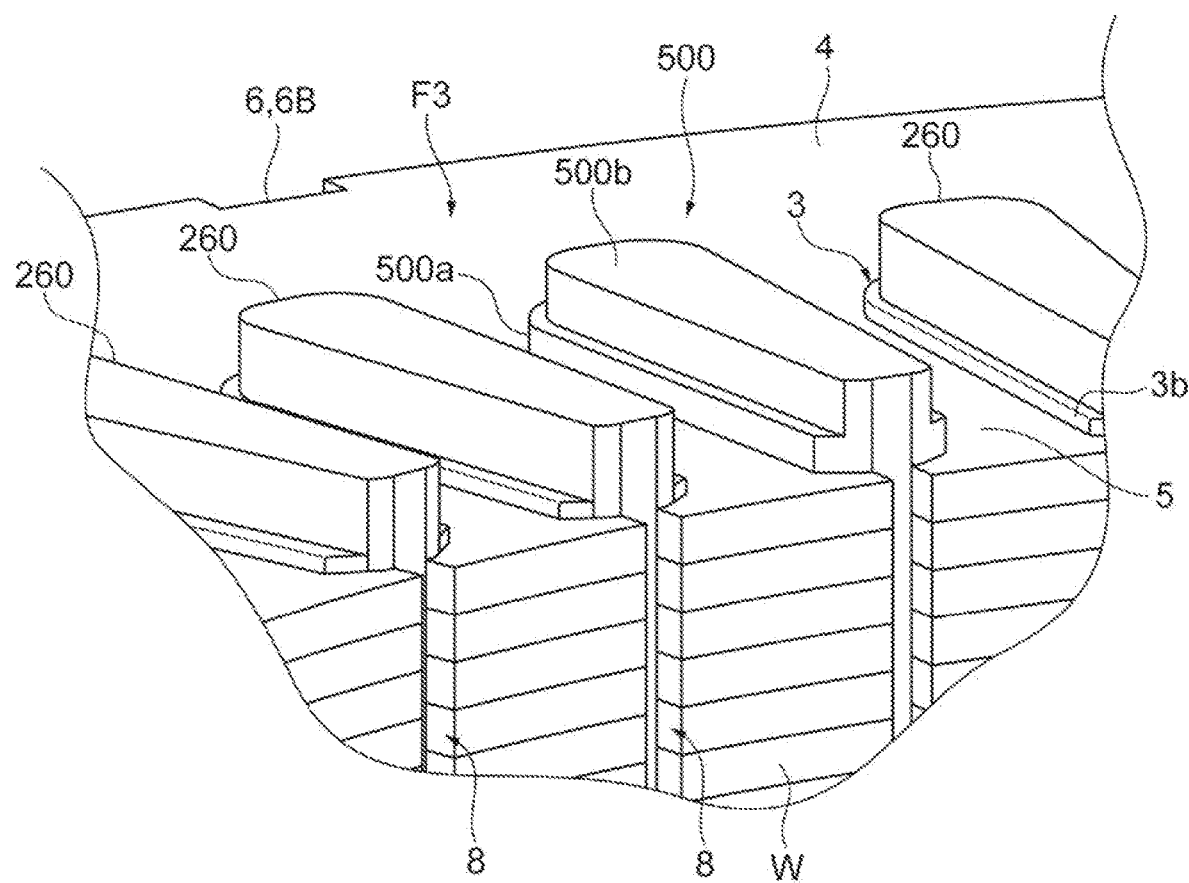
FIG. 37 is a diagram for explaining another example method of manufacturing a stacked stator core, specifically, a partially enlarged perspective view of the vicinity of tooth portions.

20) In the foregoing examples, melted resin is charged into the filling space V1 after the mold core members 260 are inserted into all of the slots 7. However, as illustrated in FIG. 37, the positioning may be performed in the slots 7 of the stack 2. Specifically, melted resin may be charged into the filling space V1 between the slot 7 and the mold core member 260 in a state in which the positioning members 500 are inserted into at least two slots 7 instead of the mold core members 260 while the mold core members 260 are inserted in the remaining slots 7. In this configuration, as illustrated in FIG. 37, while the resin portion 3 is formed between the slot 7 and the mold core member 260, the resin portion 3 is not formed between the slot 7 and the positioning member 500.

The positioning member 500 includes a body 500a and end portions 500b. The body 500a has a shape corresponding to the slot 7. The end portions 500b have a shape similar to the mold core member 260. In this configuration, almost no gap is produced between the slot 7 and the body 500a when the positioning member 500 is inserted into the slot 7. The end portion 500b on the lower side is inserted into the insertion hole 214 of the lower die 210. The end portion 500b on the upper side is inserted through the through hole 274 of the plate 270 and the through hole 284 of the plate 280.

Figure 38:
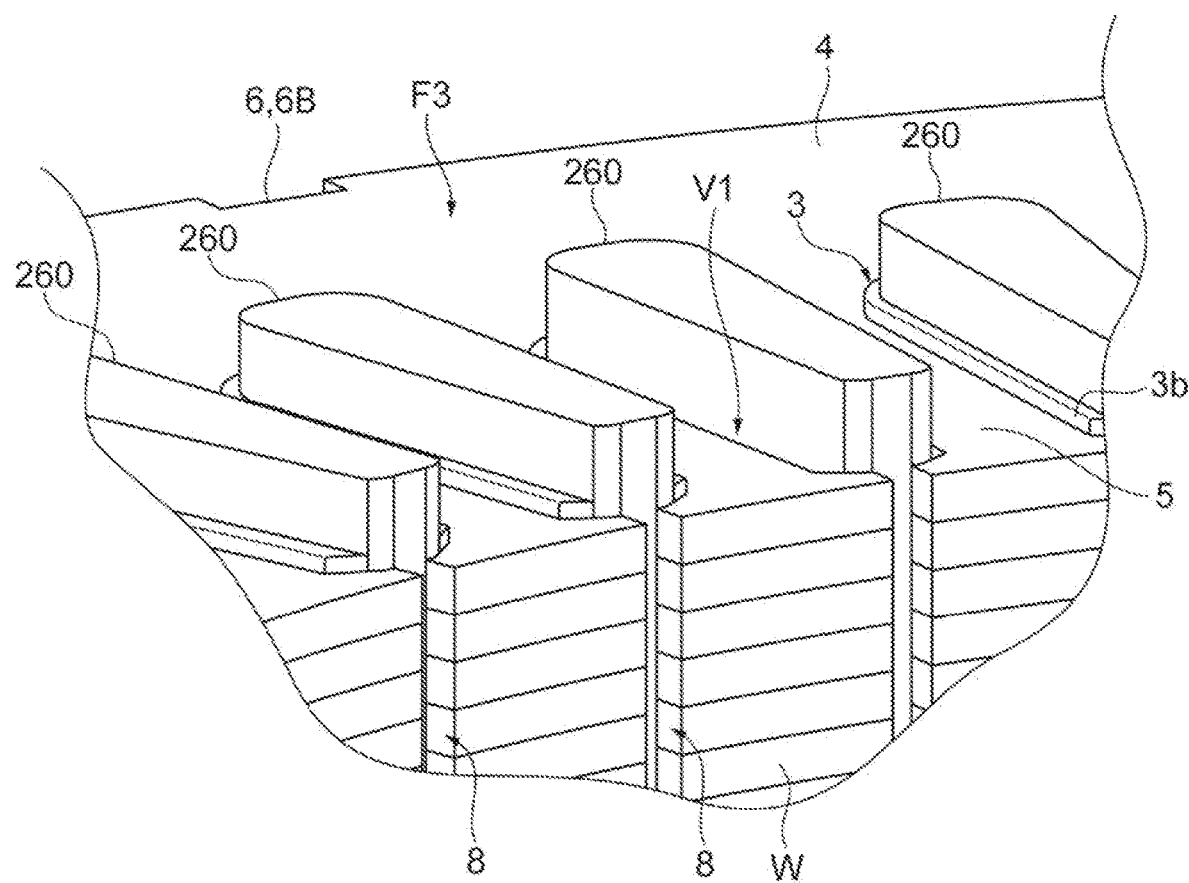
FIG. 38 is a diagram for explaining another example method of manufacturing a stacked stator core, specifically, a partially enlarged perspective view of the vicinity of tooth portions.

Subsequently, as illustrated in FIG. 38, the positioning members 500 are removed from the slots 7 and the mold core members 260 are inserted therein. Subsequently, melted resin is charged into the filling space V1 between the slot 7 and the mold core member 260. The resin portion 3 is thus formed in the slot 7 in which the positioning member 500 has been inserted.

When the stack 2 is positioned by inserting the positioning members 500 in the slots 7 in this way, the accuracy of positioning the stack 2 is extremely high. In this configuration, melted resin is charged into the filling space V1 in a state in which the shape of the stack 2 is kept by the positioning members 500. Accordingly, deformation of the stack 2 by heat of melted resin is suppressed. As a result, the stacked stator core 1 is produced in a desired shape as designed and, therefore, the motor formed with the stacked stator core 1 can achieve improved performance.

21) The thermal expansion coefficient of the positioning member 500 may be higher than the thermal expansion coefficient of the stack 2. Specifically, the thermal expansion coefficient of the positioning member 500 and the size of the body 500a may be set to such values that the body 500a substantially matches the slot 7 at the temperature at the time of charging melted resin. Melted resin may be charged into the filling space V1 in the same resin filling device 200 before and after removal of the positioning members 500 from the slots 7. Alternatively, melted resin may be charged into the filling space V1 in a state in which the stack 2 is loaded to a different resin filling device 200 after removal of the positioning members 500 from the slots 7. The shape of the positioning member 500 is not limited to the one described above. More specifically, the positioning member 500 has a portion corresponding to the shape of the slot 7.

Figure 39:
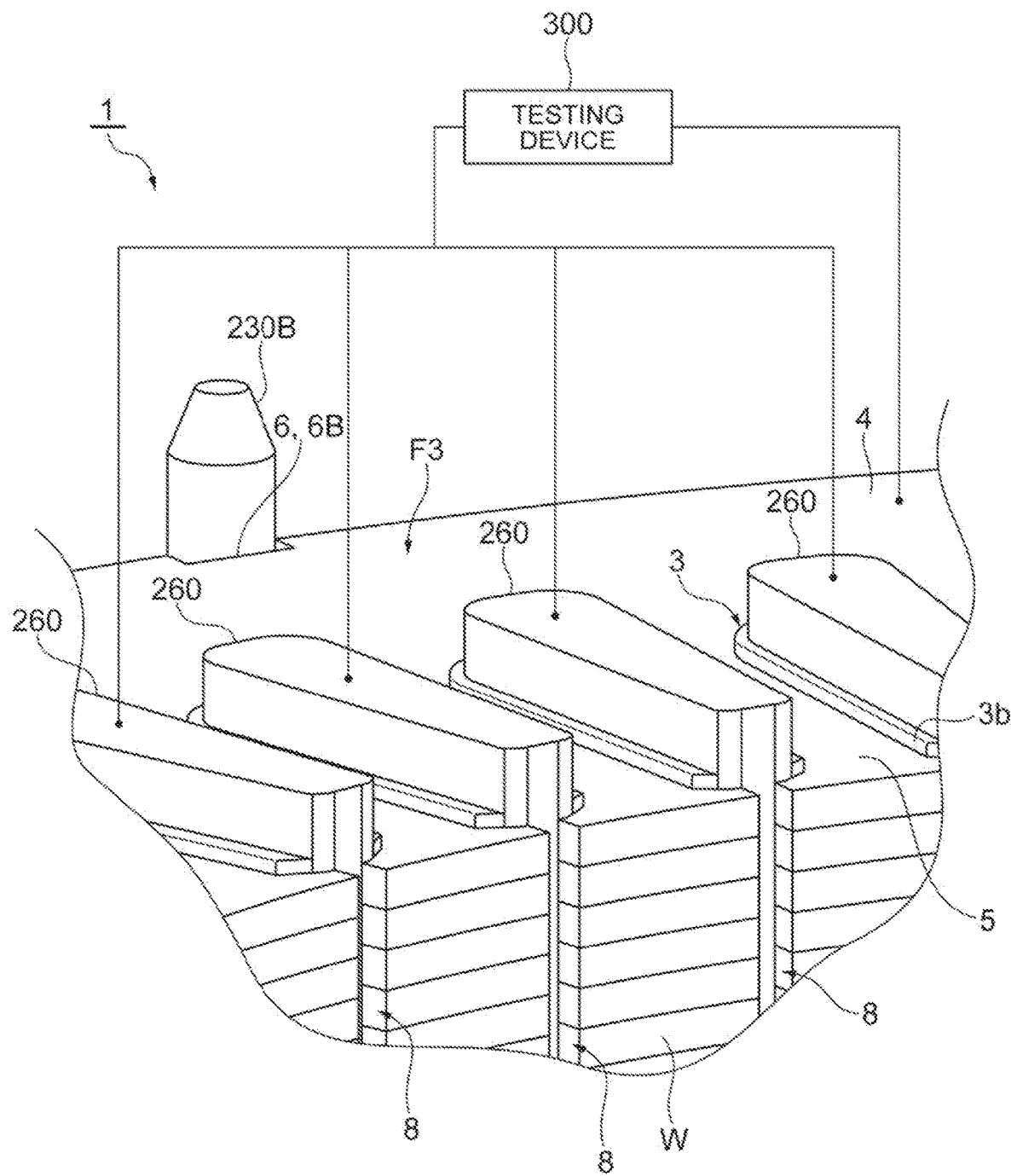
FIG. 39 is a diagram for explaining insulation testing using mold core members, specifically, a partially enlarged perspective view of the vicinity of tooth portions.

22) As illustrated in FIG. 39, after the resin portions 3 are formed in the stack 2 and before the resultant stacked stator core 1 is removed from the resin filling device 200, the insulation of the resin portions 3 may be tested. Specifically, voltage may be applied between each mold core member 260 and the stack 2 in a state in which one of a power supply (not illustrated) of a testing device 300 is connected to each mold core member 260 and the other of the power supply is connected to the stack 2. In this case, the mold core member 260 not only has the function of forming the filling space V1 between the mold core member 260 and the stack 2 but also functions as an element for insulation testing. This eliminates the operation of removing the mold core and inserting another testing member into the slot 7 for insulation testing. The insulation testing thus can be performed efficiently. The insulation of the resin portions 3 may be tested by temporarily removing the mold core member 260, inserting another testing member into the slot 7, and applying voltage between the testing member and the stack 2.

23) In the foregoing examples, three through holes 275, 285 are communicatively connected with one filling space V1. However, at least one through hole 275, 285 may be communicatively connected with one filling space V1.

24) In the foregoing examples, melted resin from the through hole 292 is split at the depressed groove 286 and supplied to a plurality of through holes 285. However, such a depressed groove 286 does not necessarily exist, and one through hole 292 for accommodating the resin pellet P and one filling space V1 may be connected one-to-one through one resin channel.

25) At least the outer peripheral surface of the diameter-increasing member 251 may be formed of an elastic material. In this case, when the outer peripheral surface of the diameter-increasing member 251 abuts on the inner peripheral surface of the stack 2, the outer peripheral surface of the diameter-increasing member 251 is elastically deformed. In this configuration, even when a plurality of stacks 2 vary in size, the variation in size of the stacks 2 can be absorbed by the diameter-increasing members 251. The outer peripheral surface of the diameter-increasing member 251 is easily in intimate contact with the inner peripheral surface of the stack 2. With this-configuration, leakage of melted resin to the outside of the opening 8 (into the through hole 2a of the stack 2) can be further suppressed. Examples of the elastic material include fluoropolymers, silicone resins, and urethane resins.

26) The surface of the mold core member 260 may be subjected to mold-release treatment. In this case, the mold core member 260 is easily removed from the slot 7 after melted resin is charged into the filling space V1 and solidified. As the mold-release treatment, a coating film at least containing fluorocarbon polymer may be formed on the surface of the mold core member 260. The coating film may be, for example, an electroless nickel-plating film containing fluorocarbon polymer. Alternatively, as the mold-release treatment, the surface of the mold core member 260 may be hard chrome plated, or a mold release agent (for example, wax) may be applied (for example, sprayed) to the surface of the mold core member 260.

Figure 40:
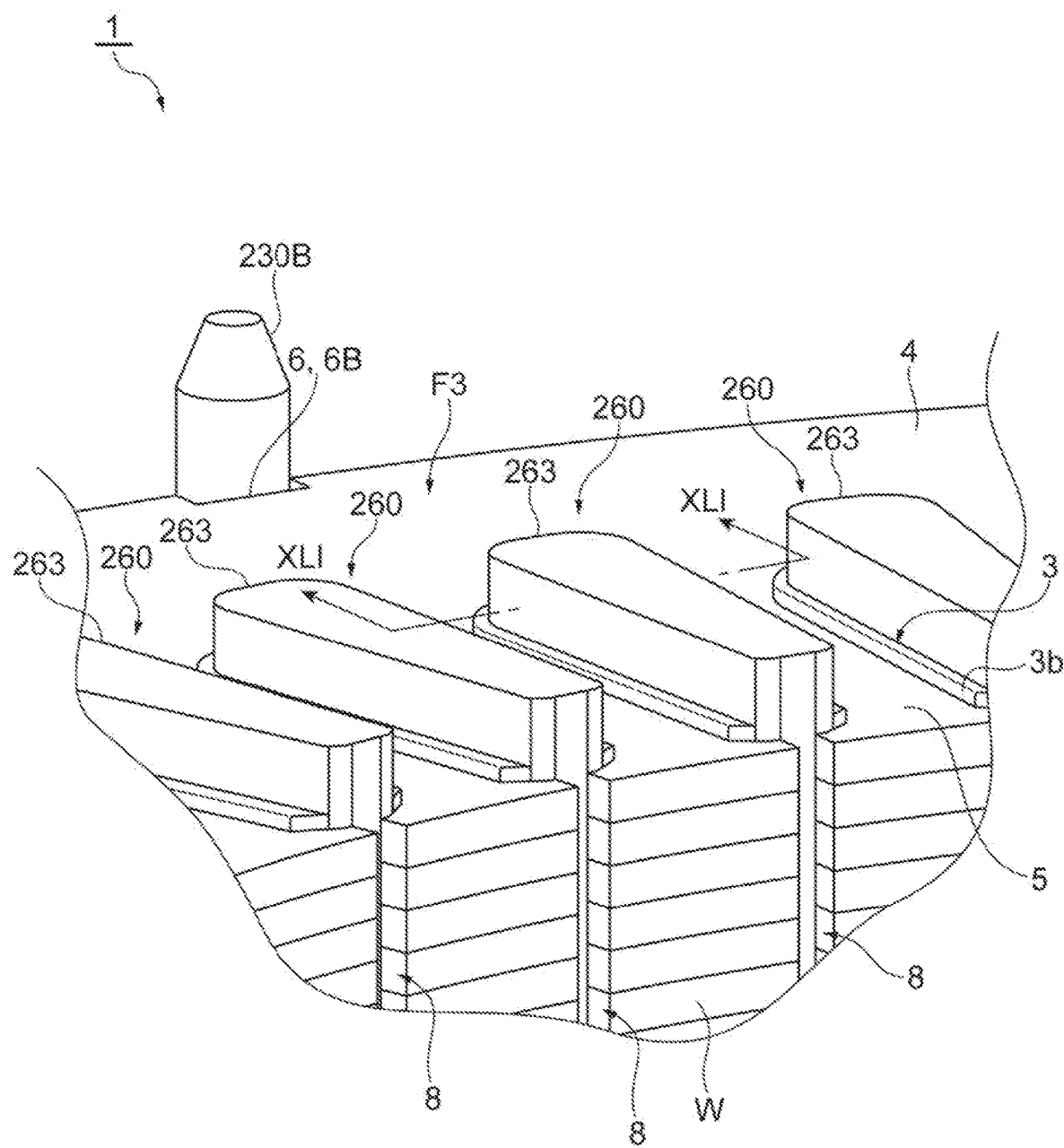
FIG. 40 is a partially enlarged perspective view illustrating a state in which mold core members are inserted in slots, in another example method of manufacturing a stacked stator core.
Figure 41:
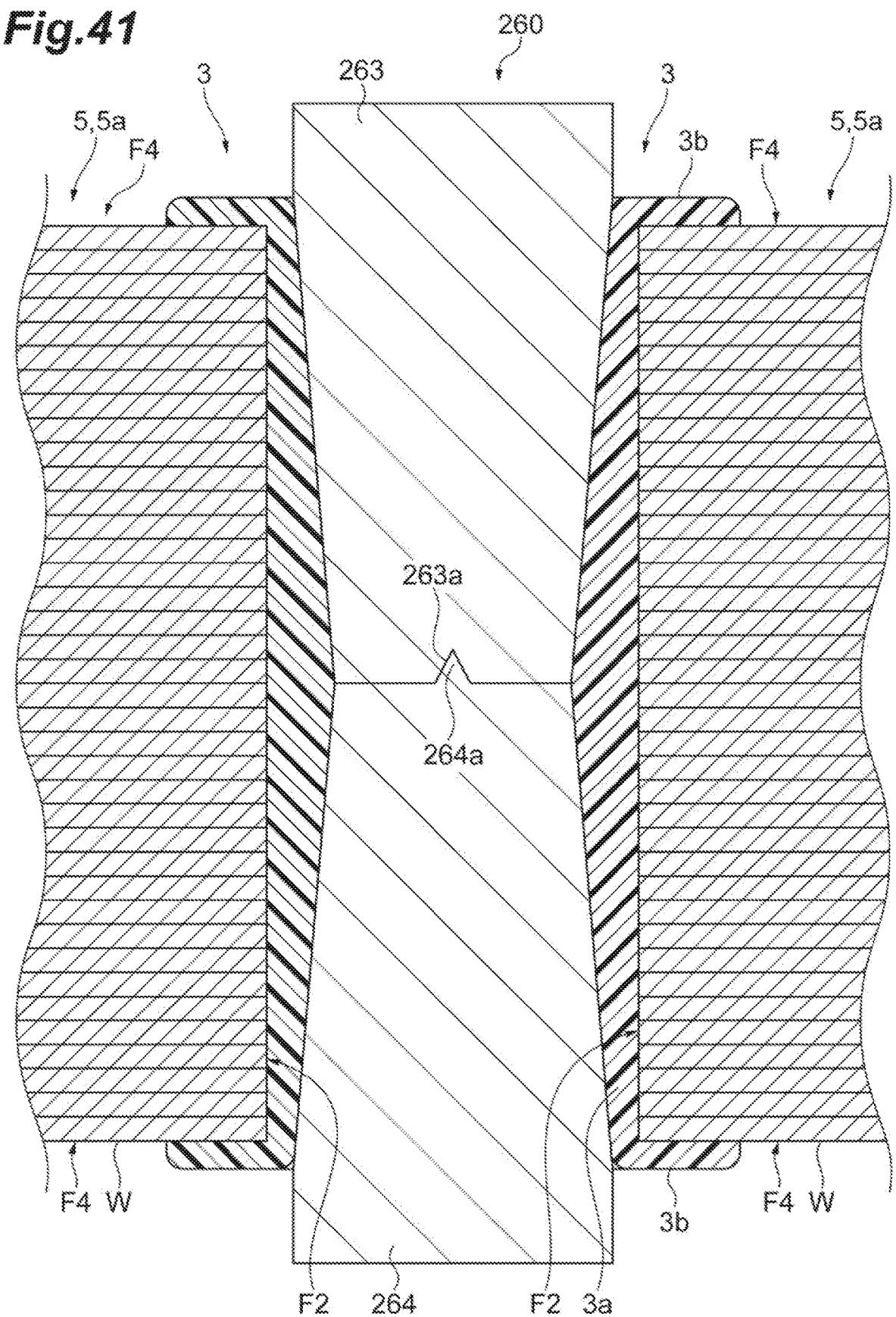
FIG. 41 is a cross-sectional view along line XLI-XLI in FIG. 40.

27) The mold core member 260 may be divided into multiple pieces in the crossing direction crossing the extending direction thereof (the crossing plane crossing the extending direction). For example, as illustrated in FIG. 40 and FIG. 41, the mold core member 260 may have two separate pieces 263 and 264 divided at the crossing plane in the vicinity of the center in the extending direction. As illustrated in FIG. 41, the separate piece 263 has a tapered shape with the cross section decreasing toward the separate piece 264. The separate piece 264 has a tapered shape with the cross section decreasing toward the separate piece 263. In this case, in a state in which the resin 3 is formed around the mold core member 260, the separate piece 263 is easily pulled out upward and the separate piece 264 is easily pulled out downward. The end surface on the diameter-reduced side of the separate piece 263 may have a depression 263a, and the end surface on the diameter-reduced side of the separate piece 264 may have a projection 264a. In this case, when the separate pieces 263 and 264 are combined, the depression 263a and the projection 264a are engaged with each other, and the end portions on the diameter-reduced side of the separate pieces 263 and 264 are connected to each other to suppress displacement from each other.

Figure 42:
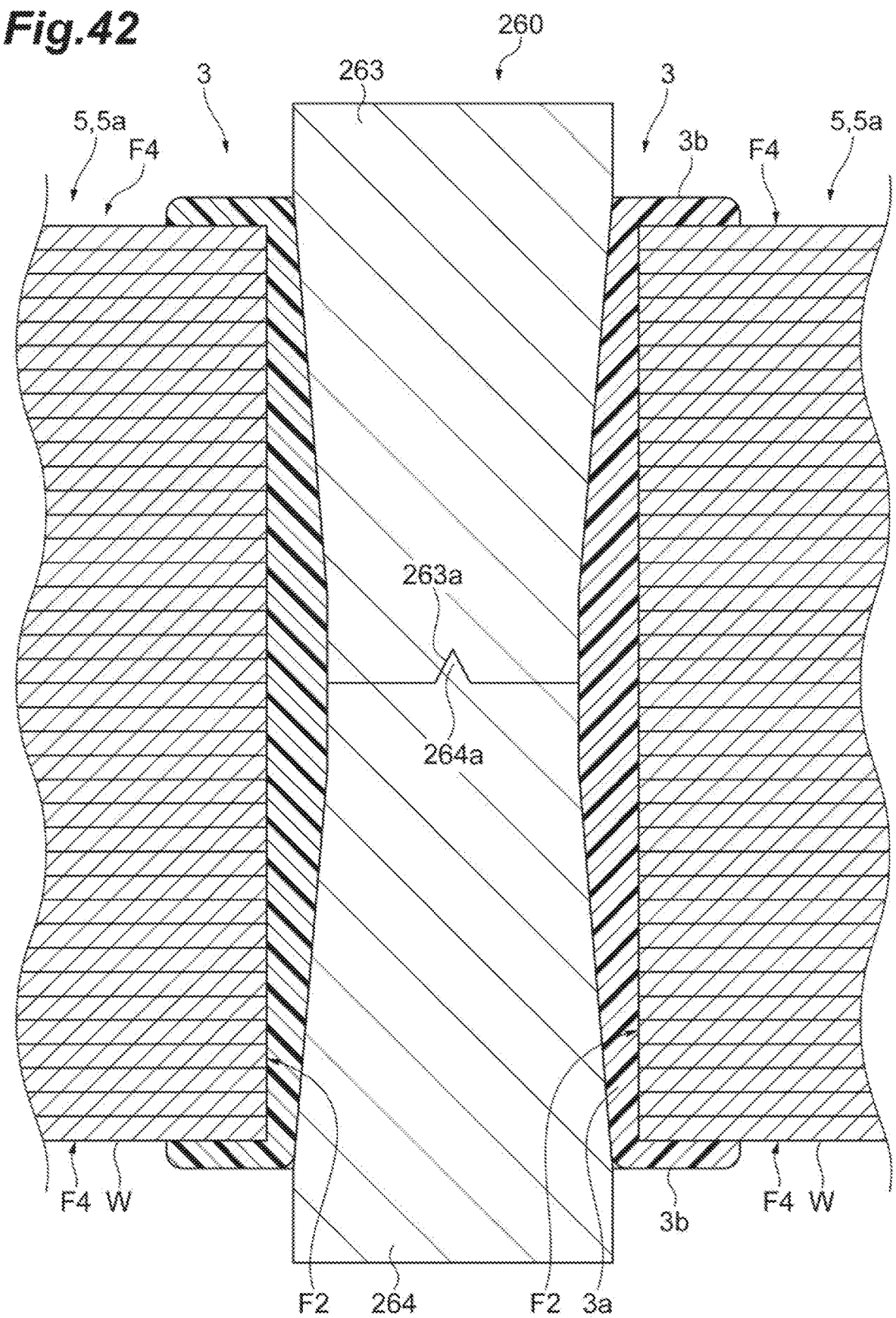
FIG. 42 is a cross-sectional view of the tooth portion cut in the same manner as in FIG. 41, in another example method of manufacturing a stacked stator core.
Figure 43:
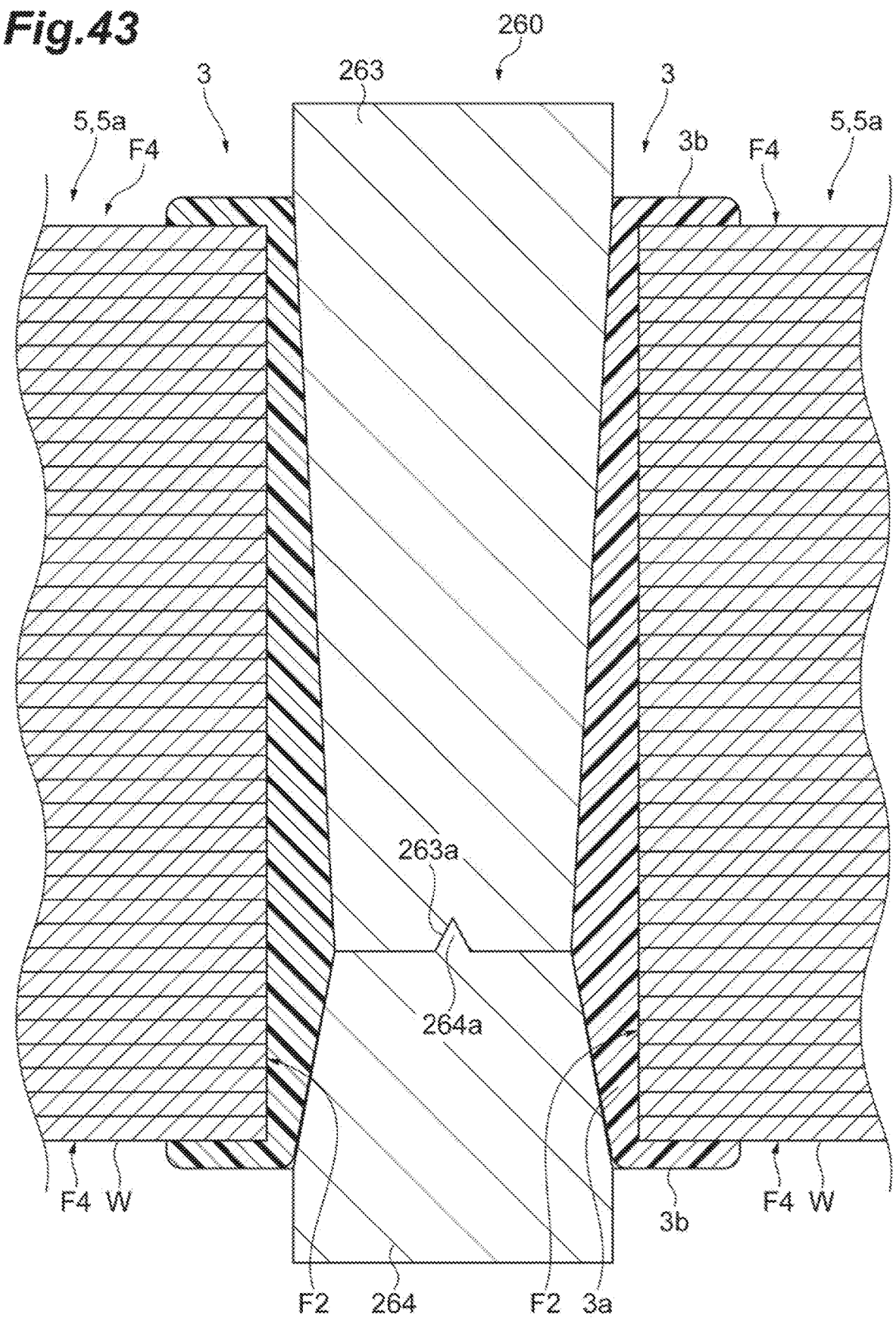
FIG. 43 is a cross-sectional view of the tooth portion cut in the same manner as in FIG. 41, in another example method of manufacturing a stacked stator core e.

As illustrated in FIG. 42, a part of the end portion on the diameter-reduced side of the separate piece 263, 264 may have a constant cross-sectional area. As illustrated in FIG. 43, the mold core member 260 may be divided into two, near one end surface of the stack 2 in the extending direction of the mold core member 260.

Figure 44:
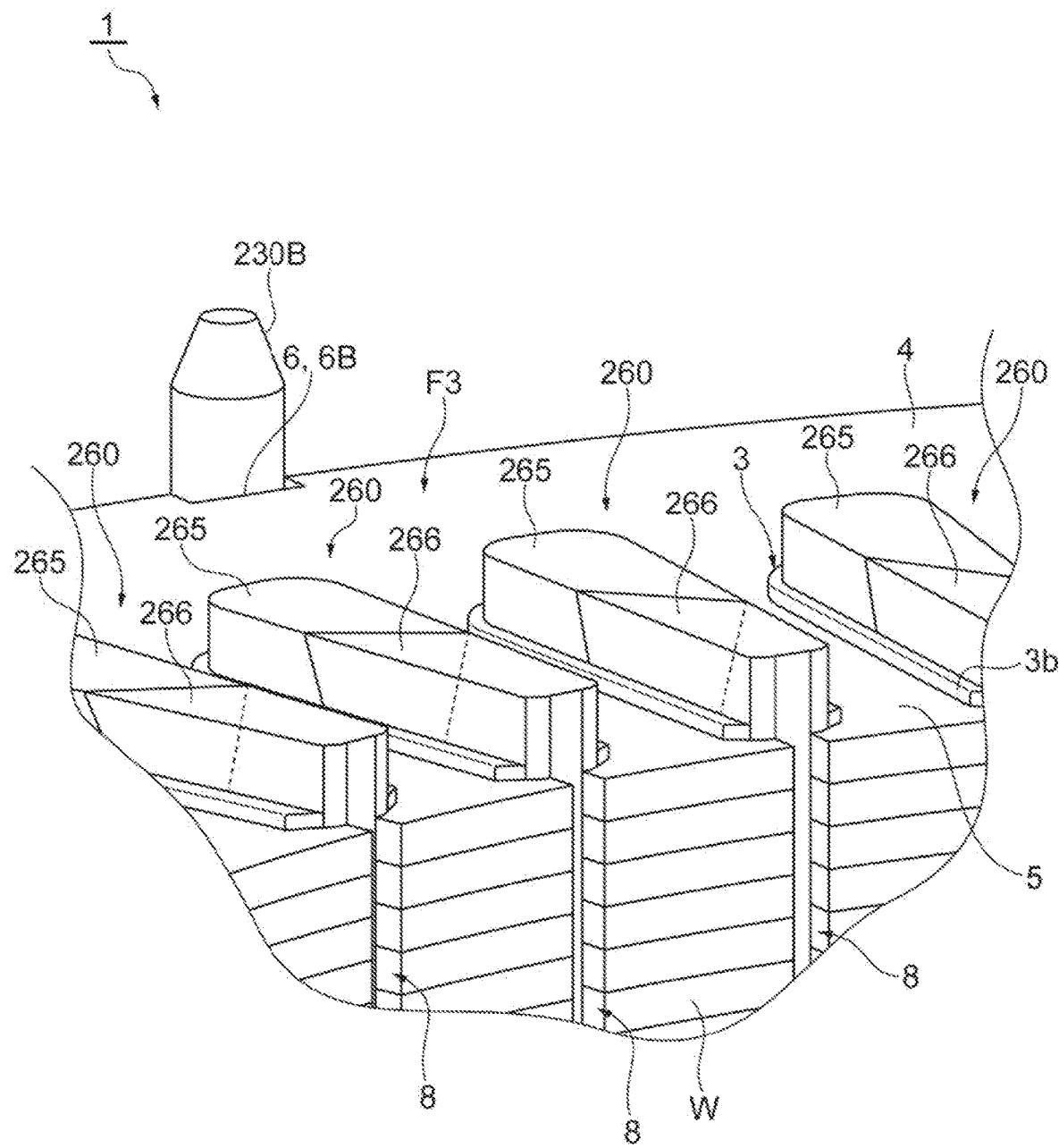
FIG. 44 is a partially enlarged perspective view illustrating a state in which mold core members are inserted in slots, in another example method of manufacturing a stacked stator core.
Figure 45:
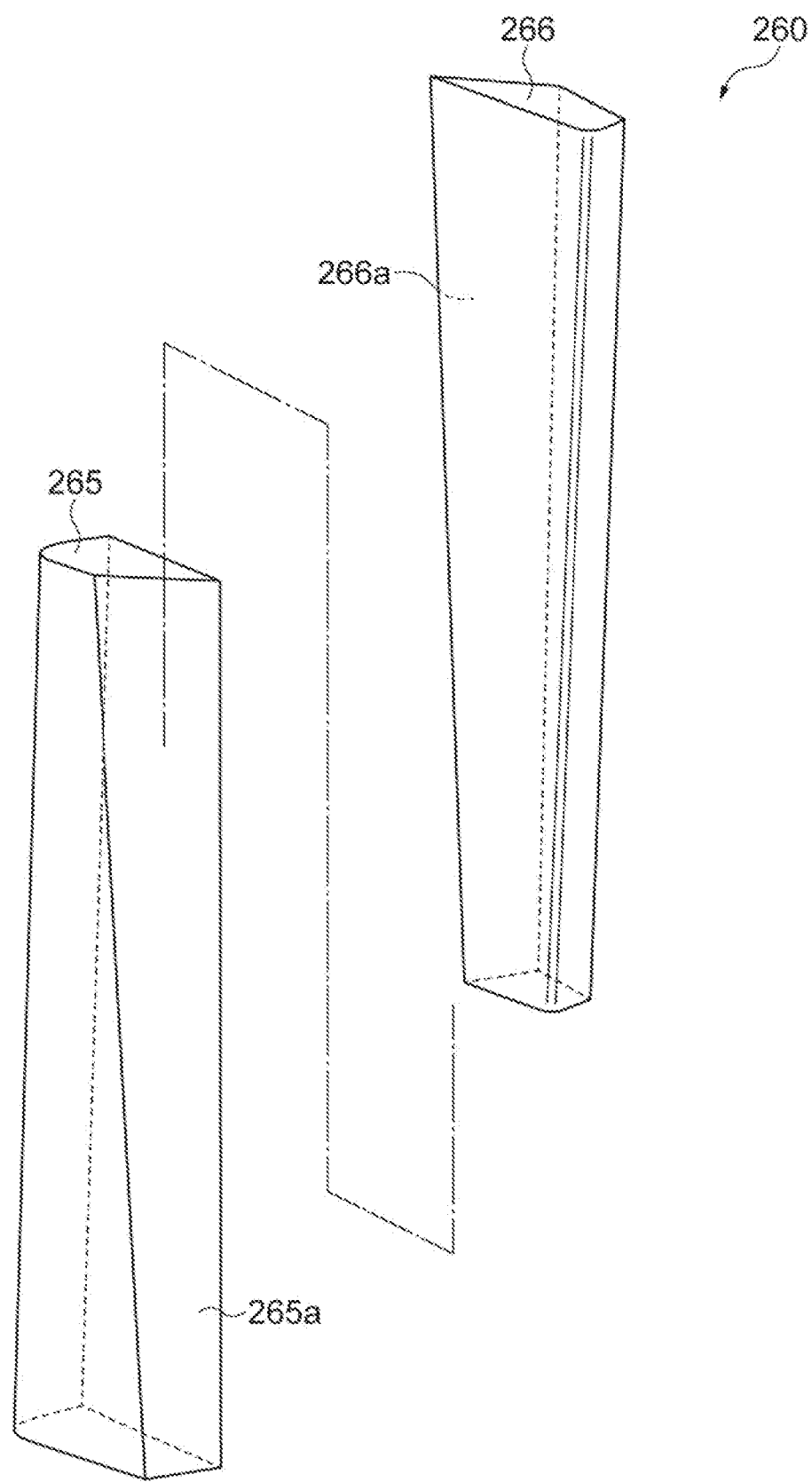
FIG. 45 is an exploded perspective view of a mold core member of in FIG. 44.

28) The mold core member 260 may be divided into multiple pieces in the extending direction thereof (the extending plane along the extending direction). For example, as illustrated in FIG. 44 and FIG. 45, the mold core member 260 may have two separate pieces 265 and 266 divided on the extending plane in the vicinity of the center in the width direction of the mold core member 260. As illustrated in FIG. 45, the separate piece 265 has a tapered shape with the cross section decreasing from the lower end side toward the upper end side. More specifically, an abutment surface 265a of the separate piece 265 that abuts on the separate piece 266 has a tapered surface. The separate piece 266 has a tapered surface with the cross section decreasing from the upper end side toward the lower end side. More specifically, an abutment surface 266a of the separate piece 266 that abuts on the separate piece 265 has a tapered surface. In this case, in a state in which the resin 3 is formed around the mold core member 260, the separate piece 265 is easily pulled out downward and the separate piece 266 is easily pulled out upward.

Figure 46:
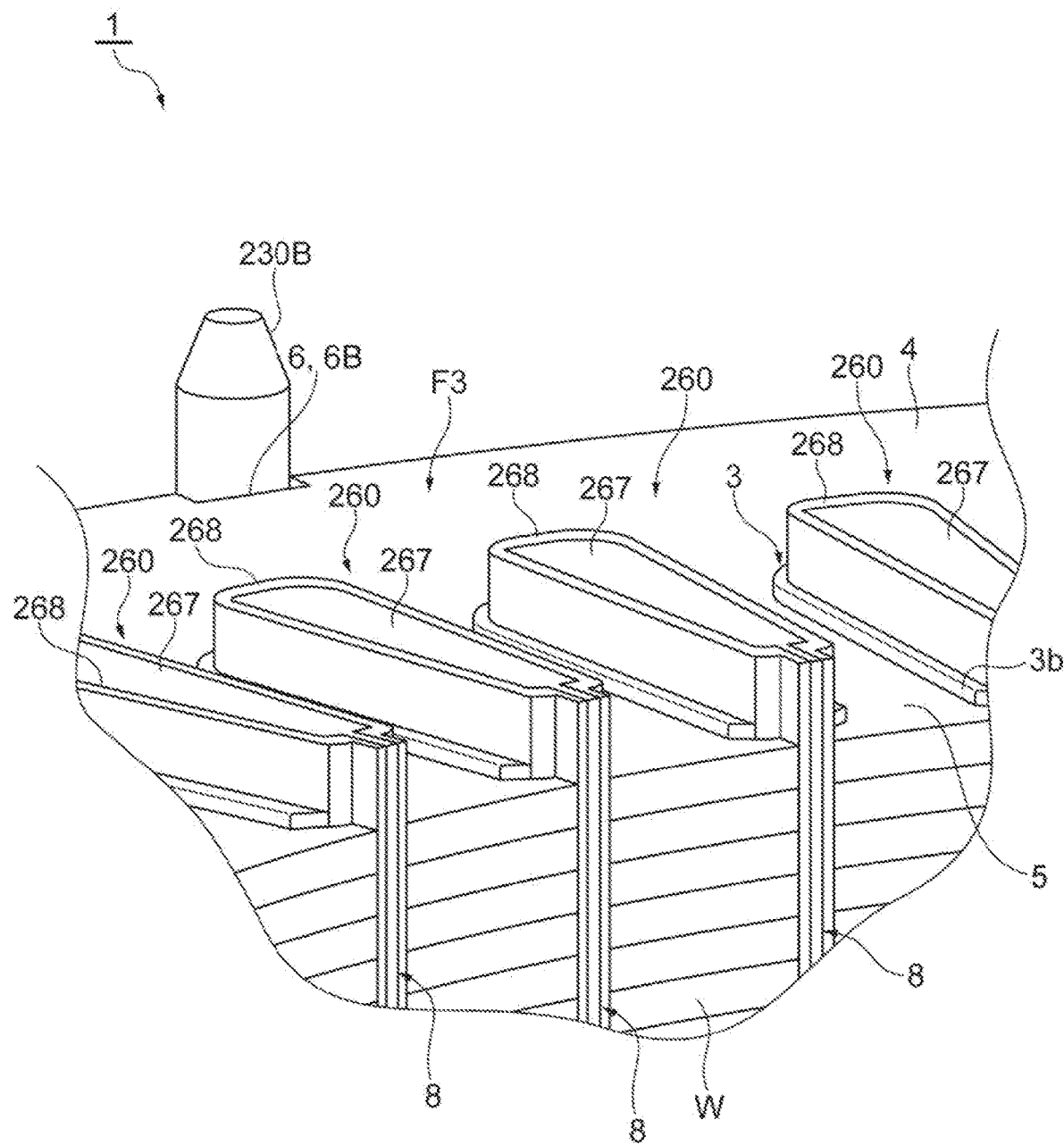
FIG. 46 is a partially enlarged perspective view illustrating a state in which mold core members are inserted in slots, in another example method of manufacturing a stacked stator core.
Figure 47:
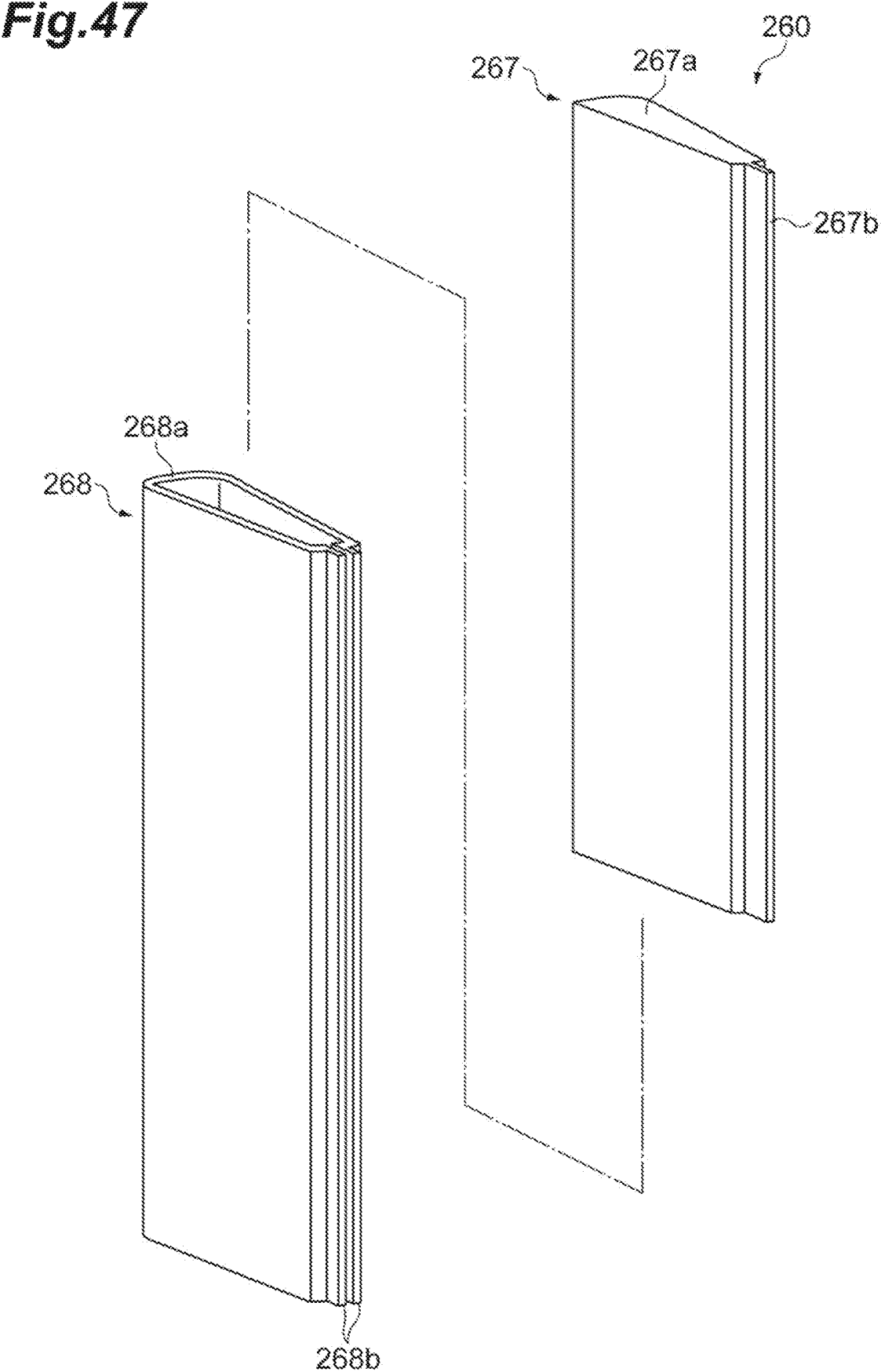
FIG. 47 is an exploded perspective view of a mold core member of FIG. 46.

29) The mold core member 260 may be divided into multiple pieces in the crossing direction crossing the extending direction thereof (the extending plane along the circumferential direction of the mold core member 260). For example, as illustrated in FIG. 46 and FIG. 47, the mold core member 260 may have two separate pieces 267 and 268 divided on the extending plane in the vicinity of the peripheral surface of the mold core member 260. The separate piece 267 is formed with a body 267a and a protrusion 267b protruding outward from the body 267a. The separate piece 268 is formed with a body 268a surrounding the peripheral surface of the body 267a and a pair of protrusions 268b covering the peripheral surface of the protrusion 277b and protruding outward from the body 268a. In this case, when the mold core member 260 is to be disposed in the slot 7, as illustrated in FIG. 46, the separate piece 268 is first disposed in the slot 7 such that a pair of protrusions 268b are positioned in the opening 8 and then the separate piece 267 is inserted into the separate piece 268. By doing so, a pair of protrusions 268b are pushed apart by the protrusion 267b, so that the opening 8 is securely closed by a pair of protrusions 268b. This configuration can more reliably suppress leakage of melted resin from the opening 8. In a state in which the resin portion 3 is formed around the mold core member 260, the separate piece 267 is first pulled out from the separate piece 268 and then the separate piece 268 is pulled out from the slot 7, whereby the mold core member 260 is easily removed from the slot 7.

30) The dividing methods of the mold core member 260 described in 27) to 29) above may be combined. More specifically, the mold core member 260 may be formed with a combination of a plurality of separate pieces divided in at least one of the extending direction of the mold core member 260 and a direction crossing the extending direction.

Figure 48:
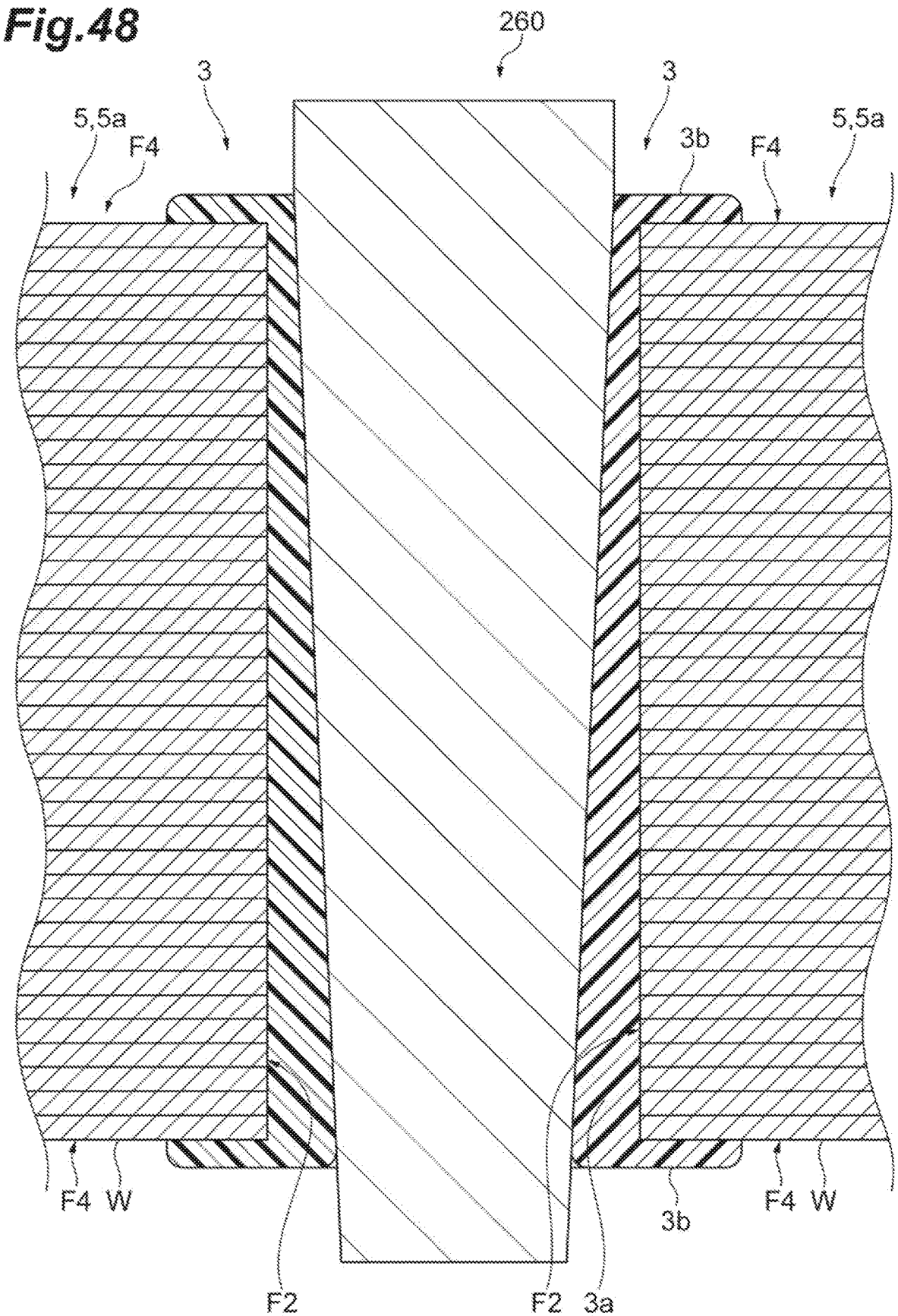
FIG. 48 is a cross-sectional view of the tooth portion cut in the same manner as in FIG. 41, in another example method of manufacturing a stacked stator core.

31) As illustrated in FIG. 48, the mold core member 260 may have a tapered shape with the cross section decreasing from the upper die 290 toward the lower die 210 in the stacking direction of the stack 2. Alternatively, although not illustrated, the mold core member 260 may have a tapered shape with the cross section decreasing from the lower die 210 toward the upper die 290 in the stacking direction of the stack 2. All of the side surfaces of the mold core member 260 may be inclined relative to the stacking direction, or at least one of the side surfaces of the mold core member 260 may be inclined relative to the stacking direction. In this case, the mold core member 260 is easily removed from the slot 7.

Figure 49:
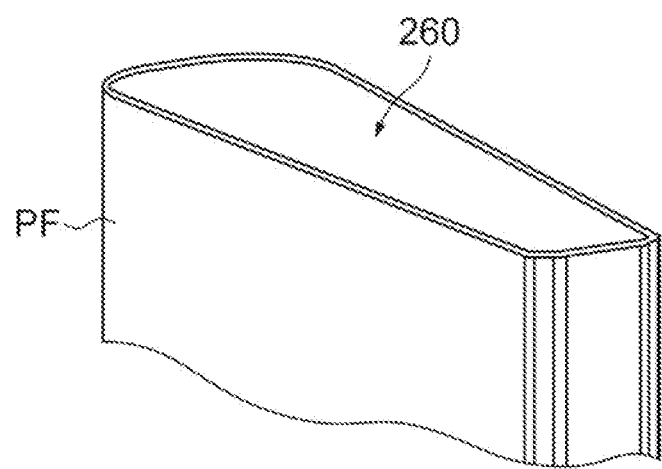
FIG. 49 is a perspective view illustrating the vicinity of the upper end of the mold core member used in another example method of manufacturing a stacked stator core.

32) As illustrated in FIG. 49, a protective film PF may be provided around the mold core member 260. The protective film PF around the mold core member 260 may be provided, for example, by disposing a heat-shrinkable film, tape, or the like around the mold core member 260 and then heating. An example of the material of the protective film PF is silicone. In this case, since the mold releasability of the protective film PF is high compared with the mold core member 260, the mold core member 260 is easily pulled out in a state in which the resin portion 3 is formed around the mold core member 260. The presence of the protective film PF can suppress wear of the mold core member 260 itself.

33) The mold core member 260 may be formed of a material capable of retaining its shape to some extent and having high heat resistance and elasticity. In this case, melted resin may be charged into the filling space V1 in a state in which the mold core member 260 is disposed in the slot 7, and then gas (for example, air, inert gas) is charged into the mold core member 260 to keep the shape of the mold core member 260. After forming the resin portion 3, the gas is evacuated from the mold core member 260, whereby the mold core member 260 is easily pulled out from the slot 7.

34) The thermal expansion coefficient of the mold core member 260 may be higher than the thermal expansion coefficient of the stack 2. In this case, when melted resin is charged into the filling space V1, the mold core member 260 and the stack 2 are heated, and the mold core member 260 expands more than the stack 2. With this configuration, the open end portion 5b is securely closed by the closing portion 260b of the expanded mold core member 260. Leakage of melted resin to the outside of the opening 8 thus can be further suppressed. In this case, after melted resin is charged into the filling space V1, the mold core member 260 is cooled to room temperature, whereby the mold core member 260 shrinks relatively to a larger degree than the stack 2. In this configuration, the mold core member 260 is easily removed from the slot 7 after the resin portion 3 is formed.

35) In the foregoing examples, since the blanked member W that constitutes the stack 2 is formed of an electrical steel sheet ES, the thermal expansion coefficient of the mold core member 260 may be higher than the thermal expansion coefficient (10 [10/K]) of the electrical steel sheet ES. Specifically, the mold core member 260 may be formed of, for example, stainless steel, aluminum, copper alloy, or aluminum alloy (for example, Al—Cu, Al—Zn—Mg). For example, SUS303 may be used as the stainless steel. The thermal expansion coefficient (linear expansivity) of SUS303 is approximately 17.3 [$10^{-6}$/K]. The thermal expansion coefficient (linear expansivity) of aluminum is approximately 23 [$10^{-6}$/K].

36) The thermal expansion coefficient of the lower die 210 and the lower plate 240 (here collectively referred to as lower holding plate) may be higher than the thermal expansion coefficient of the stack 2. Alternatively, the thermal expansion coefficient of the upper plate 240, the plates 270, 280, and the upper die 290 (here collectively referred to as the upper holding plate) may be higher than the thermal expansion coefficient of the stack 2. The thermal expansion coefficient of both of the lower holding plate and the upper holding plate may be higher than the thermal expansion coefficient of the stack 2. In these cases, when melted resin is charged into the filling space V1, the lower holding plate or the upper holding plate expands more than the stack 2. The stack 2 is therefore pressed by the lower holding plate and the upper holding plate in the stacking direction. Accordingly, leakage of melted resin charged in the filling space V1 from the gap between the lower holding plate or the upper holding plate and the stack 2 can be suppressed.

37) A surface of at least one member that forms the lower holding plate may be subjected to mold-release treatment, in the same manner as the mold core member 260. A surface of at least one member that forms the upper holding plate may be subjected to mold-release treatment, in the same manner as the mold core member 260.

38) The lower die 210 and the lower plate 240 serving as the lower holding plate may be separate as in some examples or may be integrated. Of the upper plate 240, the plates 270, 280, and the upper die 290 serving as the upper holding plate, at least two adjacent in the stacking direction may be separate as in some examples above or may be integrated.

39) In the foregoing examples, an insertion hole for receiving the mold core member 260 is not provided in the upper die 290. However, an insertion hole for receiving the mold core member 260 may be provided in the upper die 290. The shapes of the tooth portion 5 and the slot 7 vary according to the kind of the stacked stator core 1, and the shape of the mold core member 260 varies, accordingly. In the former case, there is no need for replacing the upper die 290 when the stacked stator core 1 of a different kind is manufactured.

40) Melted resin may contain filler. The filler may be anisotropic filler. As used in the present disclosure, "anisotropic filler" means filler having a size with different sizes of the long side and the short side, rather than shapes such as cube and sphere. Examples of the material of the filler include silicon dioxide, aluminum oxide, and aluminum-nitride. The particle size of the filler may be approximately 10 μm to 150 μm or may be approximately 20 μm to 70 μm. When the particle size of the filler is equal to or greater than 10 μm, the flowability of melted resin containing the filler tends to increase (the filling property of melted resin containing the filler in the filling space V1 and the auxiliary space V2 tends to increase). When the particle size of the filler is equal to or less than 150 μm, leakage of melted resin containing the filler from the gap tends to be suppressed. Here, the distance between the closing portion 260b of the mold core member 260 and the open end portion 5b of the tooth portion 5 may be equal to or less than 20 μm or may be equal to or less than 10 μm. In this case, leakage of melted resin containing the filler from the gap between the closing portion 260b and the open end portion 5b can be particularly suppressed.

41) In the foregoing examples, the mold core members 260 are attached to the lower die 210 after the stack 2 is mounted on the lower die 210. However, the stack 2 may be mounted on the lower die 210 after the mold core members 260 are attached to the lower die 210.

42) All of the mold core members 260 may be attached to the lower die 210 at a time, or the mold core members 260 may be attached to the lower die 210 one by one or in units of two or more.

43) The winding coil may be attached to the tooth portion 5 by a direct winding method in which a metal wire is fed from a nozzle and directly wound around the tooth portion 5 or by an inserter method in which the wound winding coil is inserted into the stack 2 in the stacking direction.

44) In the foregoing examples, a plurality of blanked members W are stacked to constitute the stack 2. However, the stack 2 may be configured such that a plurality of blocks (core members) are stacked. The block is, for example, formed by stacking and integrating a plurality of blanked members W.

Figure 50:
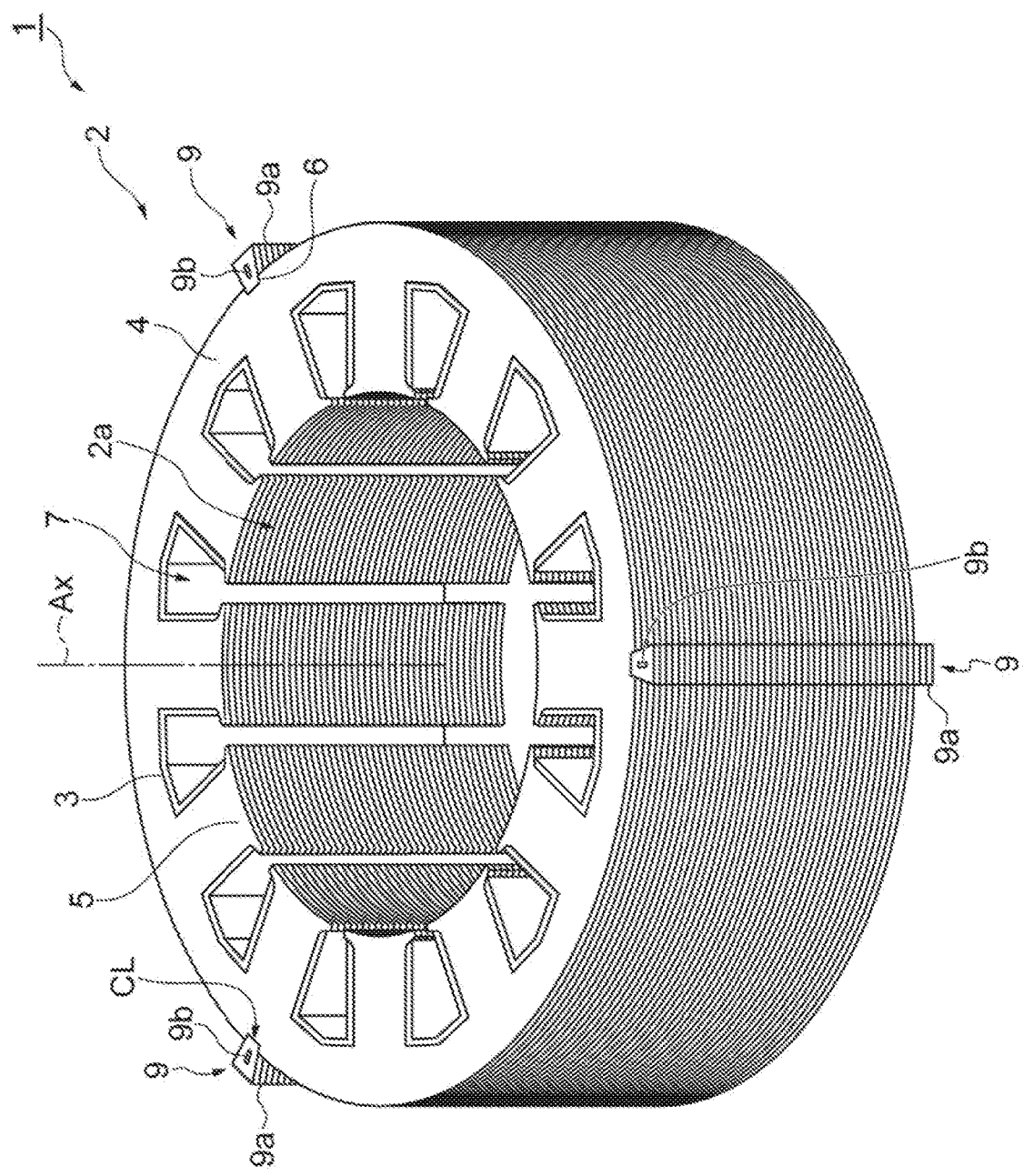
FIG. 50 is a perspective view illustrating another example stacked stator core.

45) The core members (the blanked members W or the blocks) may be joined to each other by connecting tabs, may be joined to each other by adhesive, or may be joined to each other by welding. Alternatively, as illustrated in FIG. 50, the core members may be joined to each other by temporarily-connecting tab parts 9. In this case, the temporarily-connecting tab parts 9 may be removed after the resin filling device 200 forms the resin portions 3 in the stack 2, or the temporarily-connecting tab part 9 may be removed before the resin filling device 200 forms the resin portions 3 in the stack 2.

Here, the temporarily-connecting tab part 9 is fitted in the depressed groove 6 of the stack 2. The temporarily-connecting tab part 9 is configured such that temporarily-connecting pieces 9a are stacked. The temporarily-connecting pieces 9a are pressed into the original core member along a predetermined cut line, for example, by pushing-back and temporarily fitted in the core member to such an extent not easily disengaged manually. The temporarily-connecting pieces 9a are fastened to each other by a temporarily-connecting tab 9b. Specifically, the temporarily-connecting tab 9b has a bend (not illustrated) formed in the temporarily-connecting piece 9a positioned on a layer other than the bottom layer of the temporarily-connecting tab part 9 and a through hole (not illustrated) formed in the temporarily-connecting tab piece 9a positioned on the bottom layer of the temporarily-connecting tab part 9. The bend includes a depression formed on the front surface side of the temporarily-connecting tab piece 9a and a projection formed on the back surface side of the temporarily-connecting tab piece 9a. The depression of the bend of one temporarily-connecting tab piece 9a is joined to the projection of the bend of another temporarily-connecting tab piece 9a adjacent on the front surface of the one temporarily-connecting tab piece 9a. The projection of the bend of one temporarily-connecting tab piece 9a is joined to the depression of the bend of yet another temporarily-connecting tab piece 9a adjacent on the back surface side of the one temporarily-connecting tab piece 9a. The projection of the bend of the temporarily-connecting tab piece 9a adjacent to the bottom layer of the temporarily-connecting tab part 9 is joined to the through hole. The through hole has a function of preventing the temporarily-connecting tab part 9 of the subsequently produced stack 2 from being fastened to the previously produced stack 2 by the bend when stacks 2 are continuously produced.

46) In the foregoing examples, the diameter increaser 250 is configured with the diameter-increasing members 251 and the plunger member 252. However, a diameter increaser of any other structure that can push the stack 2 (tooth portions 5) radially outward from the inner diameter side of the stack 2 (the inside of the through hole 2a) may be used. For example, a mechanical, hydraulic, or pneumatic diameter increaser may be used. Alternatively, a diameter increaser that operates using thermal expansion characteristic may be used.

47) The timing at which the diameter increaser 250 allows the diameter-increasing members 251 to move outward in the radial direction of the stack 2 and the outer peripheral surfaces of the diameter-increasing members 251 come into abutment with the inner peripheral surfaces of the through holes 2a and 240a is not limited to the one in the foregoing examples. The timing may be after the plate 270 is placed on the stack 2 and the plate 240, may be after the plate 280 is placed on the plate 270, or may be after the upper die 290 is placed on the plate 280. That is, after a load is applied to the stack 2 through the lower die 210 and the upper die 290, the outer peripheral surfaces of the diameter-increasing members 251 may be brought into abutment with the inner peripheral surfaces of the through holes 2a and 240a.

48) The thickness of each blanked member W that constitutes the stack 2 is not necessarily the same and may vary in some cases. Therefore, if the resin portion 3 is formed in the slot 7 with a certain load applied to any stack 2, and a plurality of blanked members W are fastened by the resin portion 3, the height of the resultant stacked stator core 1 may vary. Then, when a load is applied to the stack 2 through the lower die 210 and the upper die 290, a load may be applied to the stack 2 in the stacking direction thereof through the lower die 210 and the upper die 290 such that the stacking height of the stack 2 achieves a predetermined target stacking height. In this case, the heights of resulting stacked stator cores 1 are substantially the same. The stacked stator core 1 having a desired size as designed thus can be obtained. A load in a predetermined range may be applied such that the stacking height falls within, for example, the range of the target stacking height±0.01 mm. When the load is equal to or higher than a predetermined lower limit value, a gap is less likely to occur between the adjacent blanked members W and leakage of melted resin from the gap can be suppressed. When the load is equal to or lower than a predetermined upper limit value, the force of the stack 2 returning to the initial stacking height when unloaded (which is called spring back force) is reduced, and cracking of the resin portion 3 due to stress concentration is less likely to occur. The load within the predetermined range may be, for example, approximately 20 kN to 50 kN.

Figure 51:
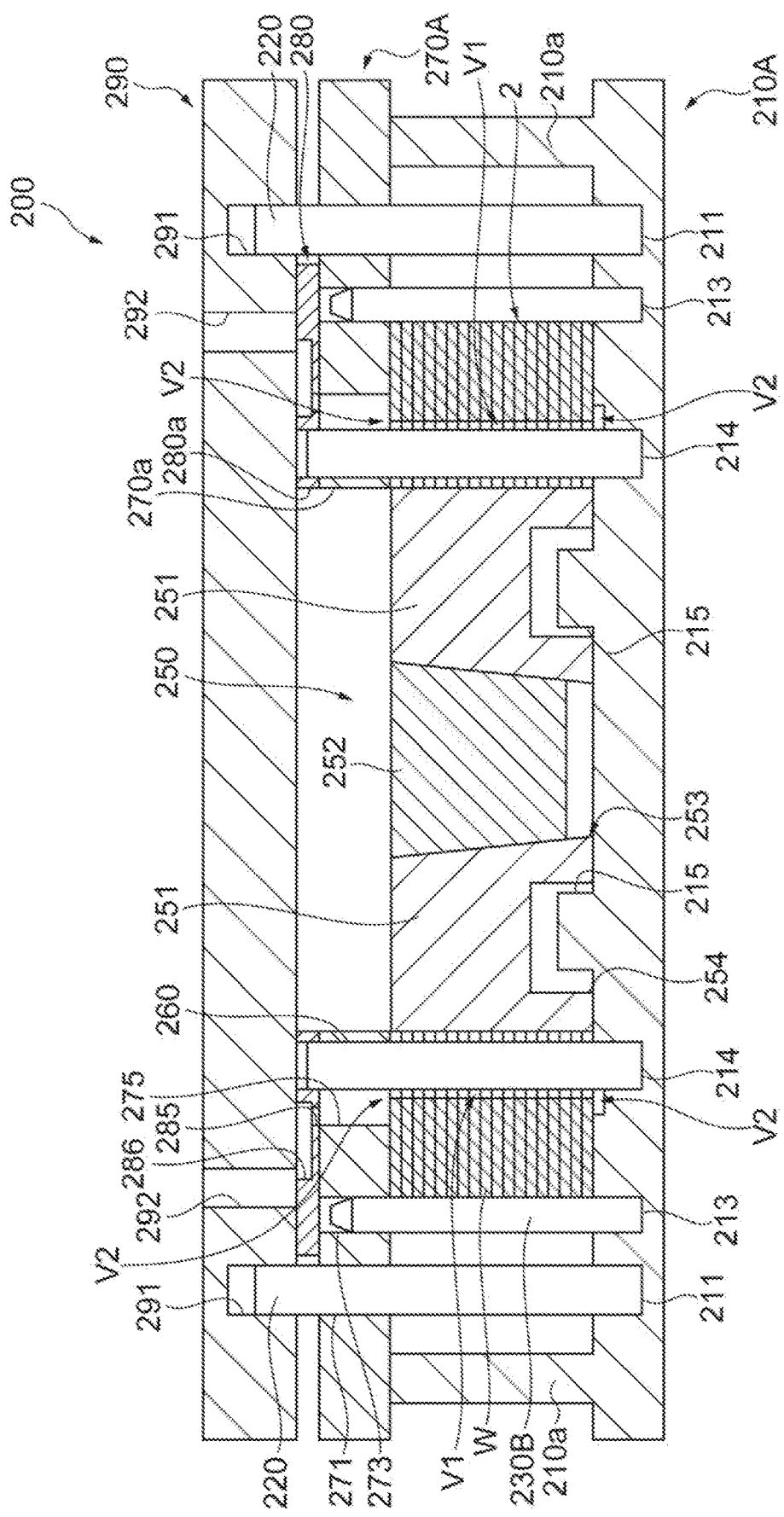
FIG. 51 is a diagram for explaining a process of manufacturing another example stacked stator core, specifically, a cross-sectional view illustrating the resin filling device and a stack.
Figure 52:
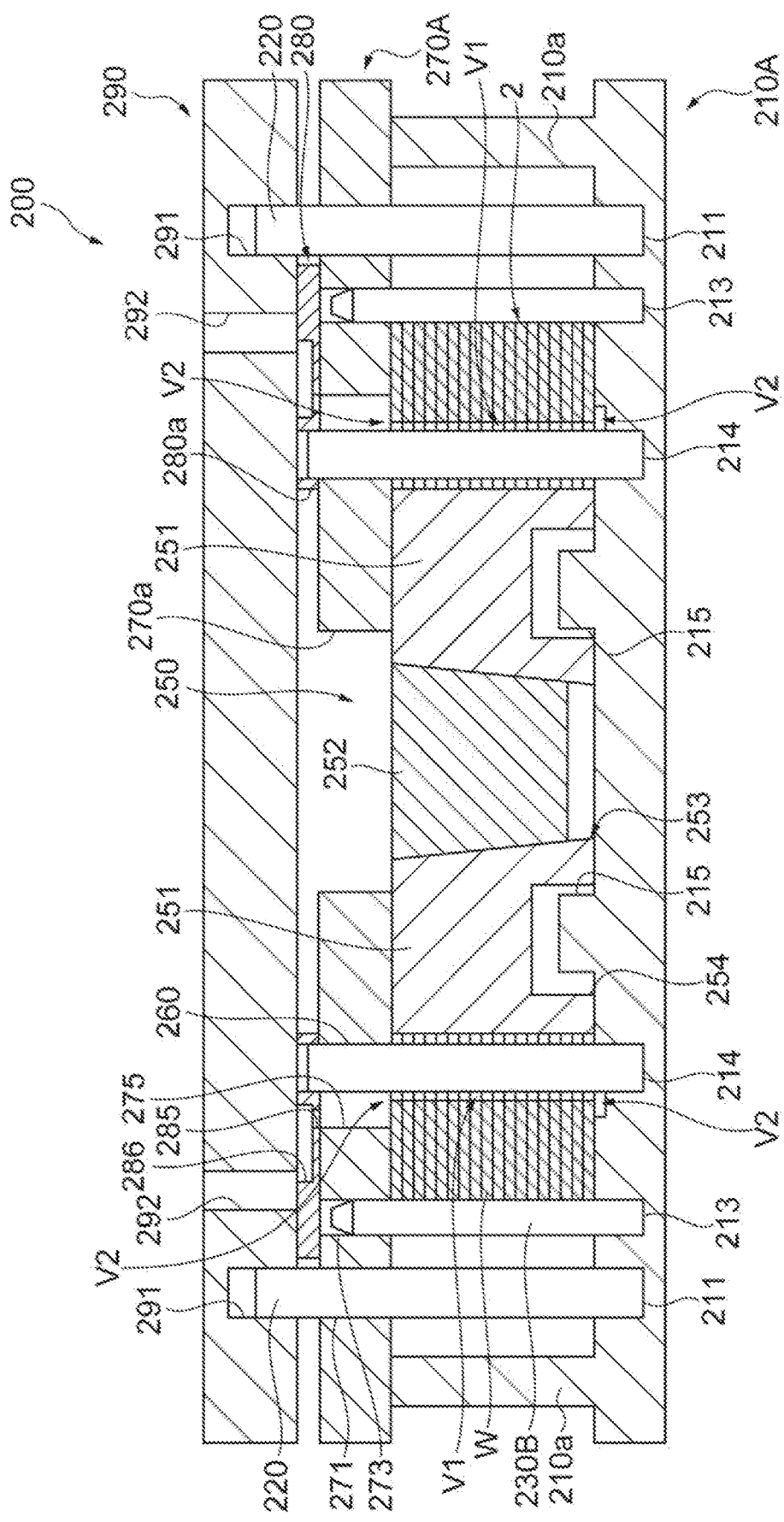
FIG. 52 is a diagram for explaining a process of manufacturing another example stacked stator core, specifically, a cross-sectional view illustrating the resin filling device and a stack.

In order to apply a load to the stack 2 in the stacking direction through the lower die 210 and the upper die 290 such that the stacking height of the stack 2 achieves a predetermined target stacking height, a stopper member having a height of the target stacking height may be disposed between the lower die 210 and the upper die 290. For example, as illustrated in FIG. 51, a lower die 210A in which a plurality of stopper members 210a are provided integrally may be used. In this case, a load is applied to the stack 2 through the lower die 210A and the upper die 290 until the plate 270A comes into abutment with the tip ends of the stopper members 210a, whereby the stacking height of the stack 2 substantially matches the height of the stopper member 210a. For example, as illustrated in FIG. 52, in addition to the lower die 210A in which a plurality of stopper members 210a are provided integrally, the diameter-increasing members 251 having a height of the target stacking height may be used and, in addition, the inner diameter of the through hole 270a of the plate 270A may be set to be smaller than the outer shape of the diameter-increasing members 251. In this case, a load is applied to the stack 2 through the lower die 210A and the upper die 290 until the plate 270A comes into abutment with the tip ends of the stopper members 210a and the diameter-increasing members 251, whereby the stacking height of the stack 2 substantially matches the height of the stopper member 210a. By doing so, the stacking height of the stack 2 can be easily matched with the target stacking height. At least one of the stopper member 210a having a height of the target stacking height and the diameter-increasing member 251 having a height of the target stacking height may be used. In the manner in FIG. 51 and FIG. 52, the plate 240 is integrated with each of the lower die 210A and the plate 270A.

49) For the purpose of further enhancing the insulation between the winding coil and a portion of the tooth portion 5 at least in the vicinity of the opening 8 of the slot 7, an insulator (for example, resin molded product, insulating paper) may be additionally provided at this portion.

50) For the purpose of preventing the winding coil from sticking out from the opening 8 of the slot 7 toward the through hole 2a (toward the rotor) or for the purpose of fixing the winding coil in the slot 7, insulating paper may be additionally provided in the opening 8 of the slot 7. At this moment, an engagement portion (for example, the depression illustrated in FIG. 21(b), the projection illustrated in FIG. 21(a)) may be provided on a side surface of the tooth portion 5 in the vicinity of the opening 8 (the side surface of the open end portion 5b). In this case, insulating paper can be attached stably to the engagement portion, and the productivity of the stack 2 having the insulating paper disposed in the vicinity of the opening 8 can be increased.

51) In some examples described above, the step of forming the resin portions 3 by the resin filling device 200 is performed after the step of forming the stack 2 by the blanking device 130. However, the stack 2 may be subjected to a predetermined heat treatment before the stack 2 is put into the resin filling device 200. The heat treatment may be, for example, burn-off, a combination of annealing and bluing, or a combination of burn-off and bluing. As illustrated in FIG. 50, when the core members are joined to each other through the temporarily-connecting tab parts 9, the temporarily-connecting tab parts 9 may be removed from the stack 2 before the heat treatment of the stack 2, or the temporarily-connecting tab parts 9 may be removed from the stack 2 after the heat treatment of the stack 2. When the temporarily-connecting tab parts 9 are removed from the stack 2 before the heat treatment of the stack 2, the core members are not bound by the temporarily-connecting tab parts 9 and therefore swell involved with heat treatment is less likely to occur in the core members. In this configuration, since the stack 2 is firmly held between the lower die 210 and the plate 270 in the resin filling process by the resin filling device 200, melted resin is less likely to leak from the resin filling device 200.

52) In some examples, the stack 2 is formed with blanked members W blanked from an electrical steel sheet ES. However, the stack 2 may be formed with blanked members blanked from a thin plate of an amorphous material.

53) In some examples, the resin portion 3 is formed using a thermosetting resin. However, the resin portion 3 may be formed using a thermoplastic resin.

Figure 53:
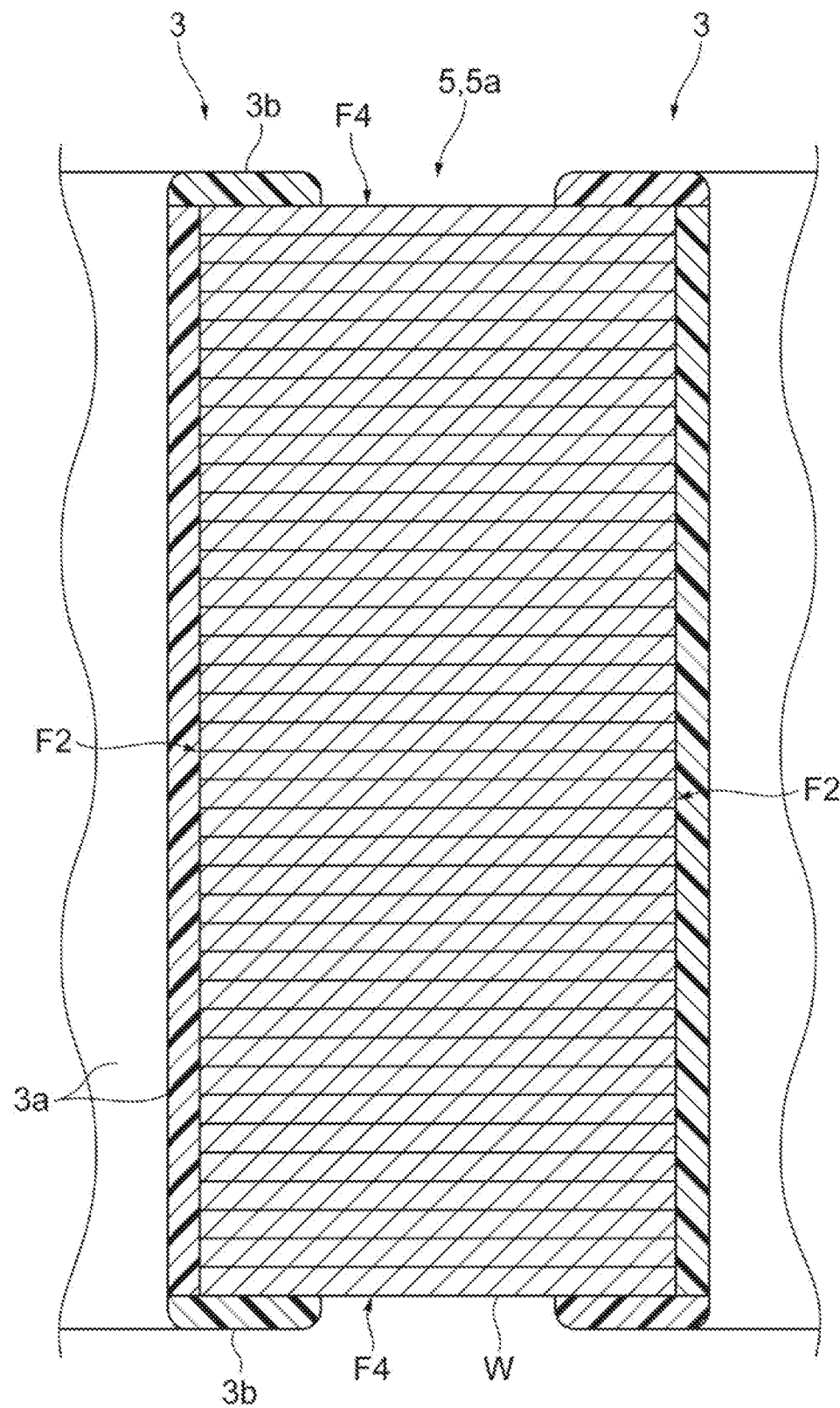
FIG. 53 is a cross-sectional view of the tooth portion cut in the same manner as in FIG. 4, in another example stacked stator core.

54) As illustrated in FIG. 53, the main portion 3a and the end portion 3b of the resin portion 3 may be formed in different steps. In this case, the kind of resin of the main portion 3a and the kind of resin of the end portion 3b may be different. For example, the main portion 3a may be formed using a first resin with a relatively low viscosity (high flowability), and the end portion 3b may be formed using a second resin with a relatively high viscosity. In this case, the first resin can be smoothly charged into the filling space V1. In addition, the strength of the end portion 3b is enhanced because the end portion 3b that tends to be under load when a winding coil is attached to the tooth portion 5 is formed of the second resin. This configuration can suppress, for example, chipping and cracking in the end portion 3b.

Figure 54:
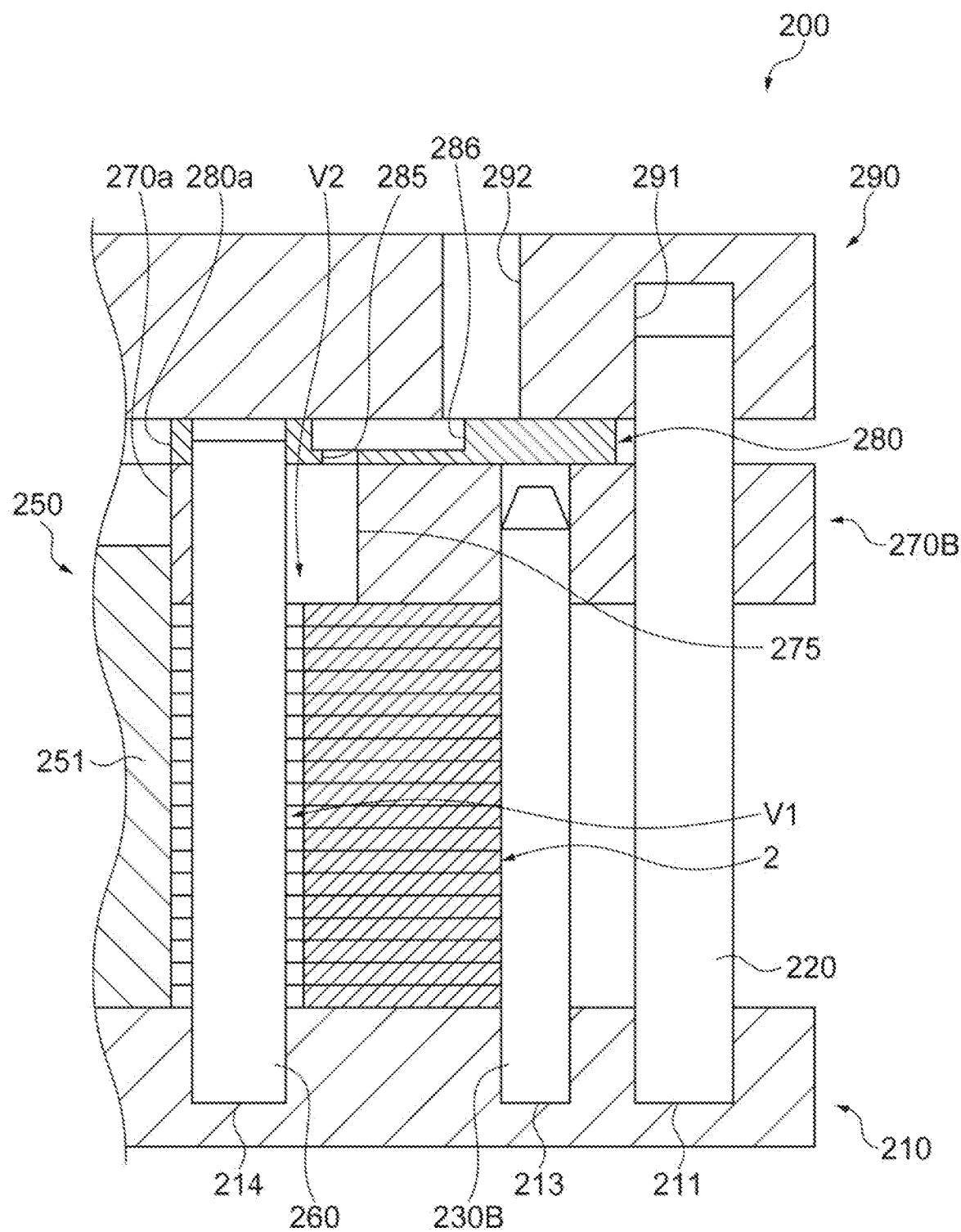
FIG. 54 is a diagram for explaining a process of manufacturing another example stacked stator core, specifically, a-cross-sectional view partially illustrating the resin filling device and a stack.

Referring now to FIG. 54 to FIG. 57, an example of the method of forming the main portion 3a and the end portion 3b of the resin portion 3 in different steps is described. First of all, as illustrated in FIG. 54, the guide shaft 220, the positioning block 230A, the positioning pin 230B, the diameter increaser 250, the stack 2, the mold core members 260, a plate 270B, the plate 280, and the upper die 290 are attached in a predetermined order on the lower die 210. Here, the plate 270B differs from the plate 270 according to the foregoing examples in that the through hole 275 is directly communicated with the filling space V1.

Figure 55:
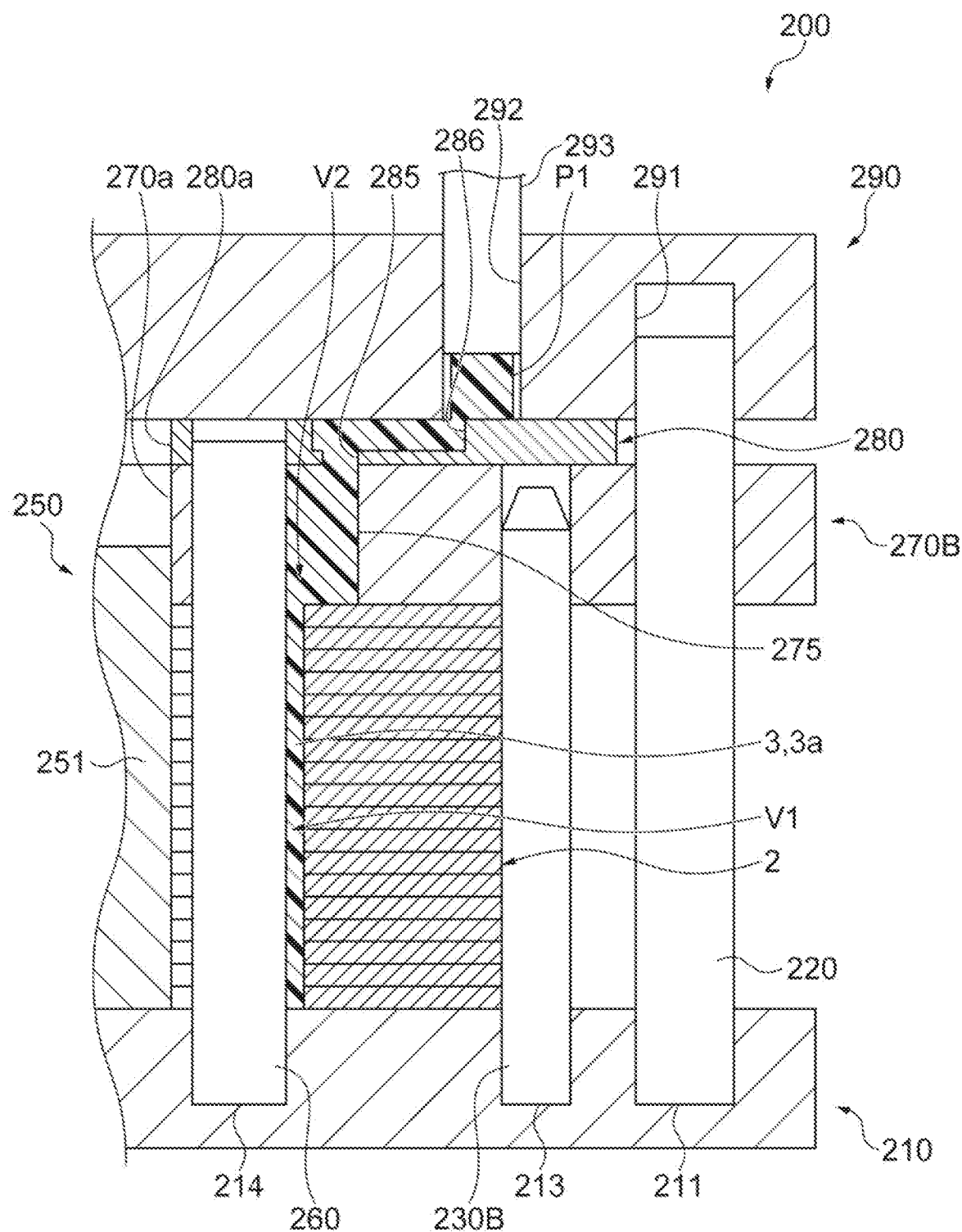
FIG. 55 is a diagram for explaining the step subsequent to FIG. 54, specifically, a cross-sectional view partially illustrating the resin filling device and a stack.

Next, as illustrated in FIG. 55, a resin pellet P1 is disposed in each through hole 292 of the upper die 290. The resin pellet P1 may be formed of, for example, the first resin with a relatively low viscosity (high flowability). Next, one plunger 293 is inserted into each through hole 292. In this state, the controller 140 brings a not-illustrated heater into operation and also the plunger 293 into operation. Then, the resin pellet P1 in a melted state is pushed out by the plunger 293, and melted resin is charged into the through hole 292, the depressed groove 286, the through hole 285, the through hole 275, and the filling space V in this order. Subsequently, melted resin is solidified by a chemical change due to heating during molding, whereby the main portion 3a is formed in the filling space V1. At this moment, the blanked members W constituting the stack 2 are connected by the main portion 3a and integrated. The stack 2 in which the main portion 3a is provided in the slot 7 is thus obtained.

Figure 56:
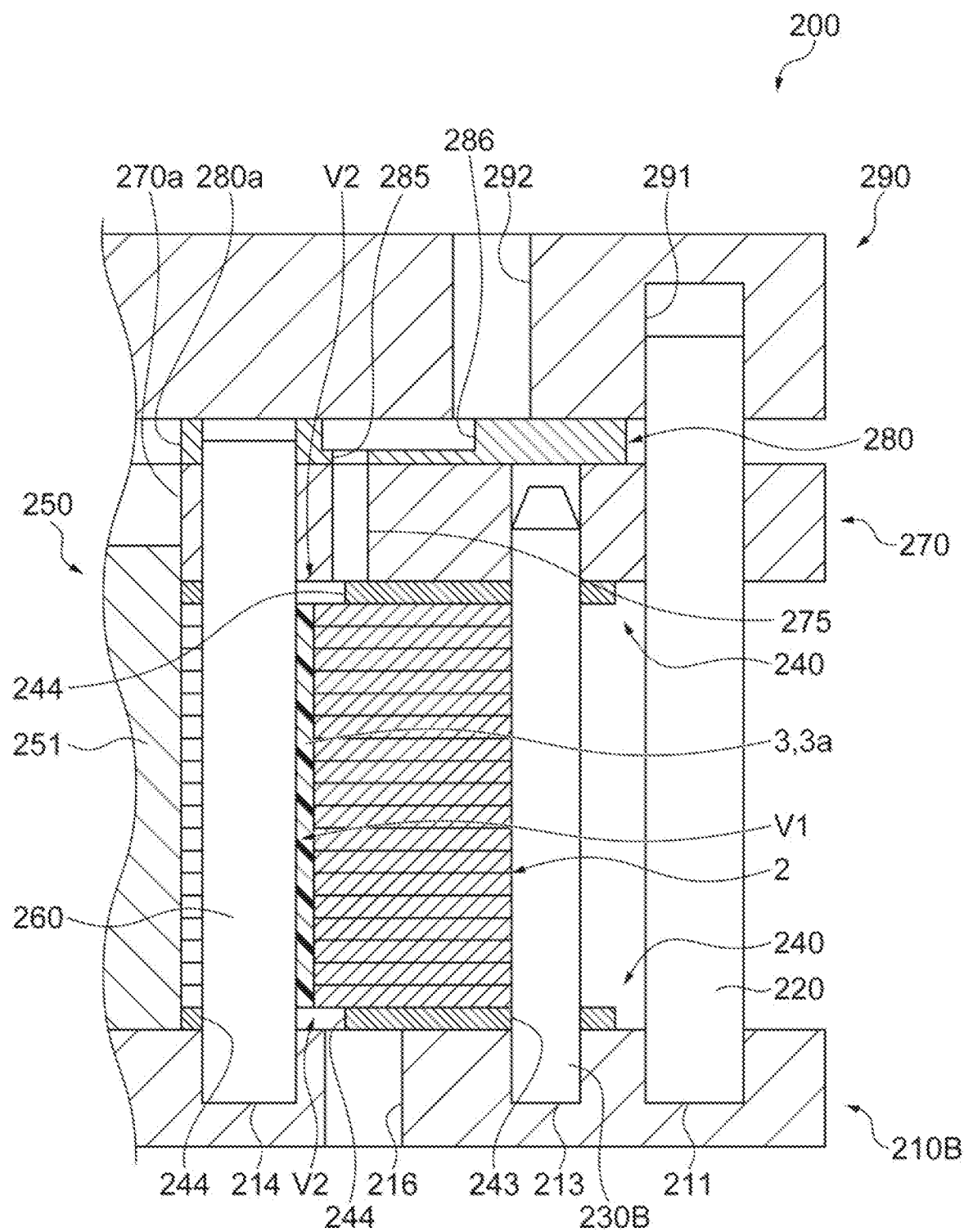
FIG. 56 is a diagram for explaining the step subsequent to FIG. 55, specifically, a cross-sectional view partially illustrating the resin filling device and a stack.

Next, as illustrated in FIG. 56, the guide shaft 220, the positioning block 230A, the positioning pin 230B, the plate 240, the diameter increaser 250, the stack 2 with the main portion 3a in the slot 7, the plate 240, the mold core member 260, the plate 270, the plate 280, and the upper die 290 are attached in a predetermined order on a lower die 210B. Here, the lower die 210B differs from the lower die 210 according to the foregoing examples in that a plurality of through holes 216 communicatively connected with the through holes 244 of the plate 240 are provided.

Figure 57:
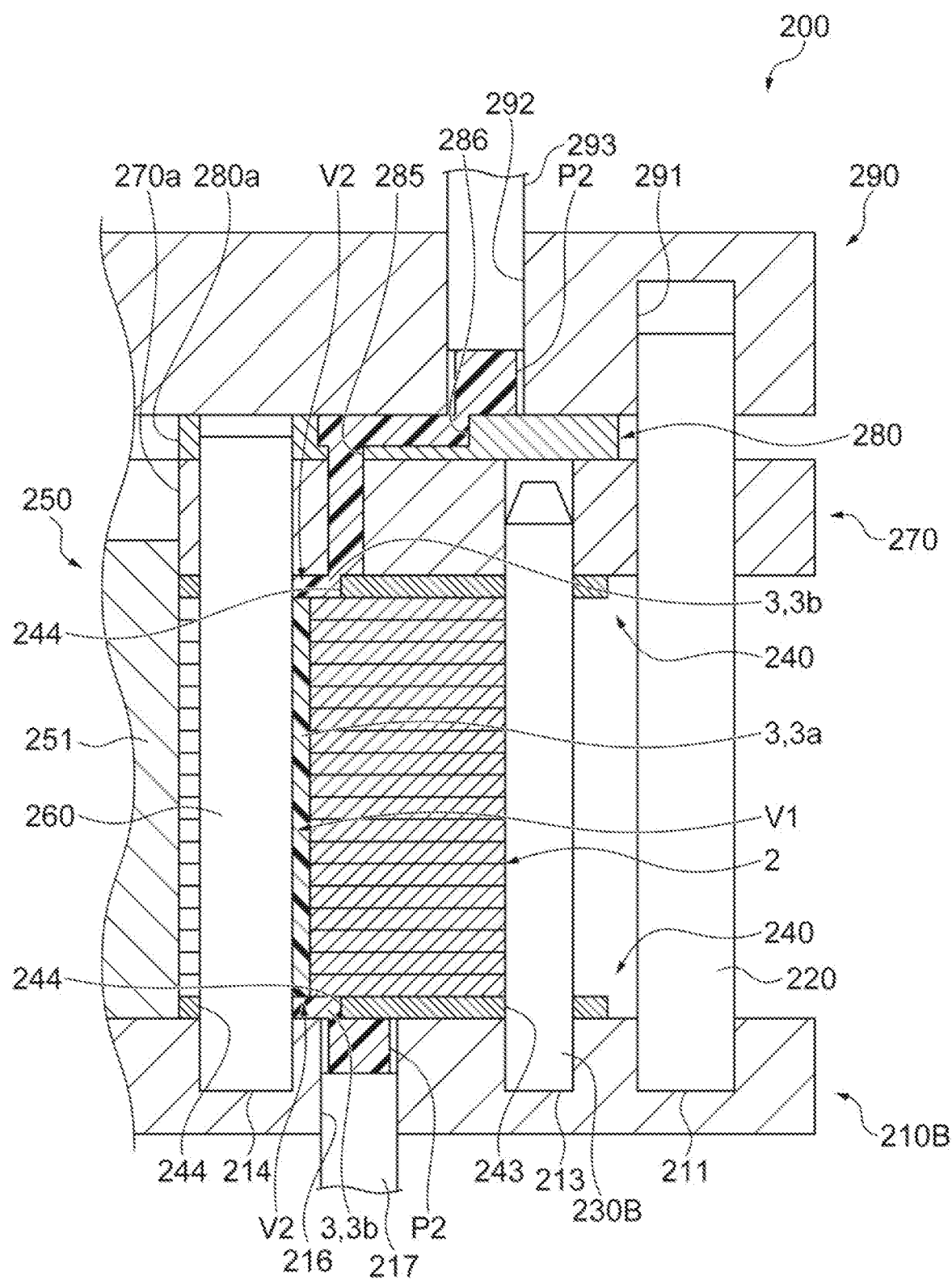
FIG. 57 is a diagram for explaining the step subsequent to FIG. 56, specifically, a cross-sectional view partially illustrating the resin filling device and a stack.

Next, as illustrated in FIG. 57, a resin pellet P2 is disposed in each through hole 216 of the lower die 210B, and a resin pellet P2 is disposed in each through hole 292 of the upper die 290. The resin pellet P2 may be formed of, for example, the second resin with a relatively high viscosity. Next, one plunger 217 is inserted into each through hole 216, and one plunger 293 is inserted into each through hole 292. In this state, the controller 140 brings a not-illustrated heater into operation and also the plungers 217 and 293 into operation. Then, the resin pellet P2 in a melted state is pushed out by the plunger 217, and melted resin is charged into the through hole 216 and the through hole 244 on the lower side (auxiliary space V2) in this order. Similarly, the resin pellet P2 in a melted state is pushed out by the plunger 293, and melted resin is charged into the through hole 292, the depressed groove 286, the through hole 285, the through hole 275, and the through hole 244 on the upper side (auxiliary space V2) in this order. Subsequently, melted resin is solidified by a chemical change due to heating during molding, whereby the end portion 3b is formed in the auxiliary space V2. The stacked stator core 1 in which the resin portion 3 is provided on the inner wall surface F2 of the slot 7 of the stack 2 is thus completed.

55) As illustrated in FIG. 58, the main portion 3a may be disposed to be shifted from the end portion 3b such that the main portion 3a protrudes toward the slot 7 relative to the end portion 3b. That is, a step St may be provided between the main portion 3a and the end portion 3b. In this case, when a winding coil is attached to the tooth portion 5, the winding coil is easily bent at the step St where the main portion 3a and the end portion 3b are shifted from each other, and the diameter of winding coil wound around the tooth portion 5 is reduced. This configuration reduces the coil length as a whole. Accordingly, heat generated in the winding coil can be suppressed, and the height of the stacked stator core 1 after the winding coil is attached can be reduced as a whole. The width of the step St may be, for example, equal to or less than 0.1 mm. For the resin portion 3 in which the main portion 3a is shifted from the end portion 3b, for example, the through hole 244 may be provided in the plate 240 such that the filling space V1 is positioned to be shifted from the auxiliary space V2.

As illustrated in FIG. 58(a), while the corner of the end portion 3b on the main portion 3a side is beveled, the corner of the end portion 3b on the side away from the main portion 3a is not necessarily beveled. As illustrated in FIG. 58(b), both of the corner of the end portion 3b on the main portion 3a side and the corner on the side away from the main portion 3a may be beveled. Also in this case, the shape of the bevel may be rounded or chamfered or may be any other shapes such as a trapezoidal shape and a step shape as long as the corner is cut off. Alternatively, the main portion 3a or the end portion 3b of the resin portion 3 may be projecting or depressed such that protrusions and depressions are alternately arranged in the extending direction of the tooth portion so as to conform to the shape of the winding coil attached to the tooth portion 5. When the corner of the end portion 3b is beveled, the end portion 3b can be easily released from the mold.

Here, to form the end portion 3b with the beveled corner on the main portion 3a, a projection having a shape corresponding to the bevel need to be provided in the plate 240. The tip end of the projection is sharpened because the beveled corner of the end portion 3b expands outward as it comes closer to the main portion 3a in the stacking direction. In this configuration, when the step St does not exist between the main portion 3a and the end portion 3b, the wall thickness of the projection is reduced. Accordingly, the strength of the tip end of the projection (the sharpened portion) is decreased, leading to a concern about stable production of the end portion 3b with the beveled corner. However, the thickness of the projection is increased when the width of the step St defined by the tip end of the projection (which may be called "allowance" of the projection) is ensured to provide the step St between the main portion 3a and the end portion 3b. With this configuration, since the strength of the tip end of the projection is ensured, the end portion 3b with the beveled corner on the main portion 3a side can be stably produced.

Although not illustrated in the figures, the corner of the end portion 3b on the main portion 3a side and the corner on the side away from the main portion 3a are not necessarily beveled.

Figure 59:
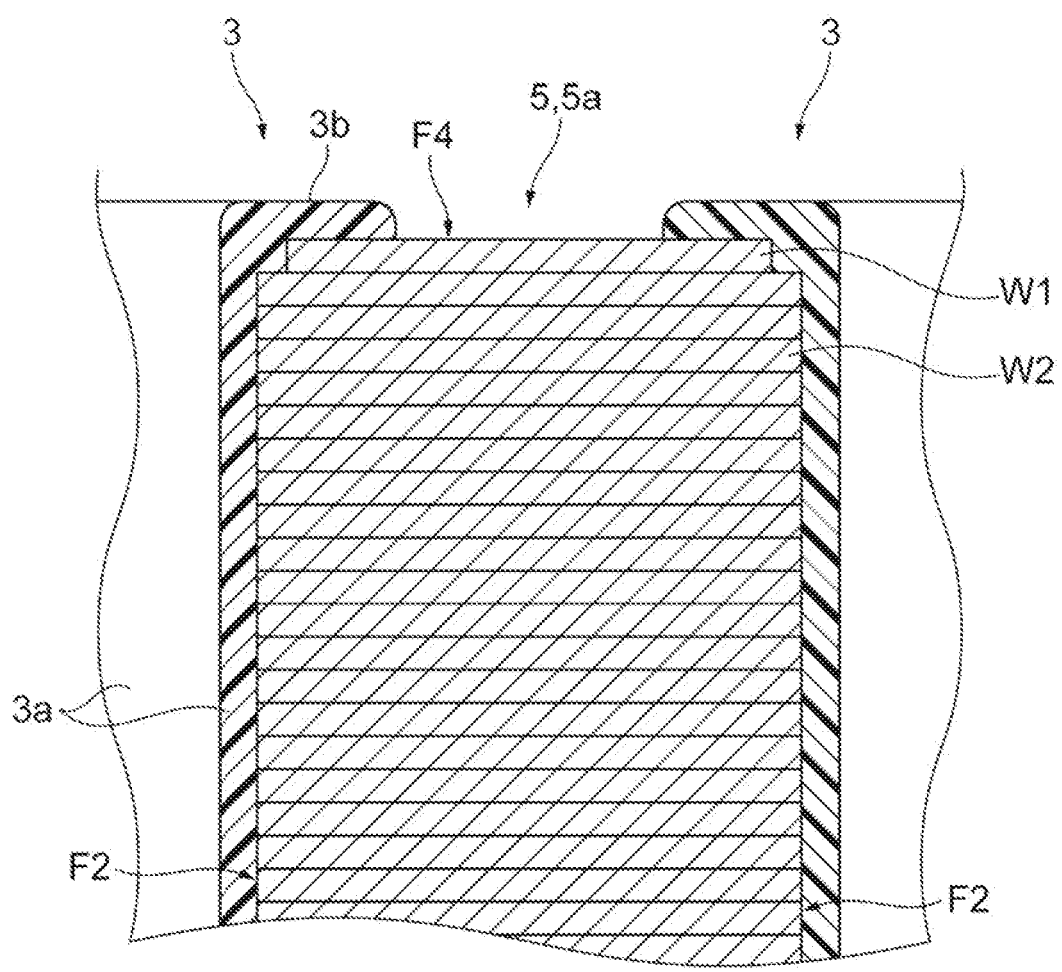
FIG. 59 is a cross-sectional view of the vicinity of the upper end surface of the tooth portion cut in the same manner as in FIG. 4, in another example stacked stator core.
Figure 60:
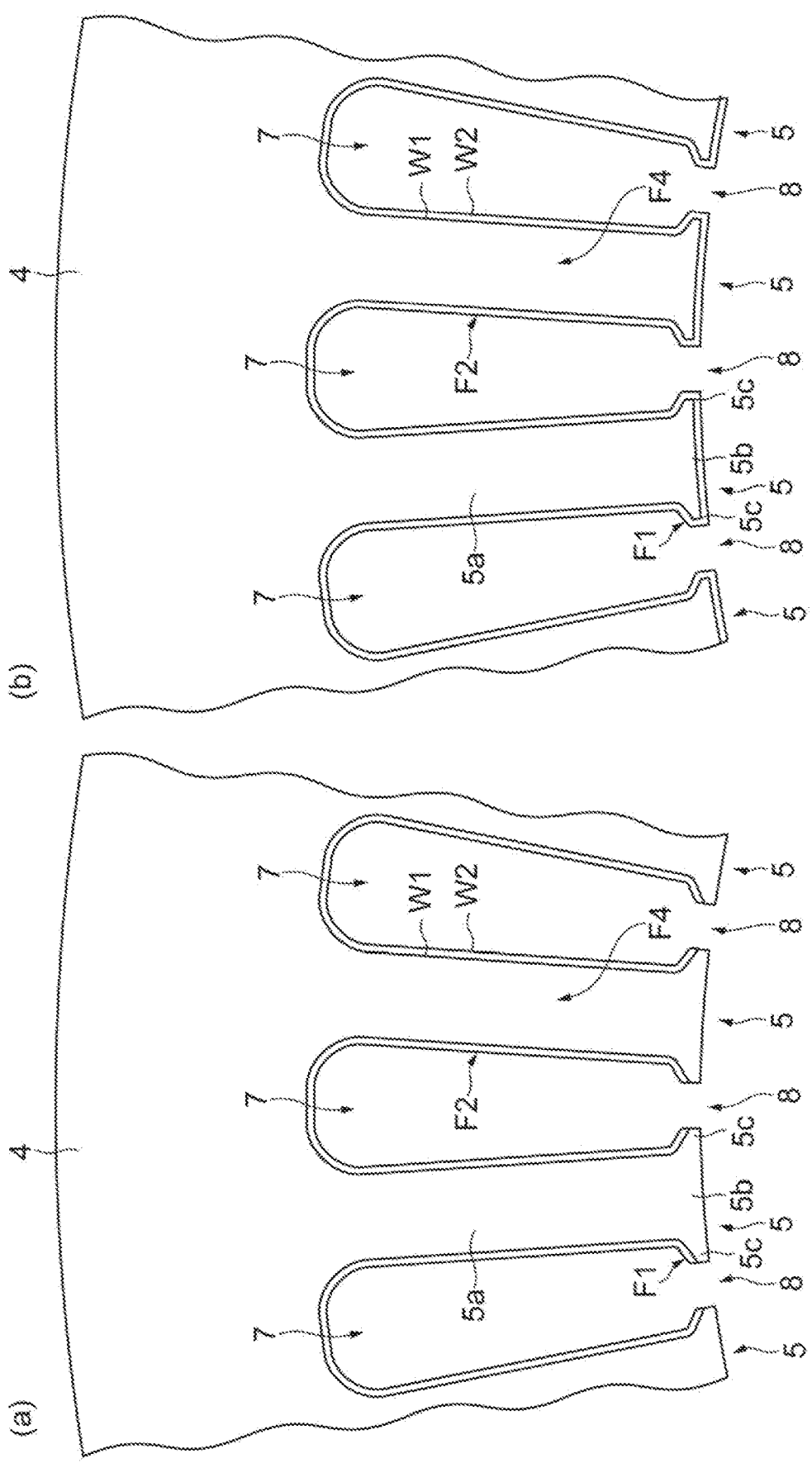
FIG. 60 is a top view illustrating a stacked state of a blanked member at an outermost layer of a stack and a blanked member at a layer other than the outermost layer of the stack.

56) The width of the tooth portion 5 may be reduced and/or the inner diameter of the yoke portion 4 may be increased toward both end surfaces of the stack 2 in the stacking direction. For example, as illustrated in FIG. 59 and FIG. 60, the width of the tooth portion 5 in the blanked member W1 serving as the outermost layer (the top layer or the bottom layer) of the stack 2 may be smaller than the width of the tooth portion 5 in the blanked member W2 serving as a layer other than the outermost layer of the stack 2, and the inner diameter of the yoke portion 4 in the blanked member W1 serving as the outermost layer of the stack 2 may be larger than the inner diameter of the yoke portion 4 in the blanked member W2 serving as a layer other than the outermost layer of the stack 2. As illustrated in FIG. 60(a), the tip end of the tooth portion 5 in the blanked member W1 serving as the outermost layer of the stack 2 may substantially match the tip end of the tooth portion 5 in the blanked member W2 serving as a layer other than the outermost layer of the stack 2. As illustrated in FIG. 60(b), the tip end of the tooth portion 5 in the blanked member W1 serving as the outermost layer of the stack 2 may be positioned closer to the yoke portion 4 than the tip end of the tooth portion 5 in the blanked member W2 serving as a layer other than the outermost layer of the stack 2.

In these cases, the corner of the tooth portion 5 on the slot 7 side and/or the corner of the yoke portion 4 on the slot 7 side is missing. In this configuration, the thickness of a portion of the resin portion 3 that extends from the inner wall surface F2 of the slot 7 around the end surfaces F3 and F4 of the stack 2 is easily ensured. Cracking in this portion of the resin portion 3 thus can be suppressed. When a winding coil is attached to the tooth portion 5, this portion of the resin portion 3 can suppress dielectric breakdown between the winding coil and the tooth portion 5 and/or the yoke portion 4.

Figure 61:
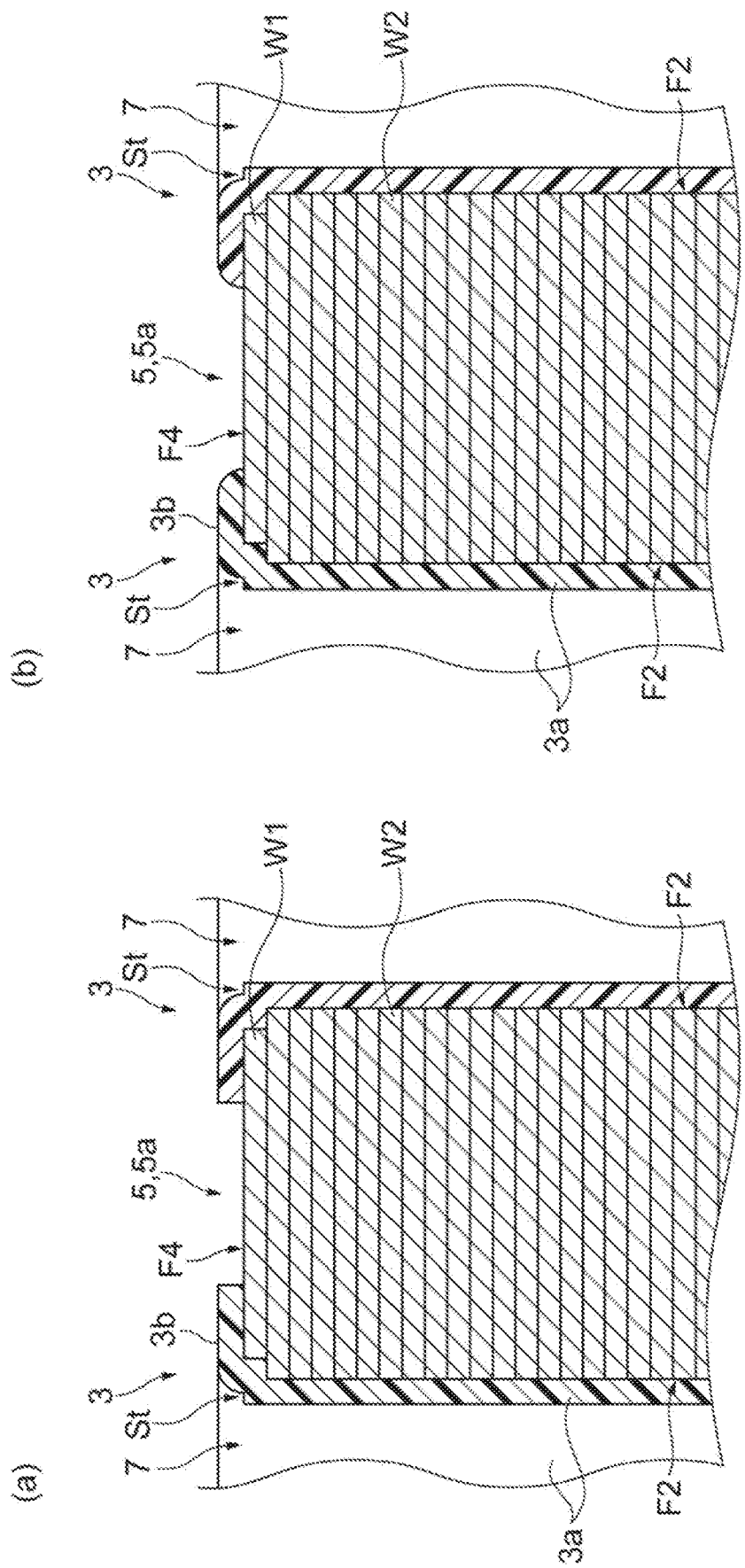
FIG. 61 is a cross-sectional view of the vicinity of the upper end surface of the tooth portion cut in the same manner as in FIG. 4, in another example stacked stator core.

The width of the tooth portion 5 in a plurality of blanked members W1 in the vicinity of the outermost layer of the stack 2 may be smaller than the width of the tooth portion 5 in the other blanked members W, and the inner diameter of the yoke portion 4 in a plurality of blanked members W1 in the vicinity of the outermost layer of the stack 2 may be larger than the inner diameter of the yoke portion 4 in the other blanked members W. The width of the tooth portion 5 in a plurality of blanked members W1 in the vicinity of the outermost layer of the stack 2 may be constant in the stacking direction or may be reduced continuously or stepwise toward the end surfaces of the stack 2. The inner diameter of the yoke portion 4 in a plurality of blanked members W1 in the vicinity of the outermost layer of the stack 2 may be constant in the stacking direction or may be increased continuously or stepwise toward the end surfaces of the stack 2. In the manner illustrated in FIG. 59 and FIG. 60, as illustrated in FIG. 61, a step St may be provided between the main portion 3a and the end portion 3b, or the corner of the end portion 3b may be beveled.

Figure 62:
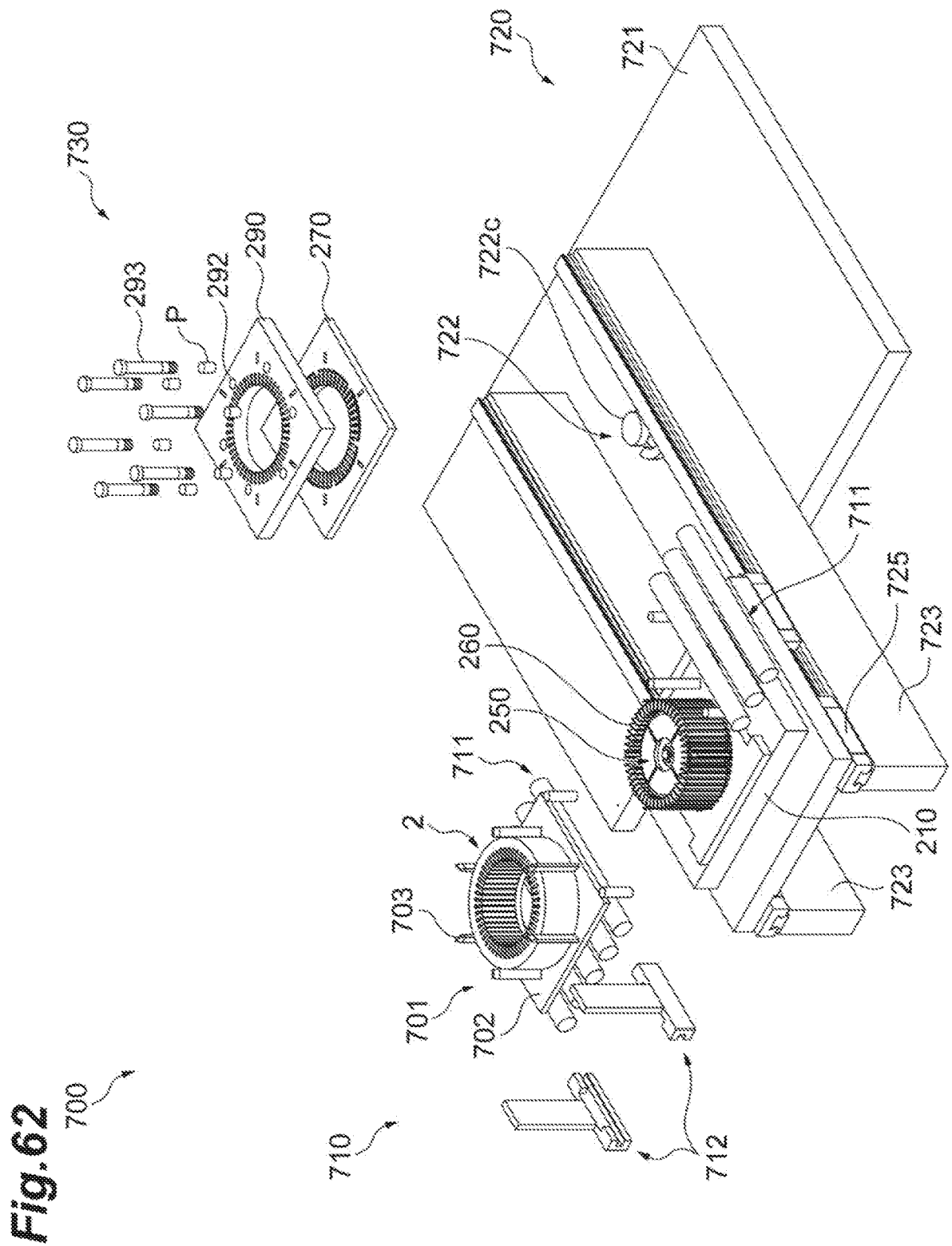
FIG. 62 is a perspective view of another example resin filling device as viewed from above.
Figure 63:
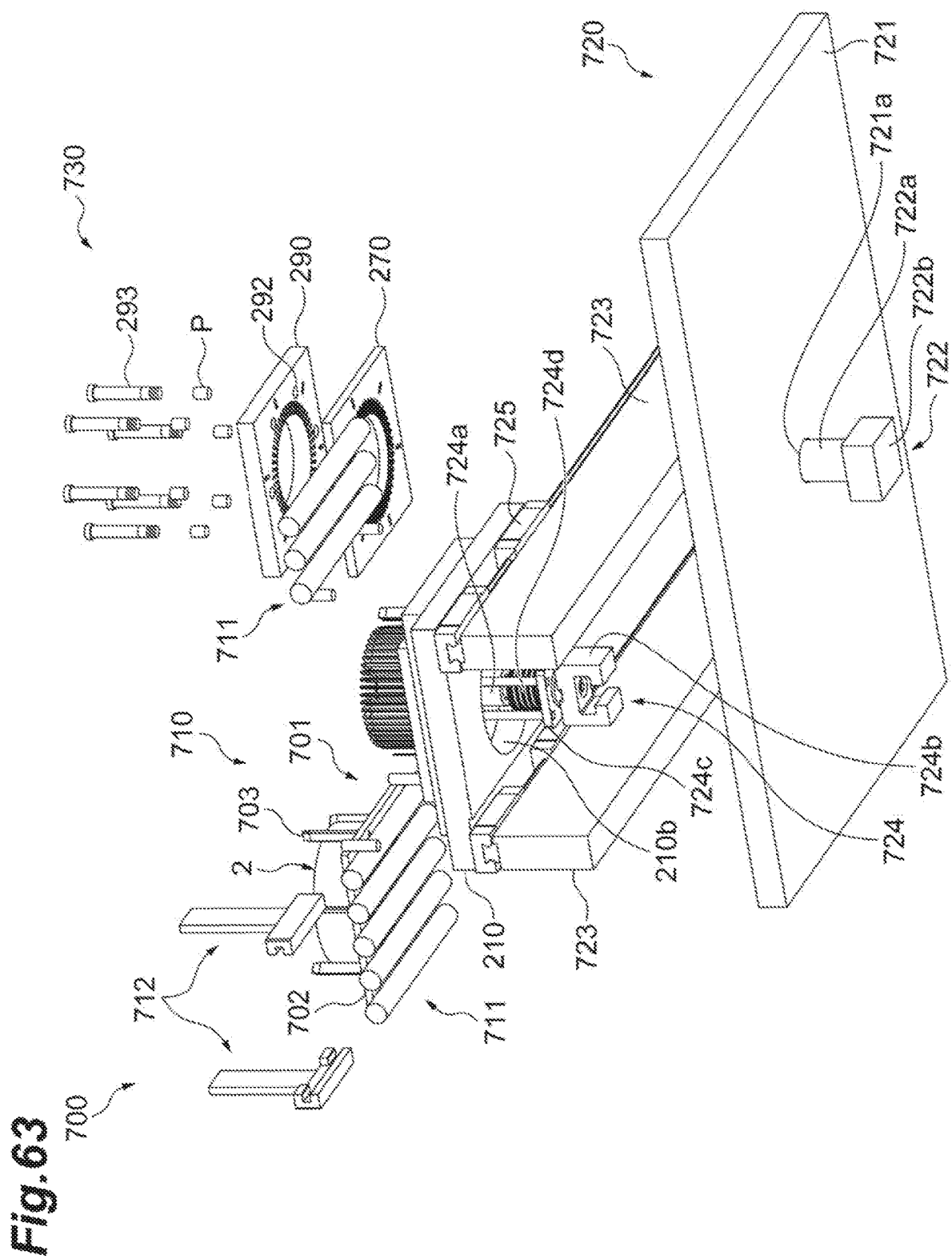
FIG. 63 is a perspective view of another example resin filling device as viewed from below.
Figure 64:
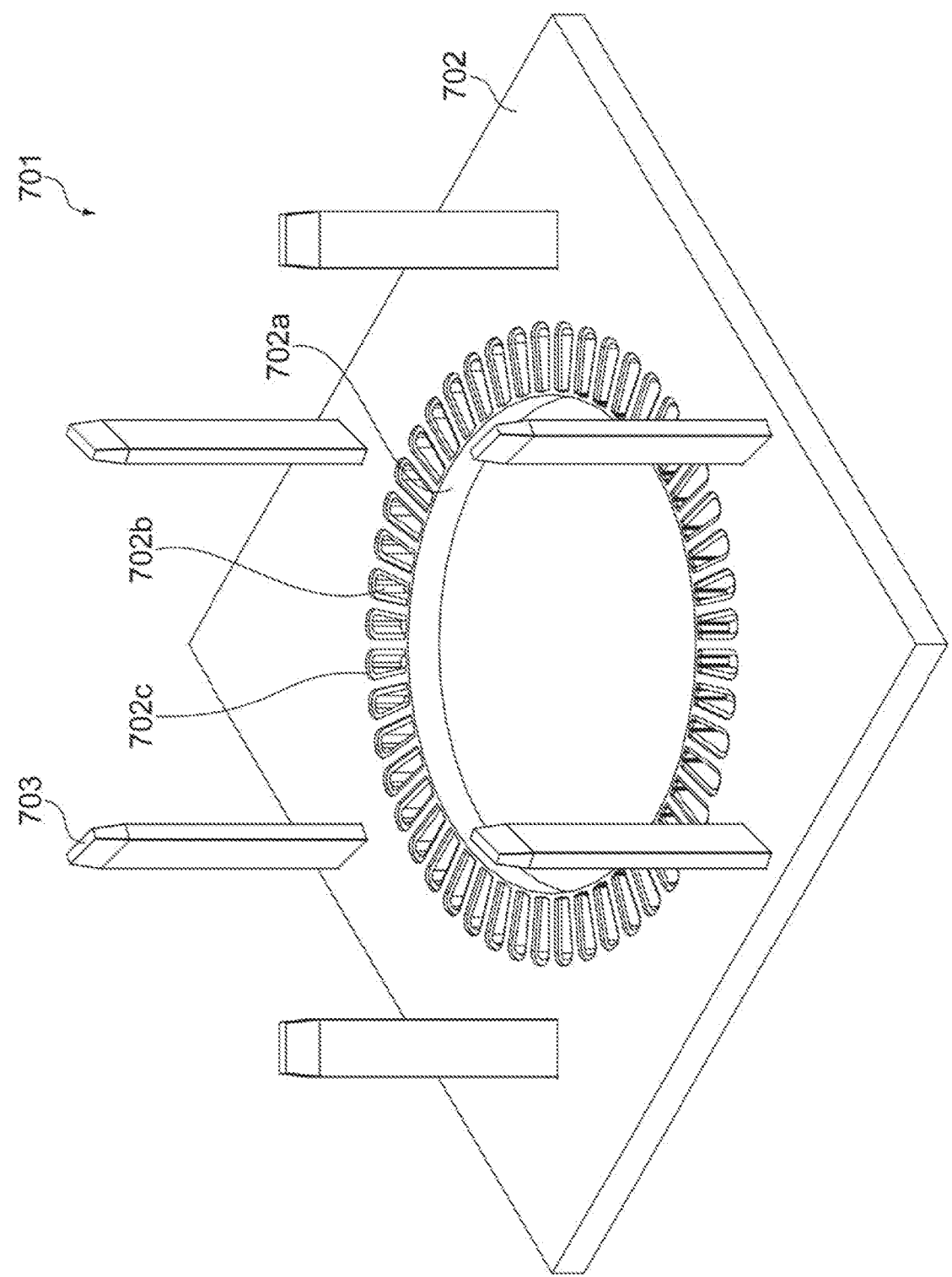
FIG. 64 is a perspective view illustrating a transportation member.
Figure 65:
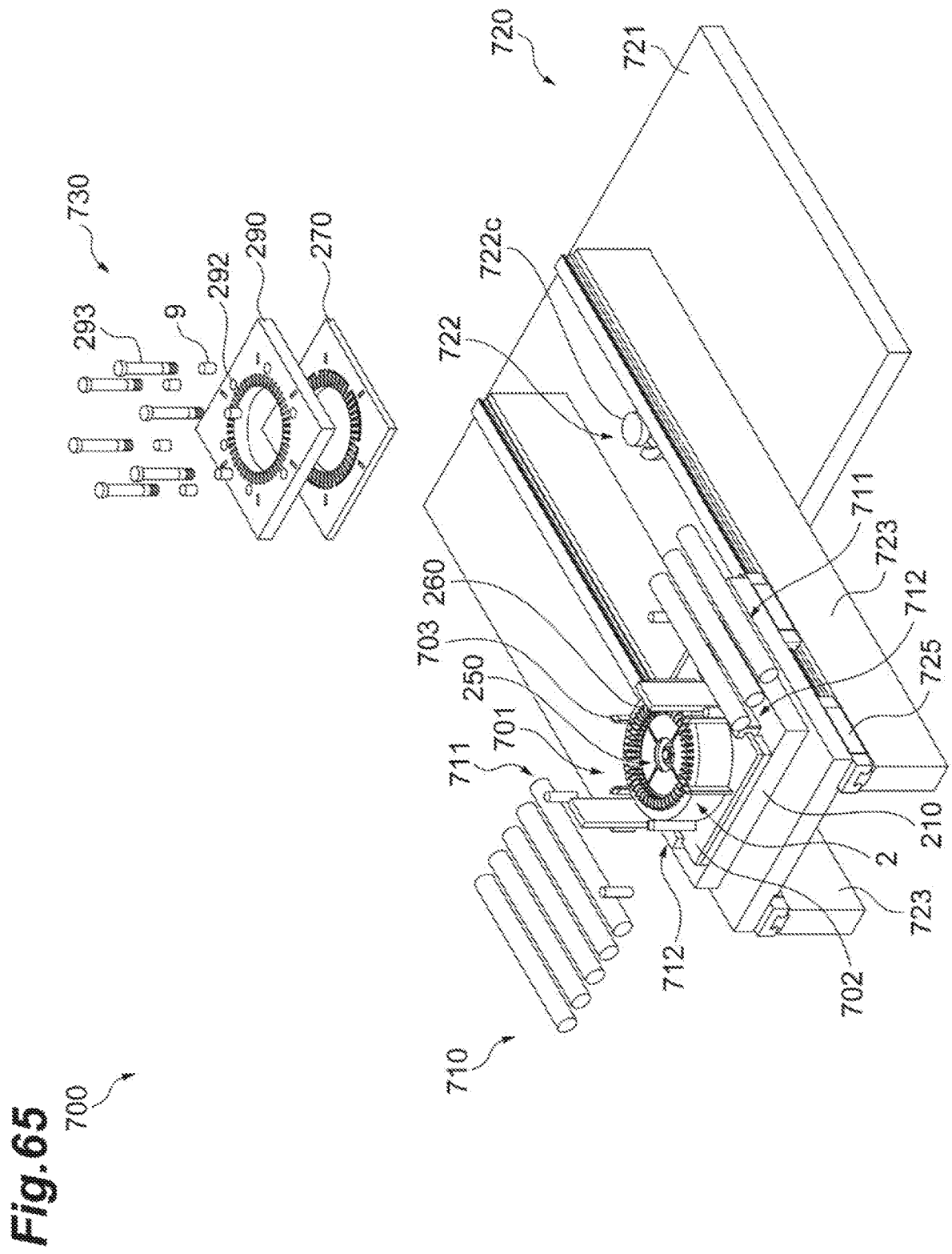
FIG. 65 is a diagram for explaining a process of manufacturing a stacked stator core using another example resin filling device.

57) The stacked stator core 1 may be produced using a resin filling device having a configuration different from the one in the foregoing examples. Referring now to FIG. 62 to FIG. 64, a resin filling device 700 according to another example is described. The resin filling device 700 includes a transportation mechanism 710, a movement mechanism 720, and a filling mechanism 730.

As illustrated in FIG. 62 and FIG. 63, the transportation mechanism 710 has transportation rollers 711 and a pair of transfer arms 712. The transportation rollers 711 are laid between the blanking device 130 and the movement mechanism 720 and between the movement mechanism 720 and a subsequent device. The transportation rollers 711 have the function of transporting the transportation member 701 configured to be loaded with the stack 2, between the blanking device 130, the movement mechanism 720, and the subsequent device. In this configuration, the transportation rollers 711 are disposed on the upstream side and the downstream side of the movement mechanism 720.

Here, as illustrated in detail in FIG. 64, the transportation member 701 has a transportation plate 702 and a plurality of positioning pins 703. The transportation plate 702 is a plate-like member having a rectangular shape and can be loaded with the stack 2. The plate 702 has one through hole 702a and a plurality of through holes 702b. The through hole 702a has a circular shape and is positioned at the center of the transportation plate 702. The through hole 702a may be equivalent to the inner diameter of the stack 2 or may be slightly smaller than the inner diameter of the stack 2.

In some examples, 48 through holes 702b are provided in the transportation plate 702. A plurality of through holes 702b are arranged substantially at regular intervals in a circular shape so as to surround the through hole 702a, outside the through hole 702a. The through holes 702b are disposed at positions corresponding one-to-one to the slots 7 of the stack 2 placed on the transportation plate 702. Each through hole 702b has a shape corresponding to the mold core member 260 and has a size equivalent to the mold core member 260. A depressed groove 702c having a shape corresponding to the mold core member 260 and being slightly larger than the mold core member 260 is provided around each through hole 702b and on the surface of the transportation plate 702. The stack 2 formed in the blanking device 130 is placed on the transportation plate 702 such that the through hole 2*a* overlaps the through hole 702*a* and each slot 7 overlaps the corresponding through hole 702*b*.

A plurality of positioning pins 703 are provided on the transportation plate 702 so as to protrude upward from the surface of the transportation plate 702. In some examples, six positioning pins 703 are provided in the transportation-plate 702. The positioning pin 703 has a rectangular prism shape. The positioning pins 703 are arranged substantially at regular intervals in a circular shape, outside the through holes 702*b*. These positioning pins 703 are engaged in the corresponding depressed grooves 6 of the stack 2 in a state in which the stack 2 is placed on the transportation plate 702.

Returning to FIG. 62 and FIG. 63, a pair of transfer arms 712 is configured to hold the transportation plate 702 from the sides. A pair of transfer arms 712 has the function of holding the transportation plate 702 transported to the vicinity of the movement mechanism 720 by the upstream transportation rollers 711 and transferring the transportation plate 702 to the lower die 210 (which will be described in detail later) in the movement mechanism 720. A pair of transfer arms 712 has the function of holding the transportation plate 702 placed on the lower die 210 and transferring the transportation plate 702 to the downstream transportation rollers 711.

The movement mechanism 720 has a base 721, an elevation mechanism 722, a pair of rails 723, the lower die 210 (base member), the diameter increaser 250, a diameter-increasing mechanism 724, and a plurality of mold core members 260.

The base 721 is a plate-like member having a rectangular shape. A through hole 721*a* is provided in the base 721. The elevation mechanism 722 includes an elevation rod 722*a* and a drive source 722*b*. The elevation rod 722*a* is shaped like a straight rod. The elevation rod 722*a* is inserted in the through hole 721*a* of the base 721 and extends along the vertical direction. A flange 722*c* extending radially outward from the elevation rod 722*a* is-provided at the upper end of the elevation rod 722*a*. The drive source 722*b* is attached to the lower end of the elevation rod 722*a*. The drive source 722*b* is configured to elevate and lower the elevation rod 722*a* relative to the base 721. The drive source 722*b* may be, for example, a hydraulic cylinder or a linear actuator.

A pair of rails 723 is provided on the base 721. A pair of rails 723 extends in parallel so as to face each other with the through hole 721*a* of the base 721 interposed therebetween. One end of a pair of rails 723 is positioned in the vicinity of the through hole 721*a*. The other end of a pair of rails 723 extends to the outside of the base 721. The other end of a pair of rails 723 is positioned between the upstream transportation rollers 711 and the downstream transportation rollers 711 as viewed from above.

The lower die 210 is attached to a pair of rails 723 through a slide unit 725 provided on the underside of the lower die 210. In this configuration, the lower die 210 can move along a pair of rails 723 between one end and the other end of a pair of rails 723. A through hole 210*b* is provided at the center of the lower die 210 (see FIG. 63).

The diameter increaser 250 is placed-on the lower die 210. The configuration of the diameter increaser 250 is similar as in the foregoing examples. That is, the diameter increaser 250 includes a plurality of diameter-increasing members 251 and a plunger member 252. A plurality of diameter-increasing members 251 are annular as a whole as viewed from above. A depressed groove 254 is provided on the lower surface of the diameter-increasing member 251, and the guide rail 215 provided on the front surface of the lower die 210 can be inserted in the depressed groove 254. With this configuration, the diameter-increasing member 251 is movable in the extending direction of the guide rail 215. Although not illustrated in the figures, an annular elastic member (for example, an O-ring) may be attached to be stretched around a plurality of diameter-increasing members 251. In this configuration, the elastic member applies biasing force to a plurality of diameter-increasing members 251 in a direction in which they come closer to each other (radially inward). The plunger member 252 is disposed within the inner peripheral surface 253 of the diameter-increasing member 251.

As illustrated in FIG. 63, the diameter-increasing mechanism 724 includes an elevation rod 724*a*, an engagement member 724*b*, an auxiliary holding plate 724*c*, and an elastic member 724*d*. The elevation rod 724*a* is shaped like a straight rod. The elevation rod 724*a* is inserted in the through hole 210*b* of the lower die 210 and extends along the vertical direction. The plunger member 252 is attached to the upper end of the elevation rod 724*a*.

The engagement member 724*b* is substantially shaped like a letter C. The engagement member 724*b* is attached to the lower end of the elevation rod 724*a* such that its open end side faces downward. The engagement member 724*b* moves along a pair of rails 723 together with the lower die 210, and when the engagement member 724*b* reaches the flange 722*c*, the engagement member 724*b* is engaged with the flange 722*c*.

The auxiliary holding plate 724*c* is attached to the lower die 210 on the underside of the lower die 210. The auxiliary holding plate 724*c* is positioned above the engagement member 724*b* in a state in which the elevation rod 724*a* is inserted.

The elastic member 724*d* is placed on the auxiliary holding plate 724*c*. The elastic member 724*d* has the function of biasing the elevation rod 724*a* upward. The elastic member 724*d* may be, for example, a compression coil spring. With this configuration, when the engagement member 724*b* is engaged with the flange 722*c* and the elevation rod 724*a* is pulled downward, the plunger member 252 lowers accordingly. Each diameter-increasing member 251 then moves radially outward along the guide rail 215. On the other hand, when the engagement member 724*b* comes apart from the flange 722*c* and the pulling force is removed from the lower end of the elevation rod 724*a*, the elastic member 724*d* biases the elevation rod 724*a* to push the elevation rod 724*a* upward. In this configuration, the load applied by the plunger member 252 to each diameter-increasing member 251 is also removed. At the same time, each diameter-increasing member 251 moves radially inward along the guide rail 215 because of the annular elastic member.

A plurality of mold core members 260 are attached to the lower die 210 so as to protrude upward from the upper surface of the lower die 210. A plurality of mold core members 260 are arranged substantially at regular intervals in a circular shape so as to surround the diameter increaser 250. The mold core members 260 are disposed at positions corresponding one-to-one to the slots 7 of the stack 2.

The filling mechanism 730 has a plate 270 and an upper die 290. In the manner in FIG. 62, the plate 270 differs from the plate 270 according to the foregoing examples in that the plates 240 and 280 are integrated. In the manner in FIG. 62, the upper die 290 differs from the upper die 290 according to the foregoing examples in that through holes are provided at positions corresponding to the diameter increaser 250, the mold core members 260, and the positioning pins 703.

Referring now to FIG. 62 and FIG. 65 to FIG. 67, a method of forming the resin portions 3 in the slots 7 of the stack 2 using the resin filling device 200 as described above (a method of manufacturing the stacked stator core 1) is described.

First of all, the stack 2 is formed in the blanking device 130, and when the stack 2 is ejected from the blanking device 130, the stack 2 is placed on the transportation plate 702. At this moment, the through hole 2a of the stack 2 overlaps the through hole 702a of the transportation plate 702. Each slot 7 of the stack 2 overlaps the corresponding through hole 702b of the transportation plate 702. Each positioning pin 703 of the transportation plate 702 is engaged with the corresponding depressed groove 6 of the stack 2 (see FIG. 62).

Next, the transportation plate 702 (transportation member 701) loaded with the stack 2 is transported by the upstream transportation rollers 711 to the vicinity of the movement mechanism 720 (see FIG. 62). At this moment, the lower die 210 is positioned on the other end of a pair of rails 723 (first position).

Next, a pair of transfer arms 712 operates to transfer the transportation member 701 to the lower die 210 while the transportation plate 702 is gripped from both sides by a pair of transfer arms 712. Specifically, the transfer arm 712 stacks the transportation member 701 onto the lower die 210 such that the transportation member 701 lowers toward the lower die 210. At this moment, the diameter increaser 250 is inserted into the through hole 702a of the transportation plate 702 and the through hole 2a of the stack 2. Each mold core member 260 is inserted into the corresponding through hole 702b of the transportation plate 702 and the corresponding slot 7 of the stack 2 (see FIG. 65).

Next, the lower die 210 moves on a pair of rails 723 to reach the one end side of a pair of rails 723 (second position). At this moment, the engagement member 724b is engaged with the flange 722c so that the diameter-increasing members 251 increase the diameter. The outer peripheral surface of each diameter-increasing member 251 then abuts on the inner peripheral surface of the through hole 2a to apply the radially outward force thereto.

Figure 66:
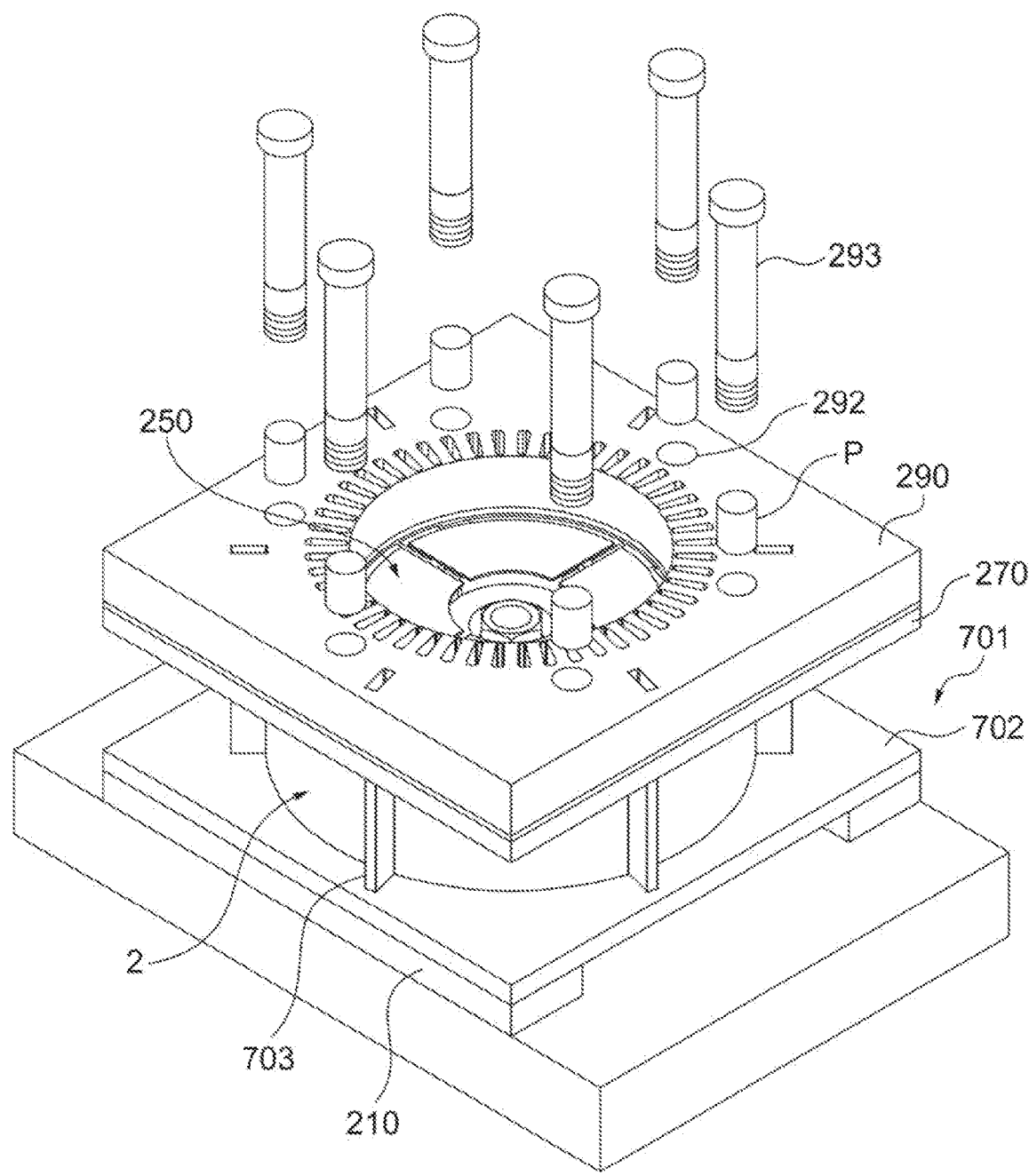
FIG. 66 is a diagram for explaining the step subsequent to FIG. 65.
Figure 67:
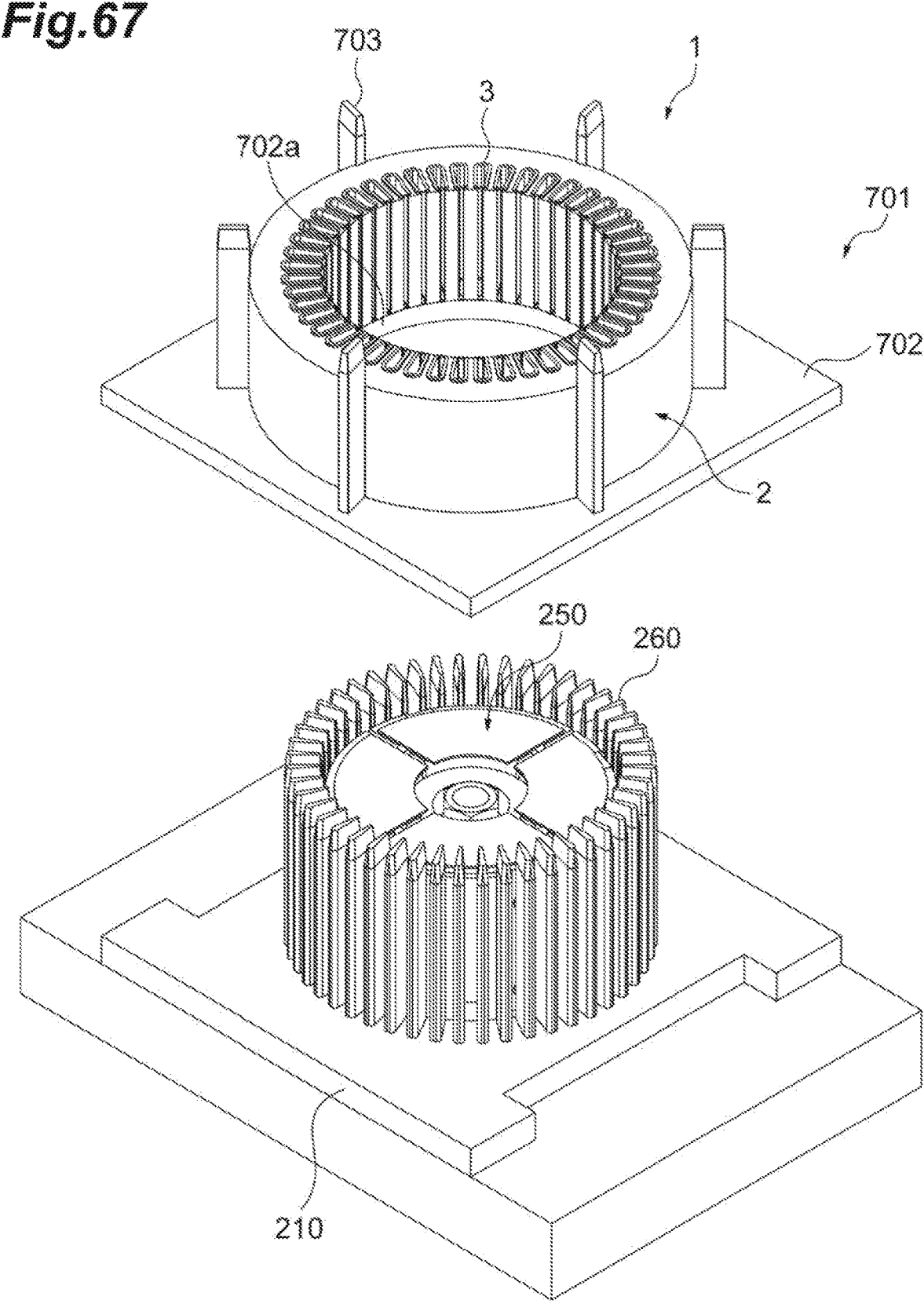
FIG. 67 is a diagram for explaining the step subsequent to FIG. 66.

Next, the plate 270 and the upper die 290 are placed on the stack 2, and the plunger 293 is operated in a state in which one resin pellet P and one plunger 293 are disposed in each through hole 292 of the upper die 290 (see FIG. 66). Then, the resin pellet P in a melted state is pushed out by the plunger 293, and melted resin is charged into the filling space V1 and the auxiliary space V2. Subsequently, melted resin is solidified, whereby the resin portion 3 is formed in the filling space V1 and the auxiliary space V2. The stacked stator core 1 in which the resin portion 3 is provided on the inner wall surface F2 of the slot 7 of the stack 2 is thus completed.

In the resin filling device 700 as described above, a plurality of mold core members 260 can be inserted into the corresponding slots 7 simultaneously and easily only by stacking the transportation member 701 onto the lower die 210.

In the resin filling device 700 as described above, the diameter increaser 250 is disposed in the inside of the stack 2 only by stacking the transportation member 701 onto the lower die 210. With this configuration, the diameter-increaser 250 also can be disposed in the stack 2 easily and quickly.

In the resin filling device 700 described above, the position where the transportation member 701 is stacked onto the lower die 210 (first position) differs from the position where melted resin is charged into the stack 2 (second position). In this configuration, the filling mechanism 730 is disposed in a region different from the region where the transfer arms 712 transfer the transportation member 701 to the lower die 210. Accordingly, the size of the resin filling device 700 can be reduced.

In the resin filling device 700 described above, the position where the transportation member 701 is stacked onto the lower die 210 (first position) and the position where melted resin is charged into the stack 2 (second position) may be the same or in the vicinity to each other. In this case, the resin filling device 700 does not have to include the rails 723 or the movement mechanism 720 itself.

The diameter increaser 250 is not necessarily provided in the lower die 210.

In the resin filling device 700 described above, the transfer arms 712 stack the transportation member 701 onto the lower die 210. However, the lower die 210 may elevate toward the transportation member 701 so that they are stacked on each other. That is, at least one of the transportation member 701 and the lower die 210 moves toward the other so that they are stacked on each other.

Figure 68:
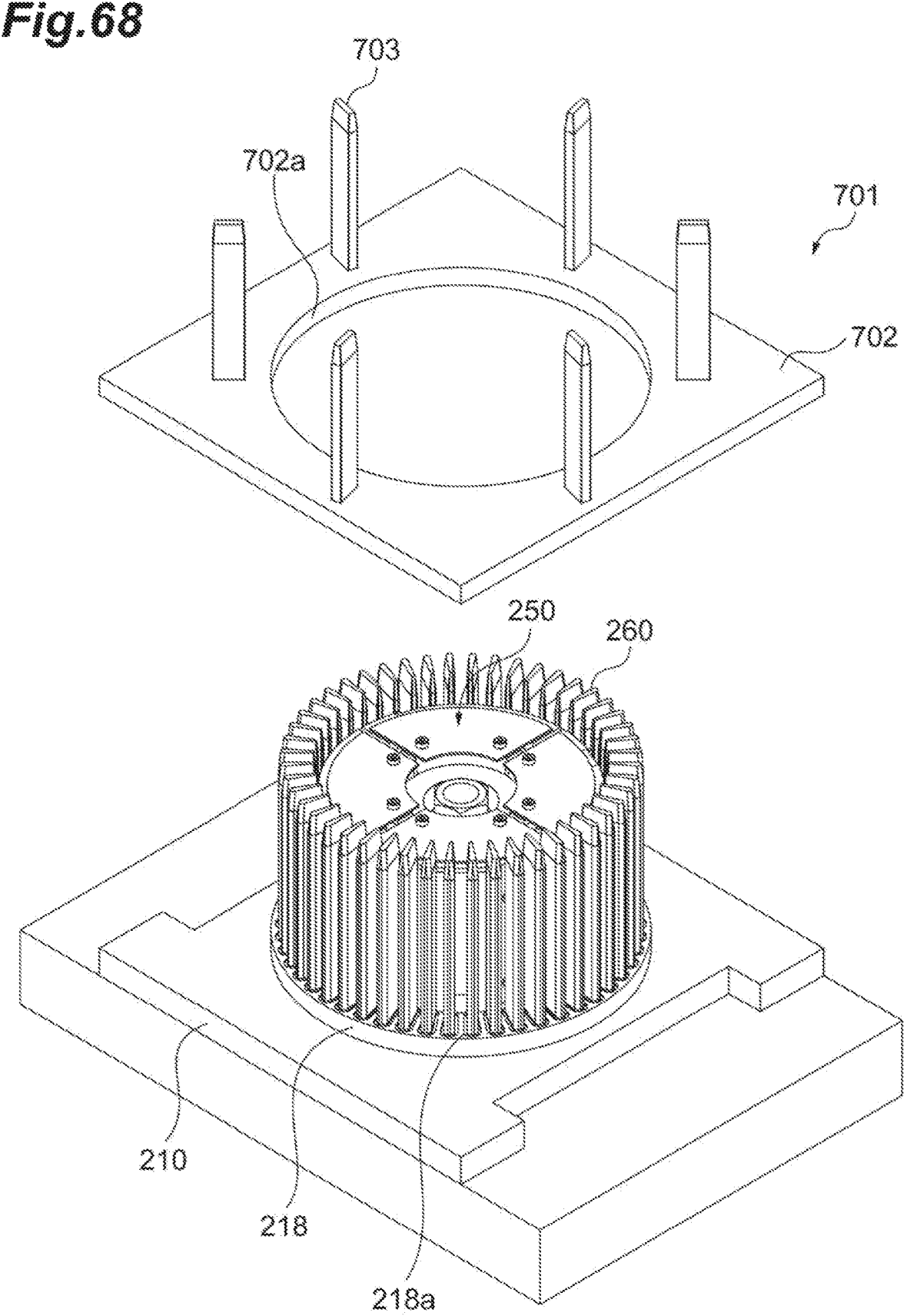
FIG. 68 is a perspective view illustrating another example transportation member and another example lower die.

As illustrated in FIG. 68, the through hole 702b and the depressed groove 702c are not provided in the transportation plate 702, and an auxiliary plate 218 having depressed grooves 218a corresponding to the depressed grooves 702c may be provided in the lower die 210. In this case, when the stack 2 is placed onto the transportation plate 702, the yoke portion 4 is supported in a region of the transportation plate 702 in the vicinity of the through hole 702b, but the tooth portion 5 overlaps the through hole 702b and is not supported by the transportation plate 702. In this case, as illustrated in the figure, when the transportation member 701 is removed from the lower die 210 after the resin portion 3 is formed on the inner wall surface F2 of the slot 7, the state of the formed resin portion 3 can be recognized not only from above but also from the transportation plate 702 side (from below) through the through hole 702b.

Figure 69:
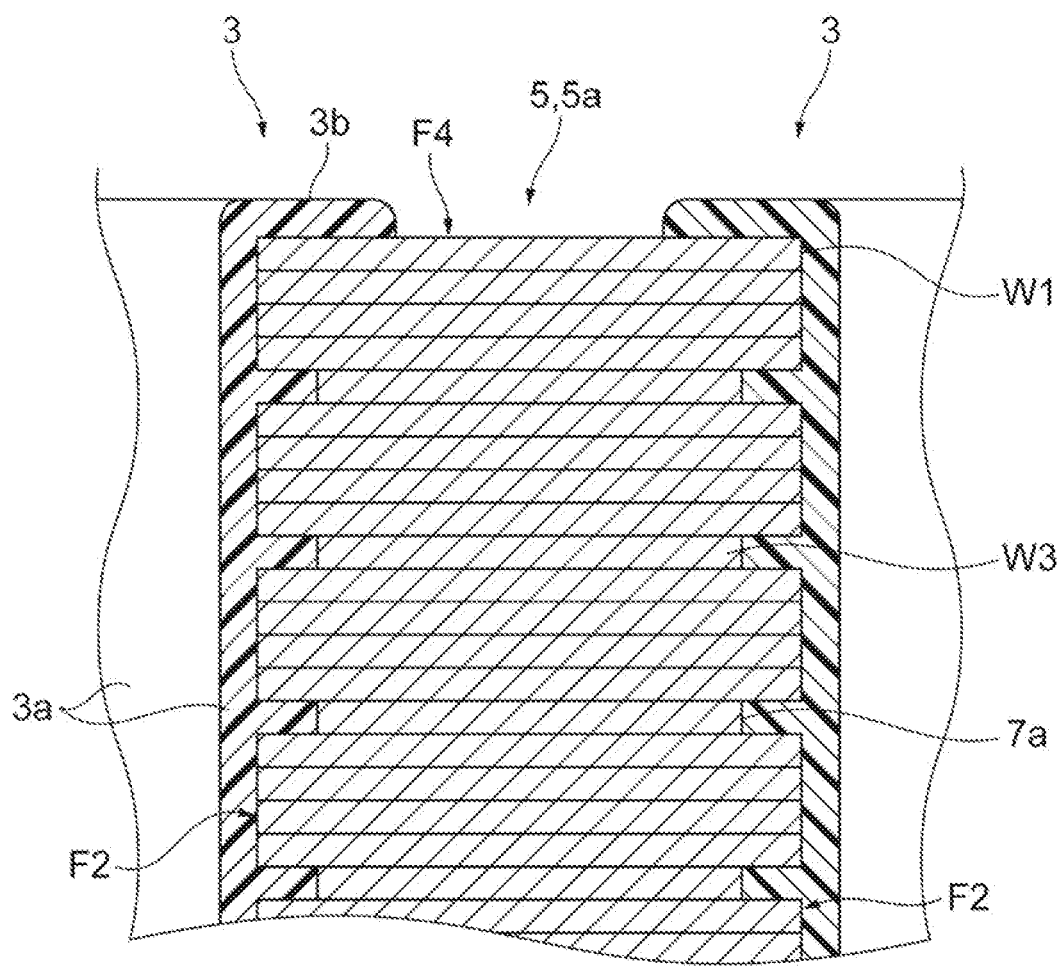
FIG. 69 is a cross-sectional view of the vicinity of the upper end surface of the tooth portion cut in the same manner as in FIG. 4, in another example stacked stator core.

58) The inner wall surface F2 of the slot 7 may be a projecting and depressed surface on which projections and depressions are arranged in the stacking direction. For example, as illustrated in FIG. 69 and FIG. 70, blanked members W3 having a notch 7a at the inner peripheral surface of the slot 7 (the inner peripheral edge of the yoke portion 4 and/or the peripheral edge of the tooth portion 5 that forms the slot 7) and blanked members W1 not having a notch 7a may be stacked together to form a stack 2. In this case, since the resin portion 3 is also provided in the notch 7a, the adherence of the resin portion 3 to the inner peripheral surface F2 of the slot 7 is enhanced. This can suppress separation of the resin portion 3 from the stack 2. As illustrated in FIG. 70(a), the notch 7a may be partially provided on the inner peripheral surface of the slot 7. As illustrated in FIG. 70(b), the notch 7a may be provided over almost the entire inner peripheral surface of the slot 7. In FIG. 70(b), a blanked member W1 is also depicted by a dashed-dotted line in order to facilitate understanding of the stacked state of blanked members W1 and W3.

Figure 71:
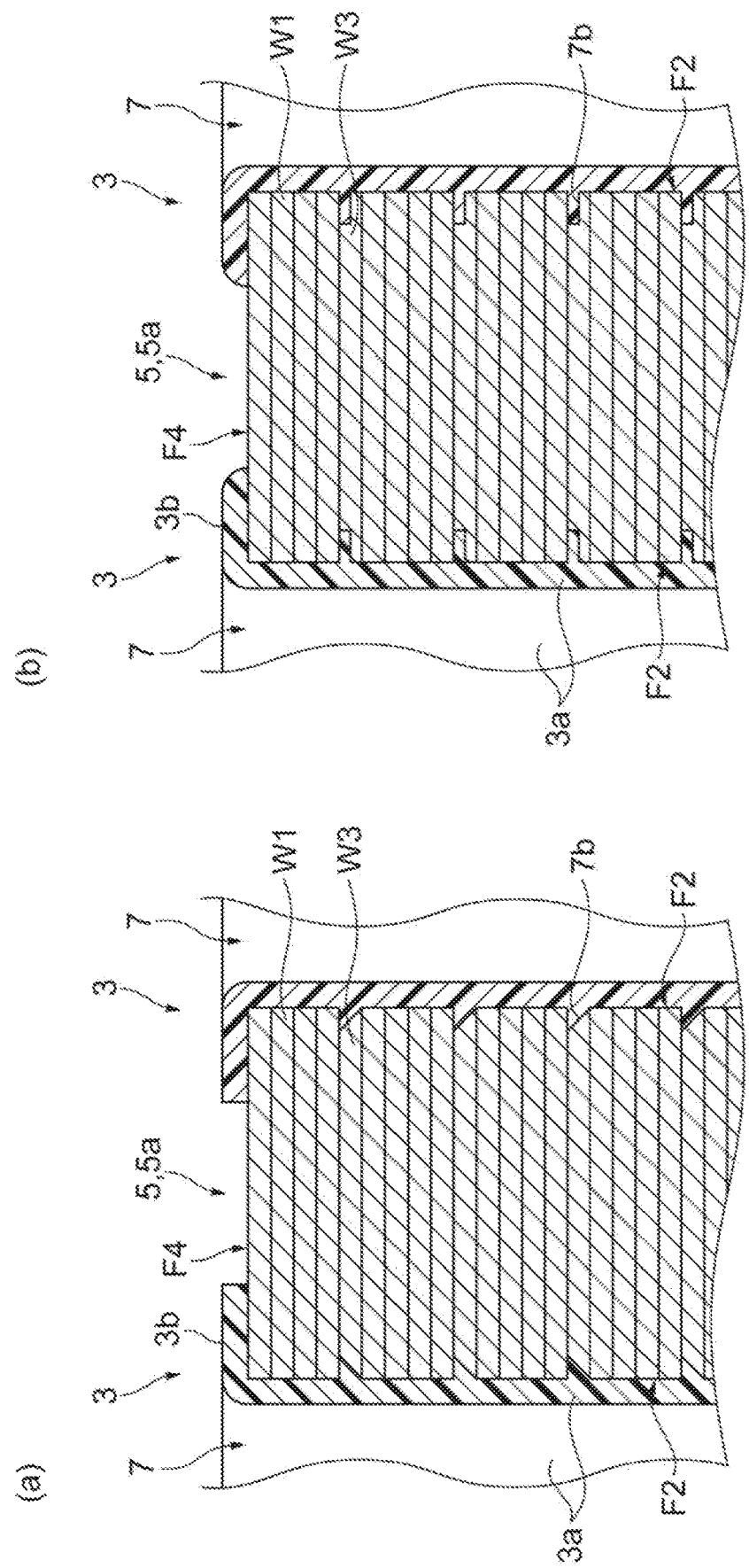
FIG. 71 is a cross-sectional view of the vicinity of the upper end surface of the tooth portion cut in the same manner as in FIG. 4, in another example stacked stator core.

As illustrated in FIG. 71, an odd-shape portion 7b may be provided instead of the notch 7a at the inner peripheral edge of the yoke portion 4 and/or the peripheral edge of the tooth portion 5 that forms the slot 7 in the blanked member W3. Specifically, in the manner illustrated in FIG. 71(a), the odd-shape portion 7b has a triangular shape in cross section. In the manner illustrated in FIG. 71(b), the odd-shape portion 7b has a cross-sectional shape thinner than the other region. These odd-shape portions 7b may be formed, for example, by coining. As illustrated in FIG. 72, the stack 2 may be formed by stacking only the blanked members W3 having the odd-shape portions 7b.

Figure 73:
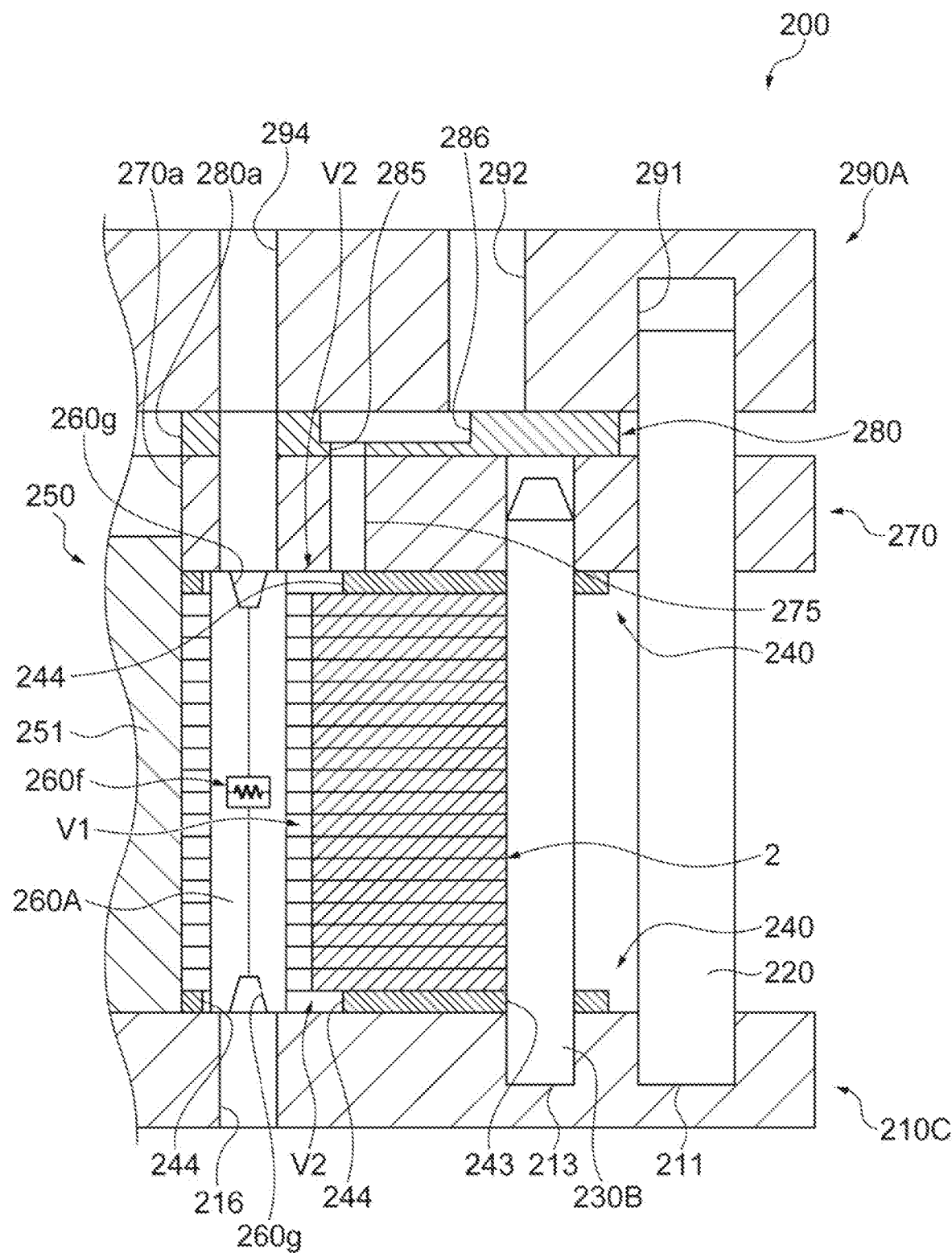
FIG. 73 is a diagram for explaining a process of manufacturing another example stacked stator core, specifically, a cross-sectional view partially illustrating the resin filling device and a stack.

59) A mold core member 260A configured to expand or shrink in the slot 7 may be used. Specifically, as illustrated in FIG. 73, the mold core member 260A may be vertically divided into two parts and these parts may be connected by an elastic member 260f. In this configuration, the parts of the mold core member 260A are biased so as to come closer to each other by the elastic member 260f. The elastic member 260f may be, for example, a compression coil spring. A depression 260g is provided on each of the upper end surface and the lower end surface of the mold core member 260A. The depression 260g has the diameter decreasing toward the bottom wall.

Figure 74:
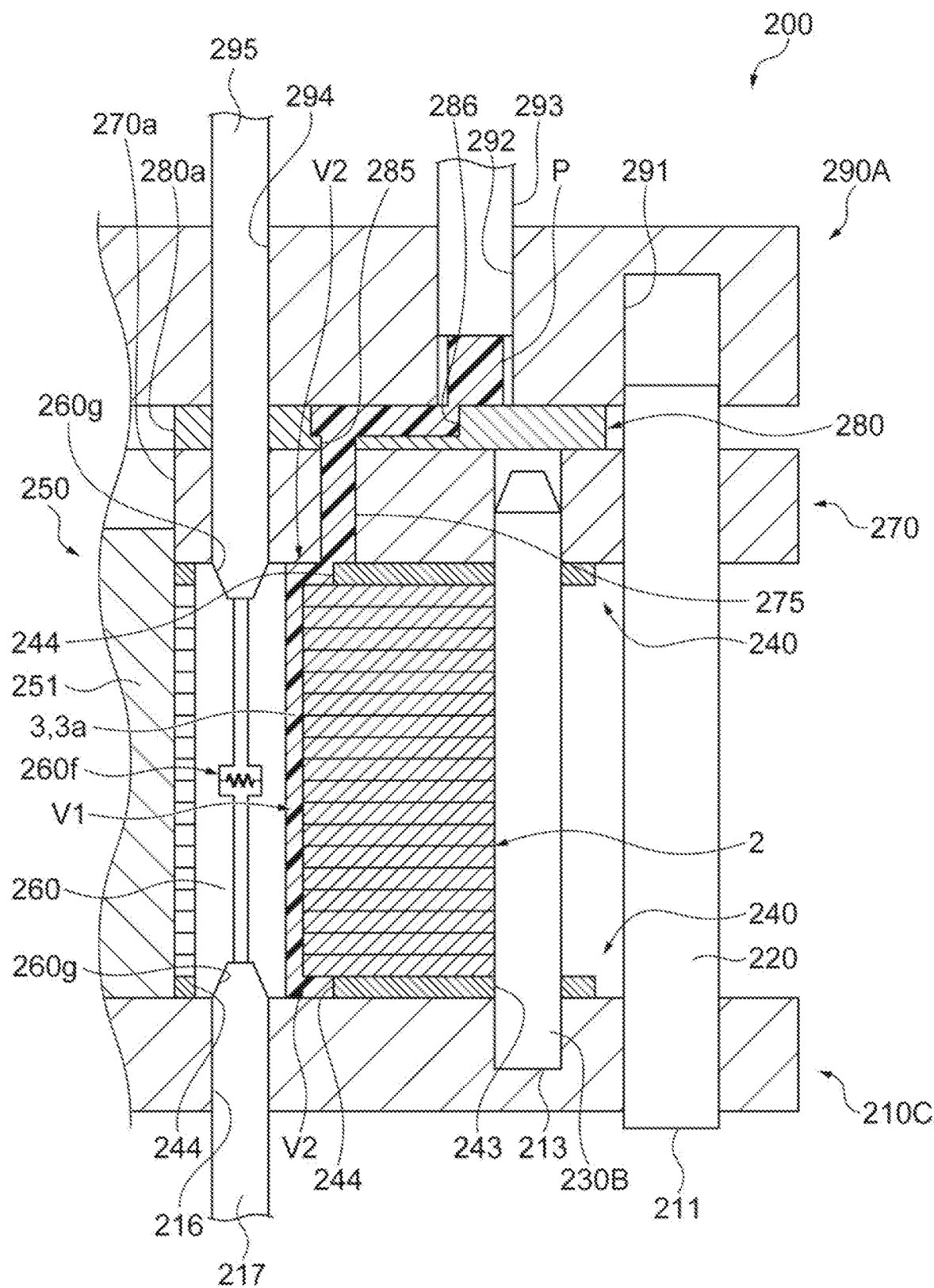
FIG. 74 is a diagram for explaining the step subsequent to FIG. 73, specifically, a cross-sectional view partially illustrating the resin filling device and a stack.
Figure 75:
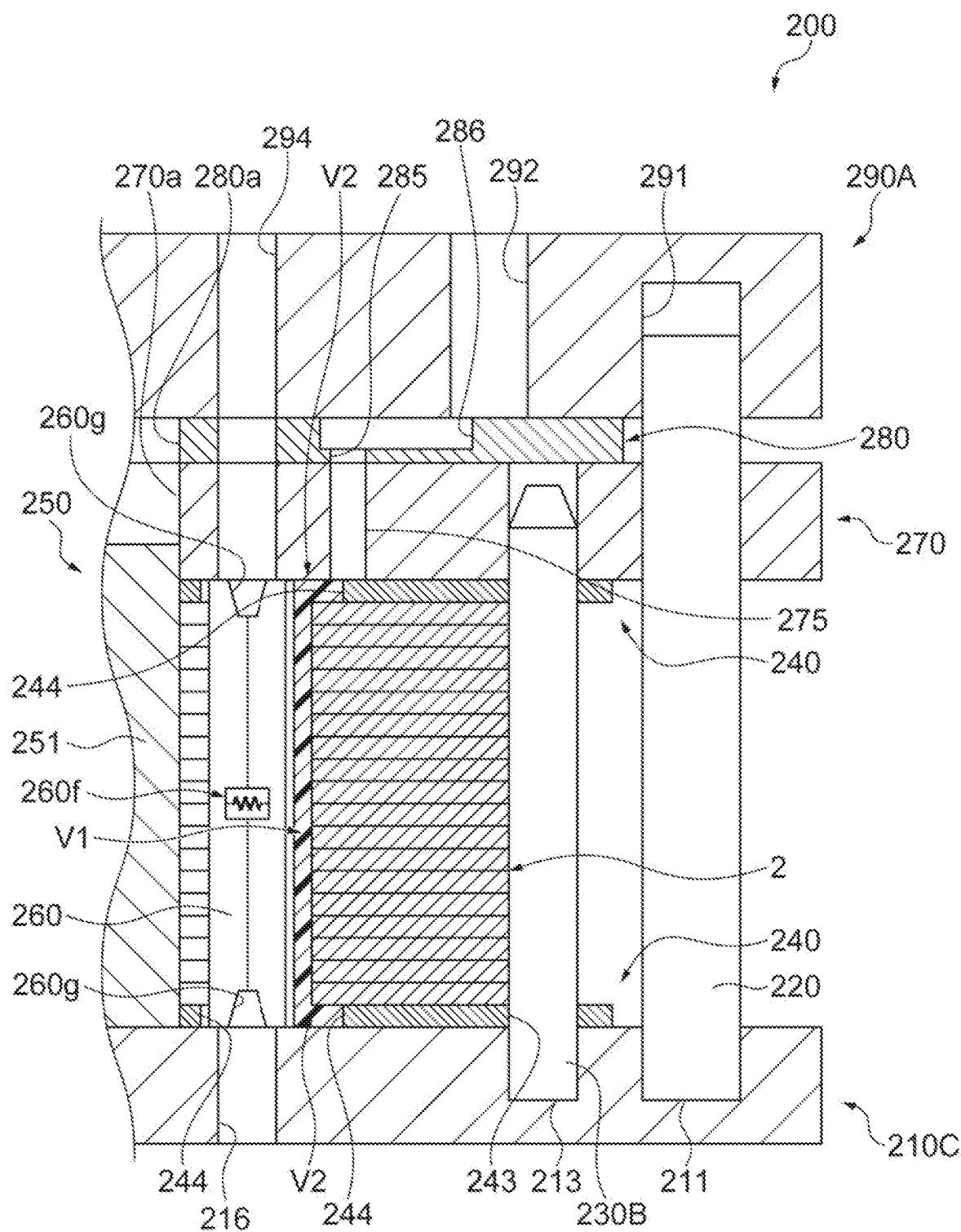
FIG. 75 is a diagram for explaining the step subsequent to FIG. 74, specifically, a cross-sectional view partially illustrating the resin filling device and a stack.

Referring now to FIG. 73 to FIG. 75, the process of forming the resin portion 3 using such a mold core member 260A is described. First of all, as illustrated in FIG. 73, the guide shaft 220, the positioning block 230A, the positioning pin 230B, the plate 240, the diameter increaser 250, the stack 2 with the main portion 3a provided in the slot 7, the plate 240, the mold core member 260A, the plate 270, the plate 280, and an upper die 290A are attached in a predetermined order on a lower die 210C. The mold core member 260A is thus disposed in the slot 7. Here, the lower die 210C differs from the lower die 210 according to the foregoing examples in that the through hole 216 is provided at a position corresponding to the mold core member 260A. The upper die 290A differs from the upper die 290 according to the foregoing examples in that the through hole 294 is provided at a position corresponding to the mold core member 260A.

Next, as illustrated in FIG. 74, the plunger 217 is inserted from the through hole 216, and the plunger 295 is inserted from the through hole 294. The tip end portions of the plungers 217 and 295 has the diameter decreasing toward the tip end. In this configuration, when the tip end portion of the plunger 217 is inserted into the depression 260g in the upper end surface of the mold core member 260A, and the tip end portion of the plunger 293 is inserted into the depression 260g in the lower end surface of the mold core member 260A, the parts of the mold core member 260A come apart from each other against the biasing force by the elastic member 260f. In this state, melted resin is charged into the filling space V1 and the auxiliary space V2.

When melted resin is solidified to form the resin portion 3 in the filling space V1 and the auxiliary space V2, the plungers 217 and 295 are pulled out from the through holes 216 and 294 as illustrated in FIG. 75. The parts of the mold core member 260A are then pulled together by the elastic member 260f. The mold core member 260A thus comes apart from the resin portion 3. Accordingly, the mold core member 260A is easily inserted into/pulled out from the slot 7.

Figure 76:
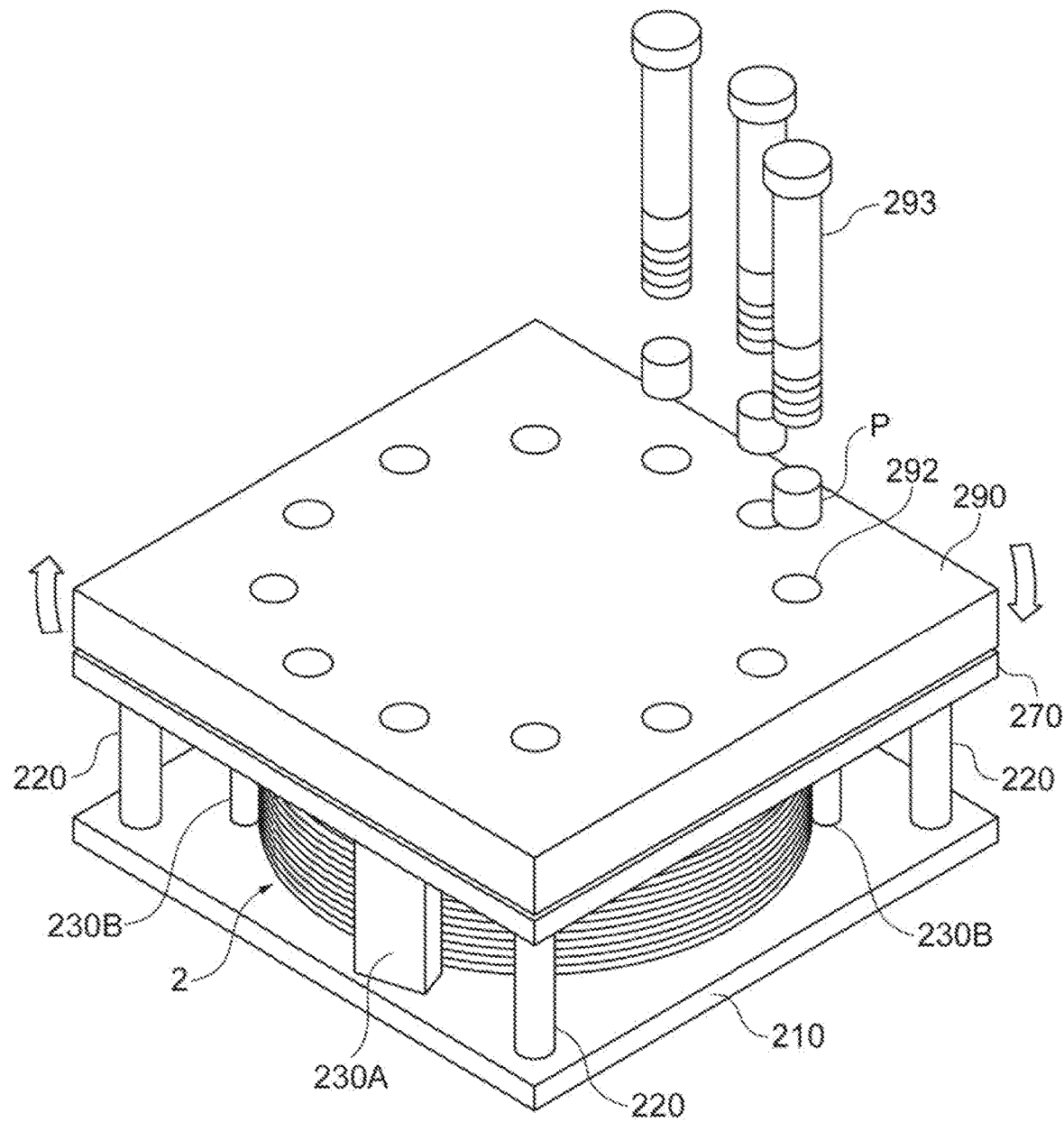
FIG. 76 is a diagram for explaining a process of manufacturing another example stacked stator core, specifically, a perspective view illustrating the resin filling device and a stack.

60) The plurality of through holes 292 in each of which the resin pellet P and the plunger 293 can be disposed is provided in the upper die 290. When melted resin is to be charged into the filling spaces V1 of all of the slots 7 at a time, the size of the resin filling device 200 tends to be increased as a whole. Then, as illustrated in FIG. 76, the resin pellet P and the plunger 293 may be disposed in some of the plurality of through holes 292, and melted resin may be charged into the filling spaces V1 of the corresponding slots 7. Subsequently, turning or moving at least one of the stack 2 side and the plunger 293 side and charging melted resin into the filling spaces V1 of the remaining slots 7 from other through holes 292 may be repeated. In this case, melted resin only has to be charged into the filling spaces V1 in some slots 7, so that the size of the resin filling device 200 can be reduced.

Figure 77:
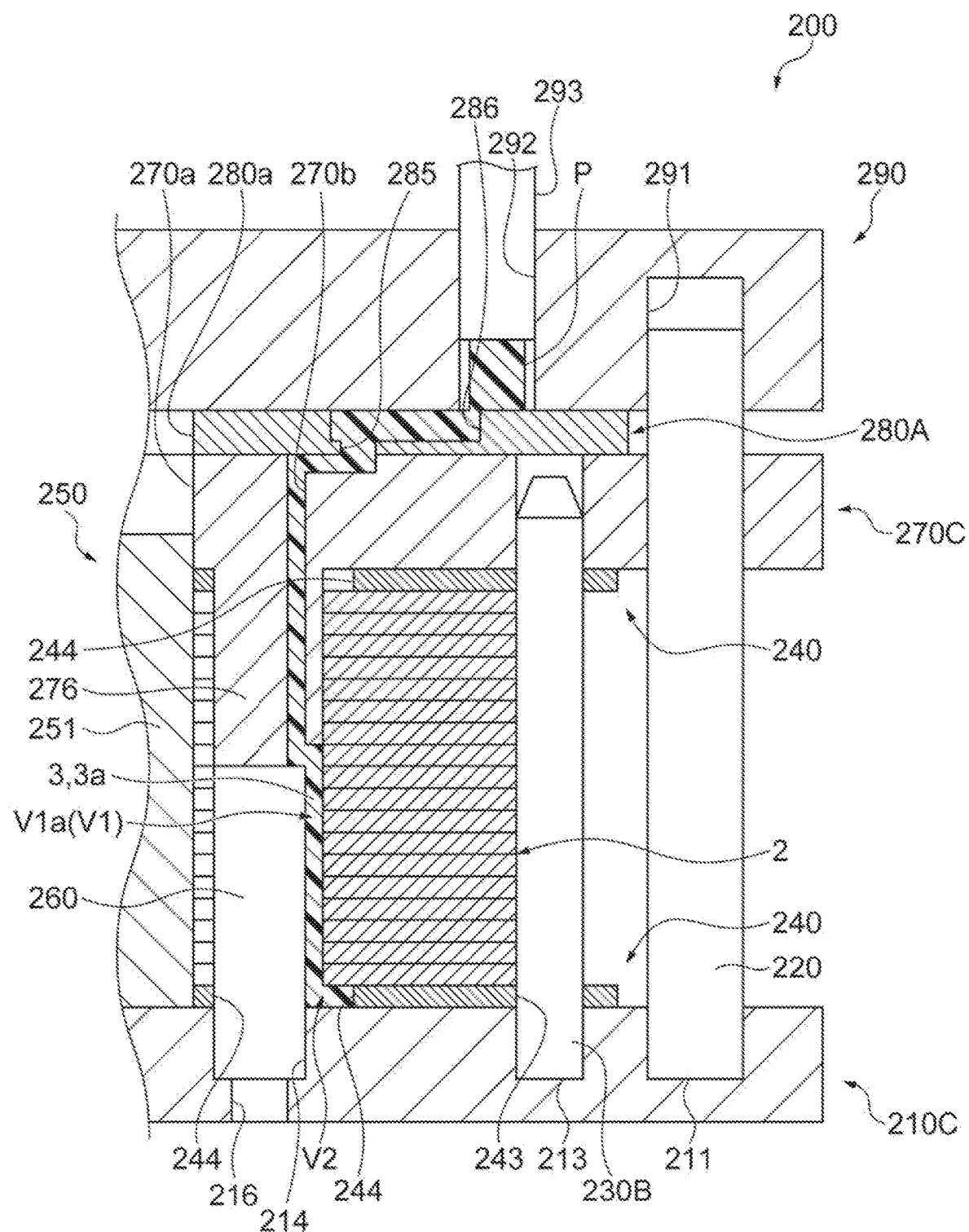
FIG. 77 is a diagram for explaining a process of manufacturing another example stacked stator core, specifically, a cross-sectional view illustrating the resin filling device and a stack.
Figure 78:
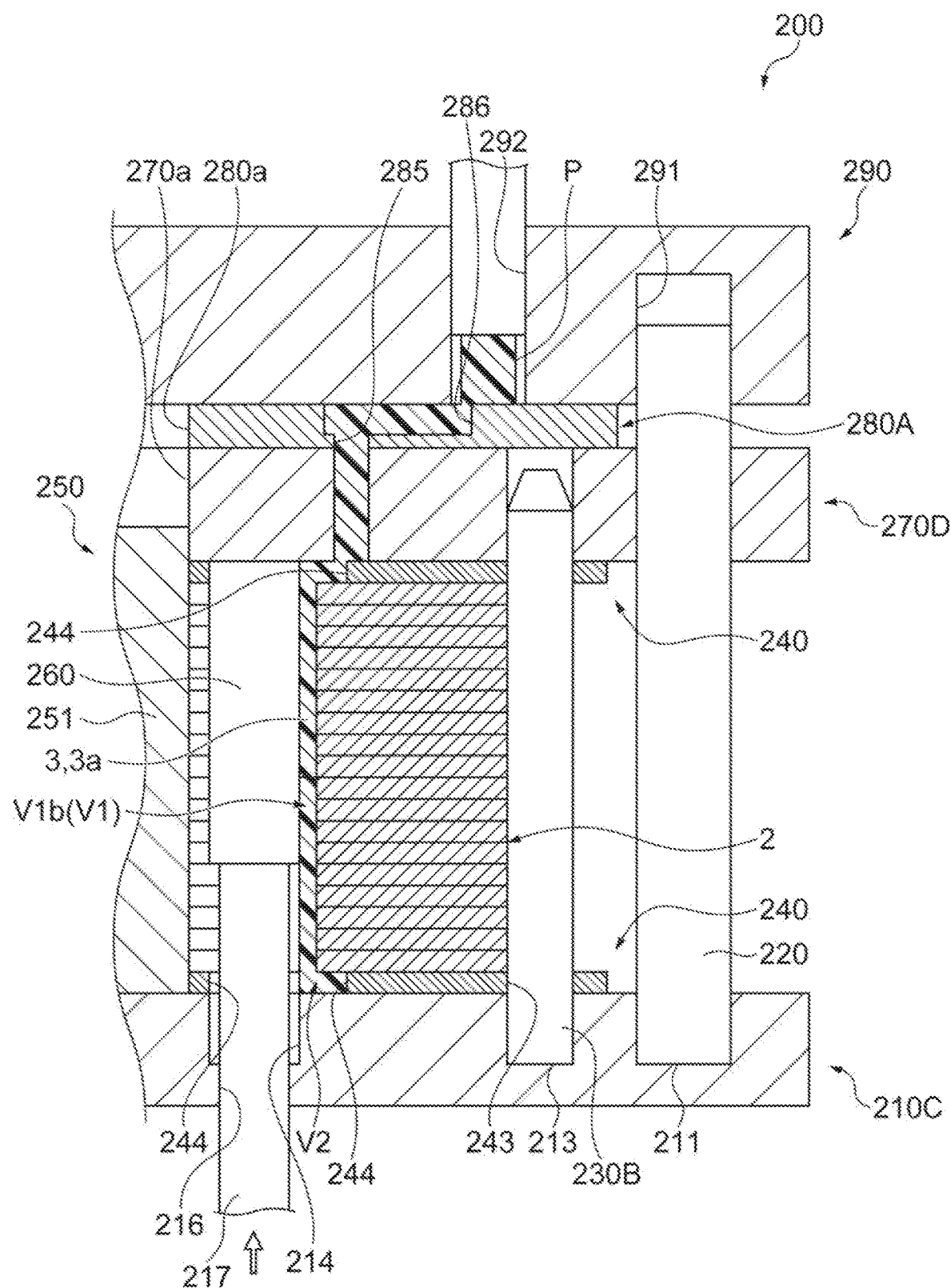
FIG. 78 is a diagram for explaining the step subsequent to FIG. 77, specifically, a cross-sectional view partially illustrating the resin filling device and a stack.

61) As illustrated in FIG. 77, a mold core member 260 smaller than the stacking height of the stack 2 may be used. Referring to FIG. 77 and FIG. 78, the process of forming the resin portion 3 using such a mold core member 260 in this case is described. First of all, as illustrated in FIG. 77, the guide shaft 220, the positioning block 230A, the positioning pin 230B, the plate 240, the diameter increaser 250, the stack 2 with the main portion 3a provided in the slot 7, the plate 240, the mold core member 260, the plate 270C, the plate 280A, and the upper die 290 are attached in a predetermined order on the lower die 210C. The mold core member 260 is thus disposed at the lower portion in the slot 7.

Here, the lower die 210C differs from the lower die 210 according to the foregoing examples in that the through hole 216 is provided at a position corresponding to the mold core member 260. A holding member 276 holding the mold core member 260 may be provided on the lower surface of the plate 270C at a position corresponding to the slot 7. The holding member 276 has a shape corresponding to the slot 7 to hold the mold core member 260 with the lower die 210 in a state in which the mold core member 260 is inserted in the insertion hole 214 of the lower die 210. The lower die 210 and the holding member 276 have a through hole 270b configured to pass through them and communicatively connect the through hole 285 with the filling space V1. Here, the plate 280A differs from the plate 280 according to the foregoing examples in that the through hole 284 is not provided at a position corresponding to the mold core member 260.

Next, one resin pellet P and one plunger 293 are disposed in each of the plurality of through holes 292, and melted resin is charged into a filling space V1a (the lower portion of the filling space V1), which is a space surrounded by the lower die 210, the mold core member 260, the holding member 276, and the slot 7, and the auxiliary space V2 below, through the through holes 285 and 270b.

Next, the plates 270C and 280A and the upper die 290 are removed from the stack 2, and instead of these, the plates 270D and 270A and the upper die 290 are attached to the stack 2 as illustrated in FIG. 78. Next, the plunger 217 is inserted from the through hole 216, and the mold core member 260 is pushed up until the upper end of the mold core member 260 comes into abutment with the plate 270D. In this state, one resin pellet P and one plunger 293 are disposed in each of the plurality of through holes 292 again, and melted resin is charged into a filling space V1b (the upper portion of the filling space V1), which is a space surrounded by the resin portion 3 already formed in the lower portion of the slot 7, the plate 270D, the mold core member 260, and the slot 7, and the auxiliary space V2 above, through the through holes 285 and 270b. The stacked stator core 1 in which the resin portion 3 is provided on the inner wall surface F2 of the slot 7 of the stack 2 is thus completed.

According to the above, melted resin is partially charged in the filling spaces V1a and V1b in the stacking direction. In this configuration, the filling property of melted resin in the filling space V1 can be enhanced compared with when melted resin is charged into the filling space V1 at a time. In the foregoing description, the charging of melted resin into the filling space V1 is performed twice. However, the charging of melted resin into the filling space V1 may be performed three or more times. When the charging of melted resin into the filling space V1 is performed multiple times, melted resin charged into one filling space V1 may be of the same kind or may be of different kinds.

Figure 79:
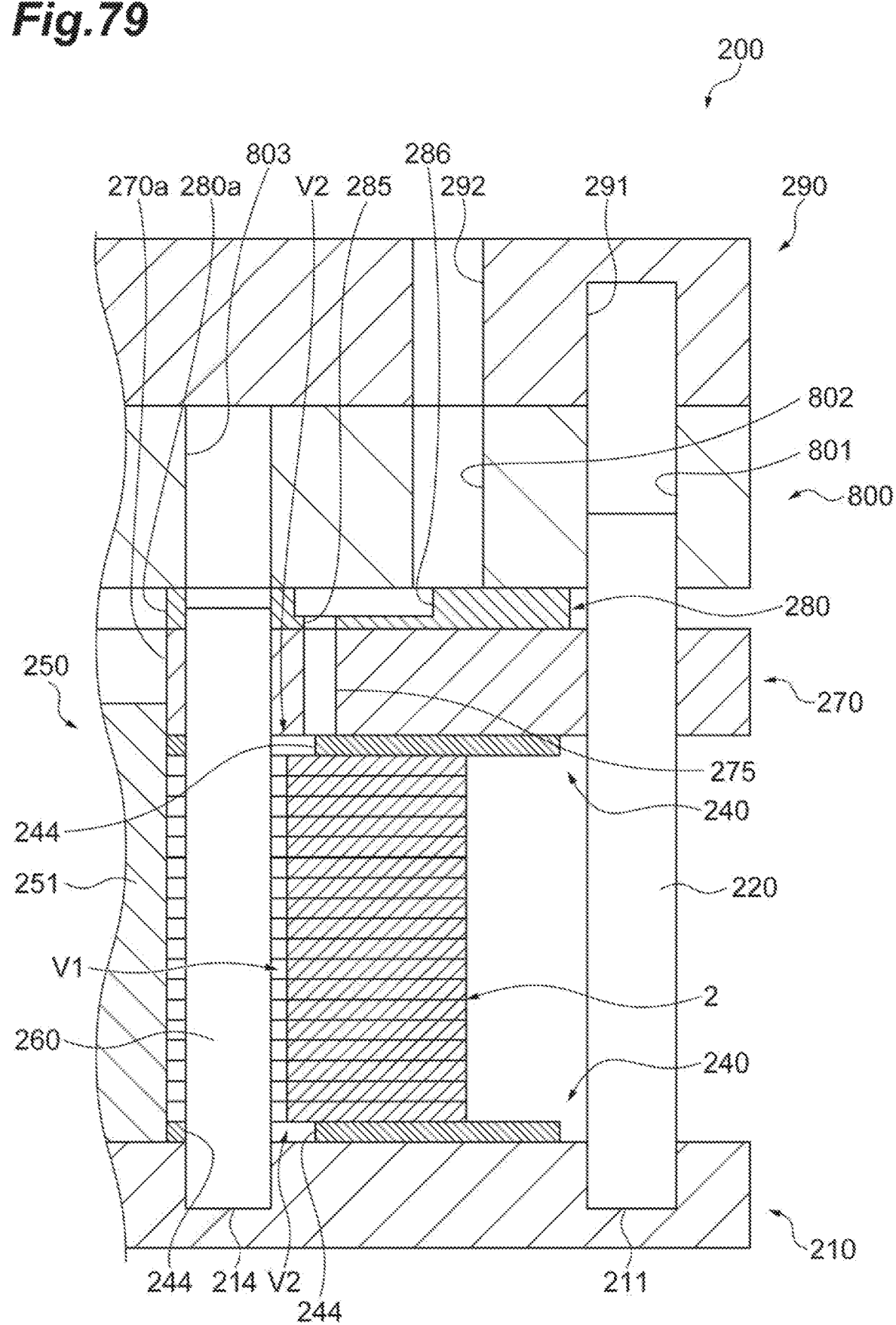
FIG. 79 is a diagram for explaining a process of manufacturing another example stacked stator core, specifically, a cross-sectional view illustrating the resin filling device and a stack.
Figure 80:
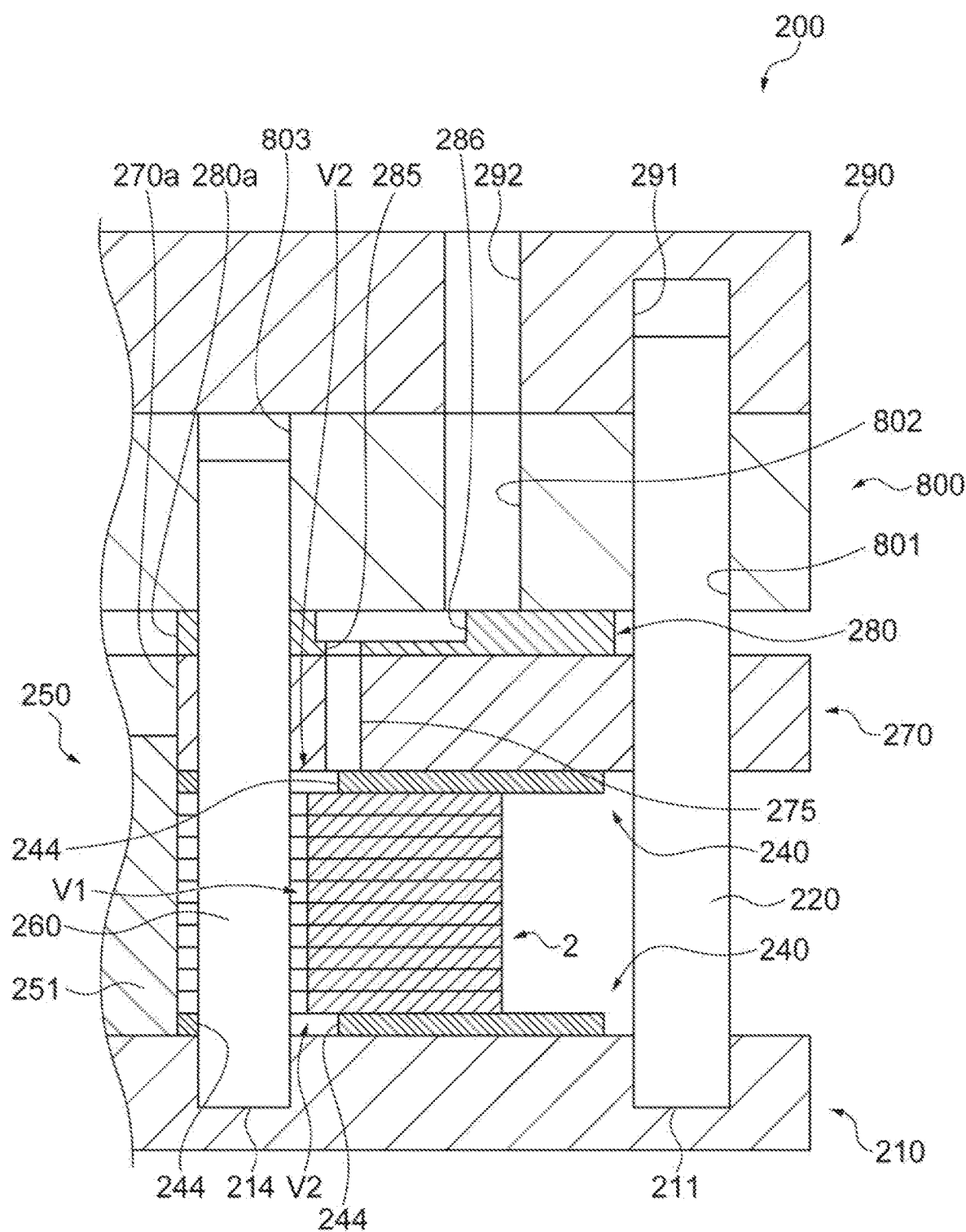
FIG. 80 is a diagram for explaining a process of manufacturing another example stacked stator core, specifically, a cross-sectional view illustrating the resin filling device and a stack.

62) As illustrated in FIG. 79 and FIG. 80, an intermediate plate 800 may be interposed between the plate 270 and the upper die 290. Specifically, the intermediate plate 800 has a plurality of through holes 801, a plurality of through holes 802, and a plurality of through holes 803. The through hole 801 is provided at a position corresponding to the insertion hole 291 of the upper die 290. The through hole 802 is provided at a position corresponding to the insertion hole 292 of the upper die 290. The through hole 803 is provided at a position corresponding to the mold core member 260. Accordingly, as illustrated in FIG. 79, when a stack 2 with a relatively large stacking height is installed in the resin filling device 200, the upper end of the guide shaft 220 is positioned in the through hole 801 of the intermediate plate 800, and the upper end of the mold core member 260 is positioned in the through hole 285 of the plate 280. On the other hand, as illustrated in FIG. 80, when a stack 2 with a relatively small stacking height is installed in the resin filling device 200, the upper end of the guide shaft 220 is positioned in the insertion hole 291 of the upper die 290, and the upper end of the mold core member 260 is positioned in the through hole 803 of the intermediate plate 800.

As described above, the through holes 801 and 803 of the intermediate plate 800 function as escape portions through which the guide shaft 220 and the mold core member 260 can pass, respectively. In this case, stacks 2 having different stacking heights can be handled by one resin filling device. In FIG. 79 and FIG. 80, the positioning pin 230B as well as the insertion hole 213 and the through holes 243 and 273 receiving the positioning pin 230B are not illustrated. Instead of the intermediate plate 800 illustrated in FIG. 79 and FIG. 80, the thickness of the plate 270, 280 or the upper die 290 may be increased, and an escape portion (for example, insertion hole, through hole) through which the guide shaft 220 or the mold core member 260 can pass may be provided in the plate 270, 280 or the upper die 290.

63) A resin injection channel FP extending in the stacking direction may be provided between the outer peripheral surface of the mold core member 260 and the inner wall surface F2 of the slot 7. The channel resistance to melted resin of the resin injection channel FP is set to be smaller than that of the filling space V1. In this case, melted resin flows from the resin injection channel FP to the filling space V in the increasing order of channel resistance. That is, melted resin fills in the resin injection channel FP extending in the stacking direction and then fills in the filling space V1 in the direction crossing the stacking direction from the resin injection channel FP toward the filling space V1. In this configuration, the entire filling space V1 can be filled with melted resin more effectively, compared with when there is no resin injection channel FP. The resin injection channel FP may extend from one end surface to the other end surface of the stack 2.

Figure 81:
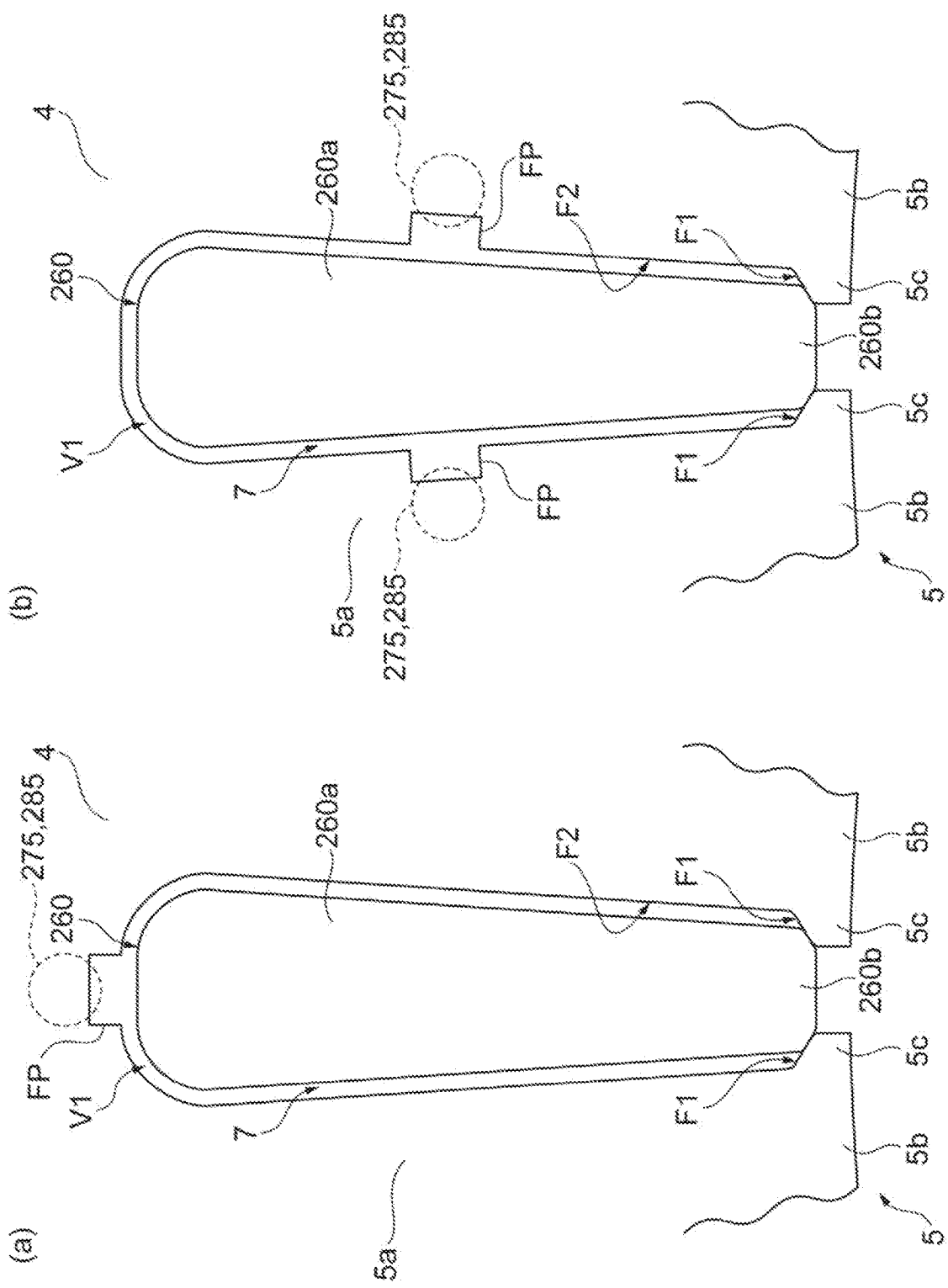
FIG. 81 is a diagram for explaining a process of manufacturing another example stacked stator core, specifically, a top view of the vicinity of one slot in which a mold core member is inserted, with the upper overflow plate removed.
Figure 82:
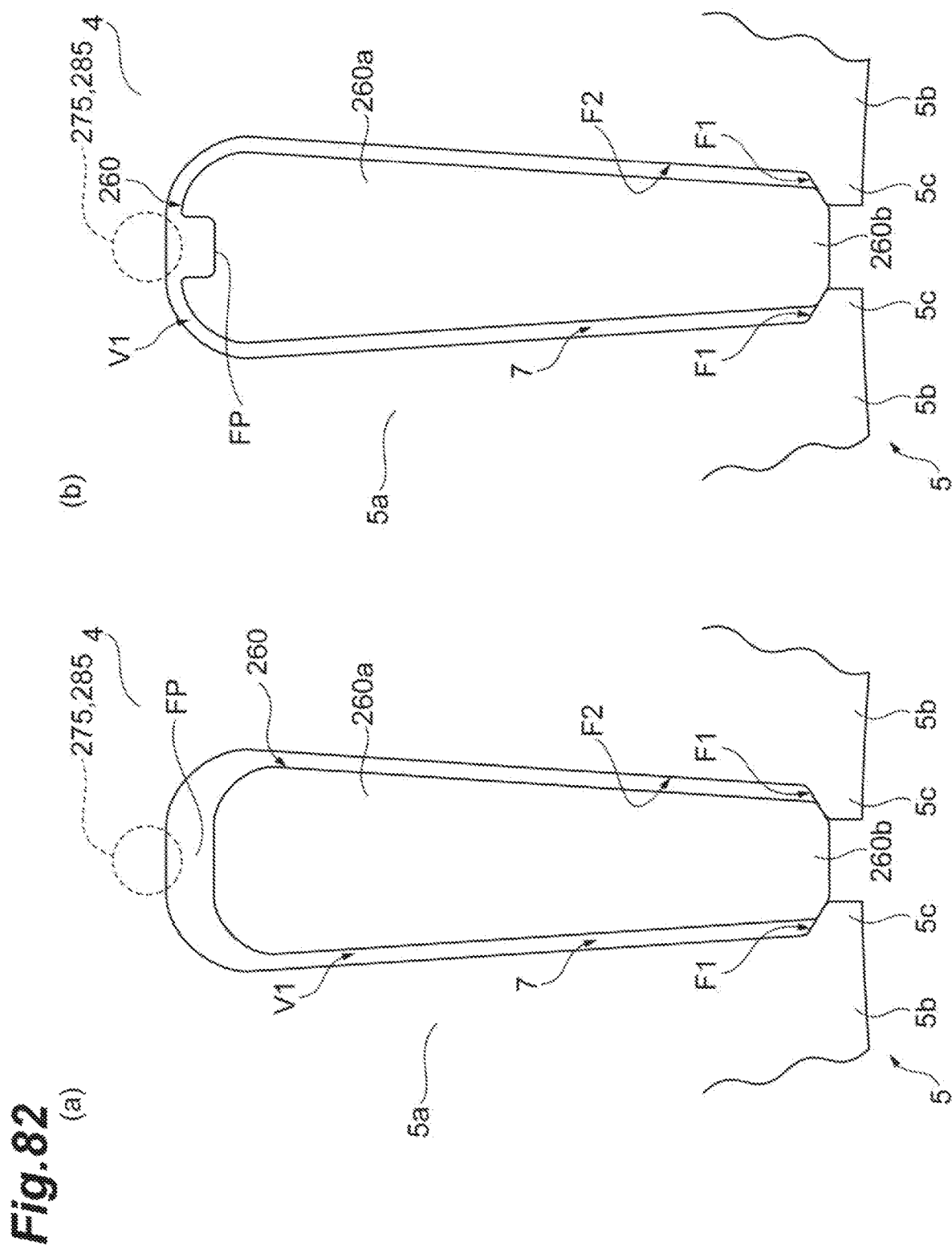
FIG. 82 is a diagram for explaining a process of manufacturing another example stacked stator core, specifically, a top view of the vicinity of one slot in which a mold core member is inserted, with the upper overflow plate removed.

For example, as illustrated in FIG. 81(a), the resin injection channel FP may be a depressed groove provided on the inner peripheral surface of the yoke portion 4 in the inner wall surface F2 of the slot 7. For example, as illustrated in FIG. 81(b), the resin injection channel FP may be a depressed groove provided on the side surface of the tooth portion 5 in the inner wall surface F2 of the slot 7. As illustrated in FIG. 82(a), the resin injection channel FP may be, for example, a space provided between the inner wall surface F2 of the slot 7 and the mold core member 260. As illustrated in FIG. 82(b), the resin injection channel FP may be, for example, a depressed groove provided on the outer peripheral surface of the mold core member 260. The number and the shape of resin injection channels FP are not limited. In FIG. 81 and FIG. 82, when the distance between the outer peripheral surface of the mold core member 260 and the inner wall surface F2 of the slot 7 is, for example, approximately 0.3 mm to 0.5 mm, the width of the resin injection channel FP may be, for example, approximately 0.7 mm to 0.9 mm.

Figure 83:
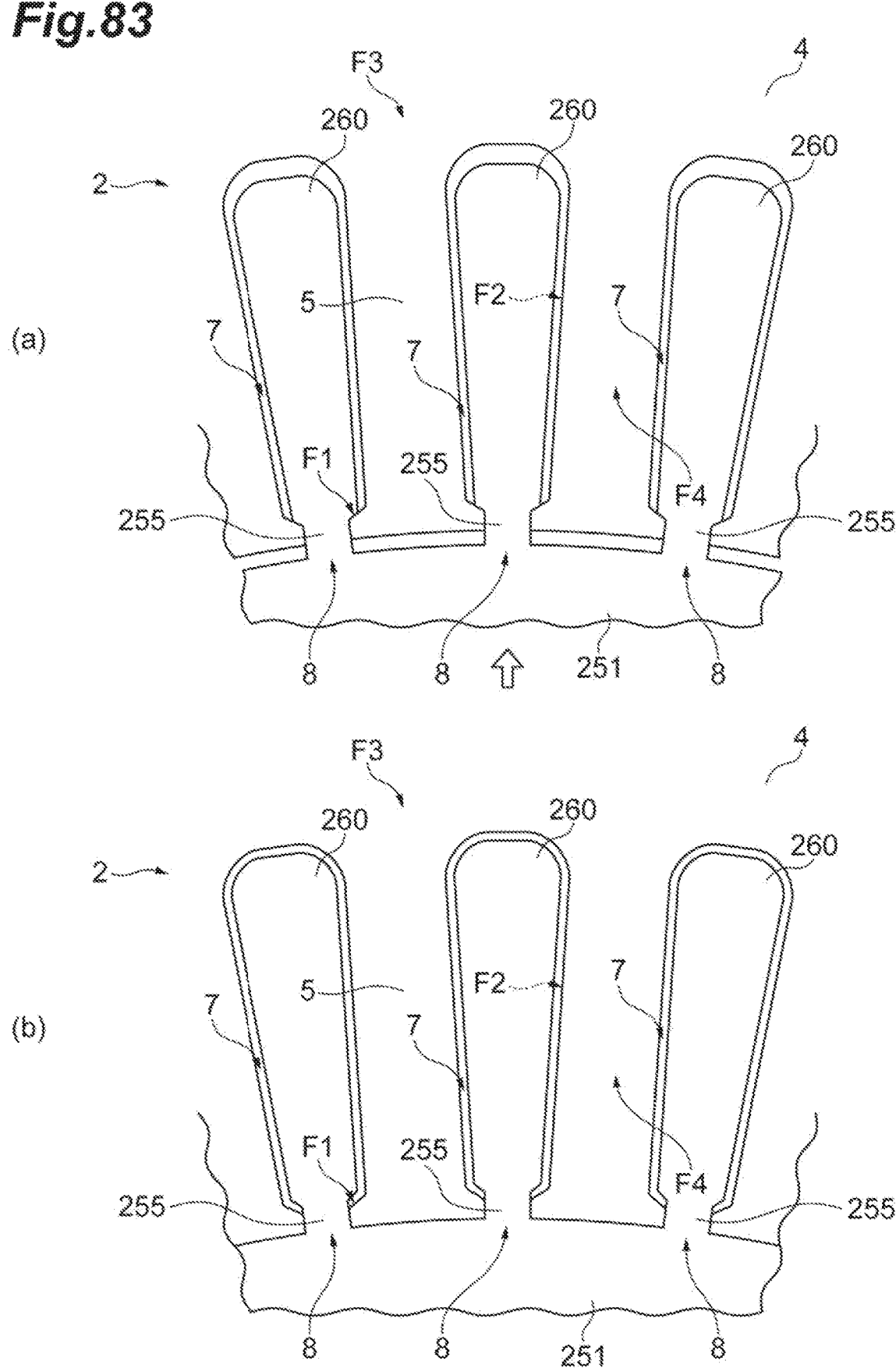
FIG. 83 is a diagram for explaining a process of manufacturing another example stacked stator core, specifically, a top view for explaining a state in which openings are closed by a closing member.

64) As illustrated in FIG. 83, the diameter increasing member 251 and the mold core member 260 may be integrated. In this case, a coupling portion 255 that integrally couples the diameter-increasing member 251 and the mold core member 260 has a width equivalent to the opening 8 of the slot 7 and closes the opening 8. When the stack 2 is attached to the resin filling device 200, as illustrated in FIG. 83(a), each mold core member 260 is inserted into the corresponding slot 7 and the coupling portion 255 is disposed in the opening 8 in a state in which the diameter-increasing members 251 as a whole come closer to the center of the lower die 210. Next, as illustrated in FIG. 83(b), with the opening 8 kept closed by the coupling portion 255, the diameter-increasing member 251 moves outward in the radial direction of the stack 2, and the outer peripheral surface of the diameter-increasing member 251 comes into abutment with the inner peripheral surface of the through hole 2a of the stack 2.

Figure 84:
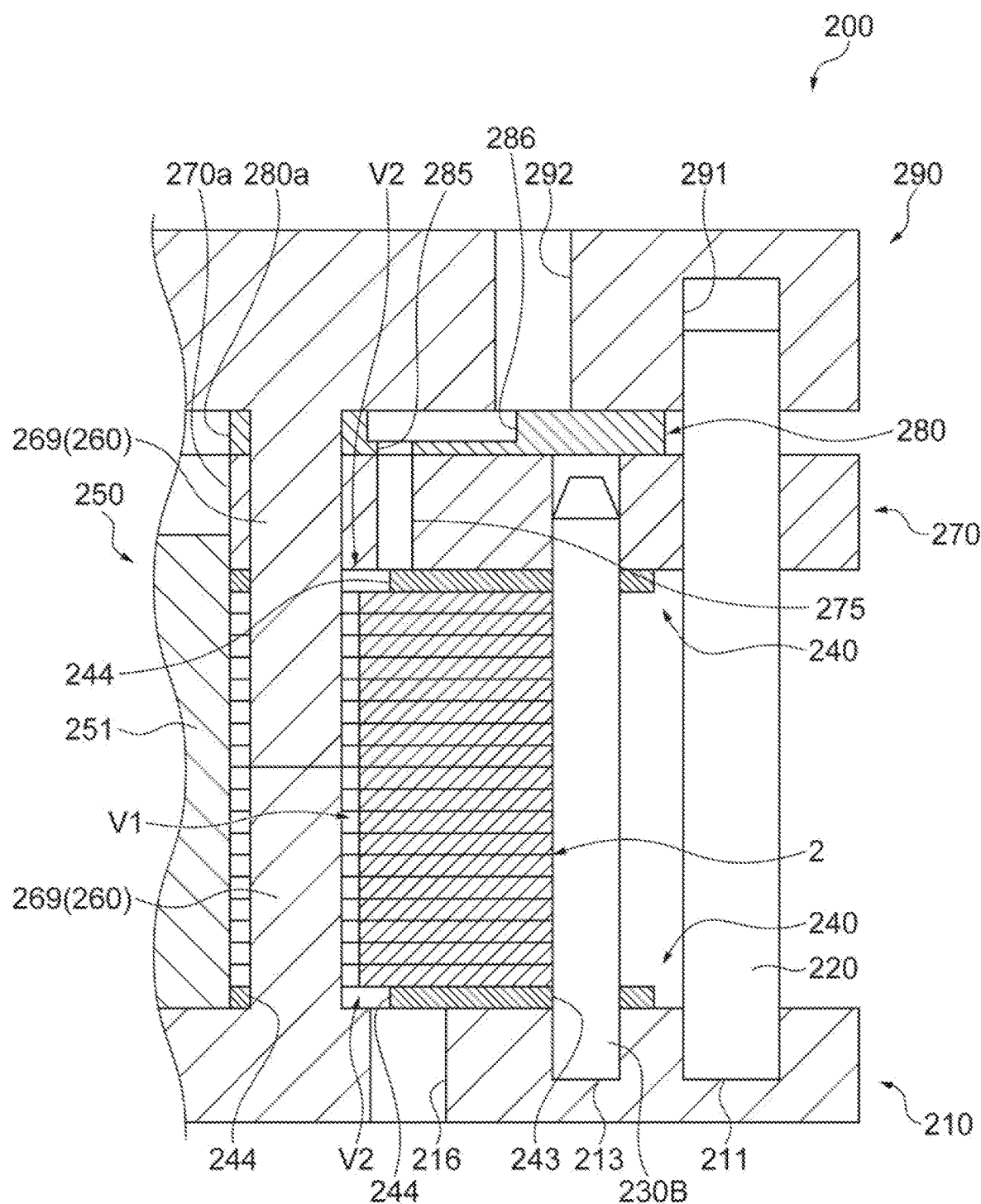
FIG. 84 is a diagram for explaining a process of manufacturing another example stacked stator core, specifically, a cross-sectional view partially illustrating the resin filling device and a stack.

65) The mold core member 260 may be integrated with a member of the resin filling device 200 that holds the stack 2 (in the foregoing examples, for example, the lower die 210, the plates 240, 270, 280, or the upper die 290). For example, as illustrated in FIG. 84, the mold core member 260 may be divided into two parts 269, one of the parts 269 may be integrated with the lower die 210, and the other part 269 may be integrated with the upper die 290. In this configuration, when the stack 2 is installed in the resin filling device 200, the part 269 integrated with the lower die 210 and the part 269 integrated with the upper die 290 abut on each other in the slot 7 to constitute the mold core member 260.

66) Although not illustrated in the figures, the diameter-increasing member 251, the mold core member 260, and the member of the resin filling device 200 that holds the stack 2 may be integrated.

67) Although not illustrated in the figures, a portion of the auxiliary space V2 that faces the end surface F3 of the yoke portion 4 may be higher than the remaining portion of the auxiliary space V2 that faces the end surface F3 of the yoke portion 4 and extend along the circumferential direction. In this case, when melted resin is charged into the auxiliary space V2, a resin wall portion with a larger height and extending in the circumferential direction is formed corresponding to the portion of the auxiliary space V2 on the end surface F3 of the yoke portion 4. When a winding coil is wound around a set of some of the tooth portions 5 (this is called distributed winding), the winding coil exiting from one slot 7 extends toward the yoke portion 4, creeps on the yoke portion 4, and then extends toward another slot 7 not adjacent to the one slot 7. In this case, when the resin wall portion is formed on the end surface F3 of the yoke portion 4 as described above, the resin wall portion can be used as a guide for the winding coil in the distributed winding. Accordingly, the winding coil can be effectively attached to the stacked stator core 1. The resin wall portion may be annular on the end surface F3 or may not extend continuously in the circumferential direction (may have an arc shape).

Figure 85:
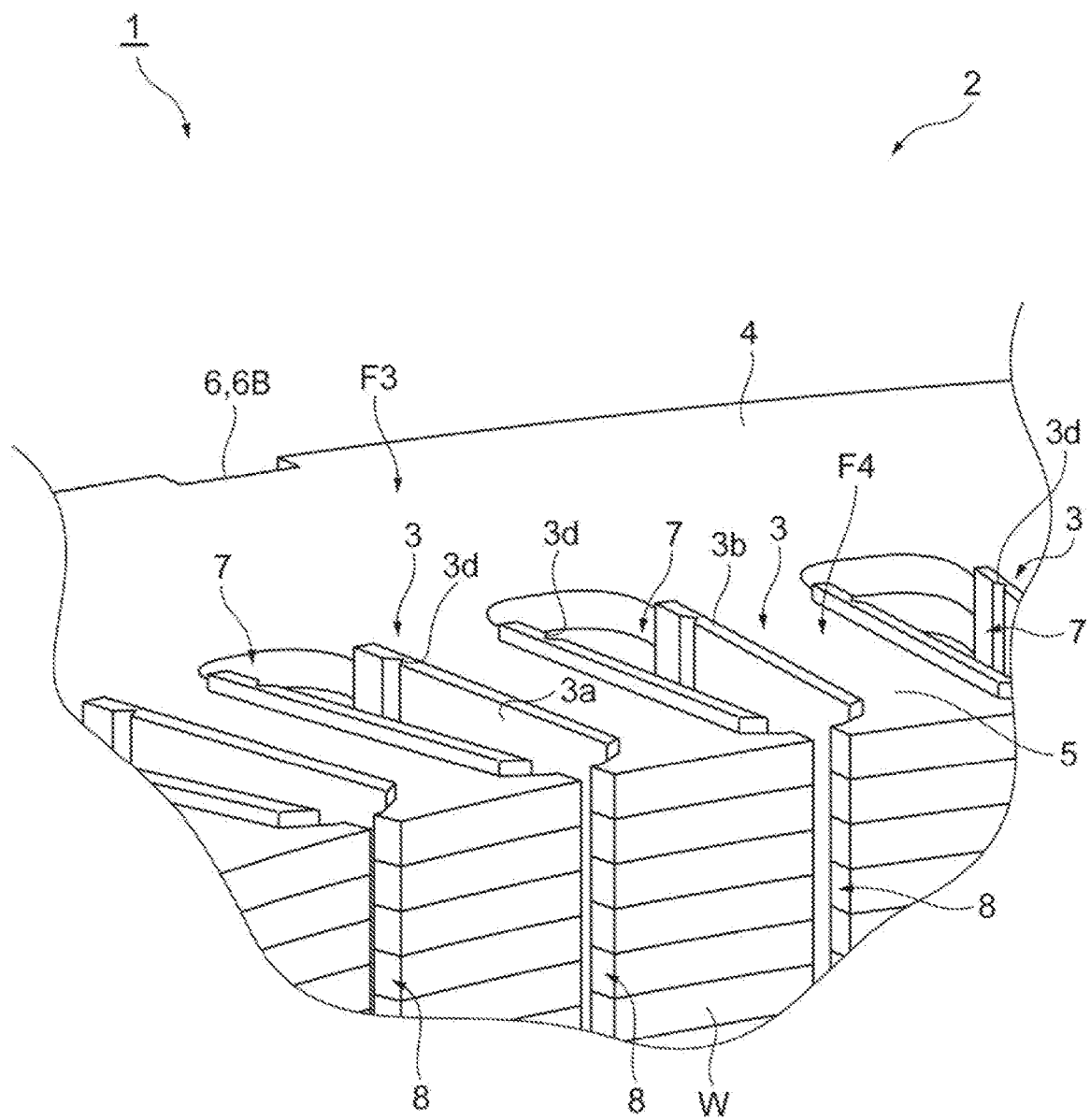
FIG. 85 is a partially enlarged perspective view of the vicinity of tooth portions of another example stacked stator core.

As illustrated in FIG. 85, the resin portion 3 may have a pair of notch grooves 3d facing each other in the slot 7 and extending in the stacking direction. In this case, an insulating member such as insulating paper can be attached to a pair of notch grooves 3d. In this configuration, as illustrated in FIG. 85, the resin portion 3 is not necessarily provided on the inner peripheral surface of the yoke portion 4, of the inner wall surface F2 of the slot 7.

68) When melted resin is charged into the filling space V1, melted resin with a low flowability may be charged into the filling space V1 on the tip end side of the tooth portion 5, and melted resin with a high flowability may be charged into the filling space V1 on the base end side of the tooth portion 5. In this case, leakage of melted resin from the opening 8 of the slot 7 can be suppressed, and the filling property of melted resin into the filling space V1 can be enhanced on the base end side of the tooth portion 5.

Figure 86:
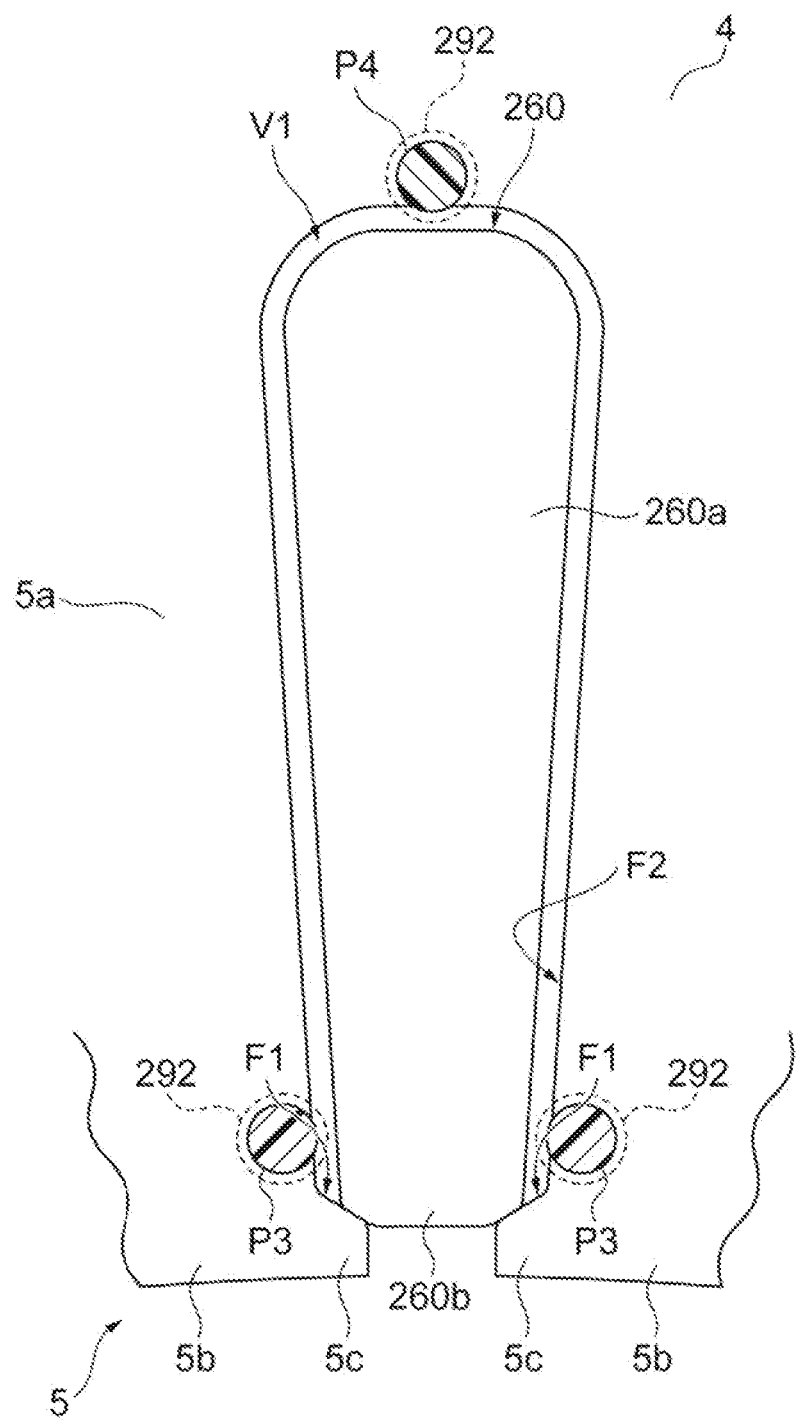
FIG. 86 is a diagram for explaining a process of manufacturing another example stacked stator core, specifically, a top view of the vicinity of one slot in which a mold core member is inserted, with the upper overflow plate removed.

For example, as illustrated in FIG. 86, in a state in which a resin pellet P3 heated to a relatively low temperature is disposed in the through hole 292 provided on the tip end side of the tooth portion 5 while a resin pellet P4 heated to a relatively high temperature is disposed in the through hole 292 provided on the base end side of the tooth portion 5, these resin pellets P3 and P4 may be melted and pushed out by the plungers 293 into the filling space V1. When the resin is heated to a relatively low temperature, the reaction relatively less proceeds, so that the flowability is low (the viscosity is high) and the curing speed is slow. On the other hand, when the resin is heated to a relatively high temperature, the reaction relatively well proceeds, so that the flowability is high (viscosity is low) and the curing speed is fast. In this configuration, melted resin in a low flowability state can be charged into the filling space V1 on the tip end side of the tooth portion 5, while melted resin in a high flowability state can be charged into the filling space V1 on the base end side of the tooth portion 5. The temperature difference between the resin pellet P3 at a relatively low temperature and the resin pellet P4 at a relatively high temperature may be approximately 20° C. The heating temperature of the resin pellet P3 may be approximately, for example, 40° C. to 60° C., and the heating temperature of the resin pellet P4 may be approximately, for example, 60° C. to 80° C. Three or more resin pellets heated to different temperatures may be used.

For example, the characteristics of the resin pellet P3 disposed in the through hole 292 provided on the tip end side of the tooth portion 5 may be different from the characteristics of the resin pellet P4 disposed in the through hole 292 provided on the base end side of the tooth portion 5. That is, the flowability when the resin pellet P3 becomes melted resin may be lower than the flowability when the resin pellet P4 becomes melted resin, depending on the kind of resin forming the resin pellets P3 and P4 and the kind of filler contained in the resin pellets P3 and P4.

For example, the tooth portion 5 or the mold core member 260 may be heated such that the temperature of the tip end side of the tooth portion 5 is lower than the temperature of the base end portion of the tooth portion 5. Also in this case, the reaction of melted resin charged in the filling space V1 relatively less proceeds and the flowability is low on the tip end side of the tooth portion 5, while the reaction relatively well proceeds and the flowability is high on the base end side of the tooth portion 5.

In order to set the tooth portion 5 or the mold core member 260 to partially different temperatures in the extending direction of the tooth portion 5, two or more different independent heaters may be provided in the lower die 210 and/or upper die 290. These heaters may be annular and may be disposed concentrically so as to be arranged along the extending direction of the tooth portion 5. The temperature of the heater positioned on the tip end side of the tooth portion 5 is set to a lower temperature, and the temperature of the heater positioned on the base end side of the tooth portion 5 is set to a higher temperature.

In order to set the tooth portion 5 or the mold core member 260 to partially different temperatures in the extending direction of the tooth portion 5, two or more different independent heaters may be provided in the inside of the mold core member 260. These heaters may be arranged in the radial direction of the tooth portion 5. The temperature of the heater positioned on the tip end side of the tooth portion 5 is set to a lower temperature, and the temperature of the heater positioned on the base end side of the tooth portion 5 is set to a higher temperature.

69) When melted resin is charged into the filling space V1, melted resin in a high flowability state may be charged into the filling space V1 after melted resin in a low flowability state is charged into the filling space V1. In this case, melted resin in a low flowability state is charged into the filling space V1 on the opposite side to the melted-resin charging port. This configuration can suppress leakage of melted resin from the opposite side to the charging port. On the other hand, melted resin in a high flowability state is charged on the charging port side. This can enhance the filling property of melted resin on the charging port side.

Figure 87:
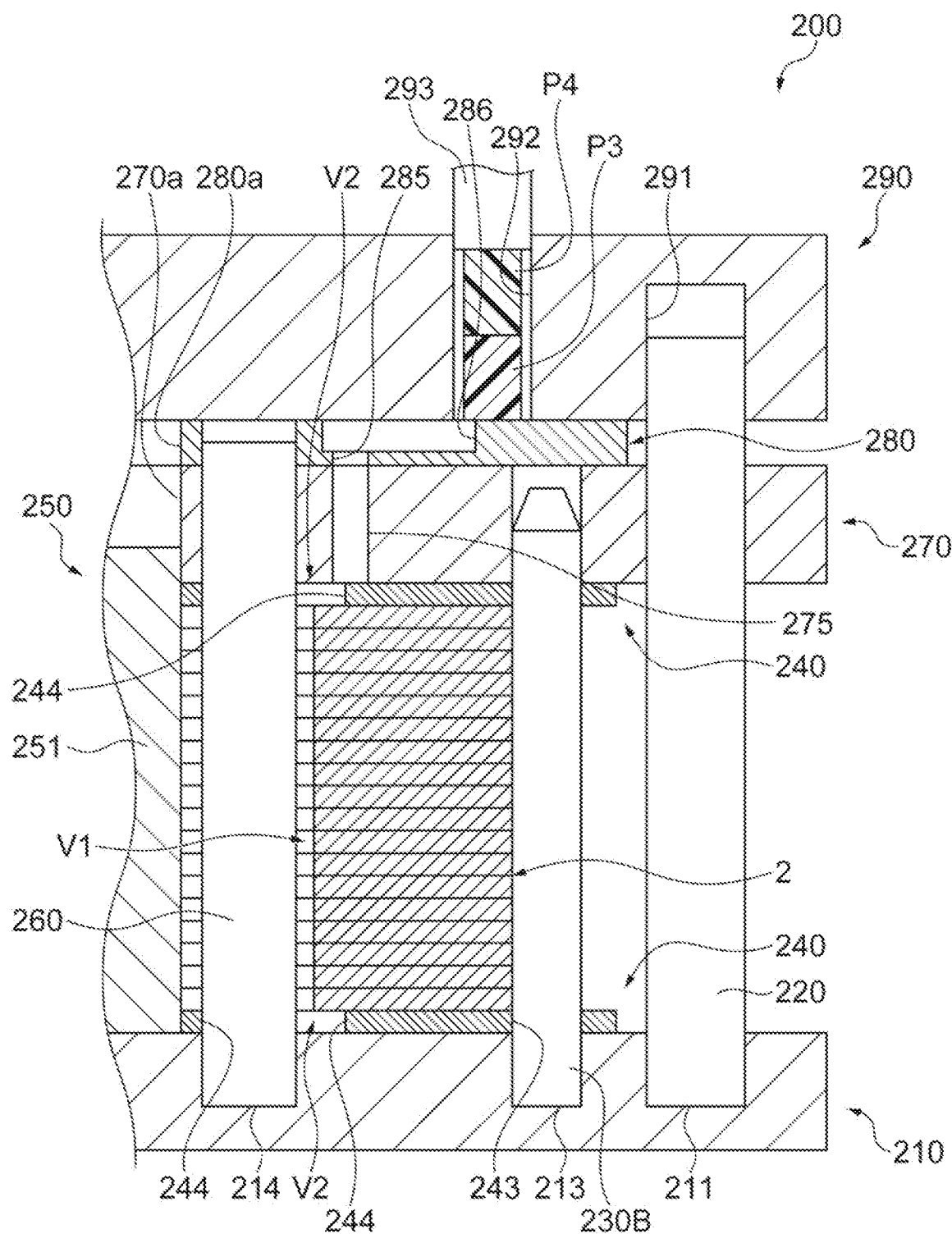
FIG. 87 is a diagram for explaining a process of manufacturing another example stacked stator core, specifically, a cross-sectional view partially illustrating the resin filling device and a stack.

For example, as illustrated in FIG. 87, in a state in which the resin pellet P3 heated to a relatively low temperature and the resin pellet P4 heated to a relatively high temperature are disposed in the through hole 292 such that the resin pellet P3 is positioned closer to the filling space V1 than the resin pellet P4, these resin pellets P3 and P4 are melted and pushed out by the plunger 293 into the filling space V1. When the resin is heated to a relatively low temperature, the reaction relatively less proceeds, so that the flowability is low (the viscosity is high) and the curing speed is slow. On the other hand, when the resin is heated to a relatively high temperature, the reaction relatively well proceeds, so that the flowability is high (viscosity is low) and the curing speed is fast. In this configuration, melted resin in a high flowability state can be charged into the filling space V1 after melted resin in a low flowability state is charged into the filling space V1. The temperature difference between the resin pellet P3 at a relatively low temperature and the resin pellet P4 at a relatively high temperature may be approximately 20° C. The heating temperature of the resin pellet P3 may be approximately, for example, 40° C. to 60° C., and the heating temperature of the resin pellet P4 may be approximately, for example, 60° C. to 80° C. Three or more resin pellets heated to different temperatures may be used.

For example, the characteristics of the resin pellets P3 and P4 disposed in one through hole 292 may be different. That is, the flowability when the resin pellet P3 becomes melted resin may be lower than the flowability when the resin pellet P4 becomes melted resin, depending on the kind of resin forming the resin pellets P3 and P4 and the kind of filler contained in the resin pellets P3 and P4.

For example, the tooth portion 5 or the mold core member 260 may be heated such that the temperature of the tooth portion 5 on the opposite side to the melted-resin charging port is lower than the temperature on the charging port side. Also in this case, the reaction of melted resin charged in the filling space V1 relatively less proceeds and the flowability is low on the opposite side to the charging port, while the reaction relatively well proceeds and the flowability is high on the charging port side.

In order to set the tooth portion 5 or the mold core member 260 to partially different temperatures in the stacking direction, different independent heaters may be provided in the lower die 210 and the upper die 290. When melted resin is charged from the upper die 290 side, the temperature of the heater positioned in the lower die 210 is set to a lower temperature, and the temperature of the heater positioned in the upper die 290 is set to a higher temperature.

In order to set the tooth portion 5 or the mold core member 260 to partially different temperatures in the stacking direction, two or more different independent heaters may be provided in the inside of the mold core member 260. These heaters may be arranged in the stacking direction. When melted resin is charged from the upper die 290 side, the temperature of the heater positioned on the lower die 210 side is set to a lower temperature, and the temperature of the heater positioned on the upper die 290 side is set to a higher temperature.

Figure 88:
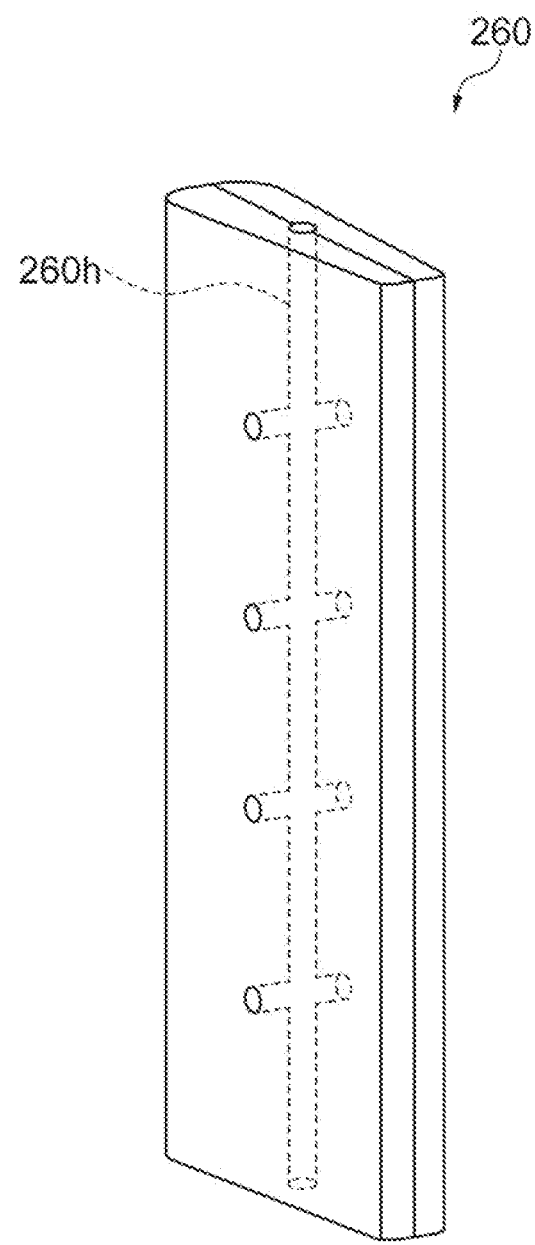
FIG. 88 is a perspective view illustrating another example mold core member.

70) As illustrated in FIG. 88, a resin channel 260h extending through the end surface and the side surface of the mold core member 260 may be provided in the mold core member 260. In this case, melted resin may be charged into the filling space V1 through the resin channel 260h in the mold core member 260. In this case, since melted resin is directly injected at a midpoint of the filling space, the filling property of melted resin into the filling space V1 can be enhanced. As illustrated in FIG. 88, when the mold core member 260 is configured to be divided at the position of the resin channel 260h, the hardened product (called "cull") of melted resin left in the resin channel 260h is easily removed.

71) The kinds of melted resin charged into the filling spaces V1 may be all the same or may be different according to the filling spaces V1.

72) Melted resin may be charged into each filling space V1 from the lower die 210 side, may be charged from the upper die 290 side, or may be charged from both the lower die 210 side and the upper die 290 side.

73) Although not illustrated in the figures, the tooth portion 5 may be split into multiple parts. For example, a bifurcate tooth portion 5 may be provided for the yoke portion 4. In this case, the resin portion 3 may be provided in a gap split in the tooth portion 5.

74) Although not illustrated in the figures, a heater for heating the mold core member 260 may be connected to the mold core member 260. In this case, the mold core member 260 is heated by the heater before melted resin is charged into the filling space V1, whereby the mold core member 260 thermally expands, and the mold core member 260 can close the opening 8 more reliably. This configuration can suppress leakage of melted resin from the opening 8 more. Since heating the mold core member 260 allows melted resin to be heated, the flowability of melted resin can be enhanced. On the other hand, heating of the mold core member 260 is stopped after charging melted resin into the filling space V1, whereby the mold core member 260 shrinks to return to the original shape, and a gap can be formed between the resin portion 3 provided on the inner wall surface F2 of the slot 7 and the mold core member 260. In this configuration, the mold core member 260 can be easily inserted into and removed from the slot 7. The mold core member 260 may be heated, for example, by heating the mold core member 260 by a heater or by circulating a heated fluid through a channel provided in the mold core member 260.

75) The stacked stator core 1 may be produced by obtaining a work having the resin portion 3 in the slot 7 of a block in which a plurality of blanked members W are stacked, and thereafter stacking and integrating a plurality of works.

76) All of the mold core members 260 may be inserted/removed from above the slots 7, or all of the mold core members 260 may be inserted/removed from below the slots 7. Alternatively, some of the mold core members 260 may be inserted/removed from above the slots, and the remaining mold core members 260 may be inserted/removed from below the slots 7. In this case, since the load (friction resistance) produced in the stack 2 is distributed between the upper end surface side and the lower end surface side of the stack 2 when the mold core members 260 are inserted into the slots 7, the mold core members 260 are easily inserted into the slots 7 and the mold core members 260 are easily removed from the slot 7.

Figure 89:
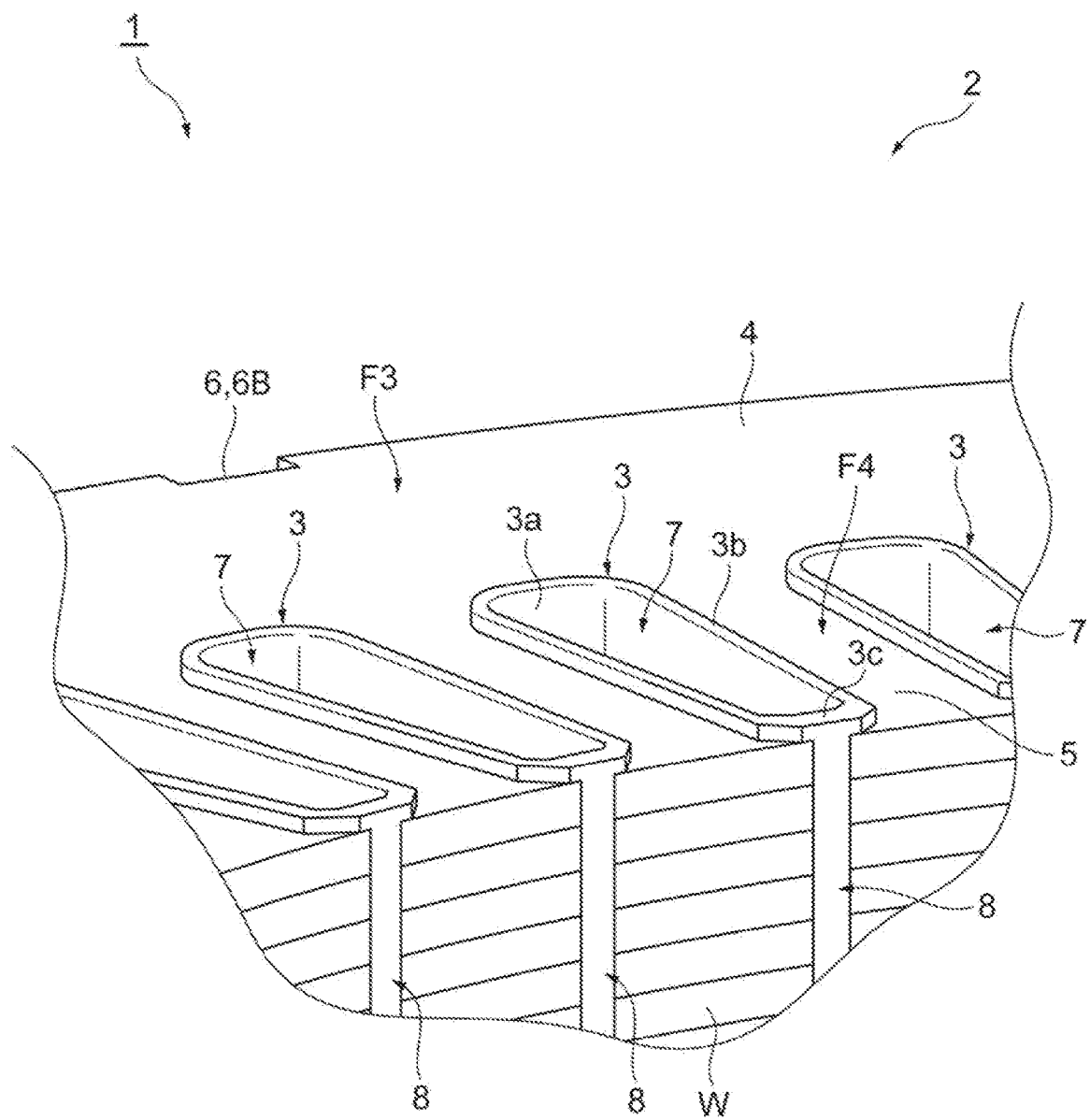
FIG. 89 is a partially enlarged perspective view of the vicinity of tooth portions of another example stacked stator core.
Figure 90:
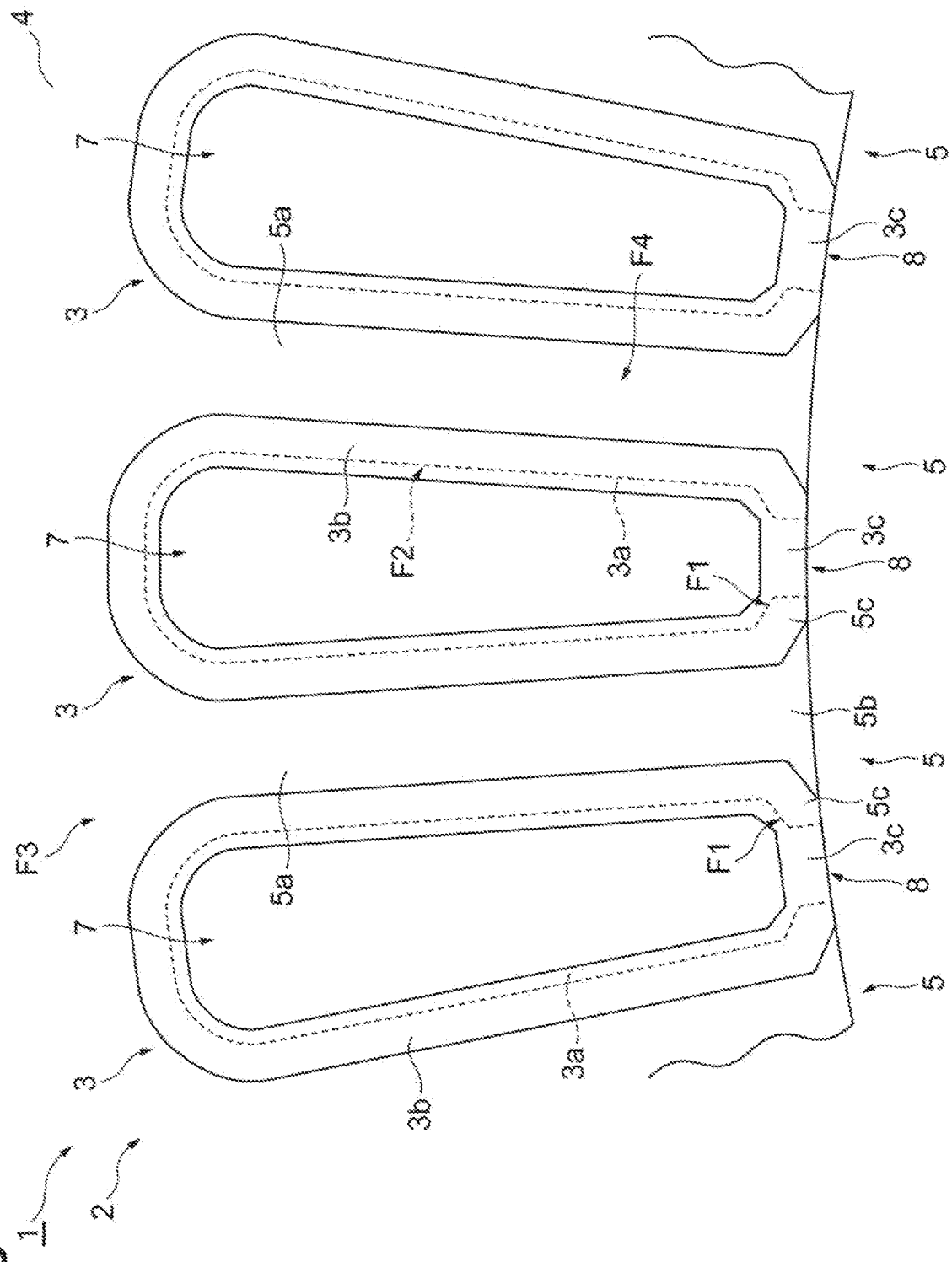
FIG. 90 is a partially enlarged top view of the vicinity of tooth portions of FIG. 89.

77) In the manner described above, the opening 8 is not closed by the resin portion 3. However, the present invention is similarly applicable to the manner in which the opening 8 is closed by the resin portion 3. For example, as illustrated in FIG. 89 and FIG. 90, the opening 8 may be closed by a closing portion 3c of the resin portion 3. The closing portion 3c is formed integrally with the main portion 3a and the end portion 3b.

Figure 91:
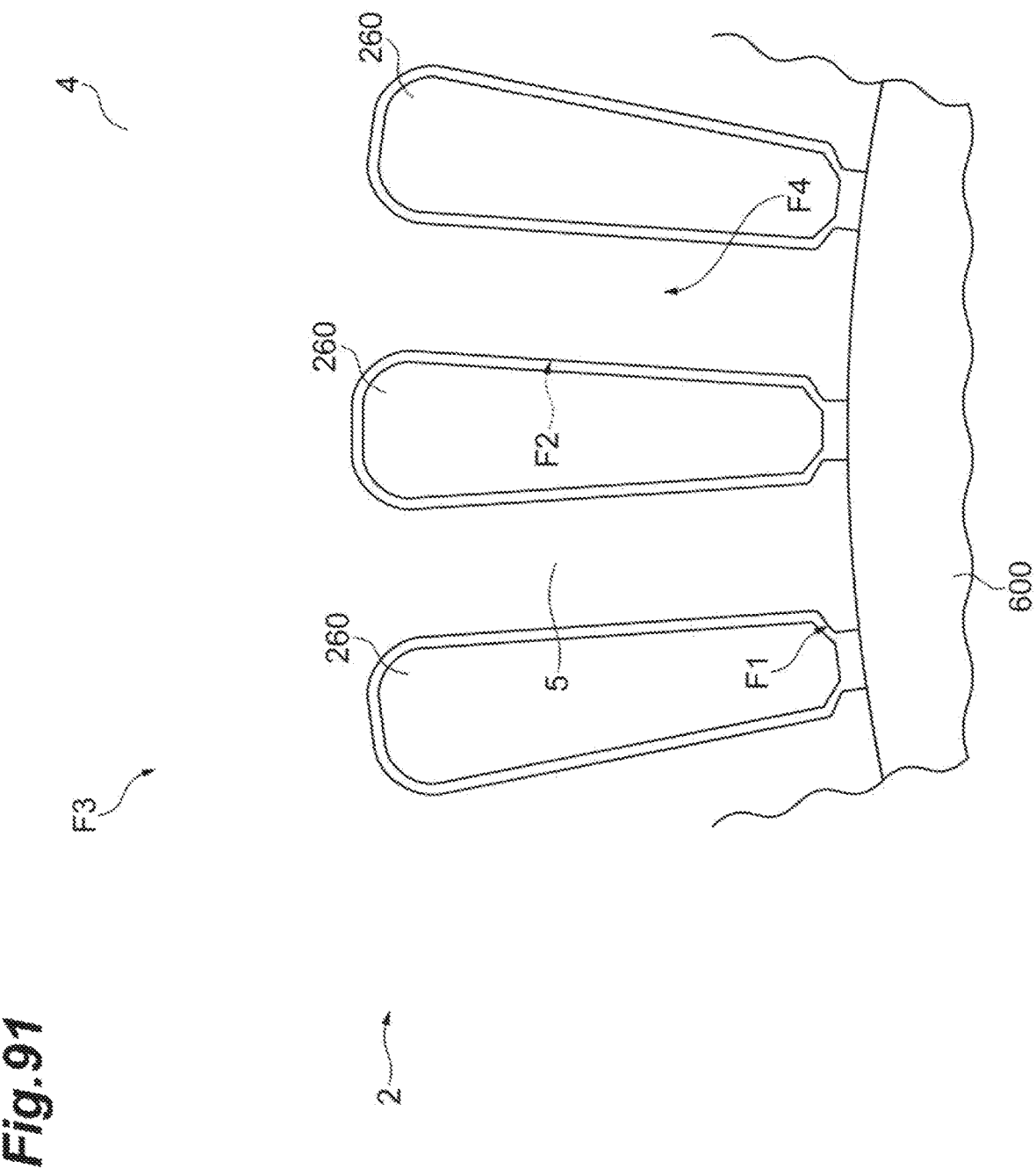
FIG. 91 is a diagram for explaining a process of manufacturing another example stacked stator core, specifically, a top view illustrating a state in which openings are closed by a closing member.
Figure 92:
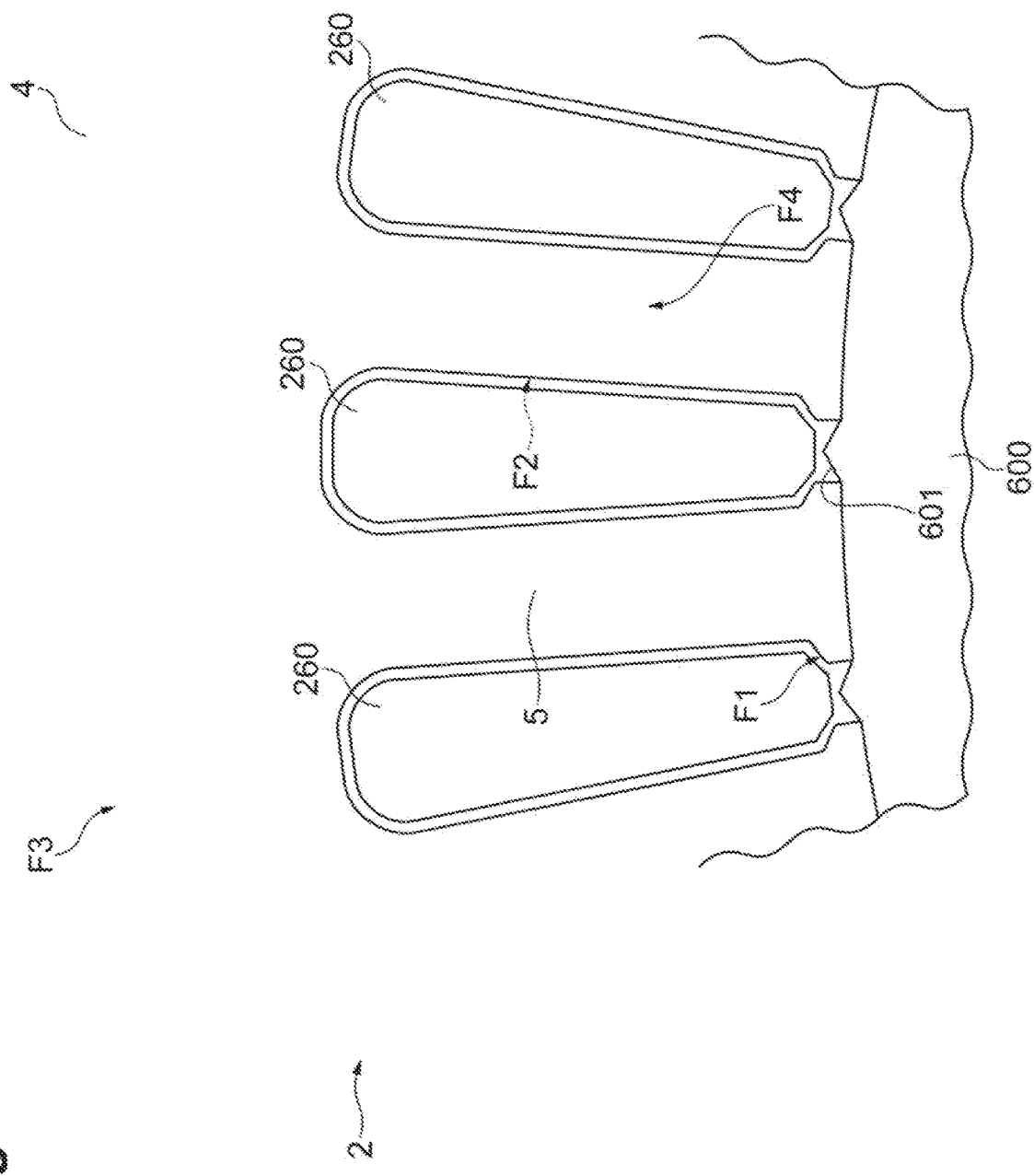
FIG. 92 is a diagram for explaining a process of manufacturing another example stacked stator core, specifically, a top view illustrating a state in which openings are closed by a closing member.

Here, in order to produce the stacked stator core 1 with the opening 8 closed by the resin portion 3, for example, as illustrated in FIG. 91, melted resin is charged into the filling space V1 in a state in which the mold core member 260 disposed in the slot 7 is spaced apart from the inner wall surface F2 of the slot 7 and all the openings 8 are closed by a closing member 600 disposed in the through hole 2a. For example, as illustrated in FIG. 64, the closing member 600 may be a cylindrical body having an outer diameter substantially equal to the inner diameter of the stack 2 (tooth portion 5). For example, as illustrated in FIG. 92, the closing-member 600 may have a ridge 601 corresponding to each opening 8 on the peripheral surface of the cylindrical closing member 600. In this case, since each opening 8 is closed by the corresponding ridge 601, leakage of melted resin from the opening 8 can be suppressed.

Figure 93:
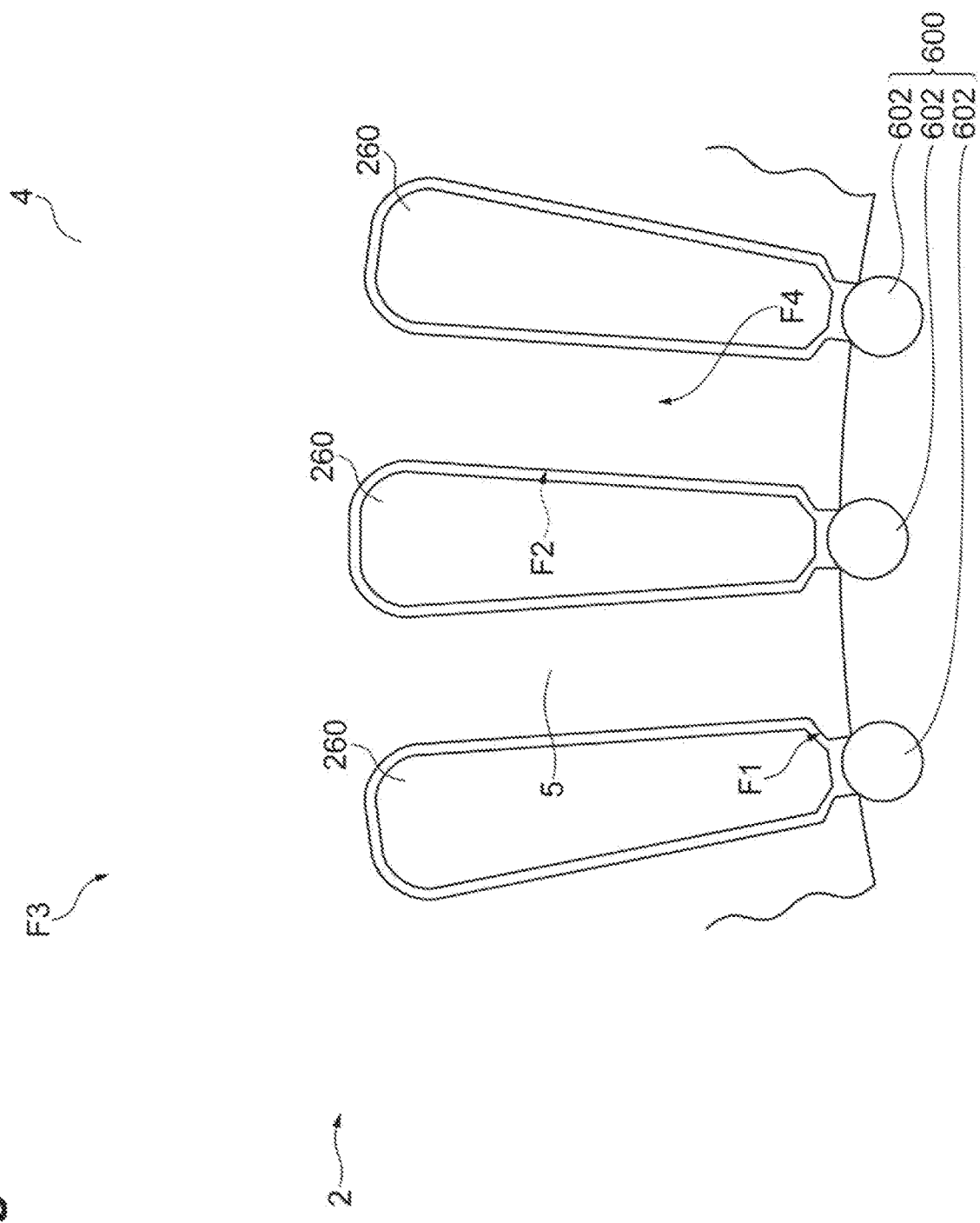
FIG. 93 is a diagram for explaining a process of manufacturing another example stacked stator core, specifically, a top view illustrating a state in which openings are closed by a closing member.
Figure 94:
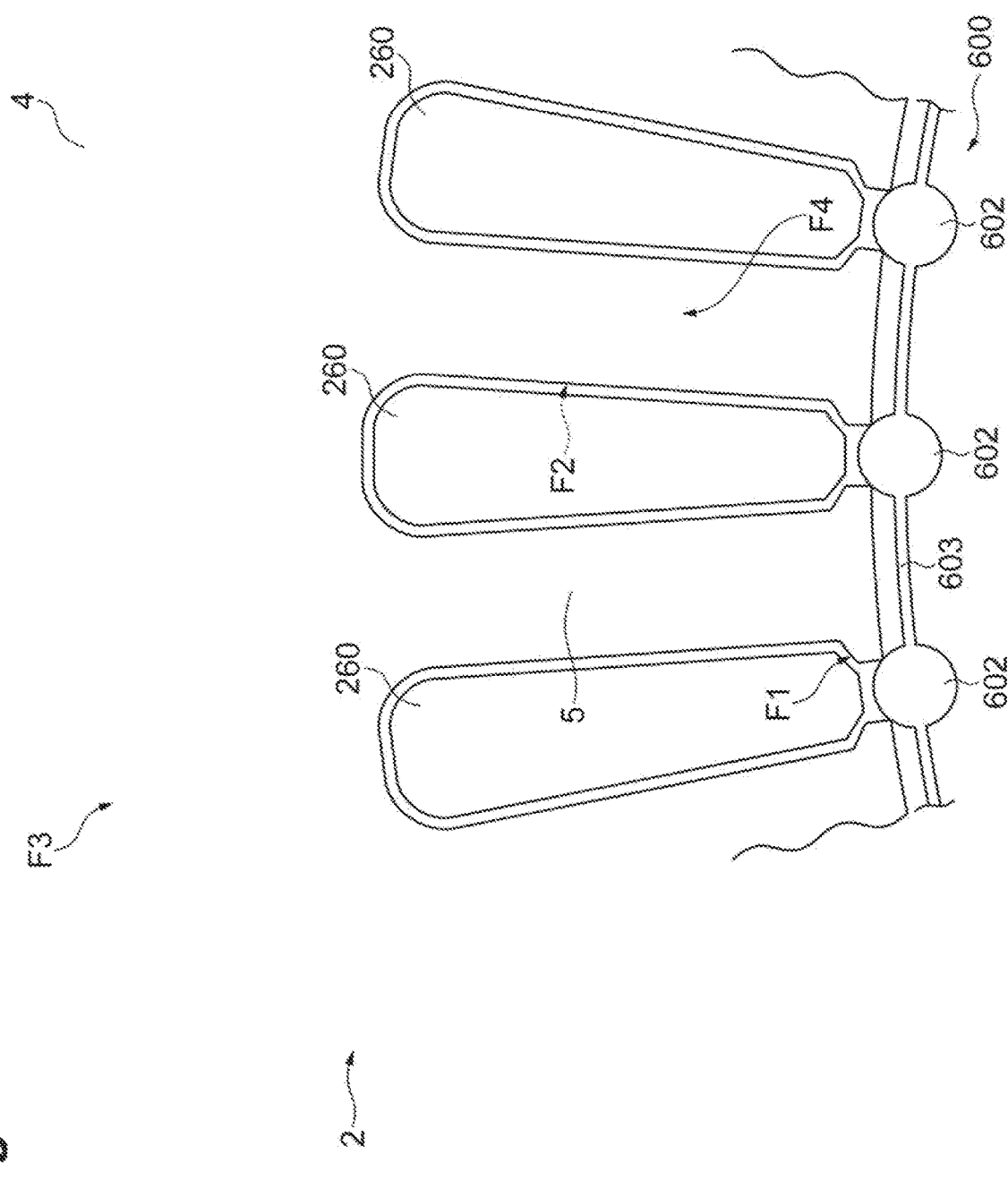
FIG. 94 is a diagram for explaining a process of manufacturing another example stacked stator core, specifically, a top view illustrating a state in which openings are closed by a closing member.

For example, as illustrated in FIG. 93, the closing member 600 may be configured with a plurality of column-shaped bodies 602. The column-shaped body 602 may be shaped like a cylinder, may be shaped like a rectangular prism, or may be shaped like a column having any other cross-sectional shapes. When the opening 8 is closed by the closing member 600, one column-shaped body 602 is disposed for the corresponding opening 8. As illustrated in FIG. 94, the adjacent column-shaped bodies 602 may be connected by a connecting member 603. In this case, all of the column-shaped bodies 602 are connected by the connecting member 603, and the column-shaped bodies 602 may be annular as a whole. Alternatively, not all but some of the column-shaped bodies 602 may be connected by the connecting member 603. Although not illustrated in the figures, the diameter increaser 250 may be used as the closing member 600, and the opening 8 may be closed by the outer peripheral surface of the diameter-increasing member 251.

Although FIG. 91 to FIG. 94 depict the closing member 600 completely abutting on the openings 8, a minute gap (for example, a gap of approximately a few tens of μm) may exist between the opening 8 and the closing member 600.

Additional Examples

An example method of manufacturing a-stacked stator core may include a first step of obtaining a stack configured such that a plurality of core members are stacked, the stack including an annular yoke portion and a plurality of tooth portions extending from the yoke portion in a crossing direction crossing the yoke portion. The method may further include a second step of inserting a mold core member into each of a plurality of slots, each of the plurality of slots being a space formed between adjacent two of the plurality of tooth portions in a circumferential direction of the yoke portion. Additionally, the method may include a third step of forming a resin portion by charging melted resin into a filling space between the slot and the mold core member. In the second step, the body portion of the mold core member may extend along the extending direction of the slot and may be spaced apart from the inner wall surface of the slot. In the second step, a closing portion of the mold core member may be positioned on a slot opening side and may close an open end portion of the slot on the slot opening side, the closing portion being connected to the body portion.

In some examples, even when melted resin flows around the mold core member, the shape of the mold core member is not deformed. Therefore, melted resin hardly leaks out of the slot opening. Thus, when melted resin is charged into the filling space between the slot and the mold core member in the third step, the resin portion is formed in a region of the inner wall surface of the slot, the region facing the body portion of the mold core member. On the other hand, the resin portion is not formed outside the slot opening side. As a result, the air gap between the inner peripheral surface of the stack and the outer peripheral surface of the rotor can be kept at a predetermined size. Since the closing portion of the mold core member exists at the open end portion in the third step of charging melted resin into the filling space, the open end portion is not filled with melted resin. That is, the resin portion formed on the inner wall surface of the slot does not close the open end portion. In this configuration, since the slot opening is kept open, a winding coil can be attached to the tooth portion, for example, using a general coil winder with no need for a special material and apparatus. The winding operation thus can be performed at low cost while the insulation between the winding coil and the stack is ensured by the resin portion. Furthermore, when melted resin is charged into the filling space between the slot and the mold core member in the third step, melted resin slightly intrudes into the gap between the plurality of core members stacked. In this configuration, melted resin is cured whereby the core members are joined to each other through the resin. The expansion of the core members in the stacking direction thus can be suppressed.

In some examples, in the second step, the closing portion may abut on the inner wall surface of the open end portion. In this case, the resin portion is not formed on the inner wall surface of the slot on the open end portion side. This configuration can further suppress leakage of melted resin out of the slot opening.

In some examples, in the second step, the closing portion may abut on the inner wall surface of the open end portion in a region of the slot inside the slot opening. Even when the mold core member abuts on the inner wall surface of the slot, a minute gap (for example, a gap of approximately a few tens of μm) exists when viewed microscopically. Melted resin may penetrate the gap by capillarity to cause burrs. However, with the method described in the third section, the mold core member does not abut in a region of the inner wall surface of the slot from the slot opening to the open end portion. With this configuration, the end point of the minute gap in which capillarity may occur exists at the slot inside the slot opening. Therefore, even if melted resin penetrates the gap, burrs are less likely to be formed outside the slot opening.

In some examples, the inner wall surface of the open end portion may include a first inclined surface inclined relative to the extending direction of the tooth portion, the closing portion may include a second inclined surface corresponding to the first inclined surface, and the first inclined surface of the opening end portion and the second inclined surface of the closing portion may abut on each other. In this case, the contact area between the mold core member and the open end portion is increased. With this configuration, the open end portion is closed more securely by the closing portion of the mold core member. Leakage of melted resin out of the slot opening thus can be further suppressed. Melted resin penetrates the minute gap by capillarity to reach the end point of the gap and thereafter develops so as to extend along the extending direction of the first and second inclined surfaces. With this configuration, burrs are unlikely to adhere to the inner wall surface of the slot on the slot opening side. Burrs, if any, thus can be removed easily.

In some examples, the open end portion may protrude in the circumferential direction relative to a base end portion of the tooth portion on the yoke portion side. In this case, when viewed from the slot opening side, the resin portion formed on the inner wall surface of the slot is protected by the open end portion. With this configuration, for example, when a winding coil is attached to the tooth portion by a coil winder, the resin portion is less likely to be damaged by the winding coil or the coil winder. Consequently, occurrence of foreign matters, for example, caused by dropping of the resin portion can be suppressed.

An example method may further include a fourth step of sandwiching the stack between a pair of holding plates in the stacking direction, after the first step and before the third step. The pair of holding plates may include an auxiliary space communicatively connected with the filling space in a region facing the filling space. In the third step, melted resin may be charged into the filling space and the auxiliary space to form the resin portion. In this case, in the third step, not only the filling space but also the auxiliary space of the holding plate is filled with melted resin. With this configuration, the resin portion provided on the inner wall surface of the slot protrudes outside the end surface of the stack. Accordingly, when a winding coil is attached to the tooth portion, the winding coil is less likely to abut on the end surface of the stack (tooth portion). Furthermore, since the linear distance between the winding coil and the tooth portion is increased, surface discharge is less likely to occur between the winding coil and the tooth portion. In addition, since the resin portion protrudes outside the end surface of the stack, the state of the core members entirely fastened by the resin portion is easily kept even when the resin portion is shrunken by heat. This configuration can suppress separation of the core members positioned on the end surface side of the stack and also can suppress chipping and cracking of the resin portion due to the separation. If chipping occurs, resin pieces dropping from the resin portion scatter in the surroundings as foreign matters, possibly influencing the performance of the motor when the motor is configured using the stacked stator core. If cracking occurs, surface discharge occurs between the winding coil and the stack in the cracked region, and electrical continuity may be established between the winding and the stack.

In some examples, the pair of holding plates may be provided with an auxiliary space continuous from a region facing the filling space to a region facing at least a part of the end surface of the tooth portion adjacent to the filling space. In this case, in the third step, not only the filling space but also the auxiliary space of the holding plate is filled with melted resin. In this configuration, the resin portion is formed on the inner wall surface of the slot and also formed on the end surface of the tooth portion around the inner wall surface. Accordingly, when a winding coil is attached to the tooth portion, the winding coil is less likely to abut on the end surface of the stack (tooth portion).

In some examples, the pair of holding plates may include an auxiliary space continuous from a region facing the filling space to a region facing at least a part of the end surface of the tooth portion adjacent to the filling space. The filling space may be positioned to be shifted from the auxiliary space such that the filling space protrudes toward the slot relative to the auxiliary space. In this case, in the third step, not only the filling space but also the auxiliary space of the holding plate is filled with melted resin. In this configuration, the resin portion is formed on the inner wall surface of the slot and also formed on the end surface of the tooth portion around the inner wall surface. Accordingly, when a winding coil is attached to the tooth portion, the winding coil is less likely to abut on the end surface of the stack (tooth portion). In this case, the filling space is positioned to be shifted from the auxiliary space such that the filling space protrudes toward the slot relative to the auxiliary space. In this configuration, when melted resin charged into the filling space and the auxiliary space is solidified into a resin portion, a resin main portion of the resin portion in the filling space is disposed to be shifted from a resin end portion of the resin portion in the auxiliary space such that the resin main portion protrudes toward the slot relative to the resin end portion. Accordingly, when a winding coil is attached to the tooth portion, the winding coil is easily bent at a stepped portion where the resin main portion and the resin end portion are shifted from each other, and the diameter of the winding coil wound around the tooth portion is reduced. As a result, the coil length is reduced as a whole, so that heat generated in the winding coil can be suppressed and the height of the stacked stator core after the winding coil is attached can be reduced as a whole.

In some examples, the pair of holding plates may include a region partially abutting on the end surface of the tooth portion. In this case, the end surface of the tooth portion includes a covered region covered with the resin portion and a non-covered region not covered with the resin portion. Here, the resin portion is obtained from melted resin at high temperature (for example, approximately 120° C. to 200° C.) which is cooled to room temperature and cured. Since melted resin is shrunken with temperature change from high temperature to room temperature, internal stress may remain in the resin portion. When the internal stress is large, chipping or cracking likely occurs in the resin portion. However, in some examples, since the non-covered region exists on the end surface of the tooth portion, expansion and shrinkage of the resin portion is alleviated in the non-covered region and the internal stress is less likely to remain in the resin portion. This configuration can suppress chipping in the resin portion.

In some examples, the pair of holding plates may include an auxiliary space continuous from a region facing the filling space to a region facing at least a part of the end surface of the yoke portion adjacent to the filling space. In this case, in the third step, not only the filling space but also the auxiliary space of the holding plate is filled with melted resin. In this configuration, the resin portion is formed on the inner wall surface of the slot and also formed on the end surface of the yoke portion around the inner wall surface. Accordingly, when a winding coil is attached to the tooth portion, the winding coil is less likely to abut on the end surface of the stack (yoke portion).

In some examples, the auxiliary space may include a portion that faces the end surface of the yoke portion and extends annularly along the circumferential direction. In this case, since the end surface of the yoke portion is covered with the resin portion in a wider range, the winding coil is even less likely to abut on the end surface of the stack (yoke portion).

In some examples, the auxiliary space may include a first portion and a second portion. The first portion may face the end surface of the yoke portion, be higher than the second portion, and extend along the circumferential direction. The second portion may face the end surface of the yoke portion. In this case, when melted resin is charged into the auxiliary space, a resin wall portion that is tall and extends in the circumferential direction is formed on the end surface of the yoke portion so as to correspond to the first portion of the auxiliary space. When a winding coil is wound around a set of a plurality of tooth portions (in the case of distributed winding), the winding coil exiting from one slot extends toward the yoke portion, creeps on the yoke portion, and then extends toward another slot not adjacent to the one slot. In this configuration, when the resin wall portion is formed on the end surface of the yoke portion, the resin wall portion can be used as a guide for the winding coil in the distributed winding. The winding coil therefore can be effectively attached to the stacked stator core.

In some examples, the end surface of the stack may include a portion that faces the auxiliary space and is roughed or depressed relative to the other portion of the end surface of the stack. In this case, the adherence of the resin portion to the end surface of the stack is increased. This can suppress separation of the resin portion from the stack.

In some examples, the corner of a depressed groove that forms the auxiliary space may have a rounded cross-sectional shape or may be inclined relative to a bottom wall surface and a side wall surface of the depressed groove. In this case, the corner portion of the resin portion extends from the inner wall surface of the slot around the end surface of the stack and is chamfered or filleted. In this configuration, when a winding coil is attached to the tooth portion, the winding coil is easily wound along the outer shape of the resin portion. This configuration reduces stress acting on the resin portion from the winding coil and thus can suppress, for example, chipping and cracking in the resin portion.

In some examples, the width of the tooth portion may be reduced and/or the inner diameter of the yoke portion may be increased toward both end surfaces of the stack in the stacking direction. In this case, the corner of the tooth portion on the slot side and/or the corner of the yoke portion on the slot side is inclined. In this configuration, the thickness of the portion of the resin portion, the portion of the resin portion extending from the inner wall surface of the slot around the end surface of the stack, is easily ensured. Cracking in this portion of the resin portion thus can be suppressed. When a winding coil is attached to the tooth portion, this portion of the resin portion can suppress dielectric breakdown between the winding coil and the tooth portion and/or the yoke portion.

An example method may further include a fifth step of applying a load to the stack in the stacking direction through the pair of holding plates such that the stacking height of the stack achieves a predetermined target stacking height, in a state in which the stack is sandwiched between the pair of holding plates in the stacking direction, after the first step and before the third step. The thickness of each core member that constitutes a stack is not always the same. Thus, if the resin portion is-formed in the slots and a plurality of core members are fastened by the resin portion, with a constant load applied on any stack, the height may vary among stacked stator cores. However, in some examples, a load is applied to a stack such that the stacking height of the stack achieves a predetermined target stacking height. With this configuration, the heights of resulting stacked stator cores are substantially the same. A stacked stator core having a desired size as designed thus can be obtained.

In some examples, in the fifth step, a stopper member having a height of a target stacking height may be disposed between the pair of holding plates, and a load may be applied to the stack in the stacking direction through the pair of holding plates such that the pair of holding plates abut on the stopper member, in a state in which the pair of holding plates sandwich the stack and the stopper member together in the stacking direction. In this case, the stacking height of the stack can be easily matched with the target stacking height by the stopper.

In some examples, a thermal expansion coefficient of at least one of the pair of holding plates may be higher than a thermal expansion coefficient of the stack. In this case, since the holding plates and the stack are heated when melted resin is charged into the filling space, the holding plates expand more than the stack. The stack is therefore pressed by the pair of holding plates. Accordingly, leakage of melted resin charged in the filling space from the gap between the holding plates and the stack can be suppressed.

In some examples, at least one of the pair of holding plates may include an escape portion through which each mold core member can pass, at a position corresponding to each mold core member, in order that stacks with different stacking heights can be sandwiched in the pair of holding plates. In this case, when the stacking height of the stack is relatively large, the mold core member hardly or never passes through the escape portion, but when the stacking height of the stack is relatively small, the end of the mold core member passes through the escape portion. With this configuration, the stacking height of the stack that can be sandwiched by the pair of holding plates can vary in a wide range. Accordingly, stacks having different stacking heights can be handled by one resin filling device.

In some examples, a thermal expansion coefficient of the mold core member may be higher than a thermal expansion coefficient of the stack. In this case, when melted resin is charged into the filling space, the mold core member and the stack are heated, so that the mold core member expands more than the stack. With this configuration, the open end portion is securely closed by the closing portion of the expanded mold core member. Leakage of melted resin out of the slot opening thus can be further suppressed.

In some examples, the surface of the mold core member may be subjected to mold-release treatment. In this case, the mold core member can be easily removed from the slot after melted resin is charged in the filling space and solidified.

In some examples, the mold core member may include a channel through which a refrigerant circulates. In this case, a cooling medium is circulated through the channel after charging melted resin into the filling space, whereby the volume of the mold core member is reduced to facilitate removal of the mold core member from the slot of the stack. This configuration reduces the time required for removing the mold core member from the slot of the stack and thus can improve productivity of stacked stator cores.

In some examples, the thermal conductivity of at least a portion around the channel in the mold core member may be higher than the thermal conductivity of the stack. In this case, the shrinkage of the mold core member is accelerated, so that the mold core member can be removed from the stack even more easily.

An example method may further include a sixth step of applying voltage between the mold core member and the stack to test the insulation of the resin portion, after the third step. In this case, the mold core member not only has the function of forming a filling space between the mold core member and the stack but also functions as an element for insulation testing. This eliminates, for example, the need for the operation of removing the mold core and inserting another testing member into the slot for insulation testing. The insulation testing thus can be performed efficiently.

An example method may further include: a seventh step of aligning, in the circumferential direction, a plurality of diameter-increasing members configured to be movable in the crossing direction and disposing the plurality of diameter-increasing members inside the yoke portion, after the first step and before the third step; and an eighth step of moving each diameter-increasing member toward the tooth portion so that the outer peripheral surface of each diameter-increasing member contacts on the inner peripheral surface of the stack to apply an outward force in the crossing direction to the stack, after the seventh step. In this case, melted resin is charged into the filling space in a state in which the shape of the stack is kept by the diameter-increasing member. This can suppress deformation of the stack by heat of melted resin. Accordingly, a stacked stator core is produced in a desired shape as designed and, therefore, the motor formed with the stacked stator core can achieve improved performance.

In some examples, at least the outer peripheral surface of each diameter-increasing member may be formed with an elastic material. In this case, when the outer peripheral surface of the diameter-increasing member abuts on the inner peripheral surface of the stack, the outer peripheral surface of the diameter-increasing member is elastically deformed. In this configuration, even when a plurality of stacks vary in size, the variation in size of the stacks can be absorbed by the diameter-increasing members.

An example method may further include a ninth step of bringing a plurality of positioning members into abutment with the outer peripheral surface of the stack to position the stack, after the first step and before the eighth step. In the eighth step, the stack may be sandwiched between each diameter-increasing member and each positioning member in the crossing direction. In this case, deformation of the stack by heat of melted resin can be further suppressed.

In some examples, the positioning member may be positioned to face the diameter-increasing member in the crossing direction. In this case, a large part of force acting on the stack from the diameter-increasing member is received by the positioning member at a position facing the diameter-increasing member in the radial direction, thereby suppressing force contributing to deformation of the stack. This configuration can further suppress deformation of the stack by heat of melted resin.

In some examples, in the eighth step, each positioning member may push the outer peripheral surface of the stack. In this case, the stack is pushed by the diameter-increasing member radially outward from the inner peripheral surface side and, in addition, the stack is pushed by the positioning member radially inward from the outer peripheral surface side. In this configuration, since the shape of the stack is kept by force acting from the inside and the outside of the stack, deformation of the stack by heat of melted resin can be further suppressed.

In some examples, in the second step, positioning jigs may be inserted into at least two slots of a plurality of slots, and the mold core members may be inserted into the remaining slots. An example method may further comprising steps of removing the positioning jigs from at least two slots and inserting the mold core members therein, after the third step; and charging melted resin into the filling space between at least two slots and the mold core members to form resin portions, after the third step. In this case, since the positioning is performed by slots of the stack, the accuracy of positioning is extremely increased. With this configuration, melted resin is charged into the filling space in a state in which the shape of the stack is kept by the positioning members. Accordingly, deformation of the stack by heat of melted resin is suppressed. As a result, a stacked stator core is produced in a desired shape as designed and, therefore, the motor formed with the stacked stator core can achieve improved performance.

In some examples, the mold core member may be formed with a combination of a plurality of separate pieces divided in at least one of the extending direction of the mold core member and the direction crossing the extending direction. In this case, a plurality of separate pieces are combined in a slot to form one mold core member. This configuration facilitates removal of the mold core member from the resin portion, compared with when a one-piece mold core member around which the resin portion has been formed is pulled out from the resin portion.

In some examples, at least a part of the mold core member may have a tapered shape with an outer peripheral size decreasing from one end side toward the other end side. In this case, the mold core member around which the resin portion has been formed is easily pulled out from the resin portion.

In some examples, a protective coating may be provided on the peripheral surface of the mold core member. In this case, wear of the peripheral surface of the mold core member can be suppressed. Because of the presence of the protective coating, the mold core member can be easily released from the resin portion.

In some examples, melted resin which is charged into the filling space in the third step may contain anisotropic filler. In this case, improvement in flowability of the resin (improvement in filling property of resin in the filling space) or suppression of leakage of the resin from the gap can be achieved, depending on the size of the anisotropic filler.

In some examples, in the second step, a transportation member having a stack placed thereon may be stacked on a base member having a plurality of mold core members protruding upward, whereby the mold core members are inserted into the slots of the stack placed on the transportation member. In this case, a plurality of mold core members can be inserted into the corresponding slots simultaneously and easily.

In some examples, the base member may be provided with a plurality of diameter-increasing members configured to be movable in the crossing direction. The second step may include: stacking the transportation member onto the base member, whereby the mold core members are inserted into the slots of the stack placed on the transportation member and the plurality of diameter-increasing members are disposed inside the yoke portion such that the plurality of diameter-increasing members are aligned in the circumferential direction; and moving each diameter-increasing member toward the tooth portion to bring the outer peripheral surface of the diameter-increasing member into abutment with the inner peripheral surface of the stack, thereby applying an outward force in the crossing direction to the stack. In this case, the plurality of mold core members are inserted into the corresponding slots and at the same time, the plurality of diameter-increasing members are disposed inside the stack. The mold core member and the diameter-increasing member thus can be disposed on the stack easily and quickly. In this case, melted resin is charged into the filling space in a state in which the shape of the stack is kept by the diameter-increasing member. This can suppress deformation of the stack by heat of melted resin. Accordingly, a stacked stator core is produced in a desired shape as designed and, therefore, the motor formed with the stacked stator core can achieve improved performance.

In some examples, in the third step, the base member on which the transportation member is stacked in the second step may be transported to a position different from the stacking position of the transportation member onto the base member, and thereafter melted resin may be charged into the filling space to form the resin portion. If stacking of the transportation member onto the base member and charging of melted resin into the filling space are performed at the same position, a resin supply mechanism is disposed above the transportation member moving up and down or above the base member moving up and down, so that the size of the resin filling device tends to be increased as a whole. However, in some examples, since stacking of the transportation member onto the base member and charging of melted resin into the filling space are performed at different positions, the size of the resin filling device can be reduced.

In some examples, a region of the transportation member, the region corresponding to the inside of the yoke portion of the stack, may have a through hole. In this case, when the transportation member is detached from the base member after the resin portion is formed on the inner wall surface of the slot, the formation state of the resin portion can be recognized not only from above but also from the transportation member side (below) through the through hole.

In some examples, the inner wall surface of the slot in the stack may be a projecting and depressed surface on which projections and depressions are arranged in the stacking direction of the stack. In this case, the adherence of the resin portion to the inner peripheral surface of the slot is enhanced. This can suppress separation of the resin portion from the stack.

In some examples, the mold core member may be configured to be expandable and shrinkable in the slot. In this case, the mold core member disposed in the slot is expanded and the mold core member is reduced after melted resin is charged in the filling space, thereby facilitating removal of the mold core member from the slot.

In some examples, in the third step, charging melted resin into some of a plurality of slots may be sequentially repeated to form the resin portions on the inner wall surfaces of all of the slots. When melted resin is to be charged into the filling spaces of all of the slots at a time, the size of the resin filling device tends to be increased as a whole. However, in some examples, melted resin is sequentially charged into the filling spaces of some of the slots, so that the size of the resin filling device can be reduced.

In some examples, in the third step, partially charging melted resin into the filling space may be sequentially repeated in the stacking direction of the stack to form the resin portion in the entire filling space. In this case, melted resin is partially charged in the filling space in the stacking direction. In this configuration, the filling property of the melted resin in the filling space can be enhanced compared with when melted resin is charged into the filling space at a time.

In some examples, in the second step, a resin injection channel may be provided between the inner wall surface of the slot and the outer peripheral surface of the mold core member. The resin injection channel may have a smaller channel resistance to melted resin than the filling space and extends in the stacking direction of the stack. In the third step, melted resin may be charged into the filling space through the resin injection channel. In this case, in the third step, melted resin flows from the resin injection channel to the filling space in increasing order of channel resistance. That is, melted resin fills in the resin injection channel extending in the stacking direction and then fills in the filling space in the direction crossing the stacking direction from the resin injection channel toward the filling space. Therefore, the entire filling space can be filled with melted resin more efficiently, compared with when there is no resin injection channel. As used in the present disclosure, "channel resistance" refers to energy loss caused by friction acting on melted resin when it flows through the channel (resin injection channel or filling space).

In some examples, the mold core members may be integrated with at least one of a pair of holding plates sandwiching the stack in the stacking direction and/or a plurality of diameter-increasing members disposed inside the stack.

In some examples, the resin portion may have a pair of notch grooves facing each other in the slot and extending in the stacking direction of the stack. In this case, an insulating member such as insulating paper can be attached to a pair of notch grooves.

In some examples, in the third step, melted resin may be charged into the filling space while the tooth portion or the mold core member is heated such that the temperature of the tip end side of the tooth portion is lower than the temperature of the base end side of the tooth portion. In this case, the flowability of melted resin on the tip end side of the tooth portion is relatively low. This configuration can suppress leakage of melted resin from the slot opening. On the other hand, the flowability of melted resin is relatively high on the base end side of the tooth portion. This can increase the filling property of melted resin in the filling space on the base end side of the tooth portion.

In some examples, in the third step, melted resin with a relatively low flowability may be charged into the filling space on the tip end side of the tooth portion, and melted resin with a relatively high flowability may be charged into the filling space on the base end side of the tooth portion.

In some examples, in the third step, melted resin may be charged into the filling space while the tooth portion or the mold core member is heated such that the temperature on the other end surface side is lower than the temperature on one end surface side of the tooth portion, melted resin being charged from the one end surface side. In this case, the flowability of melted resin on the other end surface side of the tooth portion is relatively low. This can suppress leakage of melted resin from the opposite side to the melted-resin charging port. On the other hand, the flowability of melted resin is relatively high on one end surface side of the tooth portion. This can increase the filling property of melted resin in the filling space on the melted-resin charging port side.

In some examples, in the third step, melted resin with a relatively high flowability may be charged after melted resin with a relatively low flowability is charged into the filling space.

In some examples, in the third step, melted resin may be charged into the filling space through a resin channel provided in the mold core member. In this case, since melted resin is directly injected at a midpoint of the filling space, the filling property of melted resin in the filling space can be enhanced.

In some examples, in the third step, the mold core member may be cooled after melted resin is charged into the filling space. In this case, the thermally-expanded mold core member is shrunken and therefore the mold core member is easily pulled out from the slot.

In some examples, in the third step, melted resin may be charged into the filling space while the mold core member is heated. In this case, the flowability of melted resin injected into the filling space can be increased.

An example method of manufacturing a stacked stator core may include a first step of obtaining a stack configured such that a plurality of core members are stacked, the stack including an annular yoke portion and a plurality of tooth portions extending from the yoke portion in a crossing direction crossing the yoke portion. The method may further include a second step of inserting a mold core member into each of a plurality of slots, each of the plurality of slots being a space formed between adjacent two of the plurality of tooth portions in a circumferential direction of the yoke portion. The method may still further include a third step of sandwiching the stack between a pair of holding plates in a stacking direction of the stack, after the first step. Additionally, the method may include a fourth step of disposing at least one closing member in a through hole provided at the center of the stack so as to close the slot openings of the slots. Still further, the method may include a fifth step of charging melted resin into a filling space between the slot, the mold core member, and the closing member to form a resin portion, after the second to fourth steps. The pair of holding plates may be provided with an auxiliary space continuous from a region facing the filling space to a region facing at least a part of an end surface of a tooth portion adjacent to the filling space. The filling space may be positioned to be shifted from the auxiliary space such that the filling space protrudes toward the slot relative to the auxiliary space. In the second step, the mold core member may extend along the extending direction of the slot and is spaced apart from the inner wall surface of the slot. In the fifth step, melted resin may be charged into the filling space and the auxiliary space to form a resin portion.

In some examples, when melted resin is charged into the filling space between the slot and the mold core member in the third step, melted resin does not leak from the slot opening because of the presence of the closing member, and the resin portion is formed on the inner wall surface of the slot and the slot opening. The air gap between the inner peripheral surface of the stack and the outer peripheral surface of the rotor thus can be kept at a predetermined size. In some examples, since the slot opening is closed by the resin portion, a winding coil can be attached to the tooth portion using a general insert device by inserting a winding coil wound into a predetermined shape beforehand into the slot (called inserter method). The attachment of winding coil thus can be performed at low cost while the insulation between the winding coil and the stack is ensured by the resin portion.

In some examples, in the fifth step, not only the filling space but also the auxiliary space of the holding plate is filled with melted resin. In this configuration, the resin portion is formed on the inner wall surface of the slot and also formed on the end surface of the tooth portion around the inner wall surface. Accordingly, when a winding coil is attached to the tooth portion, the winding coil is less likely to abut on the end surface of the stack (tooth portion). In some examples, the filling space is positioned to be shifted from the auxiliary space such that the filling space protrudes toward the slot relative to the auxiliary space. In this configuration, when melted resin charged into the filling space and the auxiliary space is solidified into the resin portion, a resin main portion of the resin portion in the filling space is disposed to be shifted from a resin end portion of the resin portion in the auxiliary space such that the resin main portion protrudes toward the slot relative to the resin end portion. Therefore, when a winding coil is attached to the tooth portion, the winding coil is easily bent at a stepped portion where the resin main portion and the resin end portion are shifted from each other, and the diameter of the winding coil wound around the tooth portion is reduced. As a result, the coil length is reduced as a whole, so that heat generated in the winding coil can be suppressed and the height of the stacked stator core after the winding coil is attached can be reduced as a whole.

An example method may further include a sixth step of sandwiching the stack in the stacking direction between the pair of holding plates, after the first step and before the fifth step. The pair of holding plates may include an auxiliary space communicatively connected with the filling space in a region facing the filling space. In the fifth step, melted resin may be charged into the filling space and the auxiliary space to form a resin portion.

In some examples, the pair of holding plates may be provided with an auxiliary space continuous from a region facing the filling space to a region facing at least a part of the end surface of the tooth portion adjacent to the filling space.

In some examples, the pair of holding plates may include an auxiliary space continuous from a region facing the filling space to a region facing at least a part of the end surface of the tooth portion adjacent to the filling space. The filling space may be positioned to be shifted from the auxiliary space such that the filling space protrudes toward the slot relative to the auxiliary space.

In some examples, the pair of holding plates may include a region partially abutting on the end surface of the tooth portion.

In some examples, the pair of holding plates may include an auxiliary space continuous from a region facing the filling space to a region facing at least a part of the end surface of the yoke portion adjacent to the filling space.

In some examples, the auxiliary space may include a portion that faces the end surface of the yoke portion and extends annularly along the circumferential direction.

In some examples, the auxiliary space may include a first portion and a second portion. The first portion may face the end surface of the yoke portion, be higher than the second portion, and extend along the circumferential direction. The second portion may face the end surface of the yoke portion.

In some examples, the end surface of the stack may include a portion that faces the auxiliary space and is roughed or depressed relative to the other portion of the end surface of the stack.

In some examples, the corner of a depressed groove that forms the auxiliary space may have a rounded cross-sectional shape or may be inclined relative to a bottom wall surface and a side wall surface of the depressed groove.

In some examples, the width of the tooth portion may be reduced and/or the inner diameter of the yoke portion may be increased toward both end surfaces of the stack in the stacking direction.

An example method may further include a seventh step of applying a load to the stack in the stacking direction through the pair of holding plates such that the stacking height of the stack achieves a predetermined target stacking height, in a state in which the stack is sandwiched between the pair of holding plates in the stacking direction, after the first step and before the fifth step.

In some examples, in the seventh step, a stopper member having a height of the target stacking height may be disposed between the pair of holding plates, and a load may be applied to the stack in the stacking direction through the pair of holding plates such that the pair of holding plates abuts on the stopper member, in a state in which the pair of holding plates sandwich the stack and the stopper member together in the stacking direction.

In some examples, a thermal expansion coefficient of at least one of the pair of holding plates may be higher than a thermal expansion coefficient of the stack.

In some examples, at least one of the pair of holding plates may include an escape portion through which each mold core member can pass, at a position corresponding to each mold core member, in order that stacks with different stacking heights can be sandwiched in the pair of holding plates.

In some examples, a thermal expansion coefficient of the mold core member may be higher than a thermal expansion coefficient of the stack.

In some examples, the surface of the mold core member may be subjected to mold-release treatment.

In some examples, the mold core member may include a channel through which a refrigerant circulates.

In some examples, a thermal conductivity of at least a portion around the channel in the mold core member may be higher than the thermal conductivity of the stack.

An example method may further include an eighth step of applying voltage between the mold core member and the stack to test the insulation of the resin portion, after the fifth step.

In some examples, in the fourth step, after a plurality of closing members configured to be movable in the crossing direction are disposed to be aligned along the circumferential direction and inside the yoke portion, each closing member is moved toward the tooth portion to apply an outward force in the crossing direction to the stack while the outer peripheral surface of each closing member abuts on the slot opening.

In some examples, at least the outer peripheral surface of each closing member may be formed with an elastic material.

An example method may further include a ninth step of bringing a plurality of positioning members into abutment with the outer peripheral surface of the stack to position the stack, after the first step and before the fourth step. In the fourth step, the stack may be sandwiched between each closing member and each positioning member in the crossing direction.

In some examples, the positioning member may be positioned to face the closing member in the crossing direction.

In some examples, in the fourth step, each positioning member may push the outer peripheral surface of the stack.

In some examples, in the second step, positioning jigs may be inserted into at least two slots of a plurality of slots, and the mold core members may be inserted into the remaining slots. An example method may further comprising steps of removing the positioning jigs from at least two slots and inserting the mold core members therein, after the fifth step; and charging melted resin into the filling space between at least two slots and the mold core members to form resin portions, after the fifth step.

In some examples, the mold core member may be formed with a combination of a plurality of separate pieces divided in at least one of the extending direction of the mold core member and the direction crossing the extending direction.

In some examples, at least a part of the mold core member may have a tapered shape with an outer peripheral size decreasing from one end side toward the other end side.

In some examples, a protective coating may be provided on the peripheral surface of the mold core member.

In some examples, melted resin which is charged into the filling space in the fifth step may contain anisotropic filler.

In some examples, in the second step, a transportation member having the stack placed thereon may be stacked onto a base member having a plurality of mold core members protruding upward, whereby the mold core members are inserted into the slots of the stack placed on the transportation member.

In some examples, the base member may be provided with a plurality of diameter-increasing members configured to be movable in the crossing direction. The second step may include: stacking the transportation member onto the base member, whereby the mold core members are inserted into the slots of the stack placed on the transportation member and the plurality of diameter-increasing members are disposed inside the yoke portion such that the plurality of diameter-increasing members are aligned in the circumferential direction; and moving each diameter-increasing member toward the tooth portion to bring the outer peripheral surface of the diameter-increasing member into abutment with the inner peripheral surface of the stack, thereby applying an outward force in the crossing direction to the stack.

In some examples, in the fifth step, the base member on which the transportation member is stacked in the second step may be transported to a position different from the stacking position of the transportation member onto the base member, and thereafter melted resin may be charged into the filling space to form the resin portion.

In some examples, a region of the transportation member, the region corresponding to the inside of the yoke portion of the stack, may have a through hole.

In some examples, the inner wall surface of the slot in the stack may be a projecting and depressed surface on which projections and depressions are arranged in the stacking direction of the stack.

In some examples, the mold core member may be configured to be expandable and shrinkable in the slot.

In some examples, in the fifth step, charging melted resin into some of a plurality of slots may be repeated to form the resin portions on the inner wall surfaces of all of the slots.

In some examples, in the fifth step, partially charging melted resin into the filling space may be sequentially repeated in the stacking direction of the stack to form the resin portion in the entire filling space.

In some examples, in the second step, a resin injection channel may be provided between the inner wall surface of the slot and the outer peripheral surface of the mold core member. The resin injection channel may have a smaller channel resistance to melted resin than the filling space and extends in the stacking direction of the stack. In the third step, melted resin may be charged into the filling space through the resin injection channel.

In some examples, the mold core members may be integrated with at least one of the pair of holding plates sandwiching the stack in the stacking direction and/or a plurality of diameter-increasing members disposed inside the stack.

In some examples, the resin portion may have a pair of notch grooves facing each other in the slot and extending in the stacking direction of the stack.

In some examples, in the fifth step, melted resin may be charged into the filling space while the tooth portion or the mold core member is heated such that the temperature of the tip end side of the tooth portion is lower than the temperature of the base end side of the tooth portion.

In some examples, in the fifth step, melted resin with a relatively low flowability may be charged into the filling space on the tip end side of the tooth portion, and melted resin with a relatively high flowability may be charged into the filling space on the base end side of the tooth portion.

In some examples, in the fifth step, melted resin may be charged into the filling space while the tooth portion or the mold core member is heated such that the temperature on the other end surface side is lower than the temperature on one end side surface of the tooth portion, melted resin being charged from the one end surface side.

In some examples, in the fifth step, melted resin with a relatively high flowability may be charged after melted resin with a relatively low flowability is charged into the filling space.

In some examples, in the fifth step, melted resin may be charged into the filling space through a resin channel provided in the mold core member.

In some examples, in the fifth step, the mold core member may be cooled after melted-resin is charged into the filling space.

In some examples, in the fifth step, melted resin may be charged into the filling space while the mold core member is heated.

An example stacked stator core may include a stack configured such that a plurality of core members are stacked, the stack including an annular yoke portion and a plurality of tooth portions extending from the yoke portion in a crossing direction crossing the yoke portion. The stacked stator core may further include a resin portion covering an inner wall surface of a slot which is a space between adjacent two of the plurality of tooth portions in a circumferential direction of the yoke portion. The resin portion may not close an open end portion of the slot on a slot opening side.

In some examples, the resin portion may not be provided on the inner wall surface of the open end portion of the slot.

In some examples, the inner wall surface of the open end portion may include an inclined surface inclined relative to the extending direction of the tooth portion.

In some examples, the open end portion may protrude in the circumferential direction relative to a base end portion of the tooth portion on the yoke portion side.

In some examples, the resin portion may not protrude in the circumferential direction relative to the open end portion.

In some examples, the resin portion may protrude outward relative to the end surface of the stack in the stacking direction of the stack.

In some examples, the resin portion may be formed on at least a part of the end surface of the tooth portion so as to extend from the inner wall surface of the slot around the end surface of the tooth portion.

In some examples, the end surface of the tooth portion may include a covered region covered with the resin portion and a non-covered region not covered with the resin portion.

In some examples, the resin portion may be formed on at least a part of the end surface of the yoke portion so as to extend from the inner wall surface of the slot around the end surface of the yoke portion.

In some examples, a portion of the resin portion on the end surface of the yoke portion may extend annularly along the circumferential direction.

In some examples, the resin portion may include a resin wall portion positioned on the end surface of the yoke portion. The resin wall portion may be higher than the remaining portion of the resin portion and may extend in the circumferential direction.

In some examples, the resin portion may include a resin main portion provided on the inner wall surface of the slot and a resin end portion of the resin portion provided on the end surface of the stack. The resin main portion may be disposed to be shifted from the resin end portion such that the resin main portion protrudes toward the slot relative to the resin end portion.

In some examples, the corner of the resin end portion may be chamfered or filleted.

In some examples, the end surface of the stack may include a covered portion covered with the resin portion. The covered portion may be roughed or depressed relative to the other portion of the end surface of the stack.

In some examples, the width of the tooth portion may be reduced and/or the inner diameter of the yoke portion may be increased toward both end surfaces of the stack in the stacking direction of the stack.

In some examples, the resin portion may include anisotropic filler.

In some examples, the inner wall surface of the slot in the stack may be a projecting and depressed surface on which projections and depressions are arranged in the stacking direction of the stack.

In some examples, the resin portion may have a pair of notch grooves facing each other in the slot and extending in the stacking direction of the stack.

An example stacked stator core may include a stack configured such that a plurality of core members are stacked, the stack including an annular yoke portion and a plurality of tooth portions extending from the yoke portion in a crossing direction crossing the yoke portion. The stacked stator core may further include a resin portion covering an inner wall surface of a slot which is a space between adjacent two of the plurality of tooth portions in a circumferential direction of the yoke portion. The resin portion may close a slot opening of the slot, and include a resin main portion disposed on an inner wall surface of the slot and a resin end portion disposed on an end surface of the tooth portion and an end surface of the yoke portion. The resin main portion may be disposed to be shifted from the resin end portion such that the resin main portion protrudes toward the slot relative to the resin end portion.

In some examples, the resin portion may protrude outward relative to the end surface of the stack in the stacking direction of the stack.

In some examples, the resin portion may be formed on at least a part of the end surface of the tooth portion so as to extend from the inner wall surface of the slot around the end surface of the tooth portion.

In some examples, the end surface of the tooth portion may include a covered region covered with the resin portion and a non-covered region not covered with the resin portion.

In some examples, the resin portion may be formed on at least a part of the end surface of the yoke portion so as to extend from the inner wall surface of the slot around the end surface of the yoke portion.

In some examples, a portion of the resin portion on the end surface of the yoke portion may extend annularly along the circumferential direction.

In some examples, the resin portion may include a resin wall portion positioned on the end surface of the yoke portion. The resin wall portion may be higher than the remaining portion of the resin portion and may extend in the circumferential direction.

In some examples, the resin portion may include a resin main portion provided on the inner wall surface of the slot and a resin end portion of the resin portion provided on the end surface of the stack. The resin main portion may be disposed to be shifted from the resin end portion such that the resin main portion protrudes toward the slot relative to the resin end portion.

In some examples, the corner of the resin end portion may be chamfered or filleted.

In some examples, the end surface of the stack may include a covered portion covered with the resin portion. The covered portion may be roughed or depressed relative to the other portion of the end surface of the stack.

In some examples, the width of the tooth portion may be reduced and/or the inner diameter of the yoke portion may be increased toward both end surfaces of the stack in the stacking direction of the stack.

In some examples, the resin portion may include anisotropic filler.

In some examples, the inner wall surface of the slot in the stack may be a projecting and depressed surface on which projections and depressions are arranged in the stacking direction of the stack.

In some examples, the resin portion may have a pair of notch grooves facing each other in the slot and extending in the stacking direction of the stack.

We claim all modifications and variations coming within the spirit and scope of the subject matter claimed herein.

The invention claimed is:

1. A method of manufacturing a stacked stator core, the method comprising:
    forming a stack configured such that a plurality of core members are stacked, the stack comprising an annular yoke portion, a plurality of tooth portions extending from the yoke portion in a crossing direction crossing the yoke portion, and a plurality of slots, each of the plurality of slots being a space formed between adjacent two of the plurality of tooth portions in a circumferential direction of the yoke portion;
    inserting a mold core member of a plurality of mold core members into a slot of the plurality of slots, the mold core member comprising a body portion and a closing portion connected to the body portion, the body portion extending along a longitudinal direction of the slot and spaced apart from an inner wall surface of the slot, the closing portion being positioned on a side of a slot opening of the slot and closing an open end portion of the slot on the side of the slot opening, a whole portion of the mold core member being positioned inside the slot when viewed from a stacking direction of the stack;

forming a resin portion by charging a melted resin into a filling space between the inner wall surface of the slot and an outer peripheral surface of the mold core member;

aligning, in the circumferential direction, a plurality of diameter-increasing members configured to be movable in the crossing direction and disposing the plurality of diameter-increasing members inside the yoke portion, after forming the stack and before forming the resin portion; and moving the diameter-increasing member toward the tooth portions so that an outer peripheral surface of the diameter-increasing member contacts on an inner peripheral surfaces of the tooth portion to apply an outward force in the crossing direction to the stack, after aligning the plurality of diameter-increasing members.

2. The method according to claim 1, further comprising sandwiching the stack between a pair of holding plates in a height direction of the stack, after forming the stack and before forming the resin portion, wherein the pair of holding plates comprises an auxiliary space communicatively connected with the filling space in a region facing the filling space, and wherein the resin portion is formed by charging the melted resin into the filling space and the auxiliary space.

3. The method according to claim 1, wherein a thermal expansion coefficient of the mold core member is higher than a thermal expansion coefficient of the stack.

4. The method according to claim 1, further comprising removing the mold core member from the slot by circulating a cooling medium through a channel which is provided in the mold core member, after forming the resin portion.

5. The method according to claim 1, further comprising applying voltage between the mold core member and the stack to test insulation of the resin portion, after forming the resin portion.

6. The method according to claim 1, wherein inserting the mold core member comprises inserting each mold core member into each slot, while inserting a first positioning jig into a first slot of the plurality of slots, and inserting a second positioning jig into a second slot of the plurality of slots, in order to position the stack in a direction intersecting the stacking direction of the stack, wherein the first positioning jig has a shape which is identical or corresponding to the first slot when viewed from the stacking direction of the stack, wherein the second positioning jig has a shape which is identical or corresponding to the second slot when viewed from the stacking direction of the stack, and the method further comprising:

removing the first positioning jig and the second positioning jig from the first slot and the second slot, respectively, after forming the resin portion, inserting a first mold core member of the plurality of mold core members and a second mold core member of the plurality of mold core members into the first slot and the second slot, respectively, after removing the first positioning jig and the second positioning jig, forming a first resin portion by charging the melted resin into a first filling space between an inner wall surface of the first slot and an outer peripheral surface of the first mold core member, after inserting the first mold core member; and forming a second resin portion by charging the melted resin into a second filling space between an inner wall surface of the second slot and an outer peripheral surface of the second mold core member, after inserting the second mold core member.

7. The method according to claim 1, wherein the melted resin contains an anisotropic filler.

8. The method according to claim 1, wherein the resin portion does not close the open end portion of the slot on the side of the slot opening.

9. The method according to claim 1, wherein inserting the mold core member comprises inserting the mold core member into the slot of the stack which is placed on a transportation member by stacking the transportation member on a base member, the mold core member being provided on the base member so that the mold core member protrudes upward.

10. The method according to claim 9, wherein a first positioning pin and a second positioning pin are provided on the transportation member so that the first positioning pin and second positioning pin protrude upward from a surface of the transportation member, wherein a first depressed groove and a second depressed groove are formed on an outer peripheral surface of the stack and extend in a height direction of the stack, and wherein inserting the mold core member comprises positioning the stack relative to the transportation member by engaging the first positioning pin with the first depressed groove and engaging the second positioning pin with the second depressed groove when the stack is placed on the transportation member.

11. A method of manufacturing a stacked stator core, the method comprising:

forming a stack configured such that a plurality of core members are stacked, the stack comprising an annular yoke portion, a plurality of tooth portions extending from the yoke portion in a crossing direction crossing the yoke portion, and a plurality of slots, each of the plurality of slots being a space formed between adjacent two of the plurality of tooth portions in a circumferential direction of the yoke portion;

inserting a mold core member of a plurality of mold core members into a slot of the plurality of slots, the mold core member comprising a body portion and a closing portion connected to the body portion, the body portion extending along a longitudinal direction of the slot and spaced apart from an inner wall surface of the slot, the closing portion being positioned on a side of a slot opening of the slot and closing an open end portion of the slot on the side of the slot opening, a whole portion of the mold core member being positioned inside the slot when viewed from a stacking direction of the stack;

forming a resin portion by charging a melted resin into a filling space between the inner wall surface of the slot and an outer peripheral surface of the mold core member; and sandwiching the stack between an upper die and a lower die in a height direction of the stack, including a pair of holding plates sandwiching the stack therebetween or replacing the pair of holding plates, after forming the stack and before forming the resin portion, wherein the mold core member is integrated with the upper die, the lower die, or at least one of the pair of holding plates.

12. A method of manufacturing a stacked stator core, the method comprising:
- forming a stack configured such that a plurality of core members are stacked, the stack comprising an annular yoke portion, a plurality of tooth portions extending from the yoke portion in a crossing direction crossing the yoke portion, and a plurality of slots, each of the plurality of slots being a space formed between adjacent two of the plurality of tooth portions in a circumferential direction of the yoke portion;
- inserting a mold core member of a plurality of mold core members into a slot of the plurality of slots, the mold core member comprising a body portion and a closing portion connected to the body portion, the body portion extending along a longitudinal direction of the slot and spaced apart from an inner wall surface of the slot, the closing portion being positioned on a side of a slot opening of the slot and closing an open end portion of the slot on the side of the slot opening; and
- forming a resin portion covering an inner wall surface of a slot of the plurality of slots and closing a region of a gap on a side of the slot, the gap formed between adjacent two of the plurality of core members in a height direction of the stack,
- wherein forming the resin portion comprises forming the resin portion by charging a melted resin into a filling space between the inner wall surface of the slot and an outer peripheral surface of the mold core member.

13. The method according to claim 12, wherein the resin portion does not close an open end portion of the slot on a side of slot opening.

* * * * *